United States Patent [19]

Kamada et al.

[11] Patent Number: 5,684,886
[45] Date of Patent: Nov. 4, 1997

[54] MOVING BODY RECOGNITION APPARATUS

[75] Inventors: Hiroshi Kamada; Takashi Kubota; Morito Shiohara, all of Kawasaki, Japan

[73] Assignee: Fujitsu Limited, Kawasaki, Japan

[21] Appl. No.: 428,731

[22] Filed: Apr. 25, 1995

Related U.S. Application Data

[62] Division of Ser. No. 946,540, Sep. 17, 1992, Pat. No. 5,444,791.

[30] Foreign Application Priority Data

| Sep. 17, 1991 | [JP] | Japan | 3-236464 |
| Sep. 17, 1991 | [JP] | Japan | 3-236465 |
| Sep. 17, 1991 | [JP] | Japan | 3-236466 |
| Sep. 17, 1991 | [JP] | Japan | 3-236467 |
| Nov. 15, 1991 | [JP] | Japan | 3-300591 |

[51] Int. Cl.[6] .................................................. G06K 9/00
[52] U.S. Cl. .......................... 382/107; 382/153; 382/308
[58] Field of Search ................................ 382/103, 107, 382/128, 190, 236, 297; 348/699, 700

[56] References Cited

U.S. PATENT DOCUMENTS

| 4,739,401 | 4/1988 | Sacks et al. | 382/103 |
| 4,980,762 | 12/1990 | Heeger et al. | 382/107 |
| 5,060,064 | 10/1991 | Lamnabhi et al. | 348/459 |
| 5,089,887 | 2/1992 | Robert et al. | 348/699 |
| 5,103,305 | 4/1992 | Watanabe | 382/236 |
| 5,134,472 | 7/1992 | Abe | 348/700 |
| 5,173,945 | 12/1992 | Pieters et al. | 382/107 |
| 5,241,608 | 8/1993 | Fogel | 382/107 |
| 5,257,209 | 10/1993 | Markandey | 382/107 |
| 5,272,530 | 12/1993 | Cassereau | 348/700 |
| 5,274,453 | 12/1993 | Maeda | 348/700 |
| 5,341,439 | 8/1994 | Hsu | 382/103 |

OTHER PUBLICATIONS

Darrell et al. Visual Motion, 1991 IEEE Workshop, Oct. 1991 pp. 173–178.

Biological Cybernetics, vol. 42, No. 3, 1982, Heidelberg DE, pp. 195–204, D:D: Hoffman et al. 'The Interpretaton of Biological Motion'.

IEEE Transactions on Pattern Analysis and Machine, vol. 12, No. 5, May 1990, New York US, pp. 417–434 XP168670, Hormoz Shariat et al., 'Motion Estimation With More Than Two Frames', p. 417, left column, line 23–line 26, table 1, p. 423, right column, paragraph E–p. 424, left column, paragraph F.

Proceedings of the Conference on Computer Vision and Pattern Recognition, San Francisco (US) Jun. 19–23, 1985; IEEE Computer Society Press, Silver Spring (US), pp. 181–183, Hormoz Shariat, 'The Motion Problem: A Decomposition-Based Solution'.

*Primary Examiner*—Joseph Mancuso
*Assistant Examiner*—Jayanti K. Patel
*Attorney, Agent, or Firm*—Staas & Halsey

[57] ABSTRACT

A moving body recognition apparatus which recognizes a shape and movement of an object moving in relation to an image input unit by extracting feature points, e.g. a peak of the object and a boundary of color, each in said images captured at a plurality of instants in time for observation by the image input unit. The moving body recognition apparatus comprises an image input unit for capturing images of an object as a moving body having a rotation, a feature point extraction unit for extracting feature points from the images inputted by the image input unit, a feature point storage unit for storing known position data of the extracted feature points, and a shape/movement recognition unit for calculating the actual positions and movements of the feature points of the object in the images by using the known position data of the extracted feature points outputted from the feature point storage unit.

16 Claims, 60 Drawing Sheets

( ● : FEATURE POINTS )

FIG. 19
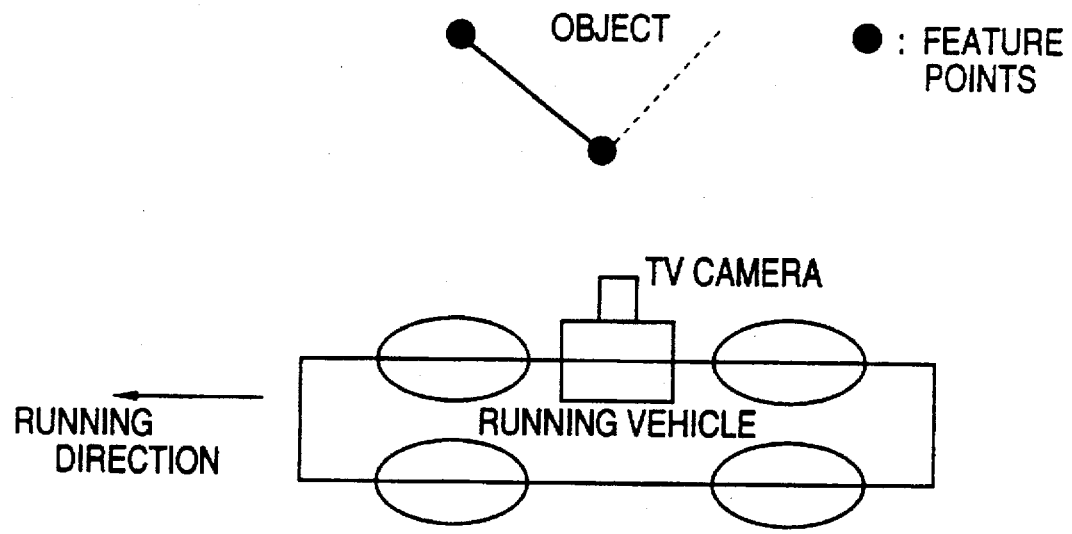
FIG. 21A
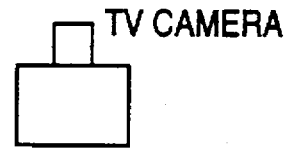
FIG. 21B
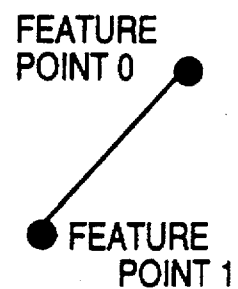
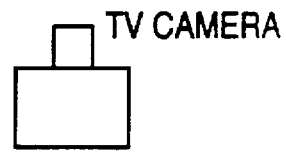

FIG. 20

SHAPE CALCULATION UNIT 35 STARTS EXECUTING ITS PROCESSES.

S53 — SHAPE CALCUALTION UNIT 35 CALCULATES $u_{12}$, $v_{12}$ AND $w_{12}$, WHICH ARE SECOND COMPONENTS OF $u_1$, $v_1$ AND $w_{12}$ BY FOLLOWING EQUATIONS, $$u_{12} = \frac{1}{\sin \theta} (2\cos^2 \theta - 1, -\cos \theta) \begin{bmatrix} v_{11} \\ w_{11} \end{bmatrix}$$

$$v_{12} = (\sin \theta, \cos \theta) \begin{bmatrix} u_{11} \\ u_{12} \end{bmatrix}$$

$$v_{13} = (\sin \theta, \cos \theta) \begin{bmatrix} v_{11} \\ v_{12} \end{bmatrix}$$

S54 — SHAPE CALCULATION UNIT 35 SENDS $u_{12}$, $v_{12}$ AND $w_{12}$ TO FEATURE POINT POSITION RECONSTRUCTION UNIT 36.

( ● : FEATURE POINTS )

FIG. 29

| α | 0 | ... | π/2 | ... | π | ... | 3/2π | ... | 2π |
|---|---|---|---|---|---|---|---|---|---|
| $u_{11}$ | + | + | 0 | · | · | · | 0 | + | |
| $u_{21}$ | 0 | · | · | · | 0 | + | + | + | |

FIG. 30

| β | 0 | ... | π/2 | ... | π | ... | 3/2π | ... | 2π |
|---|---|---|---|---|---|---|---|---|---|
| $v_{11}$ | + | + | 0 | · | · | · | 0 | + | |
| $v_{21}$ | 0 | · | · | · | 0 | + | + | + | |

| p | SIN θ |
|---|---|
| EVEN | + |
| ODD | − |

FIG. 32

| m | n | CONDITIONS | SIN θ |
|---|---|---|---|
| 0 | 0 | $u_{11} < v_{11}$ | − |
| 1 | 1 | $u_{11} > v_{11}$ | + |
| 2 | 2 | $u_{11} < v_{11}$ | + |
| 3 | 3 | $u_{11} > v_{11}$ | − |
| 0 | 2 | $|u_{11}| < |v_{11}|$ | + |
| 2 | 0 | $|u_{11}| > |v_{11}|$ | − |
| 1 | 3 | $|u_{11}| < |v_{11}|$ | − |
| 3 | 1 | $|u_{11}| > |v_{11}|$ | + |

FIG. 33

| m-n | m | n | CONDITIONS | RANGE OF θ | SIN θ |
|---|---|---|---|---|---|
| 0 | 0 | 0 | $u_{11} < v_{11}$ | $-\pi/2 < \theta < 0$ | - |
|   | 1 | 1 | $u_{11} > v_{11}$ | $0 < \theta < \pi/2$ | + |
|   | 2 | 2 | $u_{11} < v_{11}$ | $0 < \theta < \pi/2$ | + |
|   | 3 | 3 | $u_{11} > v_{11}$ | $-\pi/2 < \theta < 0$ | - |
| 2 | 2 | 0 | $|u_{11}| < |v_{11}|$ | $\pi/2 < \theta < \pi$ | + |
|   |   |   | $|u_{11}| > |v_{11}|$ | $\pi < \theta < 3\pi/2$ | - |
|   | 3 | 1 | $|u_{11}| < |v_{11}|$ | $\pi < \theta < 3\pi/2$ | - |
|   |   |   | $|u_{11}| > |v_{11}|$ | $\pi/2 < \theta < \pi$ | + |
| -2 | 0 | 2 | $|u_{11}| < |v_{11}|$ | $-3\pi/2 < \theta < -\pi$ | + |
|   |   |   | $|u_{11}| > |v_{11}|$ | $-\pi < \theta < -\pi/2$ | - |
|   | 1 | 3 | $|u_{11}| < |v_{11}|$ | $-\pi < \theta < -\pi/2$ | - |
|   |   |   | $|u_{11}| > |v_{11}|$ | $-3\pi/2 < \theta < -\pi$ | + |

FIG. 41

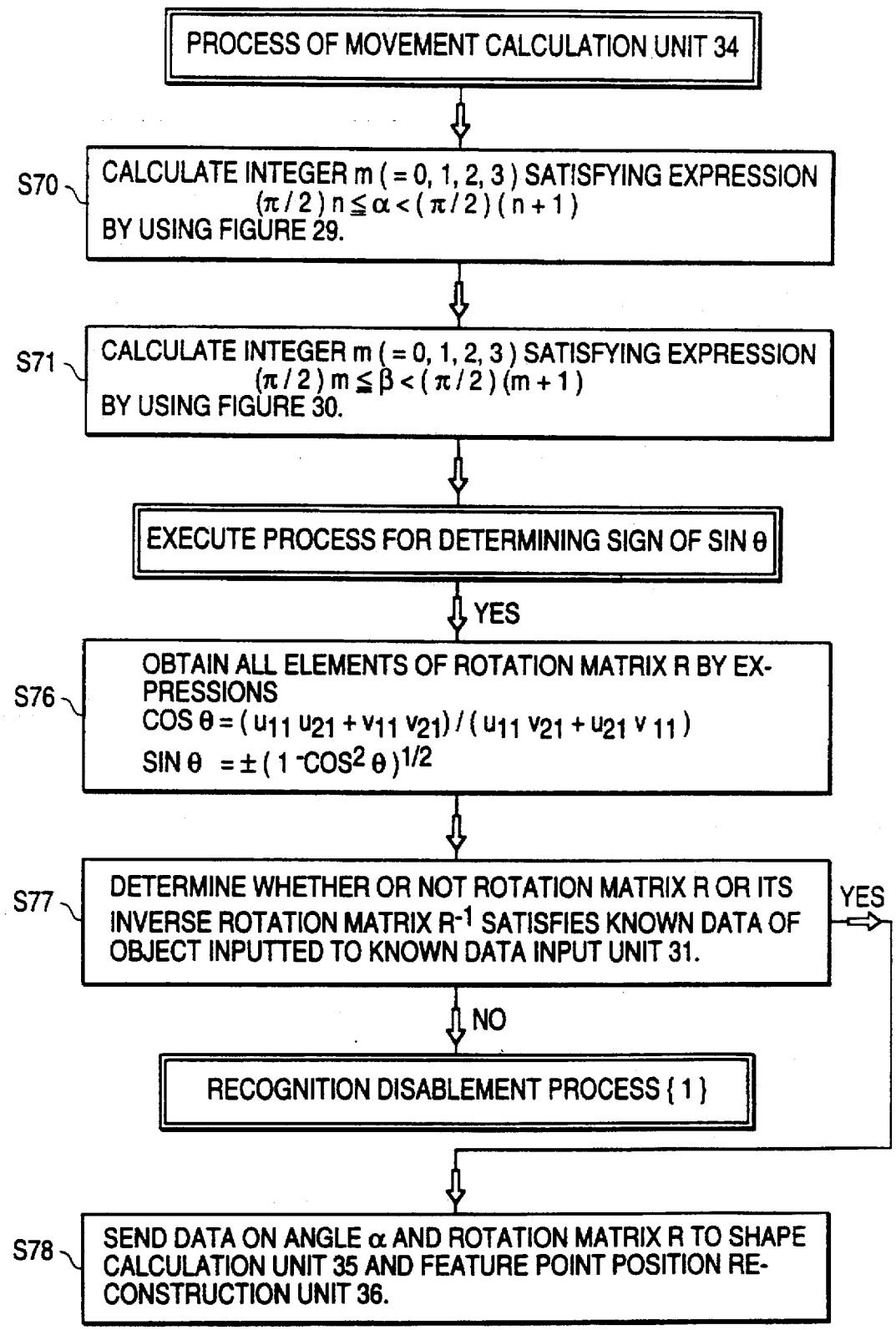

PROCESS OF MOVEMENT CALCULATION UNIT 34

S70: CALCULATE INTEGER m ( = 0, 1, 2, 3 ) SATISFYING EXPRESSION
$(\pi/2)n \leq \alpha < (\pi/2)(n+1)$
BY USING FIGURE 29.

S71: CALCULATE INTEGER m ( = 0, 1, 2, 3 ) SATISFYING EXPRESSION
$(\pi/2)m \leq \beta < (\pi/2)(m+1)$
BY USING FIGURE 30.

EXECUTE PROCESS FOR DETERMINING SIGN OF SIN θ

↓ YES

S76: OBTAIN ALL ELEMENTS OF ROTATION MATRIX R BY EXPRESSIONS
$\cos\theta = (u_{11} u_{21} + v_{11} v_{21}) / (u_{11} v_{21} + u_{21} v_{11})$
$\sin\theta = \pm(1 - \cos^2\theta)^{1/2}$ S77: DETERMINE WHETHER OR NOT ROTATION MATRIX R OR ITS INVERSE ROTATION MATRIX $R^{-1}$ SATISFIES KNOWN DATA OF OBJECT INPUTTED TO KNOWN DATA INPUT UNIT 31. → YES

↓ NO

RECOGNITION DISABLEMENT PROCESS { 1 }

S78: SEND DATA ON ANGLE α AND ROTATION MATRIX R TO SHAPE CALCULATION UNIT 35 AND FEATURE POINT POSITION RECONSTRUCTION UNIT 36.

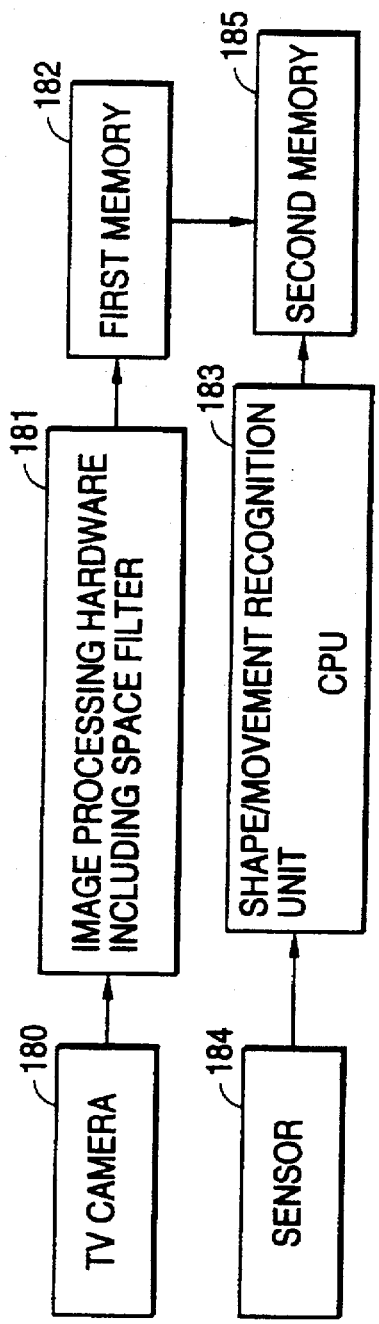

MOVING BODY RECOGNITION APPARATUS

This application is a division of application Ser. No. 07/946,540, filed Sep. 17, 1992, now allowed U.S. Pat. No. 5,444,791.

BACKGROUND OF THE INVENTION

1. Field of the Invention

This invention relates to a moving body recognition apparatus. A moving body recognition apparatus in many cases uses a TV camera as an image input unit receiving an image of an external object.

2. Description of the Related Arts

Image processing devices are used widely, e.g. for an FA (factory automation) inspection, an automatic monitoring device, and a visual sensor for an automatically operated vehicle, generally as devices capable of processing visual information as with a human being. There are potential demands for them and their research and development is actively conducted. Although an image processing device originally processed a still image as its object, recently it has put a greater emphasis on processing a moving image. Especially, those capable of recognizing a moving body have come to take a large share of all image processing devices.

A moving body recognition apparatus generally recognizes the shape of a moving body and its relative movement, when the image input unit of the moving body recognition apparatus is moving in relation to the object. That is, even if an object is not actually moving, when an image input unit of a moving body recognition apparatus moves, the moving body recognition apparatus recognizes the shape of the object standing still and the movement of the image input unit. For example, in a case of a visual sensor for an automatically operated vehicle, its image input unit is loaded on top of the vehicle, and the moving body recognition apparatus recognizes the environment in which the vehicle is running.

A moving body recognition apparatus must be compact and responsive. Compactness is critical, especially when a moving body recognition apparatus is loaded on a vehicle in its application to a visual sensor of an automatically operated vehicle. Responsiveness is crucial, because a realtime processing similar to a human vision is required.

A conventional moving body recognition device captures an object by two image input units. By establishing the correspondences between the feature points of the objects in the two images captured by the two image input units, the shape of the object is captured at every certain instant in time for observation by applying a principle of a triangulation, and then the movement of the object is calculated.

FIG. 1 shows a concept of a conventional moving body recognition apparatus.

A first image input unit 2 and a second image input unit 3 input images of an object 1 to a moving image recognition unit 4. The moving body recognition unit 4 detects feature points of an object 1 from the two images. By matching a same feature point between the two images, the position of a feature point is calculated by applying a principle of a triangulation. Here, a feature point refers to a point representing a particular part of the object 1. When there is a peak, an outline point or a pattern, a feature point may be a dot in a pattern or on a color boundary. The moving body recognition unit 4 calculates the movement of a feature point and the object 1 from a shift of the feature point in a time series. The moving body recognition apparatus outputs as a recognition result 5 the position and movement of a feature point and the movement of an object.

FIG. 2 shows a configuration of a conventional moving body recognition apparatus.

A first feature point extraction unit 6 extracts a feature point from an image inputted by the first image input unit 2 and supplies it to a feature point correspondence unit 8. Likewise, a second feature point extraction unit 7 extracts a feature point from an image inputted by the second image input unit 3 and supplies it to the feature point correspondence unit 8. The feature point correspondence unit 8 matches the same feature points from among the feature points extracted from the first feature point extraction unit 6 and the second feature point extraction unit 7.

A feature point position calculation unit 9 obtains the positions of feature points by relating the positions of the matched feature points with the positions of the first image input unit 2 and the second image input unit 3, and stores the result in a feature point position storage unit 10. The positions of feature points at plural instants in time for observation stored in the feature point position storage unit 10 are sent to an object movement calculation unit 11, which calculates the movement of an object and stores the result in an object movement storage unit 12.

However, a conventional moving body recognition apparatus as explained in the description of FIGS. 1 and 2 have the following problems.

(a) Because two feature point extraction units need to individually extract feature points extracted from two images captured respectively by two image input units, the process load for extracting a feature point is twice as much as that by using a single TV camera.

(b) An additional process of matching features from two images captured differently is required. The feature point correspondence unit 8 is required as shown in FIG. 2. Because the positions of two image input units are different, they capture the object 1 differently. This makes it difficult to match feature points of the object 1. Hence, the feature point correspondence unit 8 requires a large workload for searching for corresponding feature points. (The closer the positions of two image input units, the easier it is to make correspondences between feature points of an object, but the less accurate a recognition of the shape of an object becomes.)

Typically, processing in (b) is impossible when a feature point of an object captured by one image input unit cannot be captured by the other, where no correspondence between those feature points can be made.

FIG. 3 shows an example in which a conventional moving body recognition apparatus fails to establish correspondences between feature points captured by different image input units.

The object 1 has two feature points, for instance. However, there is a case in which both the first image input unit 2 and the second image input unit 3 can capture only one of the two feature points.

SUMMARY OF THE INVENTION

A prime object of this invention is to recognize a moving body by extracting a feature point from images at plural instants in time for observation inputted from a single image input unit. In order to recognize the movement of an object most generally in a movement coupled with a revolution, i.e. a rotation, from the position data of the four feature points of an object each in orthogonally projected images captured at any three instants in time for observation, this invention invokes a determination e.g. that the four feature points are not on a single plane, and then a calculation of the actual positions of the four feature points. However, since the required processes are complicated in a general case like this, this invention also aims at more easily recognizing the movement of a moving body despite some restrictions.

The above aims can be summarized as follows:

This invention aims at recognizing the movement of an object moving on a single plane coupled with a rotation at a constant rotating speed, from the already known position data of two feature points each in images of the object captured from a direction perpendicular to the axis of rotation at three instants in time for observation having equal time intervals.

Also, this invention aims at recognizing the movement of an object moving on a single plane coupled with a rotation, from the already known position data of three feature points forming a right angle each in images of the object captured from a direction perpendicular to the axis of rotation at any two instants in time for observation.

Further, this invention aims at recognizing the movement of an object moving on a single plane coupled with a rotation, from the already known position data of three feature points each in images of the object captured from a direction perpendicular to the axis of rotation at any three instants in time for observation.

Additionally, this invention aims at most generally recognizing the movement of a moving body. It is to recognize the movement of an object moving three-dimensionally coupled with a rotation, from the already known position data of four feature points each in images of the object captured at any three instants in time for observation, after determining e.g. that the four feature points are not on a single plane.

This invention configures a moving body recognition apparatus to comprise a single image input unit for capturing an image of an object, a feature point extraction unit for extracting feature points in an image outputted from the image input unit, and a feature point storage unit for storing the extracted feature points, thereby enabling the movement of a moving body to be recognized from the known position data of the feature points.

A feature of a first form of this invention resides in a moving body recognition apparatus for recognizing a movement of a moving body by positions of feature points on the moving body, comprising: an image input unit for capturing images of the moving body as an object; a feature point extraction unit for extracting feature points in the images captured by the image input unit; a feature point position storage unit for storing known position data of extracted feature points; and a shape/movement recognition unit for calculating the actual positions and movements of feature points of the object from known position data of two feature points of the object each in the images captured at three instants in time for observation having equal time intervals from a direction perpendicular to the axis of rotation, i.e. revolution, of the object moving on a single plane coupled with a rotation at a constant rate by using an output from the feature point position storage unit.

A feature of a second form of this invention resides in a moving body recognition apparatus for recognizing a movement of a moving body by positions of feature points on the moving body, comprising: an image input unit for capturing images of the moving body as an object; a feature point extraction unit for extracting feature points in the images captured by the image input unit; a feature point position storage unit for storing known position data of extracted feature points; and a shape/movement recognition unit for calculating the actual positions and movements of feature points of the object from known position data of three feature points forming a right angle of the object each in the images captured at any two instants in time for observation from a direction perpendicular to the axis of rotation, i.e. revolution, of an object moving on a single plane coupled with a rotation by using an output from the feature point position storage unit.

A feature of a third form of this invention resides in a moving body recognition apparatus for recognizing a movement of a moving body by positions of feature points on the moving body, comprising: an image input unit for capturing images of the moving body as an object; a feature point extraction unit for extracting feature points in the images captured by the image input unit; a feature point position storage unit for storing known position data of extracted feature points; and a shape/movement recognition unit for calculating the actual positions and movements of feature points of the object from known position data of three feature points of the object each in the images captured at any three instants in time for observation from a direction perpendicular to the axis of rotation, i.e. revolution, of an object moving on a single plane coupled with a rotation by using an output from the feature point position storage unit.

A feature of a fourth form of this invention resides in a moving body recognition apparatus for recognizing a movement of a moving body by positions of feature points on the moving body, comprising: an image input unit for capturing images of the moving body as an object; a feature point extraction unit for extracting feature points in the images captured by the image input unit; a feature point position storage unit for storing known position data of extracted feature points; and a shape/movement recognition unit for calculating the actual positions and movements of feature points of the object from known position data of four feature points of the object each in the image captured at any three instants in time for observation, by determining that the four feature points do not exist on a single plane, that the axis of rotation, i.e. revolution, of the object is not parallel to the direction of an orthogonal projection of the object between any two of the three instants in time for observation, and that a rotation of the object between any two of the three instants in time for observation is not a rotation by an angle of one hundred and eighty degrees around an axis parallel to a plane on which the orthogonal projection is made.

BRIEF DESCRIPTION OF THE DRAWINGS

One of skill in the art can easily understand additional features and objects of this invention from the description of the preferred embodiments and some of the attached drawings. In the drawings:

FIG. 19 is an explanatory chart for the method of selecting the appropriate one of two rotation matrices R and $R^{-1}$;

FIG. 20 is a flowchart of the shape calculation unit 35 pursuant to the first form of this invention;

FIGS. 21A and 21B are explanatory charts for concave/convex data of an object;

FIG. 29 illustrates a method for determining a value range for angle α;

FIG. 30 illustrates a method for determining a value range for angle β;

FIG. 31 illustrates a method for determining the sign of sinθ, when m−n is odd;

FIG. 32 illustrates a method for determining the sign of sinθ, when m−n is even;

FIG. 33 shows a relation among m, n and the sign of sinθ, when m−n is even;

FIG. 41 is a flowchart of the movement calculation unit 34 pursuant to the second form of this invention;

FIG. 70 is a block diagram of a computer system embodying a moving body recognition apparatus of this invention; and FIG. 71 shows an environment for an experimental program verification.

DESCRIPTION OF THE PREFERRED EMBODIMENT

Overview of the Underlying Principles

Figure 1:
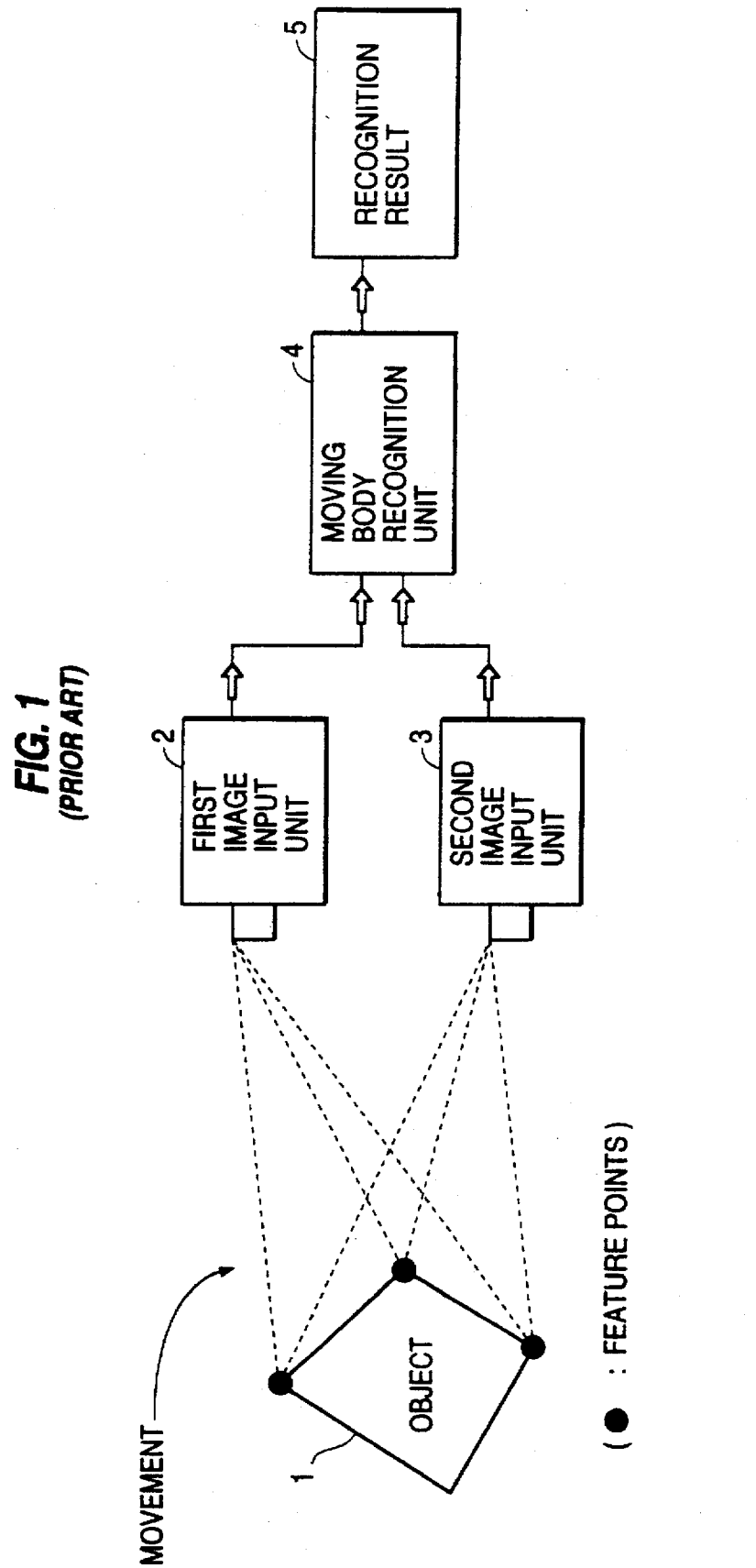
FIG. 1 (PRIOR ART) shows a concept of a conventional moving body recognition apparatus.
Figure 2:
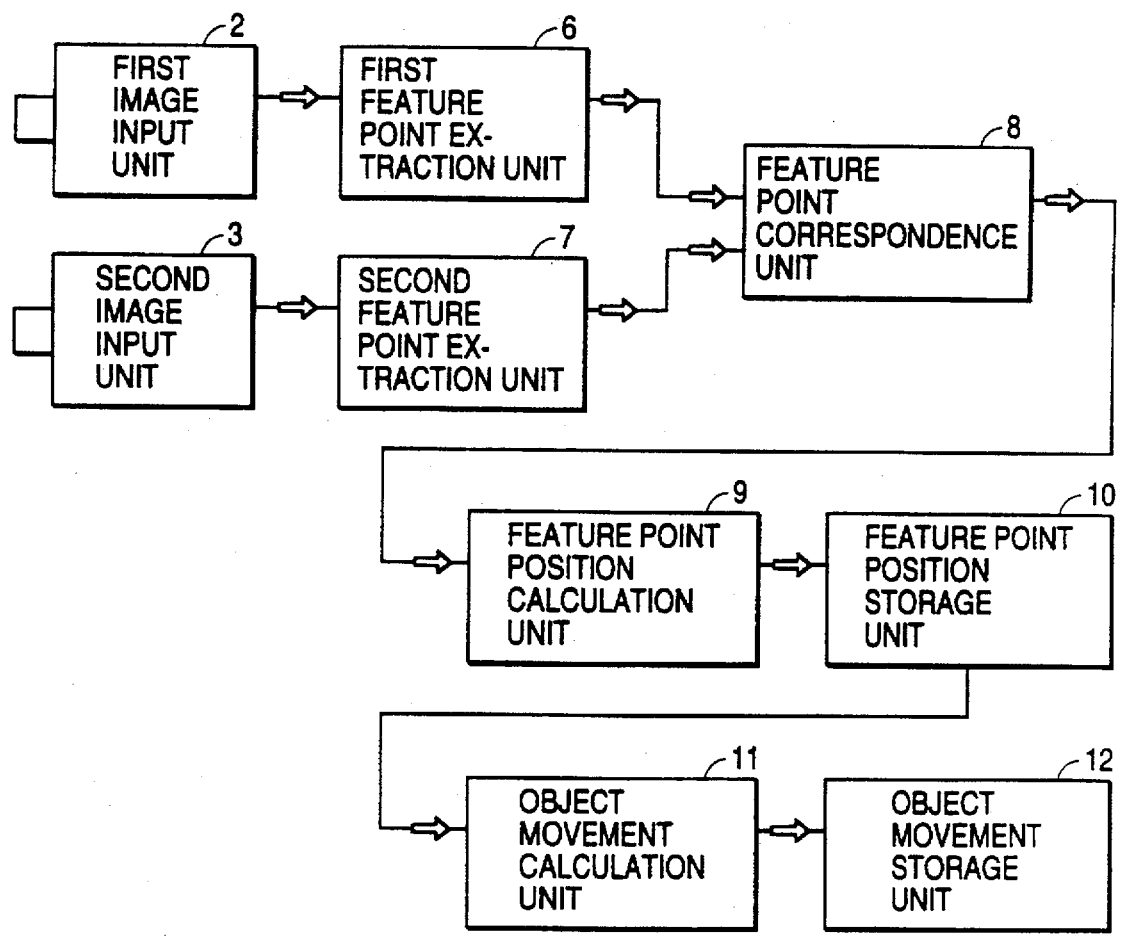
FIG. 2 (PRIOR ART) shows a configuration of a conventional moving body recognition apparatus.
Figure 3:
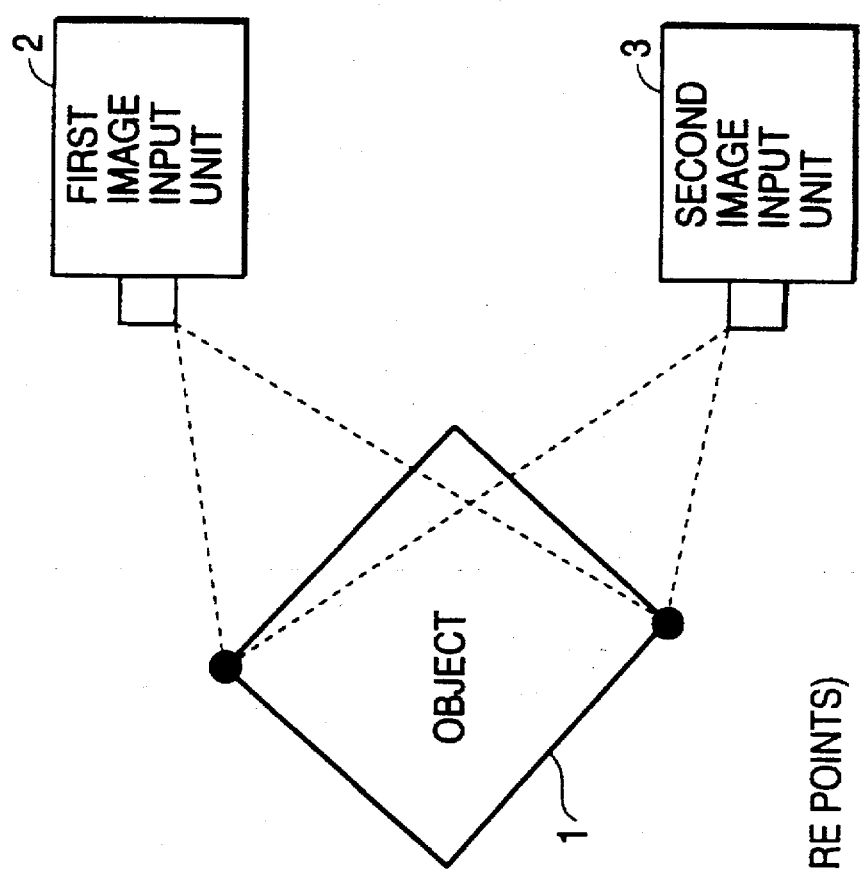
FIG. 3 (PRIOR ART) shows an example in which a conventional moving body recognition apparatus fails to establish correspondences between feature points captured by different image input units.
Figure 4:
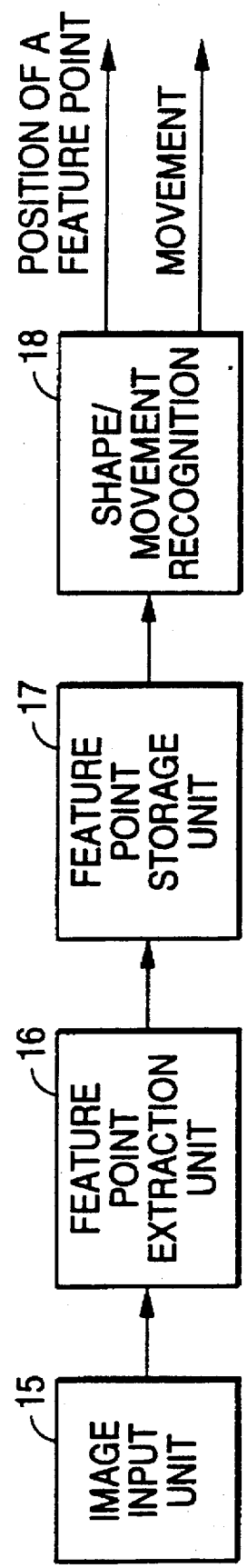
FIG. 4 is a block diagram of a moving body recognition apparatus of this invention.

FIG. 4 is a block diagram of a moving body recognition apparatus of this invention.

The moving body recognition apparatus comprises a single image input unit 15 for capturing an image of an object, a feature point extraction unit 16 for extracting feature points in an image outputted from the image input unit 15, and a feature point storage unit 17 for storing the extracted feature points, thereby recognizing the movement of a moving body from the known position data of the feature points.

Because first, second, third and fourth forms of this invention operate under similar principles, they are all explained,by referring to FIG. 4.

A First Form

A shape/movement recognition unit 18 recognizes a shape and a movement of an object. The shape/movement recognition unit 18 in a first form of this invention calculates the actual position and movement of the object in a three-dimensional space, e.g. moving on a single plane coupled with a rotation at a constant speed, from the known position data of two feature points, e.g. the X coordinate value of a feature point of an object moving on the XY plane, each in images of the object captured at three instants in time for observation having equal time intervals from a direction perpendicular to the axis of rotation.

The first form of this invention assumes, for example, that the direction of an axis of rotation is the same as the direction of the Z axis, that the direction of the movement of the rotating object is the same as the direction of the X axis, that an object moves on the XZ plane, and that the object is observed from the Y axis perpendicular to the image plane, i.e. the XZ plane. Because of the earlier described assumption of an orthogonal projection, a displacement in the X axis direction is the same as a displacement observed on the image plane, although displacement in the direction of the Y axis is unknown.

After one of the two feature points moves to the origin, the shape/movement recognition unit calculates the angle of rotation around the origin of the other one of the two feature points. That is, the shape/movement recognition unit 18 in the first form of this invention obtains the X coordinate value of a first feature point from the position data of an input image, and then calculates the Y coordinate value of a second feature point after the first feature point moves to the origin and the angle of rotation around the origin of the object, thereby obtaining the actual positions and movements of the first and second feature points.

A Second Form

The image input unit 15, the feature point extraction unit 16, and the feature point storage unit 17 in a second form of this invention operate essentially the same manner as those in the first form of this invention. However, the shape/movement recognition unit 18 in the second form of this invention calculates the actual positions and movements of three feature points forming a right angle of an object in a three-dimensional space, from the known position data of three feature points each in images captured at any two instants in time for observation from the direction perpendicular to the axis of rotation of the object moving on a single plane coupled with a rotation.

The basic differences of the second form of this invention from the first form are that the rotating speed of the object may not be constant and that object has three feature points forming a right angle. Accordingly, the second form of this invention allows the actual positions and movements of feature points of an object to be calculated from the known position data of the three feature points of the object at any two instants in time for observation.

The second form of this invention uses the same coordinate system as that of the first form of this invention. As in the first form of this invention, the displacement of a feature point in the direction of the X axis is the same as the displacement observed on the image plane, although the displacement in the direction of the Y axis is unknown.

Also, as with the shape/movement recognition unit 18 in the first form of this invention, after one of the three feature points at the right angle moves to the origin, the shape/movement recognition unit 18 in the second form of this invention calculates the Y coordinate values of the other two feature points, the angle of rotation of the object around the origin from a first instant in time for observation to a second instant in time for observation, thereby obtaining the actual positions and movements of the three feature points in the three-dimensional space.

A Third Form

As with the third form of this invention, the image input unit 15, the feature point extraction unit 16, and the feature point storage unit 17 in a third form of this invention operate essentially the same manner as those in the first form of this invention, whereas the shape/movement recognition unit 18 in a third form of this invention only operates differently from the shape/movement recognition unit 18 in the first form of this invention. The shape/movement recognition unit 18 in the third form of this invention calculates the positions and movements of the feature points of an object in a three-dimensional space, from the known position data of three feature points of an object each in images captured at three instants in time for observation from a direction perpendicular to the axis of rotation of the object moving on a single plane coupled with a rotation.

The third form of this invention can be said to correspond to a more generic case in the third form of this invention, in which three feature points of an object do not necessarily form a right angle and the known position data at three instants in time for observation are used for recognizing a moving body.

In other words, the second form of this invention is premised on a right angle formed among three feature points. However, even with this premise, the second form of this invention can be applied to many cases. For instance, it is applicable to a case in which a TV camera attached to a self-propelled vehicle observes a sidewall along its right of way, because in many cases a sidewall stands straight, thus having a right angle. Not only a sidewall, but also many artificial buildings have their sides form right angles. Hence, the third form of this invention can be applied to a case in which a TV camera observes such a building.

The third form of this invention assumes the same coordinate system as that used in the first form of this invention, where the direction of the movement of an object is the same as the direction of the X axis, the direction of the observation of an image is the same as the direction of the Y axis, and the direction of the axis of rotation of the object is the same as the direction of the Z axis.

Of the three feature points, one moves to the origin, and the Y coordinate values of the other two feature points and the angles of rotation of the object around the origin from a first instant in time for observation to second and third instants in time for observation are calculated, thereby obtaining the actual positions and movements of the three feature points in the three-dimensional space.

A Fourth Form

A fourth form of this invention represents the most generic case for recognizing the movement of a moving body. The shape/movement recognition unit 18 in the fourth form of this invention calculates from the known position data of four feature points of an object moving with a rotation each in orthogonally projected images at captured any three instants in time for observation, thereby obtaining the actual positions and movements of the four feature points in the three-dimensional space.

Also, before calculating the positions and movements of the four feature points, in order to confirm that the positions and movements can in fact be calculated, the shape/movement recognition unit 18 determines that the four feature points are not on a single plane, that the axis of rotation of an object is not parallel to the projecting direction of an orthogonal projection between any two instants in time for observation of the three instants in time for observation, and that the rotation of the object between any two instants in time for observation of the three instants in time for observation is not a rotation of one hundred and eighty degrees around an axis parallel to a plane on which an image is orthogonally projected.

The basic differences of the fourth form of this invention from the first, second and third forms of this invention are that the movement of an object is not restricted to a single plane, and that neither the relation between the axis of rotation and the direction of observing the object nor the rotating speed has any limitation.

Because of these differences, the fourth form of this invention requires the known position data of the four feature points of the object each in images captured at three instants in time for observation selected arbitrarily.

The fourth form of this invention uses the same coordinate system as that of the first, second and third forms of this invention, where the direction of observing the object is the same as the direction of the Y axis. As in other forms of this invention, because of the assumption of an orthogonal projection, the displacements in the directions of the X and Z axes are the same as the displacements observed on the image plane, although the displacement in the direction of the Y axis is unknown.

After moving any one of the four feature points to the origin, the shape/movement recognition unit 18 calculates the Y coordinate values of other three feature points, the angle of rotation of the object around the origin from a first instant in time for observation to a second instant in time for observation, and the angle of rotation of the object around the origin from a first instant in time for observation to a third instant in time for observation, thereby obtaining the actual positions and movements of the four feature points in the three-dimensional space.

Detailed Explanation of Actual Embodiments

This invention is based on a new theory, which this applicant originally submits and proves. The new theory shows that the shape (positions of feature points) and movement of an object can be calculated under limited circumstances, as long as the feature points can be extracted at several instants in time for observation even if there is only one image input unit.

The First Form

First, the new theory on the first form of this invention is explained in detail.

The first form of this invention assumes that an object moves on a single plane coupled with a rotation around a predetermined axis of rotation and that an image input unit observes an object from a direction perpendicular to the axis of rotation of the object. The first form of this invention can be applied to a lot of cases under such assumptions. For instance, as described earlier, it is applicable to a case in which the image input unit is attached to a self-propelled vehicle running along various objects such as a wayside wall along a highway, in which case an edge e.g. formed by the curb can be used as the feature points.

Also, the image captured by the image input unit is approximated by an orthogonal projection. An approximation by an orthogonal projection is pretty good especially when an image input unit can capture an object in a narrow scope, because the distance between the image input unit and the object is large. In addition, this theory is premised on the object having a constant rotating speed.

Many a moving body is deemed to be standing still during a very short lapse of time. Therefore, an assumption that a movement is constant is natural. Besides, strictly speaking, a condition "The rotating speed of an object is constant." is sufficient for a condition "A movement is constant.", because parallel displacement components of a movement of an object can be easily obtained from the movements of feature points on an image plane.

When a rotating speed is constant, the number of feature points to be in correspondence can be reduced to two. That is, when two feature points each in images captured at three instants in time for observation having equal time intervals can establish correspondences, a moving body can be recognized. (This relates to theorem 1 to be described later.) A single feature point does not allow the shape of an object to be obtained. Also, three images are necessary to confirm a status that the movement is constant. Hence, two feature points and three images are necessary premises.

Figure 5:
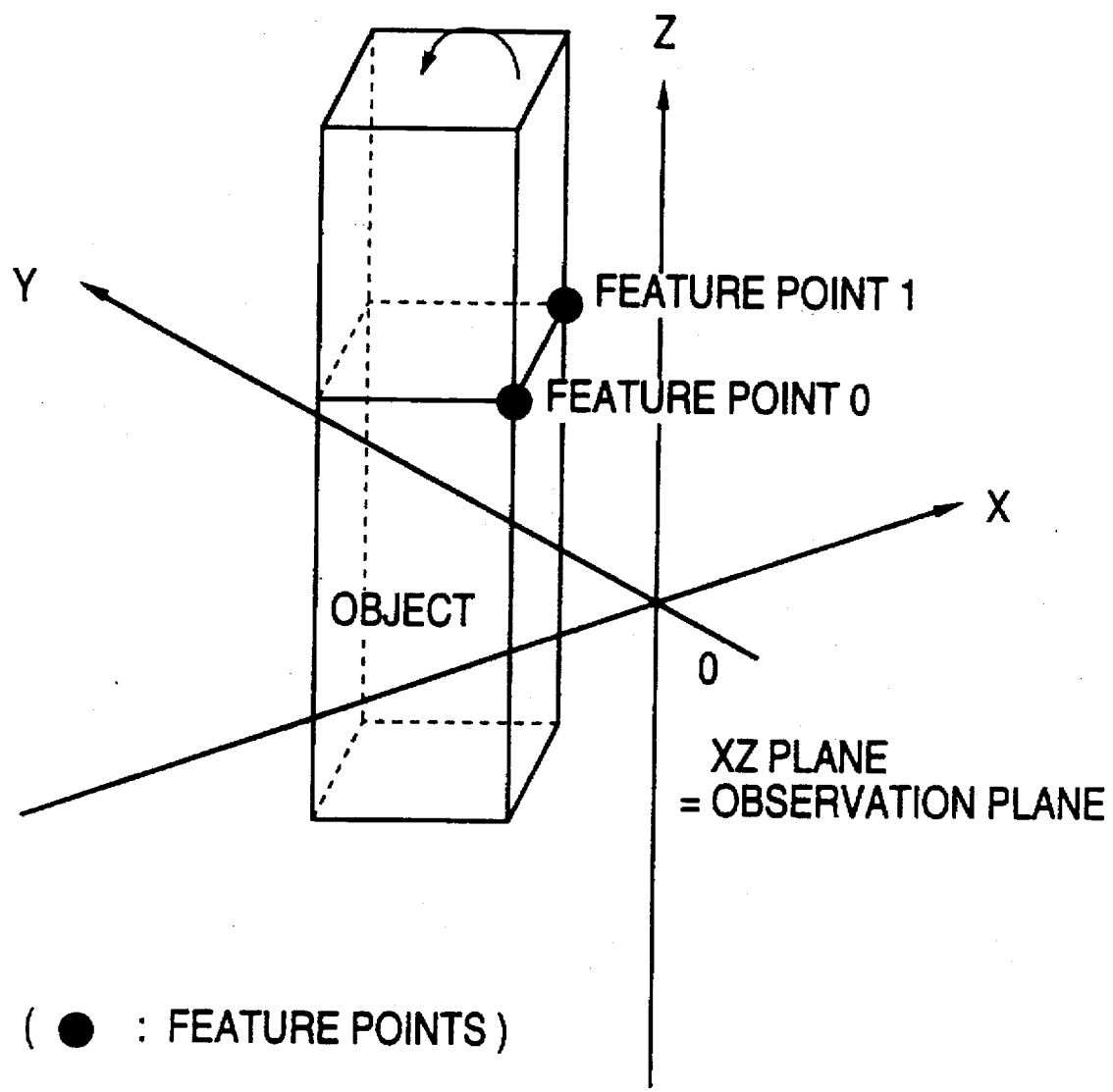
FIG. 5 shows a universal relation between an object and its observation plane in an image input unit pursuant to the first form of this invention.

FIG. 5 shows a universal relation between an object and its observation plane in an image input unit pursuant to the first form of this invention.

The direction of the Z axis on the image plane is defined as the direction of the axis of rotation of the object, and the X axis is set in a direction perpendicular to the Z axis. More specifically, the direction of the X axis is parallel to the direction of the movement of a feature point. The origin on the image plane is by definition the point at which the X axis crosses the Z axis. The Y axis is perpendicular to the image plane, and passes through the origin on the image plane. Because of an assumption of an orthogonal projection, the XYZ coordinate system can be displaced parallelly in any direction.

Figure 6:
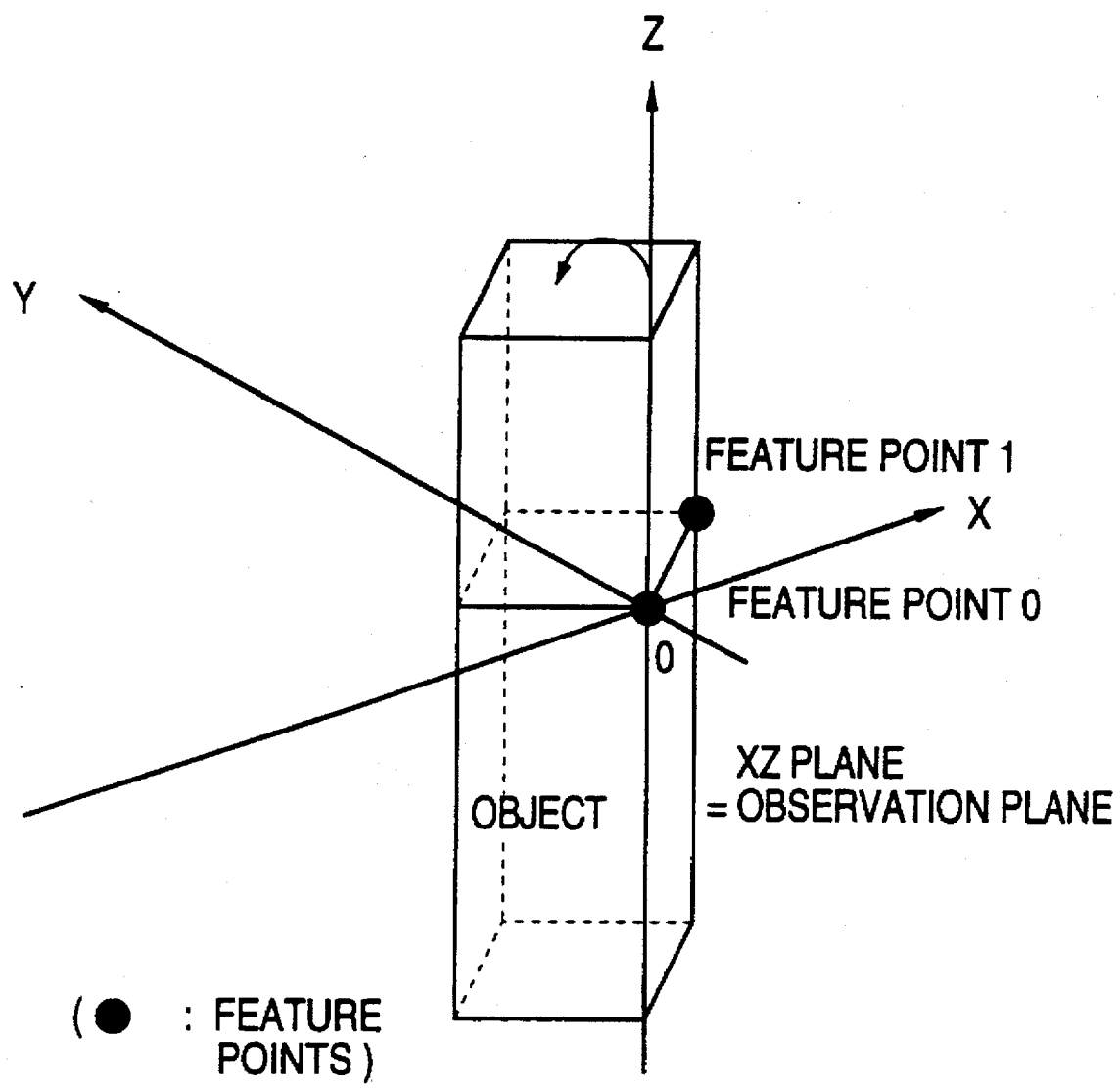
FIG. 6 shows a relation between an object and its observation plane pursuant to the first form of this invention, in which feature point 0 is fixed to the origin of a three-dimensional coordinate system.

FIG. 6 shows a relation between an object and its observation plane pursuant to the first form of this invention, in which one of feature points of the object is fixed at the origin of a three-dimensional coordinate system.

Also, because of the assumption of an orthogonal projection, the displacement in the direction of the X axis is the same as the displacement observed on the image plane, although the displacement in the direction of the Y axis in unknown. As such, one of the feature points, i.e. a feature point 0, can be considered as fixed to the origin 0, as shown in FIG. 6.

Figure 7:
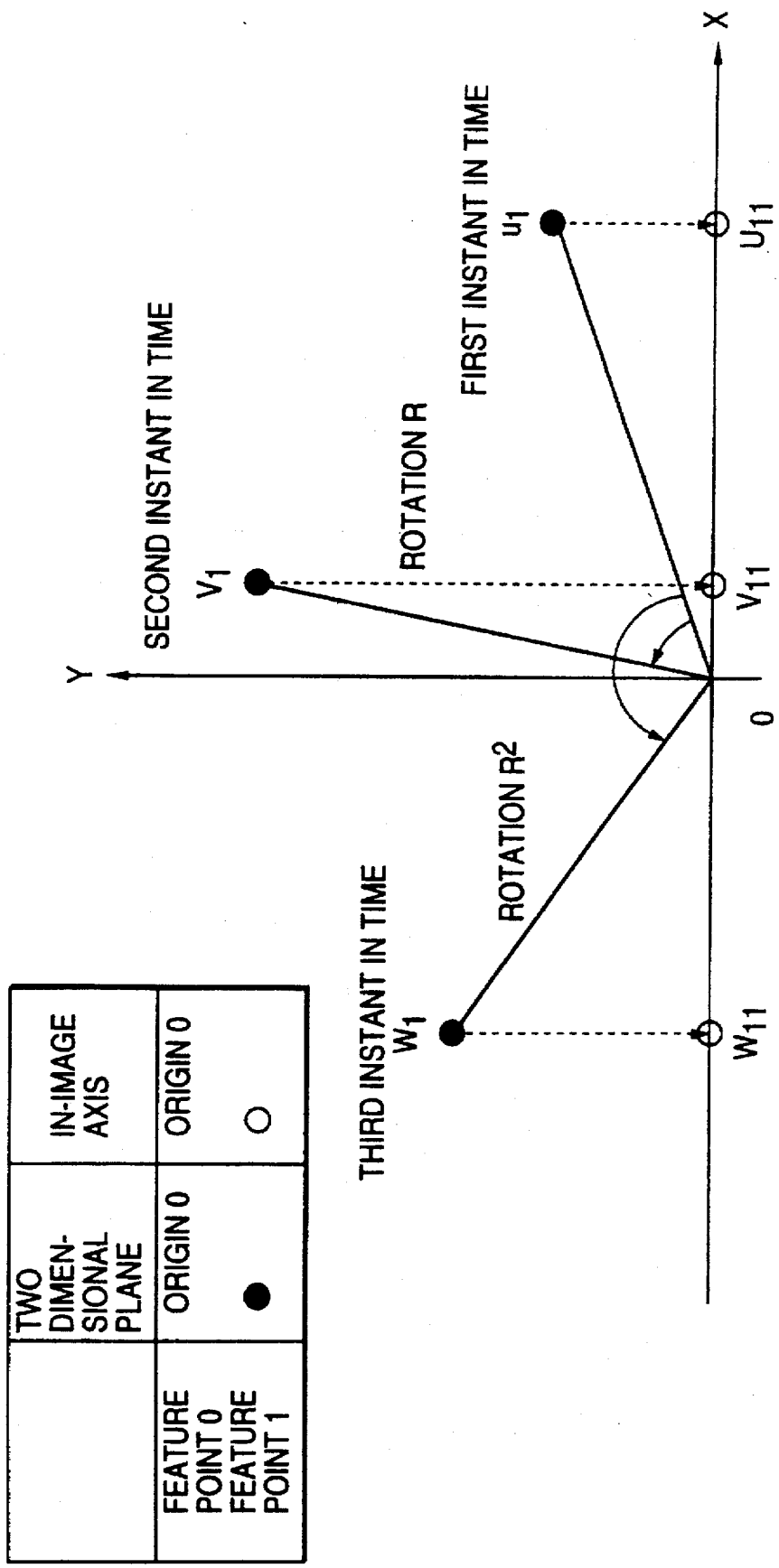
FIG. 7 illustrates the orthogonal projections of feature points 0 and 1 shown in FIG. 6 on the XY plane at three instants in time for observation pursuant to the first form of this invention.

FIG. 7 illustrates the orthogonal projections of feature points 0 and 1 shown in FIG. 6 on the XY plane at three instants in time for observation pursuant to the first form of this invention.

To obtain data on the shape and movement of an object, it is sufficient to calculate the displacement of a feature point having a correspondence, i.e. feature point 0, and the angle of rotation around the feature point. Because the displacement of feature point 0 can be obtained self-evidently, as described earlier, it is sufficient to calculate an angle of rotation around feature point 0.

A moving body recognition apparatus pursuant to the first form of this invention obtains an X axis value and a Y axis value from the known data of feature points of an input image, and calculates a Y axis value of another feature point after feature point 0 moves to an origin and an angle of rotation of the object around the origin.

The following is a description of the codes shown in FIG. 7.

Feature point 0 is a feature point of an object having moved to the origin 0.

Feature point 1 is a feature point other than feature point 0.

$u_1$ is a two-dimensional vector representing a feature point 1 at a first instant in time for observation.

$v_1$ is a two-dimensional vector representing a feature point 1 at a second instant in time for observation.

$w_1$ is a two-dimensional vector representing a feature point 1 at a third instant in time for observation.

Expressions 8

$$u_1 = \begin{bmatrix} u_{11} \\ u_{12} \end{bmatrix}, v_1 = \begin{bmatrix} v_{11} \\ v_{12} \end{bmatrix}, w_1 = \begin{bmatrix} w_{11} \\ w_{12} \end{bmatrix}$$

Here, although a subscript $_1$ in the above vector expression, e.g. in $u_1$, is not necessary, it is put here for maintaining consistency with explanations for other forms of this inventions. Also, a first vector component represents an x element, and a second vector component represents a y element.

Rotation matrix R represents a rotation of an object around the origin from a first instant in time for observation to a second instant in time for observation.

This is equal to the rotation of an object around the origin from a second instant in time for observation to a third instant in time for observation, due to an assumption of a constant rotating speed.

Expression 9

$$R = \begin{bmatrix} \cos\theta & -\sin\theta \\ \sin\theta & \cos\theta \end{bmatrix}$$

They have the following relations, $$v_1 = R\, u_1, \quad w_1 = R^2 u_1$$

which represent

| A first instant in time R for observation $u_1$ | → | A second instant in time R for observation $v_1$ | → | A third instant in time R for observation $w_1$ |
|---|---|---|---|---|

Accordingly, the problem can be formulated as follows:

Problem Of Recognizing A Body Moving On A Single Plane $u_1$, $v_1$, $w_1$ are two-dimensional vectors whose first elements are known.

R is a two-dimensional rotation matrix.

$$v_1 = R\, u_1, \quad w_1 = R^2 u_1$$

Obtain from the above, R and second elements of $u_1$, $v_1$, $w_1$.

A next theorem 1 gives conditions for solving this problem.

Theorem 1

The conditions for solving the above movement/structure recognition problem are $v_{11} \neq 0$ \hfill {1}

$v_{11} = \pm u_{11}$ and $w_{11} = u_{11}$ are not outstanding concurrently. \hfill {2}

These conditions comprise data solely on the observed X coordinate values.

Condition {1} means that the observation point mapped by $v_1$ does not fall on the origin. That is, it means that two feature points relative from an observation point do not fall on the second instant in time for observation.

Condition {2} may not be clearly understood However, it is actually equivalent to a next condition {3}.

Theorem 2

Condition {2} in theorem 1 is equivalent to condition {3}.

$$\theta \neq n\pi \text{ (where n is an integer)} \quad \{3\}$$

Condition {3} means that the angle of rotation of an object between a first instant in time for observation and a second instant in time for observation is neither zero degrees nor one hundred and eighty degrees.

A next system 2.1 is used in a proof of theorem 3.

System 2.1
Expression 10

$$\theta \neq n\pi \text{ (where n is an integer)} \quad \{3\}$$

$$\Longleftrightarrow \begin{bmatrix} R_1 \\ (R^2)_1 \end{bmatrix} \text{ being regular}$$

Here, a subscript $_1$ represents the first row of a matrix.

A next theorem 3 presents an expression for calculating a set of solutions.

Theorem 3

Under the conditions of theorem 1, the next set of definite solutions can be finalized.

Expression 11

$$R = \begin{bmatrix} \cos\theta & -\sin\theta \\ \sin\theta & \cos\theta \end{bmatrix}$$

and y component of a vector can be calculated by the following equations.

$$\cos\theta = (u_{11} + w_{12})/2v_{11}$$
$$\sin\theta = \pm(1 - \cos^2\theta)^{1/2}$$

$$u_{12} = \frac{1}{\sin\theta}[2\cos^2\theta - 1 - \cos\theta]\begin{bmatrix} v_{11} \\ w_{11} \end{bmatrix},$$

$$v_{12} = [\sin\theta \quad \cos\theta]\begin{bmatrix} u_{11} \\ u_{12} \end{bmatrix},$$

$$w_{12} = [\sin\theta \quad \cos\theta]\begin{bmatrix} v_{11} \\ v_{12} \end{bmatrix},$$

A next system 3.1 defines a relation between two sets of solutions.

System 3.1

Assuming one set of solutions comprises $R, u_1, v_1$ and $w_1$, the other set of solutions corresponding to it comprises:

Expression 12

$$\begin{bmatrix} 1 & 0 \\ 0 & -1 \end{bmatrix} R \begin{bmatrix} 1 & 0 \\ 0 & -1 \end{bmatrix}$$

is an inverse rotation matrix of R.

$$\begin{bmatrix} 1 & 0 \\ 0 & -1 \end{bmatrix} u_1$$

is a mirror image transformation of $u_1$ with respect to the X axis.

$$\begin{bmatrix} 1 & 0 \\ 0 & -1 \end{bmatrix} v_1$$

is a mirror image transformation of $v_1$ with respect to the X axis.

$$\begin{bmatrix} 1 & 0 \\ 0 & -1 \end{bmatrix} w_1$$

is a mirror image transformation of $w_1$ with respect to the X axis.

Theorem 3 and system 3.1 correspond to a fact that there are two sets of solutions for the earlier described moving body recognition problem, i.e. a fact that the Y coordinate value of the other feature point is positive or negative, when feature point 0 in an orthogonally projected image falls on the origin. They also mean that the-surface of an object seen from a TV camera as an image input unit forms a convex or a concave.

Figure 8B:
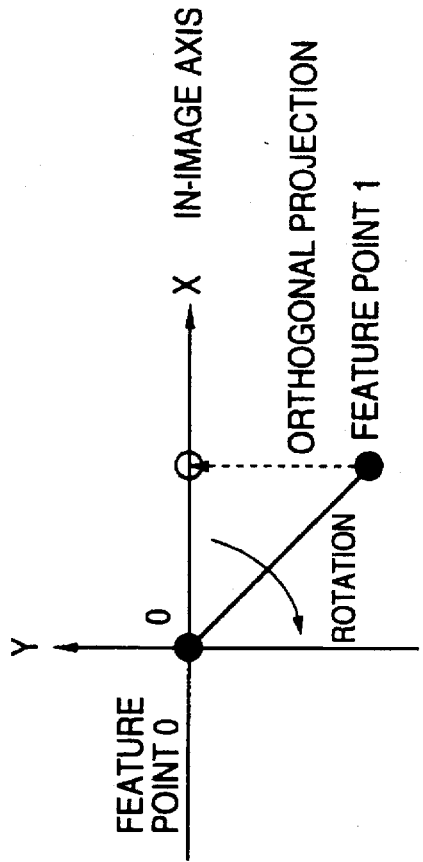
FIGS. 8A and 8B show two sets of solutions forming mirror image transformations of each other with respect to the X axis pursuant to the first form of this invention.
Figure 8A:
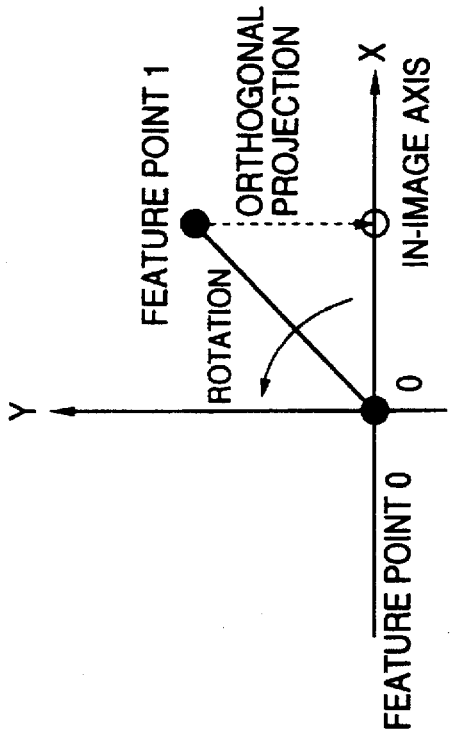

FIGS. 8A and 8B show two sets of solutions forming mirror image transformations of each other with respect to the X axis pursuant to the first form of this invention.

FIG. 8A shows a projection of a feature point shown in FIG. 6 to an XY plane. FIG. 8A illustrates a case in which the surface of an object forms a convex. FIG. 8B illustrates a case in which the surface of an object forms a concave, which is obtained by a mirror image transformation of the solution shown in FIG. 8A with respect to the X axis.

The proofs of theorems 1, 2 and 3 are illustrated in a sequence of a proposition 1, system 2.1, theorem 2 and theorem 3.

Proposition 1

Expression {1} in theorem 1 and expression {3} in theorem 2 are necessary conditions for finalizing a solution.

$$v_{11} \neq 0 \quad \{1\}$$

$$\theta \neq n\pi \text{ (where n is an integer)} \quad \{3\}$$

Proof Of Proposition 1

To reiterate the conditions, $$v_1 = R u_1, \quad w_1 = R^2 u_1$$

(1) Proof that expression {1} is a necessary condition

By assuming that $v_{11} = 0$, it is shown that no set of definite solutions can be obtained.

Expression 13

Conditions $$\Longleftrightarrow \begin{bmatrix} u_{11} \\ u_{12} \end{bmatrix} = R^{-1}\begin{bmatrix} v_{11} \\ v_{12} \end{bmatrix}, \quad \begin{bmatrix} w_{11} \\ w_{12} \end{bmatrix} = R\begin{bmatrix} v_{11} \\ v_{12} \end{bmatrix}$$

$$\Longleftrightarrow \begin{bmatrix} u_{11} \\ u_{12} \end{bmatrix} = \begin{bmatrix} \sin\theta \\ \cos\theta \end{bmatrix} v_{12}, \quad \begin{bmatrix} w_{11} \\ w_{12} \end{bmatrix} = \begin{bmatrix} -\sin\theta \\ \cos\theta \end{bmatrix} v_{12}$$

-continued $$\Longleftrightarrow \begin{bmatrix} u_{11} \\ u_{12} \end{bmatrix} = \begin{bmatrix} \sin\theta \\ \cos\theta \end{bmatrix} v_{12}, \quad \begin{bmatrix} w_{11} \\ w_{12} \end{bmatrix} = \begin{bmatrix} -u_{11} \\ u_{12} \end{bmatrix}$$

Therefore, an equation $$\begin{bmatrix} u_{11} \\ u_{12} \end{bmatrix} = \begin{bmatrix} \sin\theta \\ \cos\theta \end{bmatrix} v_{12}$$

needs to be solved.

The unknowns are $\theta$, $u_{12}$ and $v_{12}$. Since the number of unknowns are three, which is greater than the number of equations, no set of definite solutions can be obtained.

(2) Proof that expression {3} is a necessary condition

By assuming that $\theta = n\pi$ (where n is an integer), it is shown that no solution can be finalized.

Since $\cos\theta = \pm 1$, and $\sin\theta = 0$, $R = \pm I$.

It is necessary to solve conditions $$\Leftrightarrow v_1 = \pm u_1, \; w_1 = u_1$$

and equations $$v_{12} = \pm u_{12}, \; w_{12} = u_{12}$$

The unknowns are $u_{12}$, $v_{12}$ and $w_{12}$. Since the number of unknowns are three, which is greater than the number of the equations, no set of definite solutions can be obtained.
End of Proof
Proof of system 2.1
Expression 14
The contraproposition of a proposition $$\begin{bmatrix} R_1 \\ (R^2)_1 \end{bmatrix} = \begin{bmatrix} \cos\theta, -\sin\theta \\ \cos 2\theta, -\sin 2\theta \end{bmatrix}, \quad \begin{vmatrix} R_1 \\ (R^2)_1 \end{vmatrix} = -\sin(2\theta - \theta) = -\sin\theta$$

is proved.

$$\begin{bmatrix} R_1 \\ (R^2)_1 \end{bmatrix}$$

is not regular $$\Leftrightarrow \sin\theta = 0 \Leftrightarrow \theta = n\pi \text{ (where n is an integer)} \quad \{3\}$$

Therefore, $$\begin{bmatrix} R_1 \\ (R^2)_1 \end{bmatrix}$$

is regular $$\Leftrightarrow \theta \neq n\pi \text{ (where n is an integer)} \quad \{3\}$$

End of Proof
Proof of theorem 2
Expression 15

The contraproposition of a proposition that $v_{11} = \pm u_{11}$ and $w_{11} = u_{11} \Longleftrightarrow \theta = n\pi$ is proved.

($\Leftarrow$) Because $\cos\theta = \pm 1$ and $\sin\theta = 0$, $R = \pm I$, $v_1 = \pm u_1$, $w_1 = u_1$, $v_{11} = \pm u_{11}$ and $w_1 = u_{11}$, ($\rightarrow$)

$$\begin{bmatrix} u_{11} \\ u_{12} \end{bmatrix} = \begin{bmatrix} \cos\alpha \\ \sin\alpha \end{bmatrix}.$$

is defined.

$$v_{11} = \cos(\alpha + \theta), \; w_{11} = \cos(\alpha + 2\theta)$$

(i) when $v_{11} = u_{11}$, $w_{11} = u_{11}$ $$\cos(\alpha + \theta) = \cos\alpha, \; \cos(\alpha + 2\theta) = \cos\alpha$$

$$\begin{bmatrix} \alpha + \theta = \pm\alpha + 2n\pi & (1) \\ \alpha + 2\theta = \pm\alpha + 2m\pi & (2) \end{bmatrix}$$

$\theta = 2n\pi$ or $m\pi$, when either (1) or (2) is positive.

$$\begin{bmatrix} 2\alpha + \theta = 2n\pi & (1) \\ 2\alpha + 2\theta = 2m\pi & (2) \end{bmatrix}$$

when both (1) and (2) are negative.

(2)−(1): $\theta = 2(m-n)\pi$ (ii) when $v_{11} = -u_{11}$, $v_{11} = u_{11}$ $$\cos(\alpha + \theta) = -\cos\alpha, \; \cos(\alpha + 2\theta) = \cos\alpha$$

$$\begin{bmatrix} \alpha + \theta = \pm\alpha + (2n+1)\pi & (1) \\ \alpha + 2\theta = \pm\alpha + 2m\pi & (2) \end{bmatrix}$$

when either (1) or (2) is positive $\theta = (2n+1)\pi$, $m\pi$ when both (1) and (2) are negative $$\begin{bmatrix} 2\alpha + \theta = (2n+1)\pi & (1) \\ 2\alpha + 2\theta = 2m\pi & (2) \end{bmatrix}$$

(2)−(1): $\theta = (2m-2n-1)\pi$

End of Proof
Proof of theorem 3
Expression 16

From conditions $v_1 = R \, u_1$ and $w_1 = R^2 \, u_1$ $$\begin{bmatrix} v_{11} \\ v_{12} \end{bmatrix} = \begin{bmatrix} R_1 \\ (R^2)_1 \end{bmatrix} u_1$$

from system 4.2.1

$$\begin{bmatrix} R_1 \\ (R^2)_1 \end{bmatrix}$$

is regular, $$\begin{bmatrix} u_{11} \\ u_{12} \end{bmatrix} = \begin{bmatrix} R_1 \\ (R^2)_1 \end{bmatrix}^{-1} \begin{bmatrix} v_{11} \\ w_{11} \end{bmatrix} \quad (1)$$

-continued $$\begin{bmatrix} R_1 \\ (R^2)_1 \end{bmatrix}^{-1} = \begin{bmatrix} \cos\theta, & -\sin\theta \\ \cos 2\theta, & -\sin 2\theta \end{bmatrix}^{-1} = \frac{1}{\sin\theta} \begin{bmatrix} \sin 2\theta, & -\sin\theta \\ \cos 2\theta, & -\cos\theta \end{bmatrix}$$

By using the first component of (1), $$u_{11} = 2\cos\theta v_{11} - w_{11}$$

From a condition of theorem 1, since $v_{11} \neq 0$ $$\cos\theta = (u_{11} + w_{11})/(2v_{11})$$

$$\sin\theta = \pm(1-\cos^2\theta)^{1/2}$$

By using the second component of (1)

$$u_{12} = \frac{1}{\sin\theta}(2\cos^2\theta - 1, -\cos\theta)\begin{bmatrix} v_{11} \\ w_{11} \end{bmatrix}$$

From conditions $$v_1 = R\, u_1 \text{ and } w_1 = R^2\, u_1$$

$$v_{12} = (\sin\theta, \cos\theta)\begin{bmatrix} u_{11} \\ u_{12} \end{bmatrix}, \quad w_{12} = (\sin\theta, \cos\theta)\begin{bmatrix} v_{11} \\ v_{12} \end{bmatrix}$$

(End of Proof)
Proof of system 3.1
Expression 17
 Since $$\text{Since } \begin{bmatrix} 1 & 0 \\ 0 & -1 \end{bmatrix} R \begin{bmatrix} 1 & 0 \\ 0 & -1 \end{bmatrix}, \begin{bmatrix} 1 & 0 \\ 0 & -1 \end{bmatrix} u_1,$$

$$\begin{bmatrix} 1 & 0 \\ 0 & -1 \end{bmatrix} v_1, \begin{bmatrix} 1 & 0 \\ 0 & -1 \end{bmatrix} w_1$$

are mirror image transformations of R, $u_1$, $v_1$ and $w_1$ with respect to the X axis, they satisfy the conditions for a set of solution. Therefore, they are in fact a set of solutions. Since there are two sets of solutions according to theorem 3, it is known that the set of solutions other than the above is $$\begin{bmatrix} 1 & 0 \\ 0 & -1 \end{bmatrix} R \begin{bmatrix} 1 & 0 \\ 0 & -1 \end{bmatrix}, \begin{bmatrix} 1 & 0 \\ 0 & -1 \end{bmatrix} u_1,$$

$$\begin{bmatrix} 1 & 0 \\ 0 & -1 \end{bmatrix} v_1, \begin{bmatrix} 1 & 0 \\ 0 & -1 \end{bmatrix} w_1$$

End of Proof
Proof 2 of system 3.1
Expression 18
If one solution is R, $u_1$, $v_1$ and $w_1$ from theorem 3, it is known from the calculations that the other solution is $$\begin{bmatrix} 1 & 0 \\ 0 & -1 \end{bmatrix} R \begin{bmatrix} 1 & 0 \\ 0 & -1 \end{bmatrix}\begin{bmatrix} 1 & 0 \\ 0 & -1 \end{bmatrix} u_1 \begin{bmatrix} 1 & 0 \\ 0 & -1 \end{bmatrix} v_1 \begin{bmatrix} 1 & 0 \\ 0 & -1 \end{bmatrix} w_1$$

End of Proof

So far, a new theory for use in the first form of this invention has been explained in detail, by having the shape/movement recognition unit 18 shown in FIG. 4 apply the new theory to a body moving on a single plane coupled with a rotation having a constant speed of rotation, based on the extraction result in an image of two feature points at three instants in time for observation having equal time intervals, the actual positions and movements of those feature points in a three-dimensional space are calculated, thereby enabling the movement of a moving body to be recognized.

Figure 9:
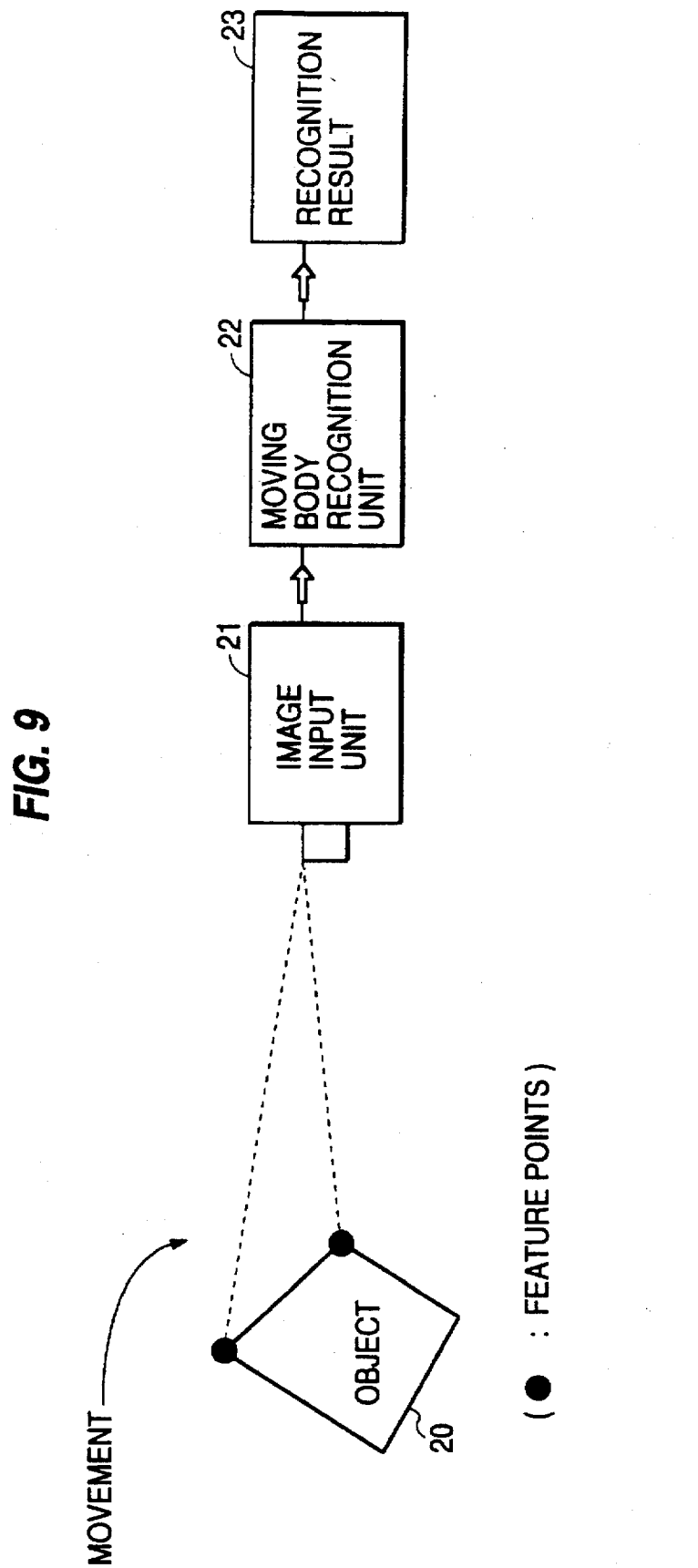
FIG. 9 is an explanatory chart showing the concept of a moving body recognition apparatus of this invention.

FIG. 9 is an explanatory chart showing the concept of a moving body recognition apparatus of this invention.

An embodiment of the first form of this invention assumes that an image input unit 21, provided singularly, recognizes the movement of a moving body rotating around a single axis, e.g. the Z axis, by observing the moving body from a direction perpendicular to the axis of rotation.

In FIG. 9, the image input unit 21 captures images of an object 20, and transmits them to a moving body recognition unit 22. The moving body recognition unit 22 extracts feature points of the object 20 from an image, and recognizes the shape and movement of an object from the positions of feature points at plural instants in time for observation. The moving body recognition unit 22 outputs the result of recognizing the object 20, as a recognition result 23.

Figure 10:
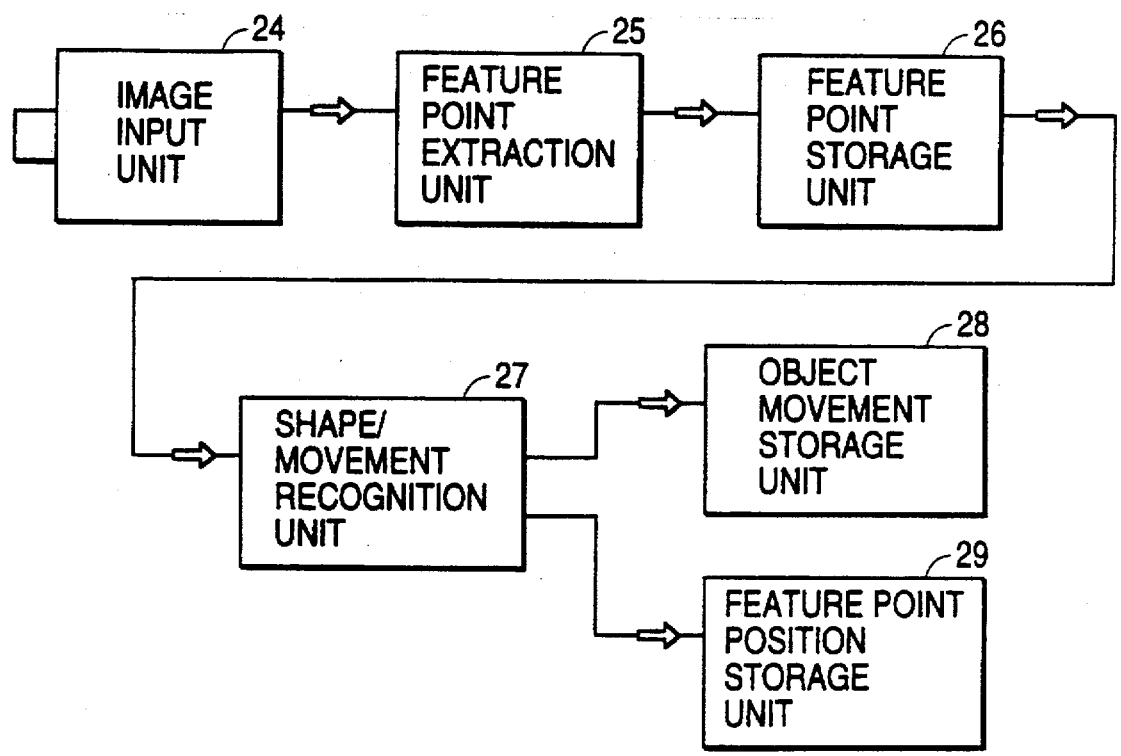
FIG. 10 is a block diagram showing the global configuration of a moving body recognition apparatus of this invention.

FIG. 10 is a block diagram showing the global configuration of a moving body recognition apparatus of this invention.

In FIG. 10, an image input unit 24 captures an input image and outputs it to a feature point extraction unit 25. The feature point extraction unit 25 extracts feature points from the input image, and outputs the position data of the feature points in the input image. The feature point storage unit 26 outputs to a shape/movement recognition unit 27 known its stored position data of the feature points at plural instants in time for observation. The shape/movement recognition unit 27 calculates the positions of the plural feature points in an actual three-dimensional coordinate space and the movement of an object, and stores the result indicating the movement of an object in an object movement storage unit 28 and the result indicating the three-dimensional positions of feature points in a feature point position storage unit 29.

Figure 11:
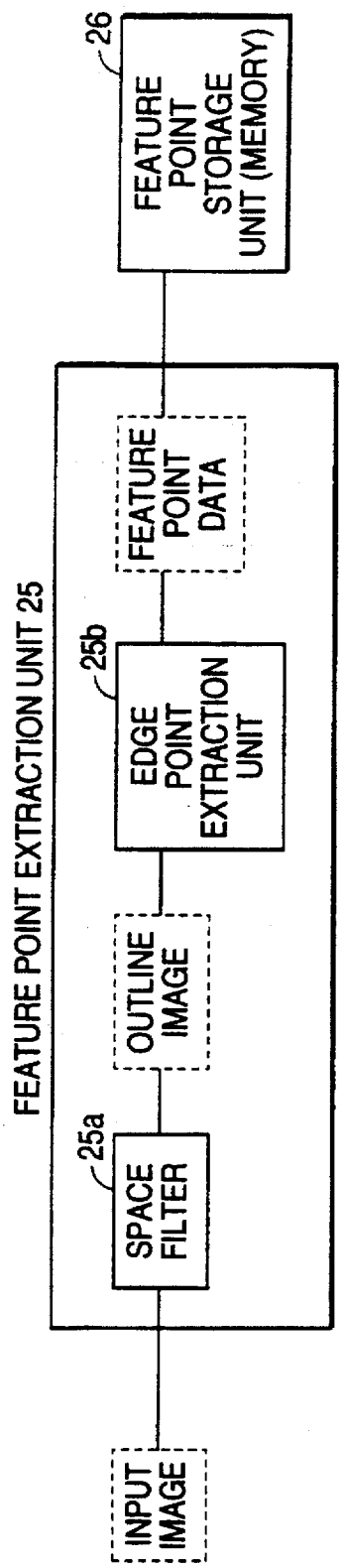
FIG. 11 is a block diagram illustrating in detail the configuration of a feature point extraction unit 25 shown in FIG. 10.

FIG. 11 is a block diagram illustrating in detail the configuration of a feature point extraction unit 25 shown in FIG. 10.

In FIG. 11, the feature point extraction unit 25 comprises a space filter 25a and an edge point extraction unit 25b. There are a number of methods for extracting a feature point, e.g. by an edge and by a color. The moving body recognition apparatus of this invention may use any one of or any combination of feature point extraction systems, and is not restricted to use a particular method for extracting a feature point.

A typical method for extracting a feature point is to extract an edge point of an object. As shown in FIG. 11, the space filter 25a is applied to an input image for extracting an outline image, enabling the edge point extraction unit 25b to detect as feature point data a kink of an edge and an intersection. For instance, in recognizing an object on a single plane, the intersections between the horizon on an image plane and an edge in the vertical direction may be used as feature points.

In FIG. 10, the shape/movement recognition unit 27 uses the earlier described new theory for calculating the actual positions of feature points and the movement of an object.

Figure 12:
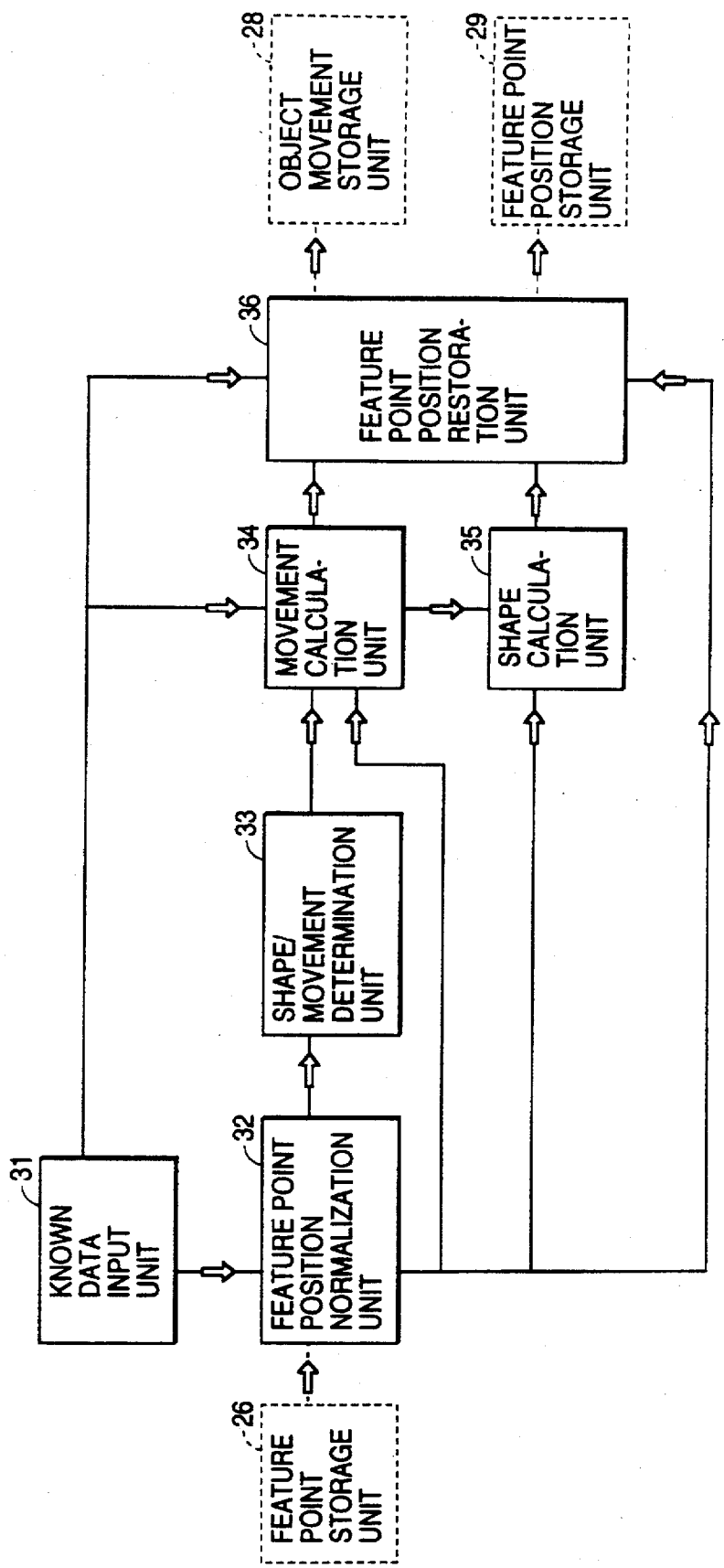
FIG. 12 is a block diagram illustrating in detail the configuration of the shape/movement recognition unit 27 shown in FIG. 10.

FIG. 12 is a block diagram illustrating in detail the configuration of the shape/movement recognition unit 27 shown in FIG. 10.

In FIG. 12, the shape/movement recognition unit 27 comprises a known data input unit 31 for receiving known data about the movement of an object e.g. from a sensor, a feature point normalization position unit 32 for obtaining the relative-positions of other feature points when one of plural feature points moves to the origin of a three-dimensional coordinate space, i.e. the normalized positions, a shape/ movement determination unit 33 for determining a recognition enablement or a recognition disablement of the movement of an object, a movement calculation unit 34 for calculating the angle of rotation around the axis of rotation of the object by using an output from the feature point normalization unit 32, a shape calculation unit 35 for obtaining unknown position data of feature points other than the feature point on the origin, and a feature point position reconstruction unit 36 for outputting the movement of the object the and the positions of feature points in the three-dimensional coordinate space respectively to the object movement storage unit 28 and the feature point position storage unit 29, by using outputs from the movement calculation unit 34 and the feature point position normalization unit 32.

Figure 13:
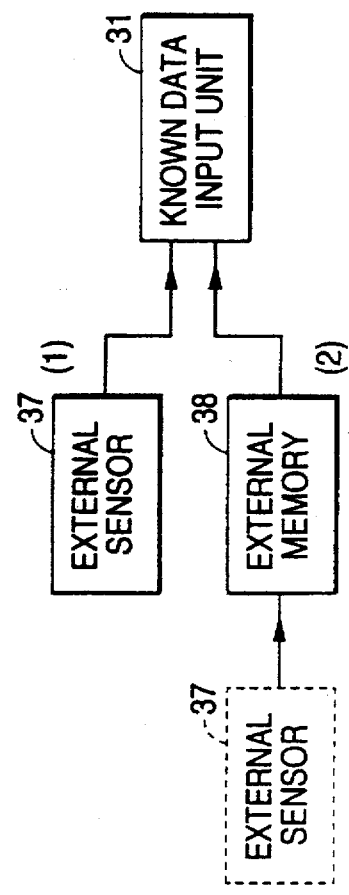
FIG. 13 illustrates an embodiment of sensor connections for the known data input unit 31 shown in FIG. 12.

FIG. 13 illustrates an embodiment of sensor connections for the known data input unit 31 shown in FIG. 12.

FIG. 13 shows two connecting systems (1) and (2). In connecting system (1), an external sensor 37 is connected directly to the known data input unit 31. In connecting system (2), an external memory 38 is connected to the known data input unit 31 and the external sensor 37 is connected off-line to the external memory 38. That is, the external memory 38 stores data from the external sensor 37, the external memory disconnects itself from the external sensor 37. The external sensor 37 may be a special electrical sensor, an optical sensor or an ultrasonic sensor for measuring an object. However, such a sensor is premised on a special relation between an object and the moving object recognition apparatus of this invention and is not a general purpose sensor almighty for any object.

The configuration of the moving body recognition apparatus illustrated in FIGS. 9 through 13 can be realized almost "as is" by a computer system. First, the image input units 21 (shown in FIG. 9) and 24 (shown in FIG. 10) are realized by a TV camera, and the known data input unit 31 is connected with a keyboard and a sensor other than a TV camera, as described earlier. The feature point storage unit 26, the object movement storage unit 28 and the feature point position storage unit 29 comprise a memory or a secondary storage apparatus such as a disk storage apparatus, and the feature point extraction unit 25 is realized by image processing hardware including the space filter 25a. The shape/movement recognition unit 27 is realized by a generic CPU, and the recognition result 23 (shown in FIG. 9) corresponds to the movement of an object and the positions of feature points stored respectively, in the object movement storage unit 28 and the feature point position storage unit 29.

Figure 14:
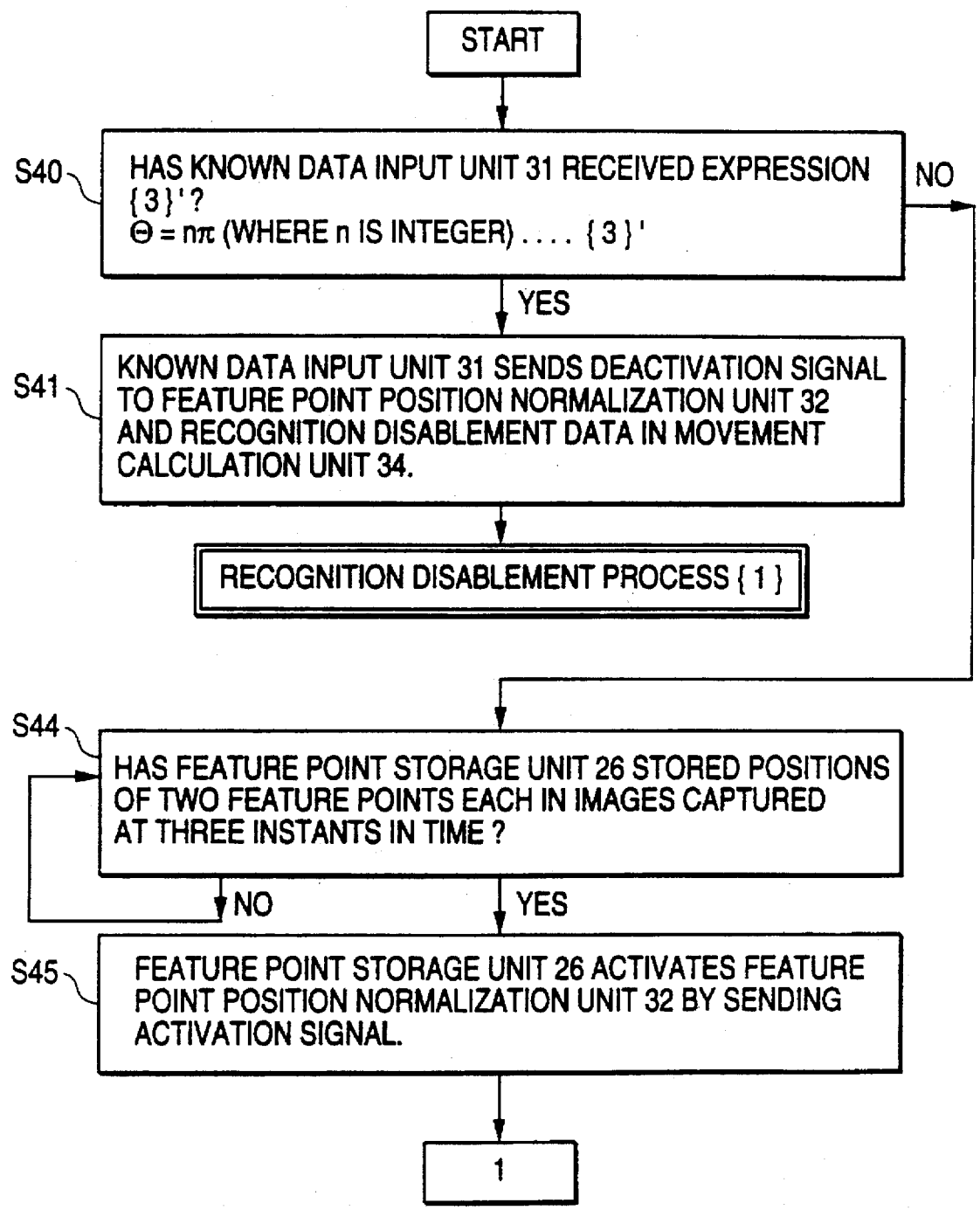
FIG. 14 is a first one of flowcharts showing in a three part series the whole processes of the movement/shape recognition unit 27 pursuant to the first form of this invention.
Figure 15:
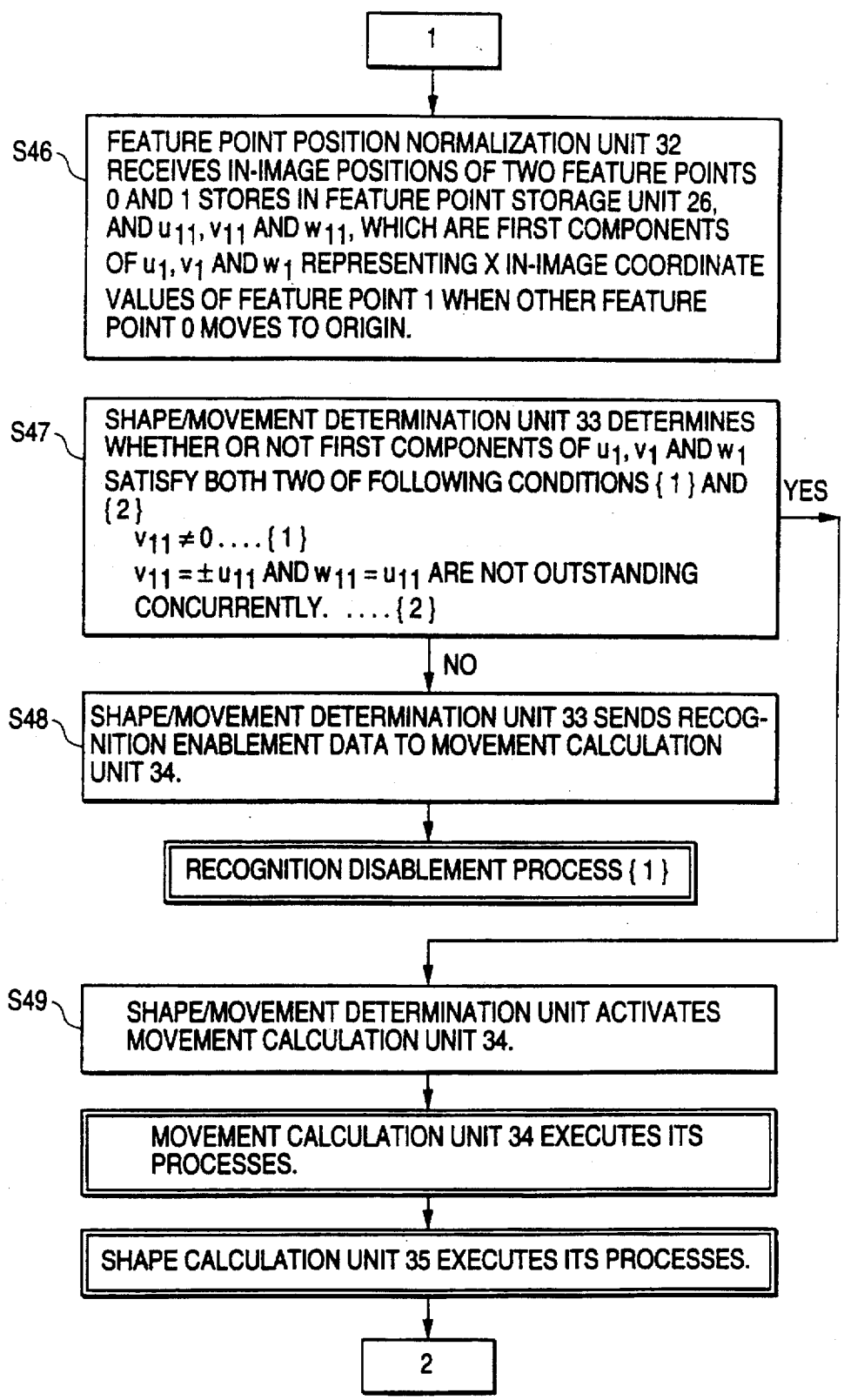
FIG. 15 is a second one of flowcharts showing in a three part series the whole processes of the movement/shape recognition unit 27 pursuant to the first form of this invention.
Figure 16:
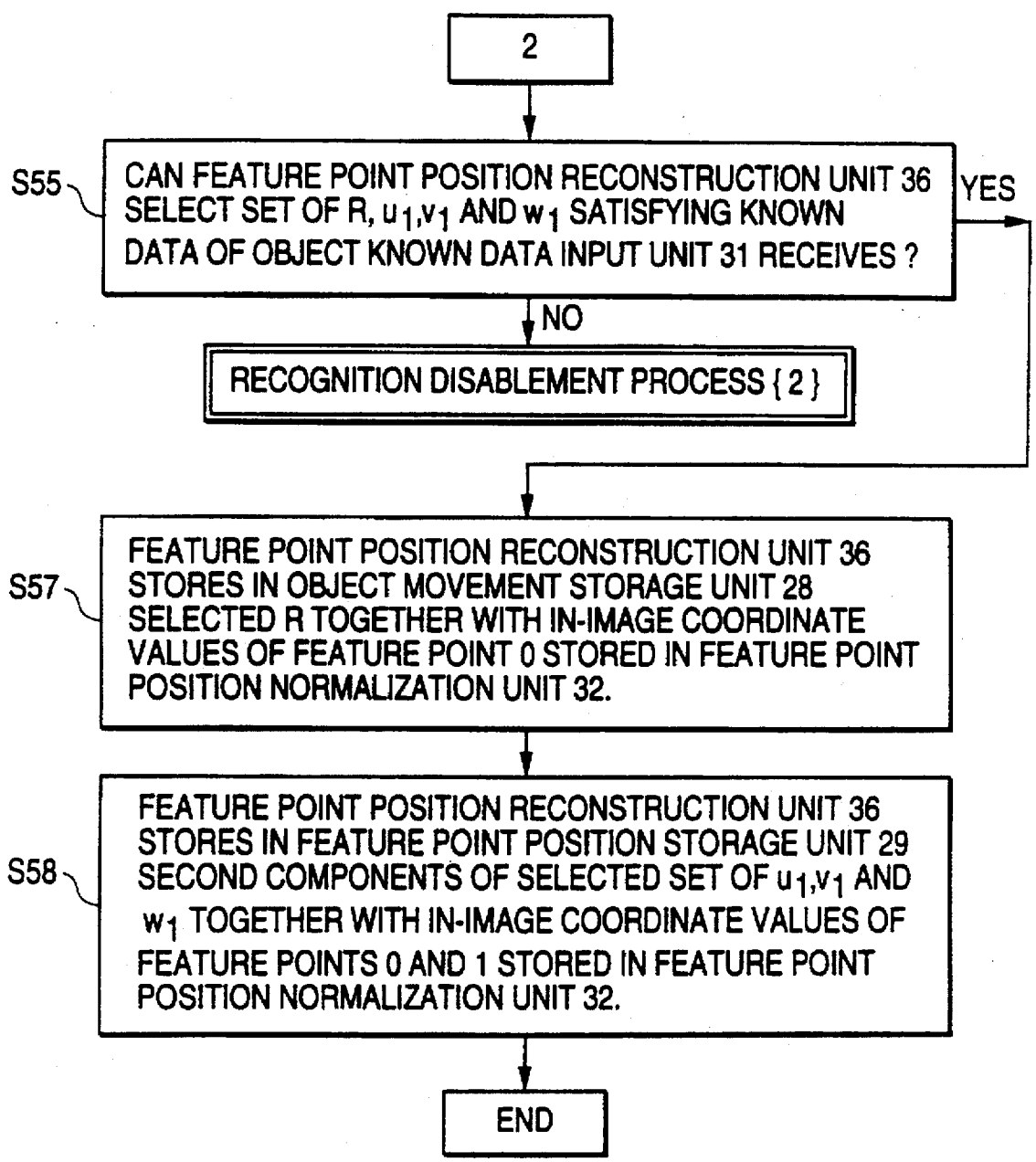
FIG. 16 is a third one of flowcharts showing in a three part series the whole processes of the movement/shape recognition unit 27 pursuant to the first form of this invention.

FIGS. 14, 15 and 16 are flowcharts showing in a three part series the whole processes of the movement/shape recognition unit 27 pursuant to the first form of this invention.

In FIG. 14, on starting the process it is determined in step S40 whether or not the known data input unit 31 shown in FIG. 8 has received an expression {3}', i.e. θ=n π, where n is an integer. Here, expression {3}' is generally determined to be outstanding or not only after a calculation of rotation matrix R, because various sensors (not explained here) are attached to the moving body recognition apparatus of this invention, it is determined by signals from those sensors whether or not the rotation of an object from a first instant in time for observation to a second instant in time for observation is a rotation by zero degrees or one hundred and eighty degrees. Here, the prime sign for expression {3}' indicates that expression {3} used in theorem 2 is transformed on an equivalent basis.

When the shape/movement recognition unit 21 determines in step S40 that the known data input unit 31 has received expression {3}', in step S41 the known data input unit 31 outputs a deactivation signal to the feature point normalization unit 32 and stores in the movement calculation unit 34 recognition disablement data, thereby invoking a recognition disablement process {1}.

Figure 17:
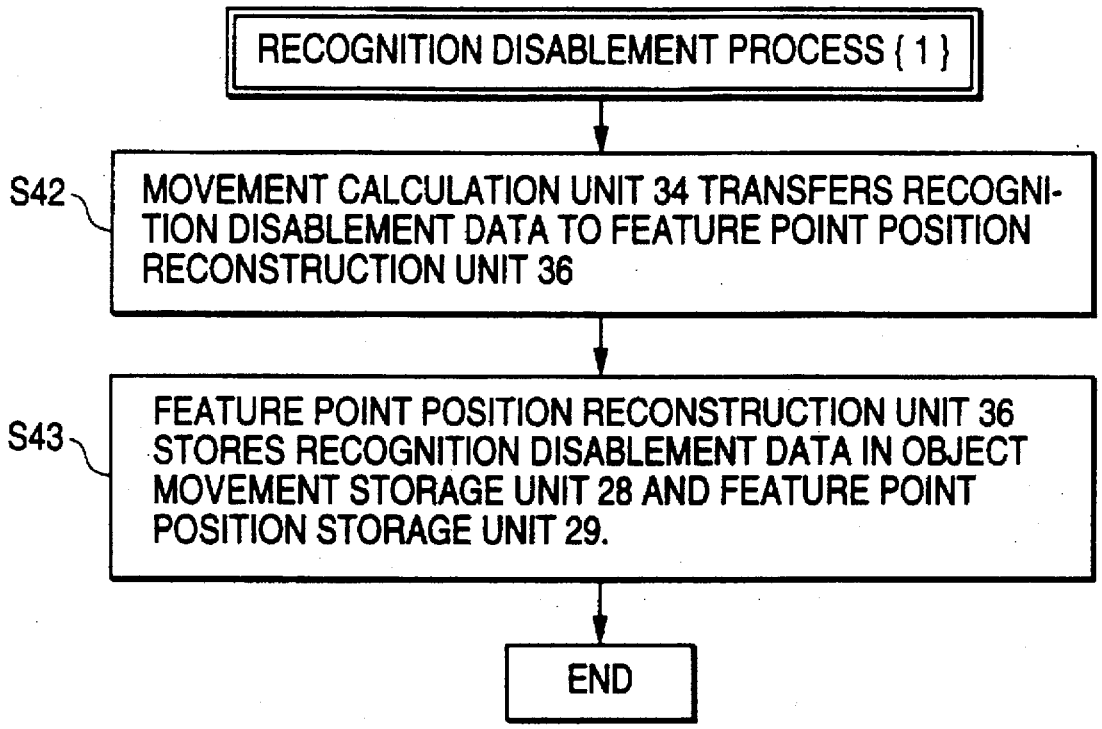
FIG. 17 is a flowchart of an embodiment of recognition disablement process {1} pursuant to the first form of this invention.

FIG. 17 is a flowchart of an embodiment of recognition disablement process {1} pursuant to the first form of this invention.

On start of recognition disablement process {1}, the movement calculation unit 34 sends recognition disablement data to the feature point position reconstruction unit 36 in step S42. Then, the feature point position reconstruction unit 36 stores the recognition disablement data in the object movement storage unit 28 and the feature point storage unit 29 in step S43, thereby ending the process.

Returning to FIG. 14, when the shape/movement recognition unit 27 determines in step S40 that the known data input unit 31 has received expression {3}', it determines in step S44 whether or not the feature point storage unit 26 has not stored the positions of two feature points each in images captured at three instants in time for observation. The shape/movement recognition unit 27 repeats step S44 until it determines that the feature point storage unit 26 has stored the positions of two feature points each in images captured at three instants in time for observation. When the shape/movement recognition unit 27 determines affirmatively (YES) in step S44, the feature point storage unit 26 sends an activation signal to the feature point position normalization unit 32, thereby activating the feature point position normalization unit 32.

Continuing on to FIG. 15, in step S46, the feature point position normalization unit 32 receives the positions of two feature points 0 and 1 stored in the feature point storage unit 26 by the feature point position normalization unit 32. Then, the first components $u_{11}$, $v_{11}$ and $w_{11}$ of $u_1$, $v_1$ and $w_1$ are obtained from the image coordinate values of feature point 1, which is different from feature point 0, which falls on the origin. The shape/movement determination unit 33 determines in step S47 whether or not those first components $u_{11}$, $v_{11}$ and $w_{11}$ satisfy expressions {1} and {2}. If at least either one of them is not satisfied, the shape/movement determination unit 33 sends recognition disablement data to the movement calculation unit 34 in step S48, thereby invoking recognition disablement process {1} shown in FIG. 17.

As already explained in the description of theorem 2, expression {2} is equivalent to expression {3}. Therefore, it can be said that the check of expression {3} in step S40 and the check of expression {2} in step S47 form a duplication. However, since a sensor can perform the check in step S40, such a duplication is instituted. Also, no further calculation is performed, when in step S47 the shape/movement determination unit 33 determines a recognition disablement by using only the positions of feature points in an image.

If the shape/movement determination unit 33 determines in step S47 that both expressions {1} and {2} are outstanding, the shape/movement determination unit 33 activates the movement calculation unit 34 in step S49, thereby invoking respective processes of the movement calculation unit 34 and the shape calculation unit 35, in accordance with theorem 3.

Figure 18:
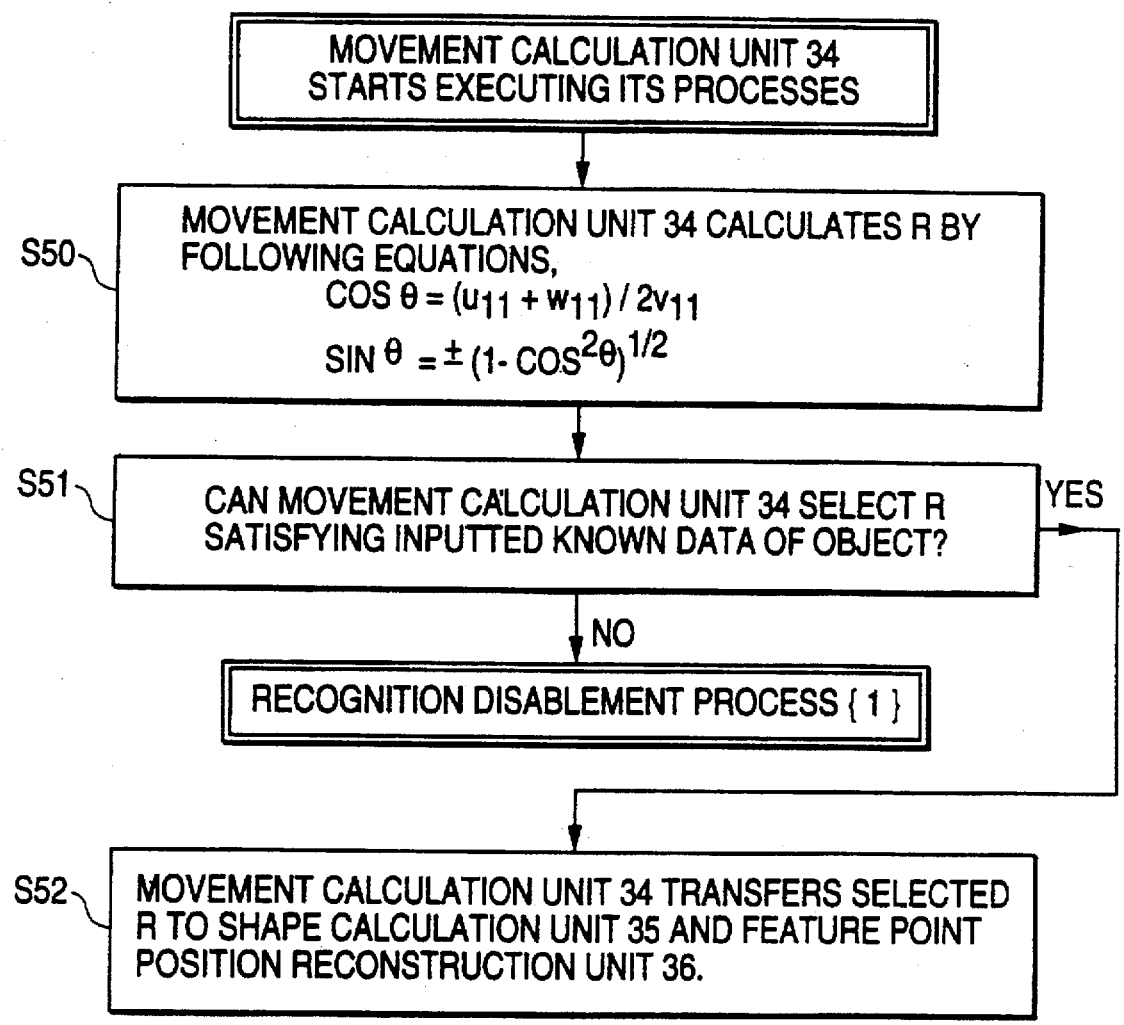
FIG. 18 is a flowchart of the movement calculation unit 34 pursuant to the first form of this invention.

FIG. 18 is a flowchart of the movement calculation unit 34 pursuant to the first form of this invention.

On starting the process, the movement calculation unit 34 calculates rotation matrix R in step S50, and determines in step S51 whether or not any of the calculation results satisfies the known data regarding the movement of an object inputted to the known data input unit 31. If rotation matrix R does not satisfy the known data, recognition disablement process {1} shown in FIG. 17 is invoked.

As described earlier, a sensor (not illustrated as part of the moving body recognition apparatus) inputs known data about the movement of an object. Assume here, for instance, that an object stands still on a single plane, and that a TV camera loaded on a running vehicle moves on the same single plane. Because the moving vehicle may slip, the movement of the TV camera cannot be determined precisely. However, the direction of the relative movement of the running vehicle as against the still body can be determined. The relative movement of the still body is supplied as known data of the object via an external memory to the known data input unit 31. The movement calculation unit 34 obtains rotation matrix R and its inverse rotation matrix $R^{-1}$, as two sets of solutions, the constraint on the direction of a relative movement allows only one set of solutions to be selected as the appropriate set of solutions.

FIG. 19 is an explanatory chart for the method of selecting the appropriate one of two rotation matrices R and $R^{-1}$.

More specifically, FIG. 19 shows a case in which a vehicle loaded with a TV camera is observed straight from the above, and illustrates how to capture the image of a still object facing a direction perpendicular to the moving direction of a running vehicle. It is assumed that a sensor e.g. loaded on the running vehicle has already detected the moving direction of the running vehicle. If the running vehicle moves to the left, the TV camera observes that the object rotates clockwise, which means that it is sufficient to select, as the calculated rotation matrix, either R or $R^{-1}$ that represents a clockwise rotation. If, on the other hand, the running vehicle moves to the right, as opposed to the direction shown in FIG. 19, the TV camera observes that the object rotates counterclockwise, in which case it is sufficient to select, as the calculated rotation matrix, either R and $R^{-1}$ that represents a counterclockwise rotation.

When the movement calculation unit 34 determines in step S51 that it can select rotation matrix R satisfying known data of the object inputted in known data input unit 31, the movement calculation unit 34 sends rotation matrix R as its result to the shape calculation unit 35 and the feature point position reconstruction unit 36.

FIG. 20 is a flowchart of the shape calculation unit 35 pursuant to the first form of this invention.

According to the first form of this invention shown in FIG. 20, on invoking the process, the shape calculation unit 35 obtains $u_{12}$, $v_{12}$ and $w_{12}$ as the second components of two-dimensional vectors $u_1$, $v_1$ and $w_1$ in step S53. Then, in step S54, the shape calculation unit 35 sends the second components $u_{12}$, $v_{12}$ and $w_{12}$ to the feature point position reconstruction unit 36.

After the shape calculation unit 35 shown in FIG. 15 completes its processes, the feature point position reconstruction unit 36 executes its processes in step S55 shown in FIG. 16. Here, from the two-dimensional vectors $u_1$, $v_1$ and $w_1$ and rotation matrix R, as the calculation result of the shape and movement of the object, the feature point position. reconstruction unit 36 selects the values matching the known data about the movement of the object inputted to the known data input unit 31. If no such values exist, a recognition disablement process {2} is invoked.

Here, for explaining an example of known data, it is assumed that the TV camera loaded on a vehicle moves on a single plane. It is further assumed here that it is known already whether the surface shape of the still object observed from the TV camera is a convex or a concave. For instance, a telegram pole has a convex surface. The concave/convex data on an object are supplied as known data of the still object to the known data input unit e.g. via an external memory. Although the shape calculation unit 35 obtains two sets of solutions, which are mirror image transformations of each other with respect to the observation plane, the concave/convex data on the object enables only one set of solutions to be selected as the appropriate set of solutions.

FIGS. 21A and 21B are explanatory charts for concave/convex data of an object.

Because two feature point are captured in the first form of this invention, if the relative distances of the two feature points observed by a TV camera are known, either of the two sets of solutions can be selected as the appropriate set of solutions.

FIG. 21A shows a case in which feature point 0 is closer to the TV camera than feature point 1, and FIG. 21B shows a case in which feature point 1 is closer to the TV camera than feature point 0. The known data input unit 31 receives as the knowledge about the object either these relative distances "as is" or the results measured e.g. by an ultrasonic sensor.

Figure 22:
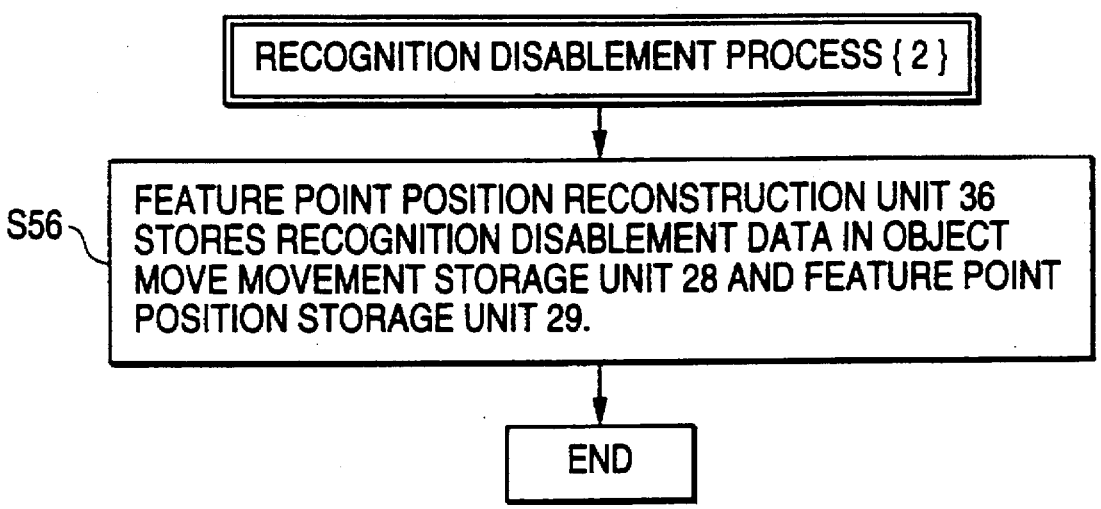
FIG. 22 is a flowchart of an embodiment of recognition disablement process {2} pursuant to the first form of this invention.

FIG. 22 is a flowchart of an embodiment of recognition disablement process {2} pursuant to the first form of this invention.

In step S56, the feature point position reconstruction unit 36 stores the recognition disablement data in the object movement storage unit 28 and the feature point position storage unit 29, thereby ending the process.

Returning to FIG. 16, when the feature point position reconstruction unit 36 selects a set of solutions satisfying the known data in step S55, the feature point position reconstruction unit 36 stores in the object movement storage unit 28 the values of elements of rotation matrix R in the selected set of solutions and the in-image coordinate values of feature point 0 in step S57, and in the feature point position storage unit 29 the second component values $u_{12}$, $v_{12}$ and $w_{12}$ of the two-dimensional vectors $u_1$, $v_1$ and $w_1$ also in the selected set of solutions and the in-image coordinate values of the two feature points 0 and 1 stored in the feature point position normalization unit 32 in step S58, thereby ending the process.

In the above described embodiment, the movement calculation unit 34 obtains two sets of solutions simultaneously in step S50 (shown in FIG. 18) of calculating rotation matrix R. However, the above embodiment can be reconfigured, such that the movement calculation unit 34 obtains only one set of solutions in step S50.

In such an alternative embodiment, as an initial step, the feature point position reconstruction unit 36 calculates inverse rotation matrix $R^{-1}$ inverse to rotation matrix R, which is in the other set of solutions not selected.

Expression 19

$$R^{-1} = \begin{bmatrix} \cos\theta, & \sin\theta \\ \sin\theta, & \cos\theta \end{bmatrix}$$

Also, two-dimensional vectors $u_1'$, $v_1'$ and $w_1'$ in the other set of solutions, which are the mirror image transformations of two-dimensional vectors $u_1$, $v_1$ and $w_1$ in the selected set of solutions with respect to the X axis are calculated.

Expression 20

$$u_1' = \begin{bmatrix} u_{11} \\ u_{12} \end{bmatrix}, v_1' = \begin{bmatrix} v_{11} \\ v_{12} \end{bmatrix}, w_1' = \begin{bmatrix} w_{11} \\ w_{12} \end{bmatrix}$$

This allows the feature point position reconstruction unit 36 to obtain two [2] sets of solutions.

As described above, the first form of this invention enables the movement of an object moving on a single plane coupled with a rotation at a constant rotating speed to be recognized from the positions of two feature points each in images captured at three instants in time for observation having equal intervals. Also, as explained in the description of FIG. 15, the shape/movement determination unit 33 can immediately determine the recognition enablement or the recognition disablement from the in-image positions of feature points.

The Second Form

The following is a description of the second form of this invention. As described earlier, the second form corresponds to a special case of a first form of this invention, in which three feature points of an object forms a right angle. In such a case, the positions and movements of feature points are calculated from the known position data at three feature points at two instants in time for observation.

Figure 23:
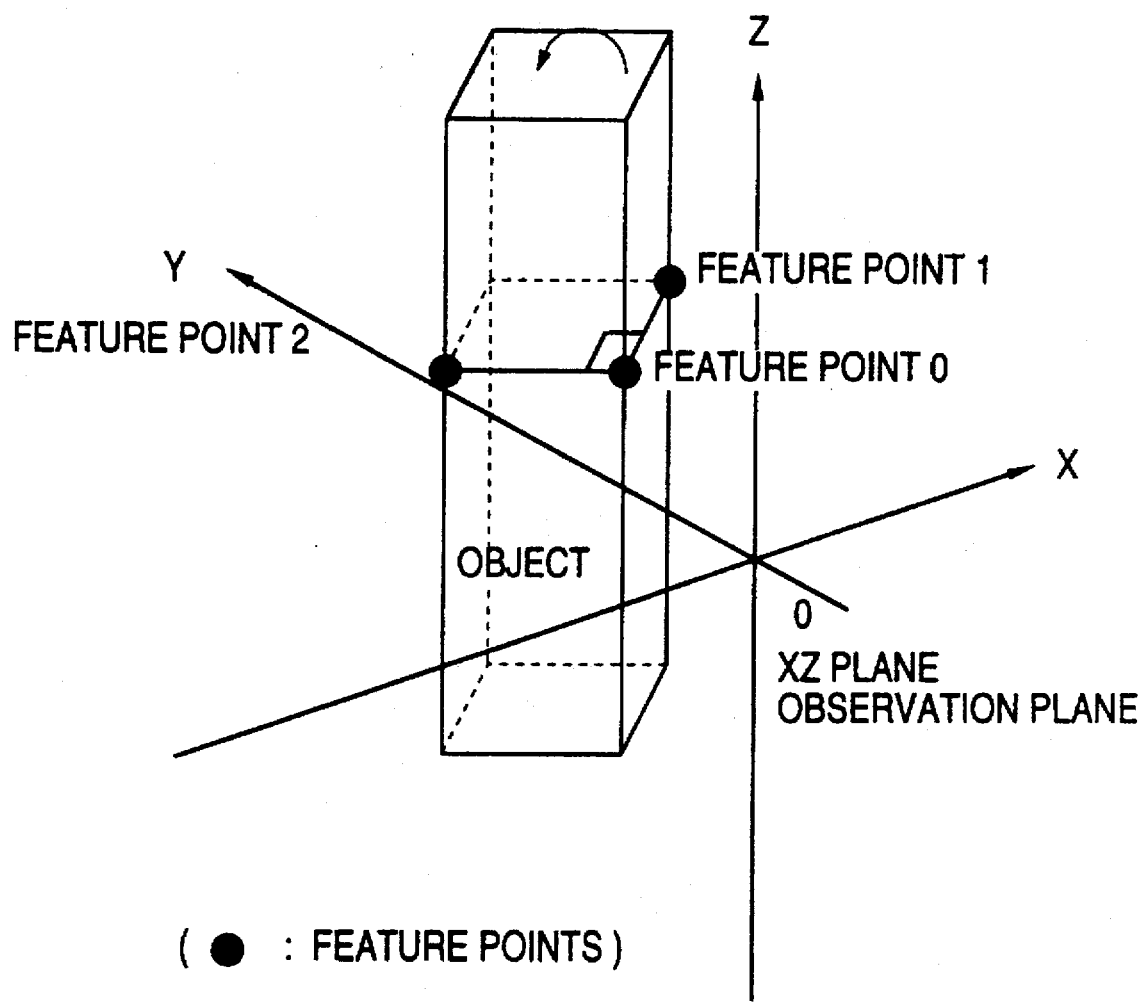
FIG. 23 shows a universal relation between an object and its observation plane in an image input unit pursuant to the second form of this invention.
Figure 24:
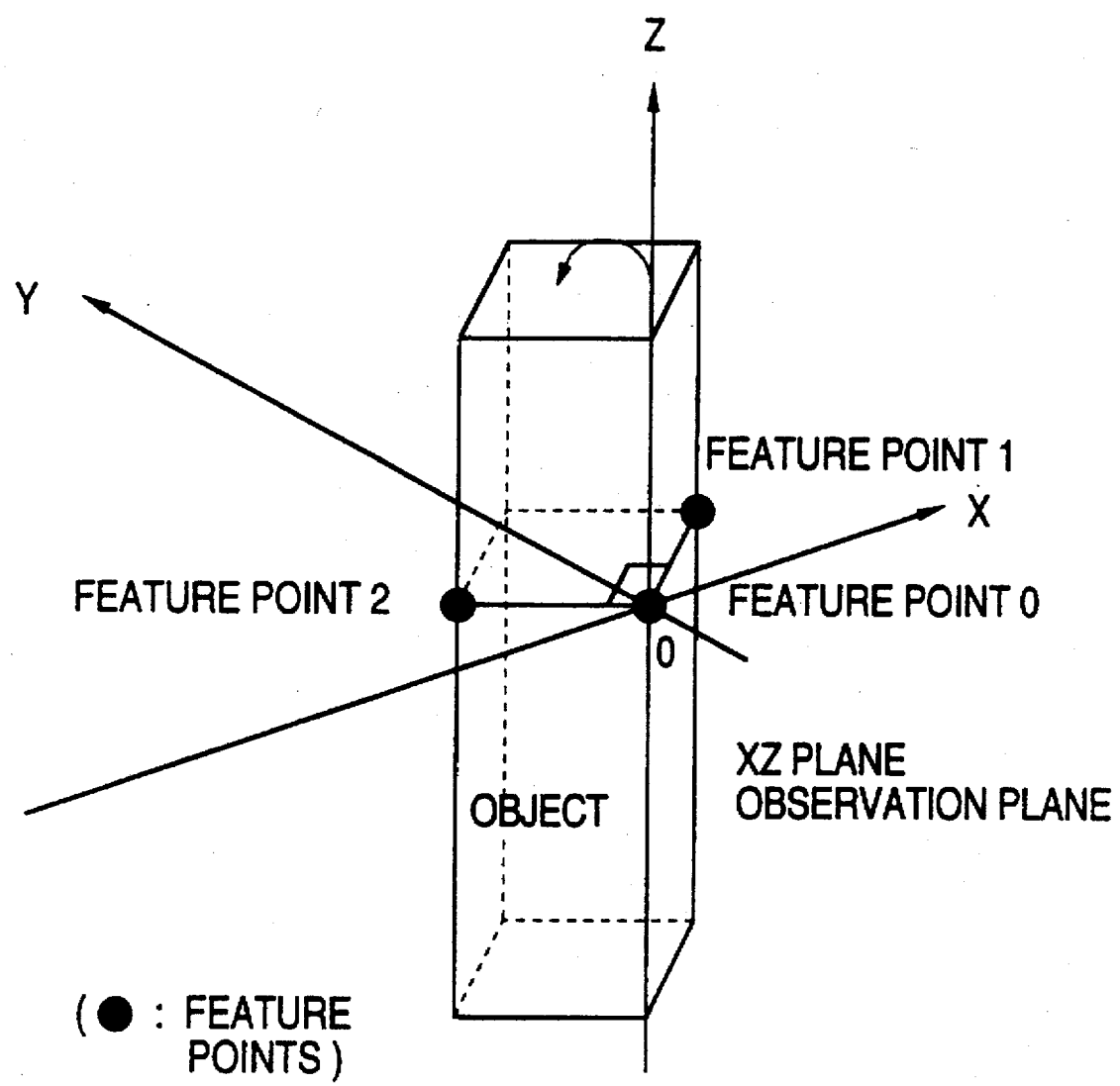
FIG. 24 shows a relation between an object and its observation plane pursuant to the second form of this invention, in which feature point 0 is fixed to the origin of a three-dimensional coordinate system.

The rotating direction, the moving direction and observing direction of an object in relation with the coordinate axes are essentially the same as those of the first form, and they are not explained again. The general relation between an object and an observation plane is similar to what is shown in FIGS. 23 and 24.

The only difference is that feature point 0 of the three feature points 0, 1 and 2 falls at the peak point of a right angle formed as the intersection between the line segment between feature point 1 and feature point 0 and the line segment between feature point 2 and feature point 0.

Next, the new theory for the second form of this invention is explained below. As shown in theorem 8 described later, the second form of this invention allows a moving body to be recognized by making correspondences between three feature points in two images. Here, the one of the feature points at the peak of the right angle is displaced to the origin of the coordinate axis, and the Y coordinate values of other two feature points and the rotating angle of the object around the origin is calculated. By putting one of the feature points on the origin, three feature points form a right angle on the XY plane.

To observe the condition that edges form a right angle, three feature points are necessary. Also, a single image cannot allow the shape of a moving body to be determined. Therefore, three feature points and two images are necessary conditions.

Figure 25:
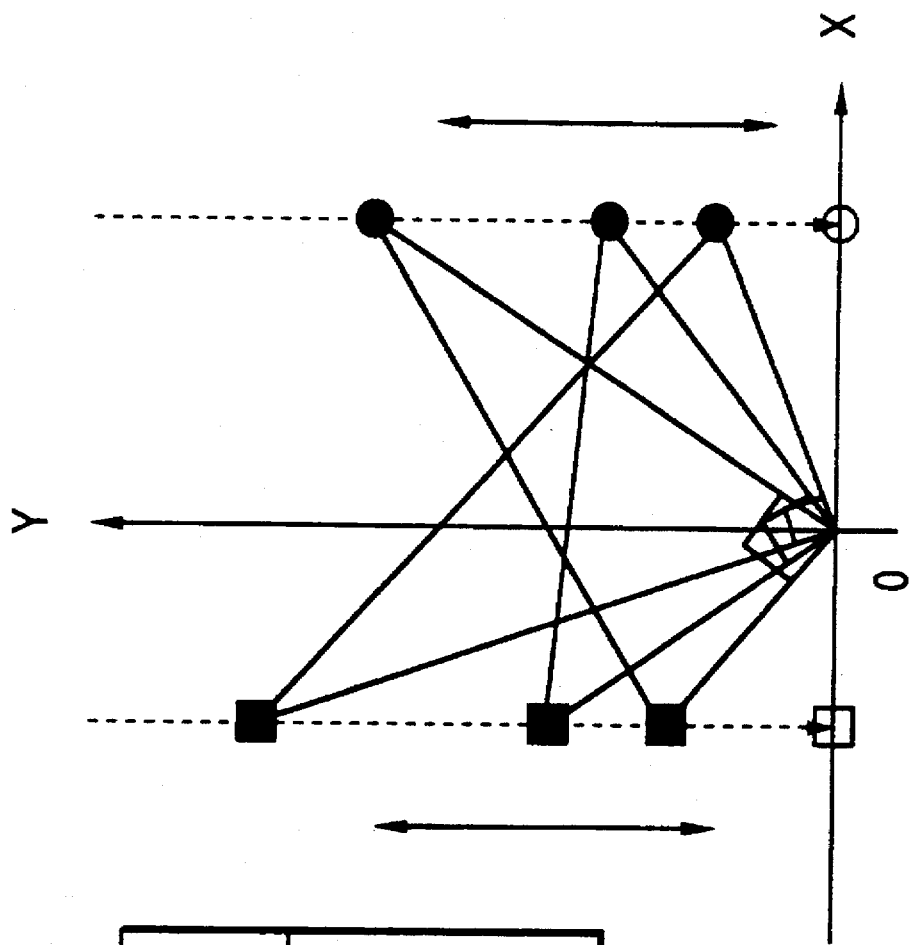
FIG. 25 shows that edges forming a right angle in a single image cannot produce a set of definite solutions pursuant to the second form of this invention.

FIG. 25 shows that edges forming a right angle in a single image cannot produce a set of definite solutions pursuant to the second form of this invention.

The actual positions of feature points 1 and 2 are on a single straight line of the observed X coordinate values. If feature point 1 is arbitrarily is selected, one position of feature point 2 satisfying the condition is determined. This is because the triangle formed by feature point 1, the origin (feature point 0) and feature point 2 is a right angled triangle. That is, there is an infinite number of combinations between feature points 0 and 1.

Figure 26:
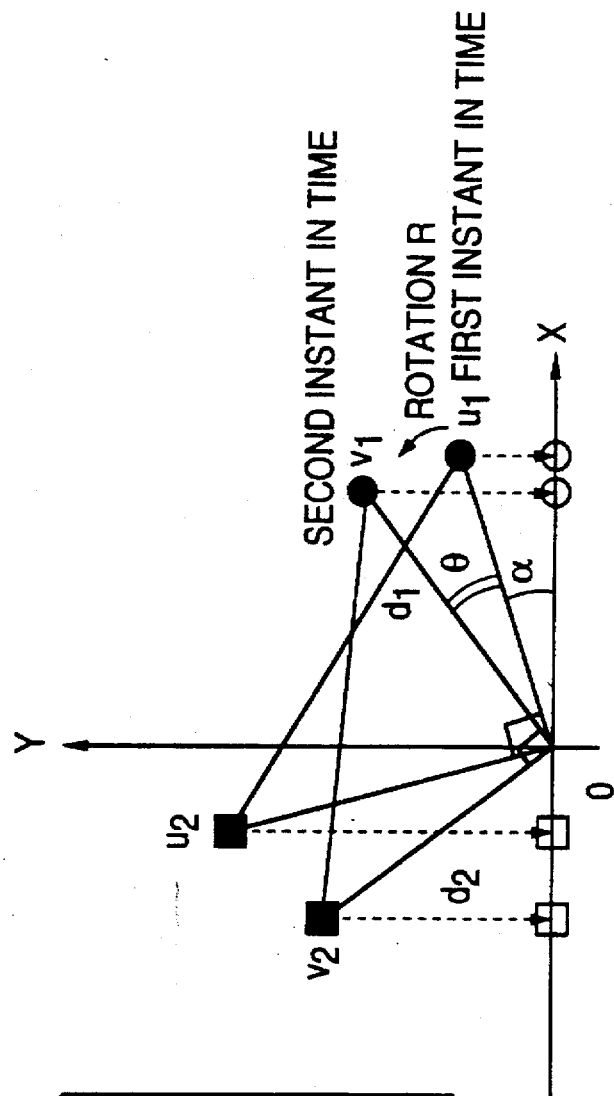
FIG. 26 illustrates the orthogonal projections of feature points 0, 1 and 2 shown in FIG. 34 on the XY plane at two instants in time for observation pursuant to the second form of this invention.

FIG. 26 illustrates the orthogonal projections of feature points 0, 1 and 2 shown in FIG. 25 on the XY plane at two instants in time for observation pursuant to the second form of this invention.

More specifically, FIG. 26 shows a status of the actual positions and movements of the feature points from the orthogonally projected points to the image axes of two feature points other than the origin of an object captured at two instants in time for observation.

Signs used in FIG. 26 is explained.

Feature point 0 is a feature point of an object moved to the origin.

Feature points 1 and 2 are feature points on an object other than feature point 0.

$u_1$ and $u_2$ are two-dimensional vectors on the XY plane from the origin respectively to feature points 1 and 2 at a first point in time for observation.

$v_1$ and $v_2$ are two-dimensional vectors on the XY plane from the origin respectively to feature points 1 and 2 at a second point in time for observation.

Expression 11

$$u_i = \begin{bmatrix} u_{i1} \\ -u_{i1} \end{bmatrix}, v_i = \begin{bmatrix} v_{i1} \\ -v_{i2} \end{bmatrix}, \text{(where } i = 1, 2\text{)}$$

Rotation matrix R represents a two-dimensional rotation of the object on the XY plane around the origin from the first instant in time for observation to the second instant in time for observation.

Expression 12

$$R = \begin{bmatrix} \cos\theta & -\sin\theta \\ \sin\theta & \cos\theta \end{bmatrix}$$

$u_2$ represents a vector obtained by rotating $u_1$ by $\pi/2$ or by $-\pi/2$. The solutions of these two cases have the relation of a lemma 1. Lemma 1 describes two sets of solutions, which form mirror image transformations of each other with respect to the observation plane, as already explained in the description of the first form of this invention.

lemma 1

The following solutions (1) and (2) are mirror image transformations of each other with respect to the X axis.

(1) $u_2$ is a solution obtained by rotating $u_1$ by $\pi/2$.
(2) $u_2$ is a solution obtained by rotating $u_1$ by $-\pi/2$.

Figure 27:
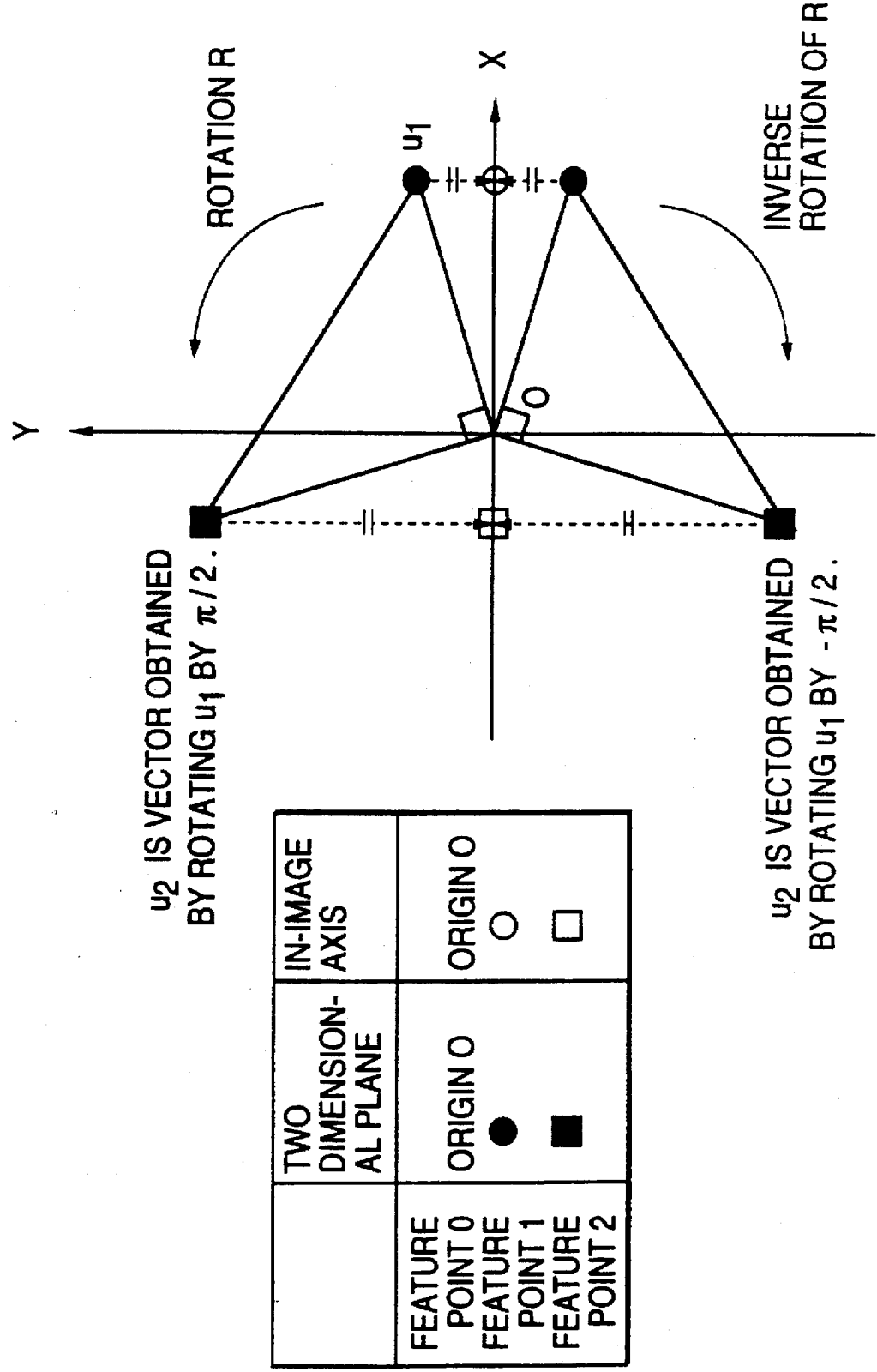
FIG. 27 shows two sets of solutions forming mirror image transformations of each other with respect to the X axis pursuant to the second form of this invention.

FIG. 27 shows two sets of solutions forming mirror image transformations of each other with respect to the X axis pursuant to the second form of this invention.

FIG. 27 shows that there are cases in which Y coordinate values of other feature points are positive and negative, when feature point 0 in the orthogonally projected image falls on the origin. This corresponds to a case in which the surface of an object forms either a convex or a concave.

Therefore, in the second form of this invention, a recognition solution <2> is a mirror image transformation of a recognition solution <1> with respect to the X axis, where recognition solution <2> is a solution to the problem in which $u_2$ is obtained by rotating $u_1$ by $-\pi/2$ and recognition solution <1> is a solution to the problem in which $u_2$ is a vector obtained by rotating $u_1$ by $\pi/2$.

Expression 13

Therefore, when $u_1$ is defined as:

$$u_1 = d_1 \begin{bmatrix} \cos\alpha \\ \sin\alpha \end{bmatrix}$$

Then, $u_2$ is defined as:

$$u_2 = d_2 \begin{bmatrix} \cos(\alpha + \pi/2) \\ \sin(\alpha + \pi/2) \end{bmatrix} = d_2 \begin{bmatrix} -\sin\alpha \\ \cos\alpha \end{bmatrix} \quad \text{(a)}$$

Expression 14

Also, when $v_1$ is defined as:

$$v_1 = d_1 \begin{bmatrix} \cos\beta \\ \sin\beta \end{bmatrix} = d_1 \begin{bmatrix} \cos(\alpha + \theta) \\ \sin(\alpha + \theta) \end{bmatrix}$$

Then, $v_2$ is defined as:

$$v_2 = d_2 \begin{bmatrix} \cos(\alpha + \pi/2 + \theta) \\ \sin(\alpha + \pi/2 + \theta) \end{bmatrix} = d_2 \begin{bmatrix} -\sin(\alpha + \theta) \\ \cos(\alpha + \theta) \end{bmatrix} \quad (b)$$

| A first instant in time for observation $u_1 \to v_1$ $u_2 \to v_2$ | A second instant in time for observation |
|---|---|

$R$

By their relations can be stated as $$v_i = R\, u_i \text{ (where } i=1, 2)$$

Therefore, the problem can be formulated as follows:
A Recognition Of An Object Having A Right Angle At An Edge On A Plane $u_i$ (where $i=1, 2$) are two-dimensional vectors whose first components are known.

$u_2$ is a vector obtained by rotating $u_1$ by $\pi/2$.

R is a two-dimensional rotation matrix.

$v_i$ (where $i=1, 2$) are two-dimensional vectors whose first components are known.

$v_i = R\, u_i$ (where $i=1, 2$)

At this time, obtain the second components of $u_i$ and $v_i$ (where $i=1, 2$) and R.

The second element of $v_i$ (where $i=1, 2$) can be obtained directly from R, $u_i$ and the relation $v_i = R\, u_i$. Accordingly, it is sufficient to obtain the second component of $u_i$ (where $i=1, 2$) and R. That is $\theta$, $d_1$, $d_2$ and $\alpha$.

A next theorem 4 gives condition for solving the problem.

Theorem 4

The condition of allowing the above movement structure recognition problem is $$v_{11} \neq \pm u_{11} \quad \{4\}$$

or $$v_{21} \neq \pm u_{21} \quad \{5\}.$$

If the coordinate values to be observed from the X axis satisfy conditions $\{4\}$ and $\{5\}$, it is determined that a unique set of solutions can be obtained.

Figure 28:
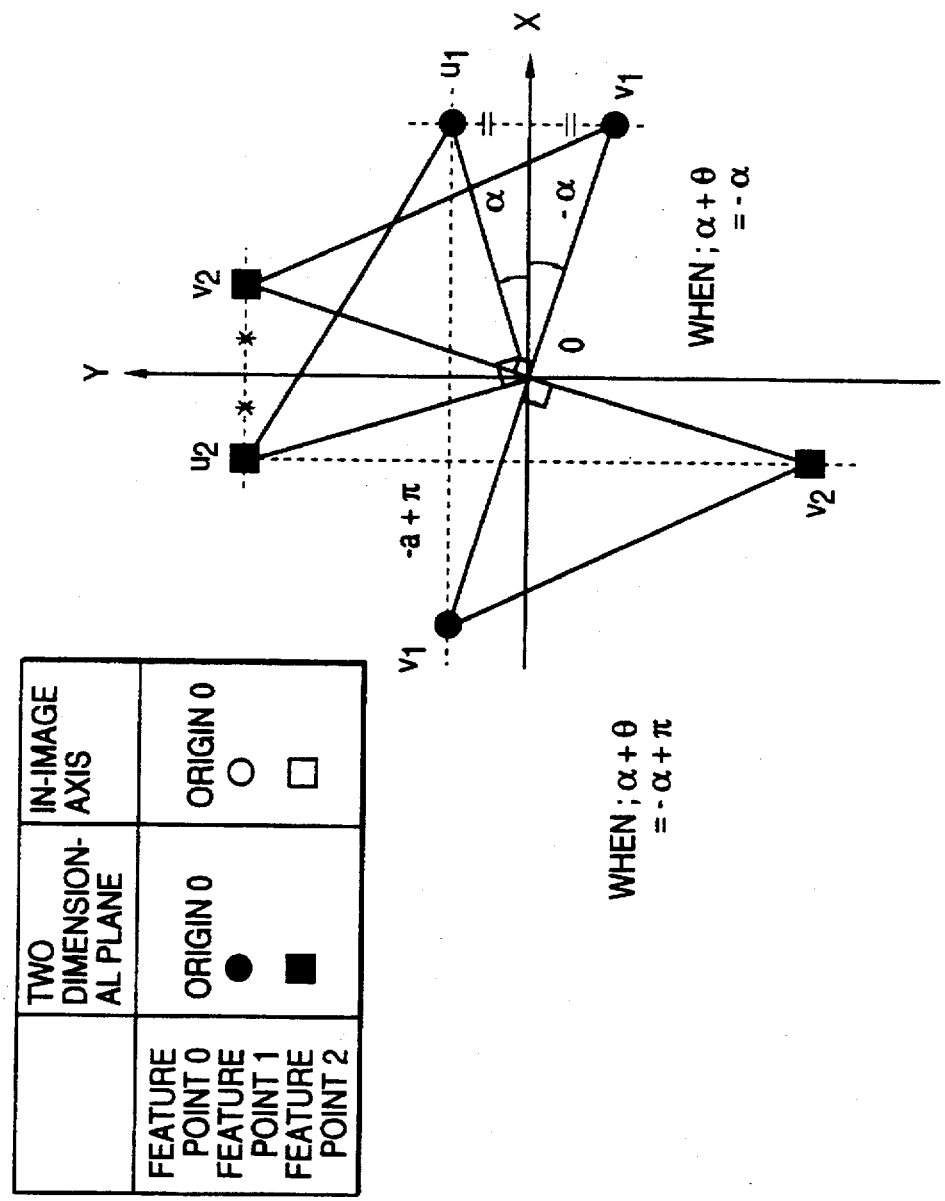
FIG. 28 illustrates the meaning of expression {7} for use in theorem 9.

FIG. 28 illustrates the meaning of expression $\{7\}$ for use in theorem 5.

A next theorem 5 gives reasoning of conditions $\{4\}$ and $\{5\}$ of theorem 4.

Theorem 5

Conditions $\{4\}$ and $\{5\}$ are equivalent to next conditions $\{6\}$ and $\{7\}$.

$$\theta \neq n\, \pi \quad \{6\}$$

and $$\alpha + \theta \neq n\, \pi - \alpha \quad \{7\}$$

(where n is an integer.)

Condition $\{7\}$ is equivalent to a next condition $\{8\}$.

$$u_{11}\, v_{21} + u_{21}\, v_{11} \neq 0 \quad \{8\}$$

Condition $\{6\}$ means that the object does not rotate by 0 (zero degrees) or $\pi$ (one hundred and eighty degrees).

To make the meaning of condition $\{7\}$ clearer, its negation $\alpha + \theta = n\, \pi - \alpha$ is considered. Since a shift of $\alpha + \theta$ by $2\pi$ (three hundred and sixty degrees) does not produce any difference, a first case of $\alpha + \theta = -\alpha$ and a second case of $\alpha + \theta = -\alpha + \pi$ need only be considered, as shown in FIG. 28.

In the first case of $\alpha + \theta = -\alpha$, feature point 1 moves symmetrically with respect to the X axis, and feature point 2 moves symmetrically with respect to the Y axis. The second case of $\alpha + \theta = -\alpha + \pi$ corresponds to a one hundred and eighty degree rotation of the first case of $\alpha + \theta = -\alpha$.

Condition $\{8\}$ is used for theorem 6.

Described below is the deduction of formulae for calculating $\theta$, $d_1$, $d_2$ and $\alpha$. The ranges of values $\alpha$ and $\sin\theta$ need to narrowed for a substantive numerical calculation.

FIG. 29 illustrates a method for determining a value range for angle $\alpha$.

FIG. 30 illustrates a method for determining a value range for angle $\beta$.

Lemma 2 is for narrowing the value of angle $\alpha$.
lemma 2

Assuming $u_i$ (where $i=1, 2$) are two-dimensional vectors from the origin and $u_2$ is a vector obtained by rotating $u_1$, the angle of rotation $\alpha$ from the X axis has a value within a value range for $\pi/2$ according to the signs of the X coordinate values $u_{1i}$ and $u_{2i}$ of $u_i$ (where $i=1, 2$) as shown in FIG. 29.

By replacing $u_1$ with $v_1$ and $\alpha$ with $\beta$, the value of $\beta = \alpha + \theta$ can be narrowed.

In lemma 3, the value of $\sin\theta$ is narrowed by using the results of lemma 2.

Lemma 3

From FIGS. 29 and 30, a pair of integers m and n ($=0, 1, 2, 3$) that satisfies two sets of inequalities, $(\pi/2)m \leq \beta < (\pi/2)(m+1)$ and $(\pi/2)n \leq \alpha < (\pi/2)(n+1)$ is selected.

FIG. 31 illustrates a method for determining the sign of $\sin\theta$, when m−n is odd.

FIG. 32 illustrates a method for determining the sign of $\sin\theta$, when m−n is even.

A comparison between the values of m and n and a comparison between the values of $u_{11}$ and $v_{11}$ allow the sign of $\sin\theta$ to be determined from cases (1) and (2) below.

(1) When m−n is odd, an integer p is defined as $p=(m-n-1)/2$
The sign of $\sin\theta$ is determined from FIG. 31.

(2) When m−n is even, the sign of $\sin\theta$ is determined from FIG. 32. When the equalities are outstanding in the above sets of inequalities for m and n, $\sin\theta = 0$.

After being prepared by lemmas 2 and 3, theorem 6 for calculating the set of solutions is shown.

Theorem 6

Under condition of theorems 4 and 5, the solution is obtained as follows, when $u_2$ is a vector obtained by rotating $u_1$ by $\pi/2$.

The following equations allow $\theta$, $d_1$, $d_2$ and $\alpha$ to be calculated.

$$\cos\theta = (u_{11}u_{21} + v_{11}v_{21})/(u_{11}v_{21} + u_{21}v_{11})$$

$$\sin\theta = \pm(1 - \cos^2\theta)^{1/2},$$

where the sign is determined by lemma 3.
(1) When $u_{11} \neq 0$ and $u_{21} \neq 0$ $\tan\alpha = (u_{11}\cos\theta - v_{11})/u_{11}\sin\theta$. Combining with the value range for $\alpha$ obtained from lemma 2, the value of $\alpha$ can be uniquely determined.

$$d_1 = u_{11}/\cos\alpha$$

$$d_2 = -u_{21}/\sin\alpha$$

(2) When $u_{11} = 0$

Expression 15

$$\alpha = \begin{cases} \pi/2 & \text{(when } u_{21} < 0\text{)} \\ -3\pi/2 & \text{(when } u_{21} > 0\text{)} \end{cases} \quad \text{(from lemma 2)}$$

$$d_1 = |v_{11}/\sin\theta|$$
$$d_2 = |u_{21}|$$

(3) When $u_{21}=0$

Expression 16

$$\alpha = \begin{cases} 0 & \text{(when } u_{11} > 0\text{)} \\ \pi & \text{(when } u_{11} < 0\text{)} \end{cases} \quad \text{(from lemma 2)}$$

$$d_1 = |u_{11}|$$
$$d_2 = |v_{21}/\sin\theta|$$

As described in lemma 1, the set of solutions, in which $u_2$ is a vector obtained by rotating $u_1$ by $-\pi/2$, is obtained by a mirror image transformation of the solution by theorem 6 with respect to the X axis. System 6.1 describes this more concretely.

System 6.1

The set of solutions, in which vector $u_2$ is obtained by rotating vector $u_1$ by $-\pi/2$, is obtained as described in (1) and (2).

(1) Assuming that the set of solutions, when vector $u_2$ in theorem 6 is obtained by rotating vector $u_1$ by $\pi/2$ is R, $u_i$ and $v_i$ (where i=1, 2), the set of solutions, when vector $u_2$ is obtained by rotating vector $u_1$ by $-\pi/2$ is represented by the next formulae.

Expression 17

$$\begin{bmatrix} 1 & 0 \\ 0 & -1 \end{bmatrix} R \begin{bmatrix} 1 & 0 \\ 0 & -1 \end{bmatrix}$$

which represents inverse rotation matrix of R.

$$\begin{bmatrix} 1 & 0 \\ 0 & -1 \end{bmatrix} u_i \begin{bmatrix} 1 & 0 \\ 0 & -1 \end{bmatrix}$$

which represents the mirror image transformations of $u_1$ and $v_1$.

(2) Assuming that the set of solutions, when vector $u_2$ in theorem 6 is obtained by rotating vector $u_1$ by $\pi/2$, is $\theta$, $d_1$, $d_2$ and $\alpha$, the set of solutions, when vector $u_2$ is obtained by rotating vector $u_1$ by $-\pi/2$, is $-\theta$, $d_1$, $d_2$ and $-\alpha$.

Proofs of lemmas 1, 2 and 3, theorems 4, 5 and 6, and system 6.1 are described below.

Proof of Lemma 1

Assuming that (1) is a set of solution when vector $u_2$ is obtained by rotating vector $u_1$ by $\pi/2$, (2) is a set of solution when vector $u_2$ is obtained by rotating vector $u_1$ by $\pi/2$, sets of solutions (1) and (2) are mirror image transformations of each other with respect to the X axis, as shown in FIG. 27.

Expression 18

$$u_1 = d_1 \begin{bmatrix} \cos\alpha \\ \sin\alpha \end{bmatrix} \quad (a)$$

$$u_2 = d_2 \begin{bmatrix} \cos(\alpha+\pi/2) \\ \sin(\alpha+\pi/2) \end{bmatrix} = d_2 \begin{bmatrix} -\sin\alpha \\ \cos\alpha \end{bmatrix}$$

Since vectors $v_1$ and $v_2$ are obtained by rotating vectors $u_1$ and $u_2$ by angle $\theta$,

Expression 19

$$v_1 = d_1 \begin{bmatrix} \cos(\alpha+\theta) \\ \sin(\alpha+\theta) \end{bmatrix} \quad (b)$$

$$v_2 = d_2 \begin{bmatrix} \cos(\alpha+\pi/2+\theta) \\ \sin(\alpha+\pi/2+\theta) \end{bmatrix} = d_2 \begin{bmatrix} \sin(\alpha+\theta) \\ \cos(\alpha+\theta) \end{bmatrix}$$

components of vectors $u_i$ and $v_i$ (where i=1, 2) are known.

$$d_1 \cos\alpha = u_{11} \quad (1)$$
$$-d_2 \sin\alpha = u_{21} \quad (2)$$
$$d_1 \cos(\alpha+\theta) = v_{11} \quad (3)$$
$$-d_2 \sin(\alpha+\theta) = v_{21} \quad (4)$$

The values of the right sides of formulae (1) through (4) are already known.

The following are proofs of lemmas 2 and 3, as well as theorems 4, 5 and 6, in a sequence of proposition 2, theorem 5, lemmas 2 and 3, and theorem 6.

Proposition 2

Expressions {6} and {7} in theorem 5 are conditions necessary for having a set of definite solutions.

Proof of Proposition 2

To reiterate the conditions, $$v_i = R\ u_i \text{ and } w_i = S\ u_i, \text{ where } i=1, 2.$$

(1) Proof that expression {6} is necessary

By assuming that {6} is not outstanding, it is shown that there is no definite solution.

By substituting $\theta = n\pi$ into formulae (3) and (4), $$\pm d_1 \cos\alpha = v_{11} \quad (3)'$$
$$\mp d_2 \sin\alpha = v_{21} \quad (4)'$$

where the signs are in the same order.

Since formulae (3)' and (4)' can be transformed into formulae (3)" and (4)" by formulae (1) and (2), formulae (1), (2), (3) and (4) are equivalent to formulae (1), (2), (3)" and (4)".

$$d_1 \cos\alpha = u_{11} \quad (1)$$
$$-d_2 \sin\alpha = u_{21} \quad (2)$$
$$v_{11} = \pm u_{11} \quad (3)''$$
$$v_{21} = \pm u_{21} \quad (4)''$$

where the signs are in the same order.

That is, the conditions are only formulae (1) and (2), whereas the unknowns are $d_1$, $d_2$ and $\alpha$. Therefore, the solutions are indefinite.

(2) Proof that condition {7} is necessary

By assuming that {7} is not outstanding, it is shown that there is no definite solution.

By substituting (where n is an integer) into the left side of formulae (3) and (4), $$d_1 \cos(\alpha+\theta) = \pm d_1 \cos\alpha$$

$-d_2 \sin(\alpha+\theta) = \pm d_2 \sin\alpha$ $\pm d_1 \cos\alpha = v_{11}$ \hfill (3)'

$\pm d_2 \sin\alpha = v_{21}$ \hfill (4)'

Therefore, formulae (1), (2), (3) and (4) are equivalent to formulae (1), (2), (3)" and (4)".

$d_1 \cos\alpha = u_{11}$ \hfill (1)

$-d_2 \sin\alpha = u_{21}$ \hfill (2)

$v_{11} = \pm u_{11}$ \hfill (3)"

$v_{21} = \mp u_{21}$ \hfill (4)"

That is, the only remaining conditions are formulae (1) and (2), where the unknowns are $d_1$, $d_2$ and $\alpha$. Therefore, the solutions are indefinite.

End of Proof

Proof of theorem 5

It is illustrated first that {4} or {5} is equivalent to {6} or {7}.

The contraproposition of this proposition is proved, which is as follows.

$v_{11} = \pm u_{11}$, $v_{21} = \pm u_{21}$ (in the same order) $\leftrightarrow \theta = n\pi$ or $\alpha + \theta = n\pi - \alpha$ Therefore,
Expression 20

$$\begin{cases} v_{11} = \pm u_{11}, v_{21} = \pm u_{21} \leftrightarrow \theta = n\pi \\ \text{(in the same order)} \\ v_{11} = \pm u_{11}, v_{21} = \pm u_{21} \leftrightarrow \alpha + \theta = n\pi - \alpha \\ \text{(in the same order)} \end{cases}$$

(1) and (2) below will illustrate the above.

(3) will illustrate that {7} and {8} are equivalent.

(1) A proof that $v_{11} = \pm u_{11}$, $v_{21} = \pm u_{21}$ (in the same order) $\leftrightarrow \theta = n\pi$.

($\leftarrow$) (3)" and (4)" can be deducted from proof (1) for proposition 2.

($\rightarrow$) The formula numbers in proof (1) of proposition 2 are used.

(3)" and (4)" can be transformed into (3)' and (4)' by using (1) and (2). Combining them with (3) and (4), Expression 21

$d_1 \cos(\alpha+\theta) = \pm d_1 \cos\alpha$ $-d_2 \sin(\alpha+\theta) = \mp d_2 \sin\alpha$ That is, $$\begin{cases} \cos(\alpha+\theta) = \pm\cos\alpha \\ \sin(\alpha+\theta) = \pm\sin\alpha \end{cases}$$

By using these formulae, $\sin\theta$ is calculated as follows.

$\sin\theta = \sin\{(\alpha+\theta) - \alpha\}$
$= \sin(\alpha+\theta)\cos\alpha - \cos(\alpha+\theta)\sin\alpha$
$= \pm\{\sin\alpha\cos\alpha - \cos\alpha\sin\alpha\}$
$= 0$ Therefore, $\theta = n\pi$ (2) A proof that $v_{11} = \pm u_{11}, v_{21} = \pm u_{21} \leftrightarrow \alpha + \theta = n\pi - \alpha$ (the same order)

($\leftarrow$) This has already been proved in proof (2) of proposition 2.

($\rightarrow$) The formula numbers in proof (1) of proposition 2 are used.

(3)" and (4)" can be transformed into (3)' and (4)'. Combining them with (3) and (4), Expression 22

$d_1 \cos(\alpha+\theta) = \pm d_1 \cos\alpha$ $-d_2 \sin(\alpha+\theta) = \pm d_2 \sin\alpha$ That is, $$\begin{cases} \cos(\alpha+\theta) = \pm\cos\alpha \\ \sin(\alpha+\theta) = \pm\sin\alpha \end{cases}$$

$\sin(2\alpha+\theta) = \sin\{(\alpha+\theta)+\alpha\}$
$= \sin(\alpha+\theta)\cos\alpha + \cos(\alpha+\theta)\sin\alpha$
$= 0$ $\alpha + \theta = n\pi - \alpha$ (where n is an integer.)

(3) A proof that {7} and {8} are equivalent.
Substituting (1) through (4) into $u_{11}v_{21} + u_{21}v_{11}$
$= -d_1 d_2 \{\cos\alpha\sin(\alpha+\theta) + \sin\alpha\cos(\alpha+\theta)\}$
$= -d_1 d_2 \sin(2\alpha+\theta)$ $\alpha+\theta = n\pi-\alpha$ (where n is an integer.)

$\leftrightarrow 2\alpha+\theta = n\pi$ (where n is an integer.)

$\leftrightarrow \sin(2\alpha+\theta) = 0$ $\leftrightarrow u_{11}v_{21} + u_{21}v_{11} = 0$ $\alpha+\theta = n\pi-\alpha$ (where n is an integer) \hfill {7}

$\Longleftrightarrow u_{11}v_{21} + u_{21}v_{11} \neq 0$ \hfill {8}

End of Proof

Proof of lemma 2

FIG. 29 summarizes the result of examining signs of $u_{11}$ and $u_{21}$, when the value of $\alpha$ is $\alpha=0$, $0<\alpha<\pi/2$, $\alpha=\pi/2$, $\pi/2<\alpha<\pi$, $\alpha=\pi$, $\pi<\alpha<3\pi/2$, $\alpha=3\pi/2$, $3\pi/2<\alpha<2\pi$.

End of Proof

Proof of lemma 3

$(\pi/2)m \leq \beta < (\pi/2)(m+1)$ and $(\pi/2)n \leq \alpha < (\pi/2)(n+1)$ where m and n are integers satisfying $0 \leq m \leq 3$ and $0 \leq n \leq 3$.
Because $\theta = \beta - \alpha$, $$(\pi/2)(m-n) - \pi/2 \leq \theta < (\pi/2)(m-n) + \pi/2 \qquad (*)$$

(1) If m−n is odd, it can be transformed into m−n=2p+1, where p is an integer.
That is, p=(m−n−1)/2.
Substituting this into (*), $p\pi < \theta < (p+1)\pi$.
Therefore, FIG. 31 is obtained.

(2) If m−n is even, because $0 \leq m \leq 3$ and $0 \leq n \leq 3$, $-3 \leq m-n \leq 3$. Since, m−n is even, there are only three cases, which are m−n=0, 2 and −2.

FIG. 33 shows a relation among m, n and the sign of $\sin\theta$, when m−n is even.

More specifically, FIG. 33 shows the conditions for determining the sign of $\sin\theta$, by listing the possible combinations of m and n for these three cases.

When $u_{11}$ and $v_{11}$ have an equality in the conditions shown in FIG. 33, the value of $\sin\theta$ is zero.

As described earlier, FIG. 32 shows a method for determining the sign of $\sin\theta$, when m−n is odd. FIG. 32 is obtained as a summary of FIG. 33.

Figure 34:
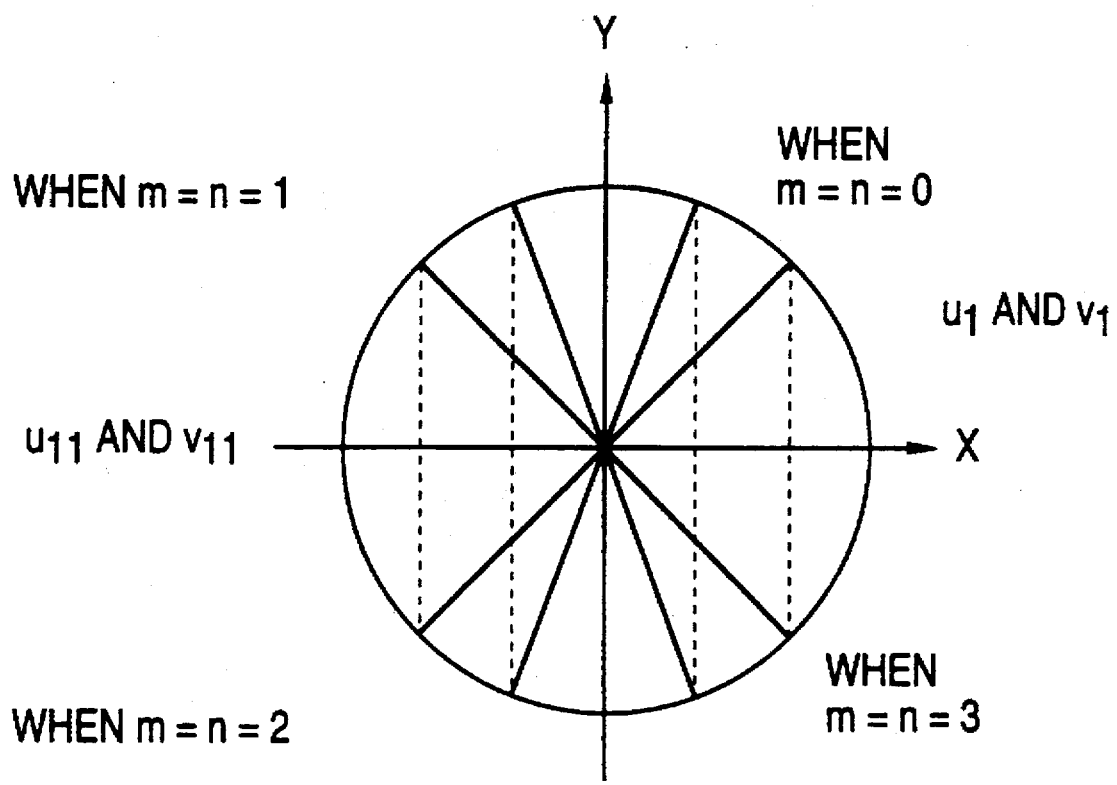
FIG. 34 illustrates a method for determining the sign of sinθ, when m−n=0.

FIG. 34 illustrates a method for determining the sign of $\sin\theta$, when m−n=0.

The following is a description of the process for obtaining FIG. 33. Basically, depending on the values of m and n, the ranges of positions of $u_1$ and $v_1$ are drawn, thereby obtaining the inequalities between $u_{11}$ and $v_{11}$ capable of narrowing the value range for angle $\theta$.

(a) When m−n=0, from (*), $-\pi/2 < \theta < \pi/2$. There are four cases shown in FIG. 34.

By comparing the value of $u_{11}$ with the value of $v_{11}$, the value of $\theta$ can be narrowed.

Figure 35B:
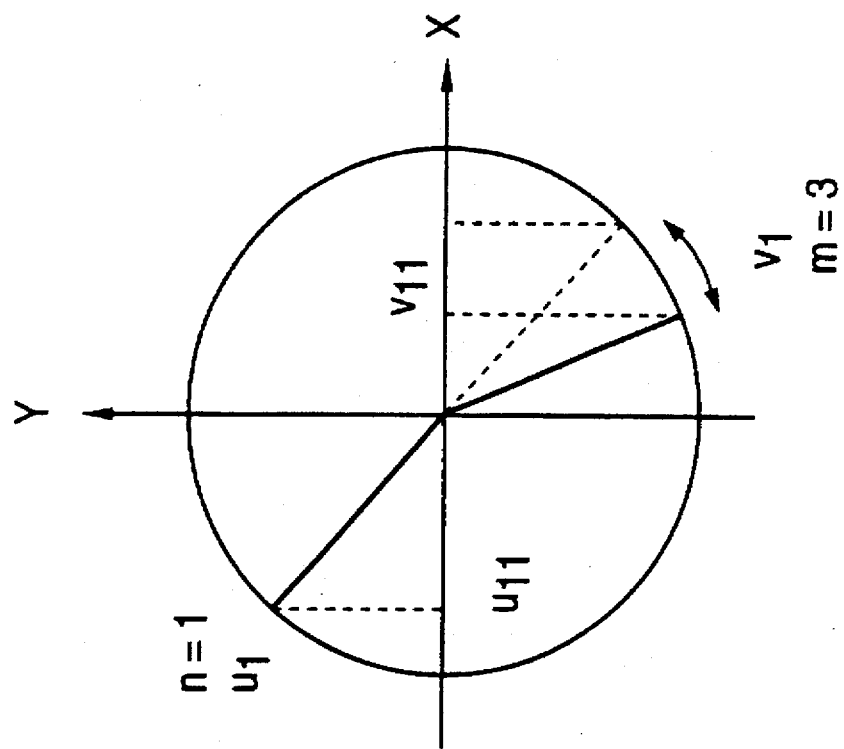
FIGS. 35a and 35b illustrates a method for determining the sign of sinθ, when m−n=2.
Figure 35A:
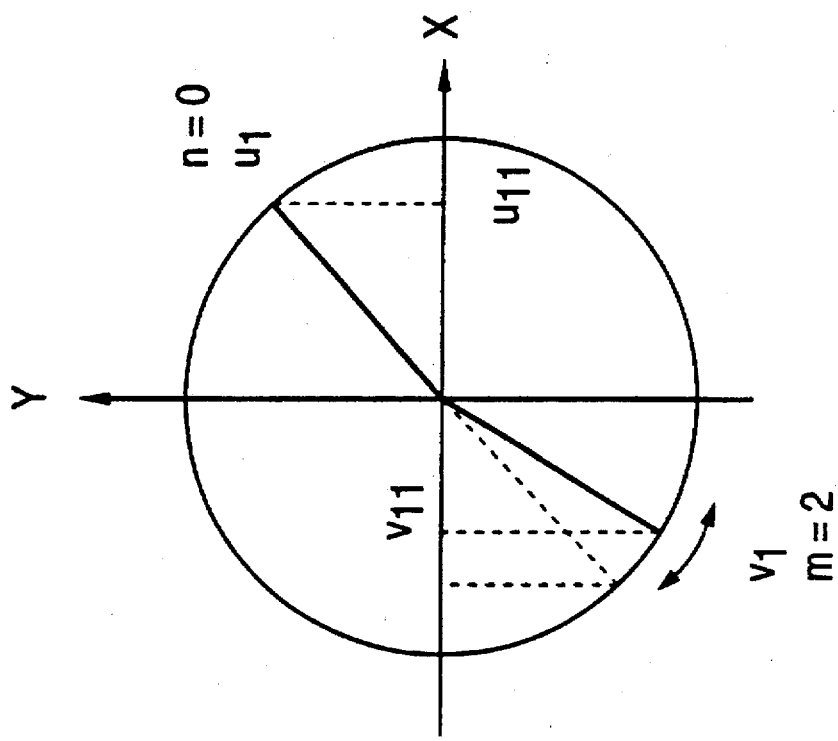

FIG. 35 illustrates a method for determining the sign of $\sin\theta$, when m−n=2.

(b) When m−n=2, from (*), $\pi/2 < \theta < 3\pi/2$. There are two cases shown in FIG. 35.

By comparing the values of $|u_{11}|$ with the value of $|v_{11}|$, the value of $\theta$ can be narrowed.

Figure 36B:
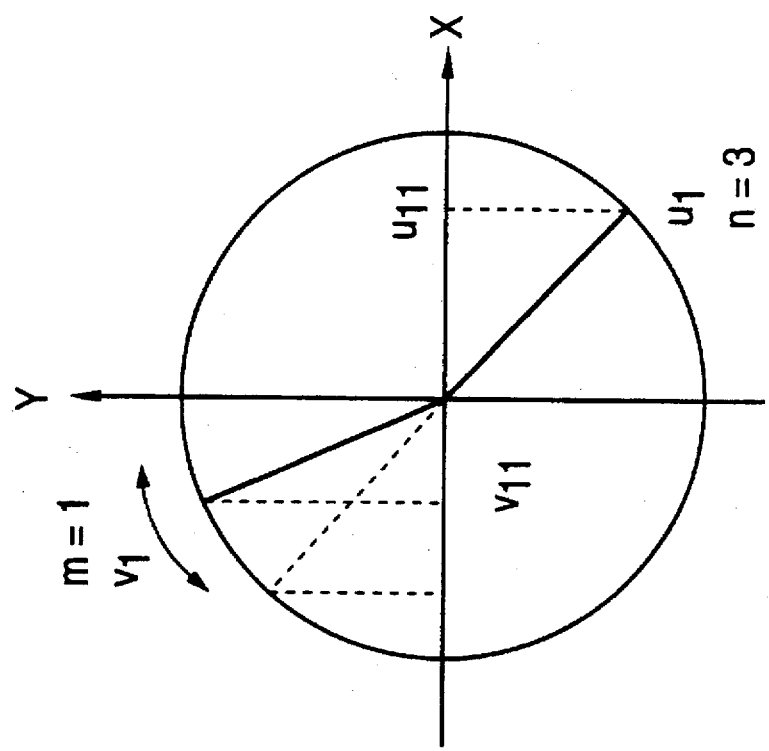
FIG. 36 illustrates a method for determining the sign of sinθ, when m−n=−2.
Figure 36A:
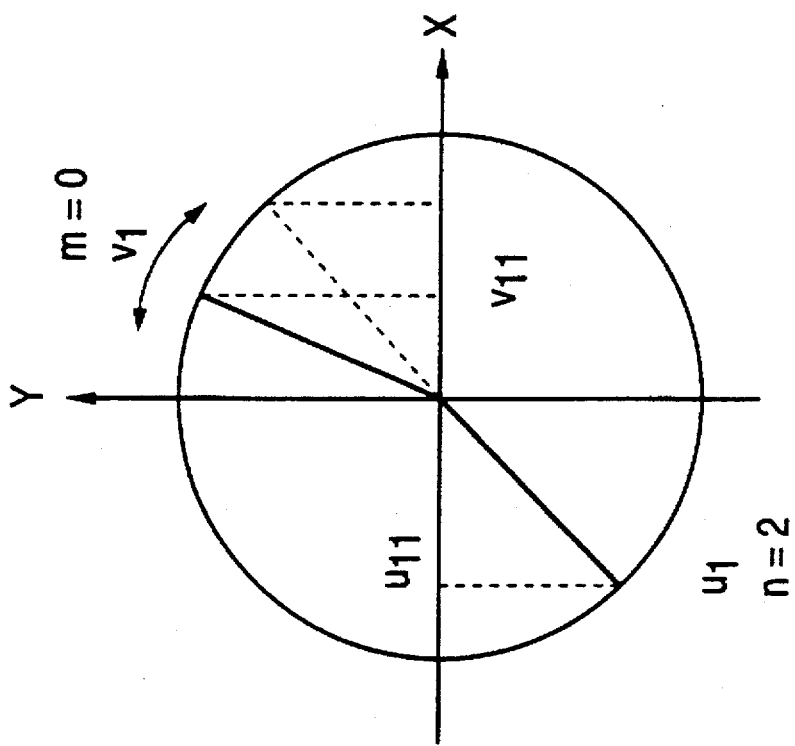

FIG. 36 illustrates a method for determining the sign of $\sin\theta$, when m−n=−2.

(c) When m−n=−2, from (*), $-3\pi/2 < \theta < -\pi/2$. There are two cases shown in FIG. 36.

By comparing the value of $|u_{11}|$ with the value of $|v_{11}|$, the value of $\theta$ can be narrowed.
End of Proof
Proof of theorem 6

By a cross multiplication between (1) and (3), $$u_{11} \cos(\alpha+\theta) = v_{21} \cos\alpha \qquad (5)$$

By a cross multiplication between (2) and (4), $$u_{21} \sin(\alpha+\theta) = v_{21} \sin\alpha \qquad (6)$$

(1) When $u_{11} \neq 0$ and $u_{21} \neq 0$
Since $\alpha$ is not integer times of $\pi/2$ from FIG. 29, $\cos\alpha \neq 0$, $\sin\alpha \neq 0$ By expanding (5) and dividing both sides by $\cos\alpha$, $$u_{21}(\cos\theta - \tan\alpha \sin\theta) = v_{11} - u_{11} \tan\alpha \sin\theta = v_{11} - u_{11} \cos\theta \qquad (5)'$$

By expanding (6) and dividing both sides by $\sin\alpha$, $$u_{21}(\cos\theta + \cot\alpha \cdot \sin\theta) = v_{21} u_{21} \cot\alpha \cdot \sin\theta = v_{21} - u_{21} \cos\theta \qquad (6)'$$

By multiplying both sides of (5)' by corresponding sides of (6)', $$-u_{11} u_{21} \sin^2\theta = (v_{11} - u_{11} \cos\theta)(v_{21} - u_{21} \cos\theta)(u_{11} v_{21} + u_{21} v_{11}) \cos\theta = u_{11} u_{21} + v_{11} v_{21} \qquad (7)$$

Because $$u_{11} v_{21} + u_{21} v_{11} \neq 0 \qquad (5)$$

$$\cos\theta = (u_{11} u_{21} + v_{11} v_{21})/(u_{11} v_{21} + u_{21} v_{11}) \qquad (8)$$

$$\sin\theta = \pm(1 - \cos^2\theta)^{1/2} \qquad (9)$$

The sign of (9) can be obtained from lemma 2.
Since $\sin\theta \neq 0$ from (5)' and {6}, $$\tan\alpha(u_{11} \cos\theta - v_{11})/u_{11} \sin\theta$$

By combining the value range for $\alpha$ obtained from lemma 3, only one value of $\alpha$ can be determined.

From (1), $d_1 = u_{11}/\cos\alpha \qquad (10)$

From (2), $d_2 = -u_{21}/\sin\alpha \qquad (11)$ (2) When $u_{11}=0$
Expression 23
From lemma 2, $$\alpha = \pi/2 \text{ (when } u_{21} < 0\text{)}$$
$$3\pi/2 \text{ (when } u_{21} > 0\text{)}$$

Substituting $\cos\alpha=0$, $\sin\alpha=\pm 1$ into (1) through (4).

$$0 = u_{11} \qquad (1)'$$

$$\mp d_2 = u_{21} \qquad (2)'$$

$$\mp d_1 \sin\theta = v_{11} \qquad (3)'$$

$$\mp d_2 \cos\theta = v_{21} \qquad (4)'$$

That is, the left side of (7)=$d_1 d_2 \sin\theta \cos\theta$=the right side of (7).

Therefore, (7) is outstanding in this case, too. As well, (8) and (9) are outstanding.
Since $\sin\theta \neq 0$ in (3)' (from {6})

$$d_1 = |v_{11}/\sin\theta| \qquad (11)'$$

from (2)'

$$d_2 = |u_{21}| \qquad (11)'$$

(3) When $u_{21}=0$
Expression 24
From lemma 2, $$\alpha = 0 \text{ (when } u_{11} > 0\text{)}$$
$$= \pi \text{ (when } u_{11} < 0\text{)}$$

Substituting $\cos\alpha=\pm 1$ and $\sin\alpha=0$ into (1) through (4), $$\pm d_1 = u_{11} \qquad (1)''$$

$$0 = u_{21} \qquad (2)''$$

$$\pm d_1 \cos\theta = v_{11} \quad (3)''$$

$$\mp d_2 \sin\theta = v_{21} \quad (4)''$$

That is, the left side of $(7)'' = -d_1 d_2 \sin\theta \cos\theta =$ the right side of $(7)''$.

Therefore, $(7)''$ is outstanding in this case, too. As well, $(8)''$ and $(9)''$ are outstanding.

From $(1)''$, $$d_1 = |u_{11}| \quad (10)''$$

In $(4)''$, since $\sin\theta \neq 0$ (from $\{6\}''$)

$$d_2 = |v_{21}|/|\sin\theta| \quad (11)''$$

End of Proof

So far, the new theory for use in the second form of this invention has been described in detail. By having the shape/movement recognition unit 18 shown in FIG. 4 apply the new theory to a recognition of an object moving on a single plane coupled with a rotation, based on the result of extracting three feature points forming a right angle each in images captured at two points in time for observation, it becomes possible to calculate the actual positions and movements of these feature points within a three-dimensional space and to recognize the movement of a moving body.

The concept of a moving body recognition apparatus in the second form of this invention is similar to that in the first form of this invention. Also, an embodiment of the second form of this invention and the detailed configuration of the shape/movement recognition unit 27 are similar to those of the first form of this invention, which are shown in FIGS. 9 through 13. Accordingly, their descriptions are omitted.

Figure 37:
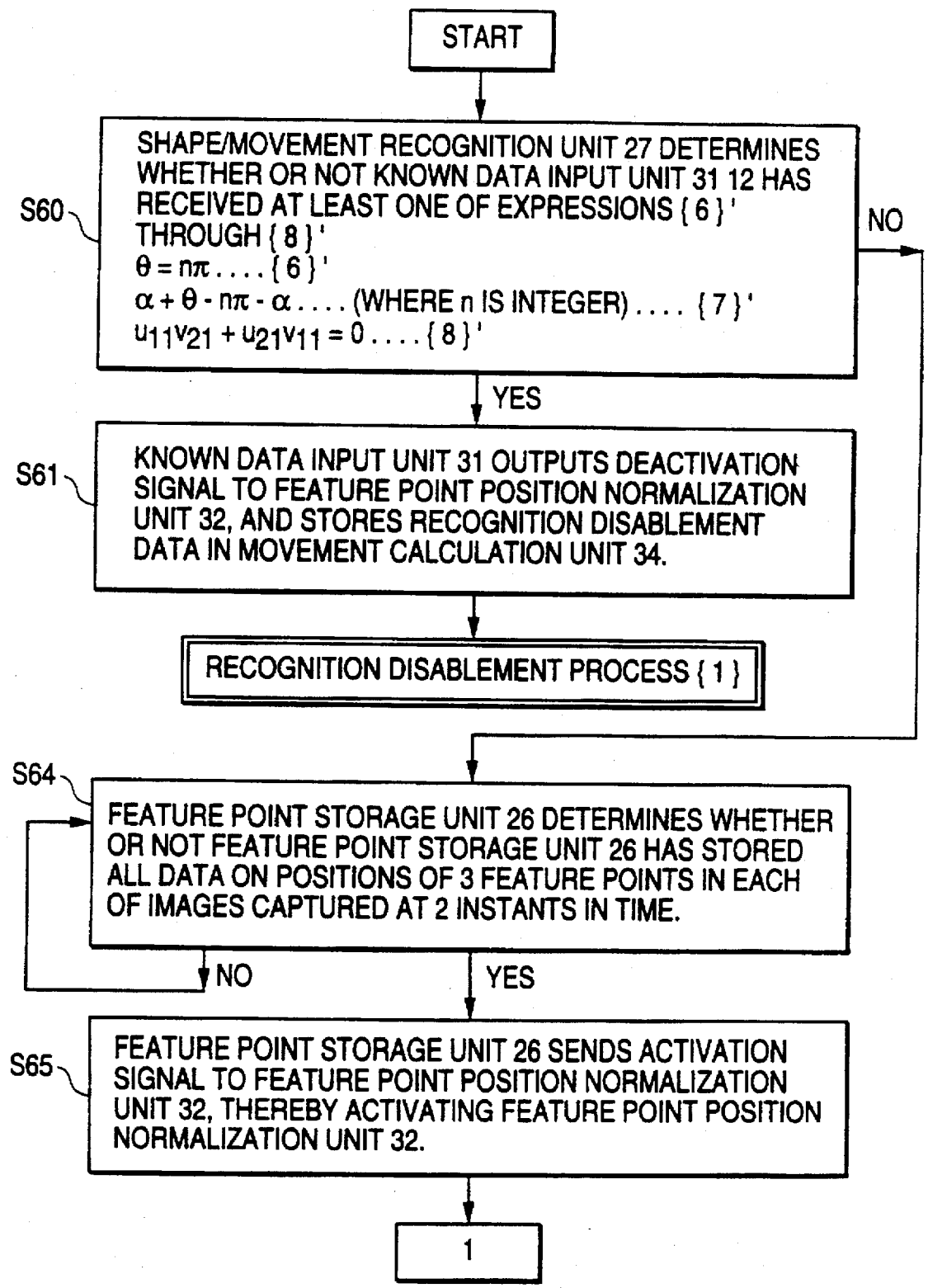
FIG. 37 is a first one of flowcharts showing in a three part series the whole processes of the shape/movement recognition unit 27 pursuant to the second form of this invention.
Figure 38:
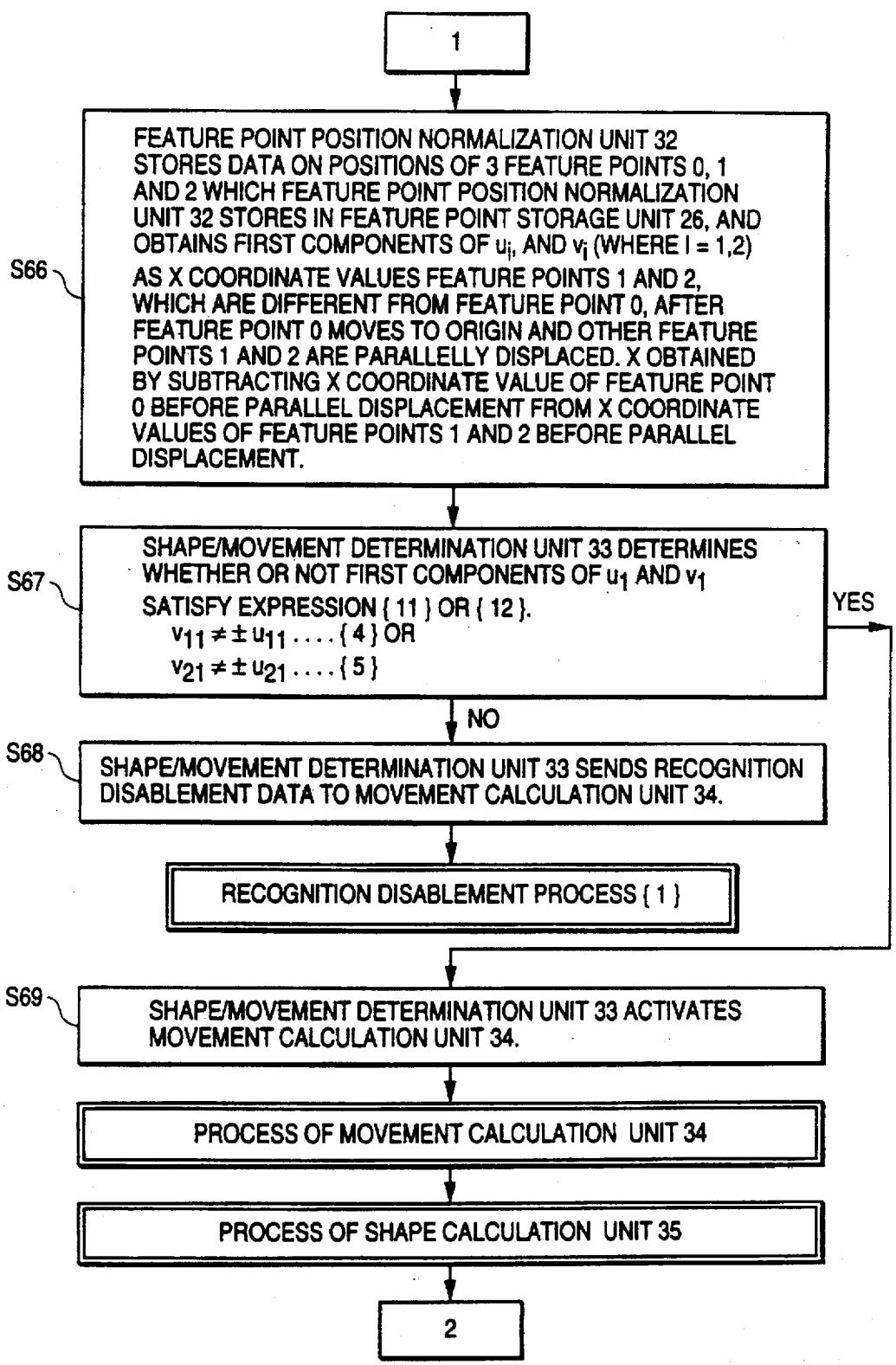
FIG. 38 is a second one of flowcharts showing in a three part series the whole processes of the shape/movement recognition unit 27 pursuant to the second form of this invention.
Figure 39:
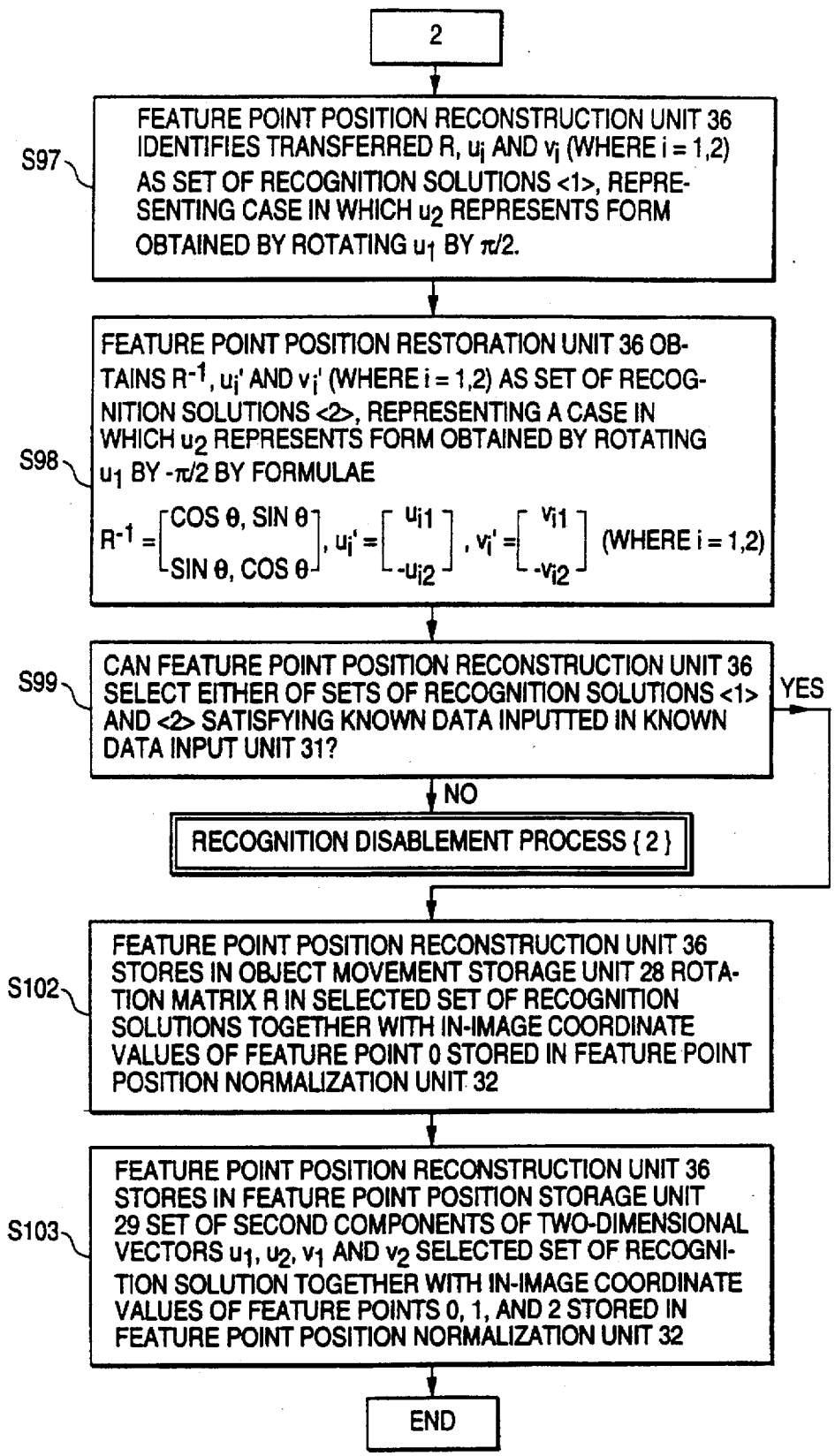
FIG. 39 is a third one of flowcharts showing in a three part series the whole processes of the shape/movement recognition unit 27 pursuant to the second form of this invention.

FIGS. 37, 38 and 39 are flowcharts showing in a three part series the whole processes of the shape/movement recognition unit 27 pursuant to the second form of this invention.

In FIG. 37, when the processes start, the shape/movement recognition unit 27 determines in step S60 whether or not the known data input unit 31 shown in FIG. 12 has received at least one of expressions $\{6\}'$, $\{7\}'$ and $\{8\}'$. As with the first form of this invention, a signal from a sensor allows the determination to be made. The relations between expressions $\{6\}'$ through $\{8\}'$ and $\{6\}$ through $\{8\}$ are the same as those described earlier.

Figure 40:
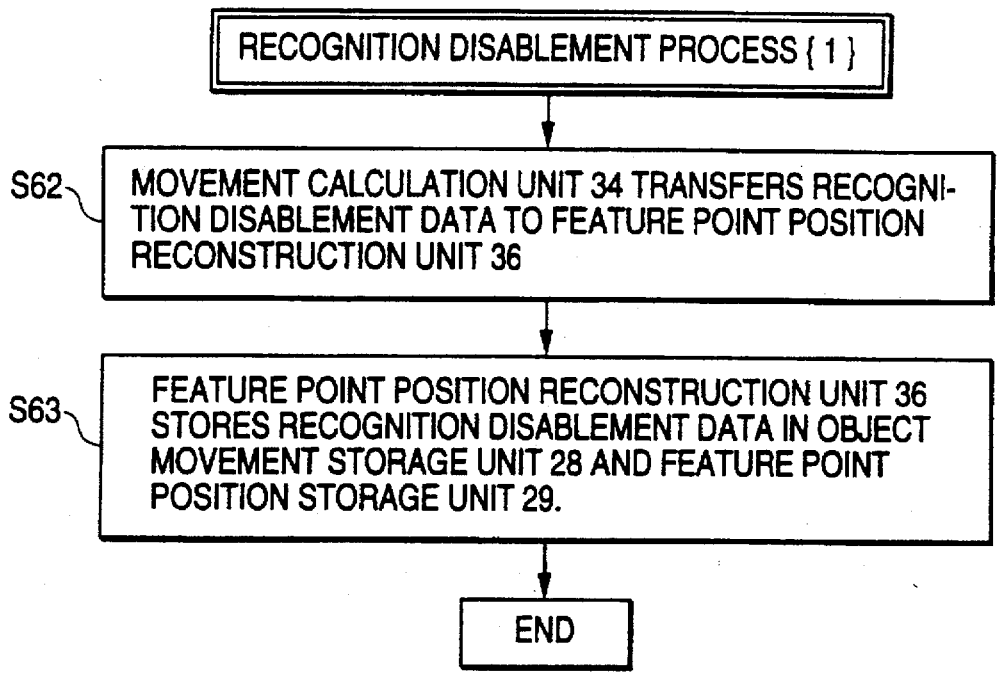
FIG. 40 is a flowchart of an embodiment of recognition disablement process {1} pursuant to the second form of this invention.

If the shape/movement recognition unit 27 determines in step S60 that the known data input unit 31 has received at least one of expressions $\{6\}'$, $\{7\}'$ and $\{8\}'$, the known data input unit 31 outputs in step S61 a deactivation signal to the feature point position normalization unit 32, and stores recognition disablement data in the movement calculation unit 34, thereby invoking a recognition disablement process $\{1\}$ shown in FIG. 40. The flow of recognition disablement process $\{1\}$ pursuant to the second form of this invention shown in FIG. 40 is essentially the same as that shown in FIG. 17 pursuant to the first form of this invention.

FIG. 40 is a flowchart of an embodiment of recognition disablement process $\{1\}$ pursuant to the second form of this invention.

On start of recognition disablement process $\{1\}$, the movement calculation unit 34 sends recognition disablement data to the feature point position reconstruction unit 36 in step S62. Then, the feature point position reconstruction unit 36 stores the recognition disablement data in the object movement storage unit 28 and the feature point storage unit 29 in step S63, thereby ending the process.

Returning to FIG. 37, if the shape/movement recognition unit 27 determines in step S60 that the known data input unit 31 has received none of $\{6\}'$, $\{7\}'$ and $\{8\}'$, the shape/movement recognition unit 27 determines in step S64 whether or not the feature point storage unit 26 has stored all data on the positions of three feature points in each of the images captured at two instants in time for observation. The shape/movement recognition unit 27 repeats step S64 until it determines that the feature point storage unit 26 has stored the positions of three feature points each in images captured at two instants in time for observation. When the shape/movement recognition unit 27 determines in step S64 that the feature point storage unit 26 has stored all data, the shape/movement recognition unit 27 sends an activation signal to the feature point position normalization unit 32 in step S65, thereby activating the feature point position normalization unit 32.

Continuing on to FIG. 38, the feature point position normalization unit 32 stores in step S66 data on the positions of three feature points 0, 1 and 2, which the feature point position normalization unit 32 stores in the feature point storage unit 26, and obtains first components of two-dimensional vectors $u_i$ and $v_i$ (where $i=1, 2$) as X coordinate values of feature points 1 and 2, which are different from feature point 0, after feature point 0 moves to the origin and the other feature points 1 and 2 are parallelly displaced. Therefore, the X coordinate values of feature points 1 and 2 after the displacement in parallel with feature point 0 are obtained by subtracting the X coordinate value of feature point 0 before the parallel displacement from the X coordinate values of feature points 1 and 2 before the parallel displacement.

Then, the shape/movement recognition unit 27 has the shape/movement determination unit 33 determine in step S67 whether or not these first components satisfy either expression $\{4\}$ or expression $\{5\}$. If they satisfy neither expression $\{4\}$ nor expression $\{5\}$, the shape/movement determination unit 33 sends recognition disablement data to the movement calculation unit 34 in step S68, thereby invoking recognition disablement process $\{1\}$ shown in FIG. 40.

As explained in the description of theorem 5, expressions $\{4\}$ and $\{5\}$ are equivalent to expressions $\{6\}$ and $\{7\}$. Therefore, it can be said that the check in step S67 and the check in step S60 form a duplication. However, since the check in step S60 can be performed by a sensor, such a duplication is instituted. Also, no further calculation is performed, when the shape/movement determination unit 33 determines in step S67 a recognition disablement (leading to recognition disablement process $\{1\}$) by using only the positions of the three feature points each in images captured at two instants in time for observation.

If the shape/movement determination unit 33 determines in step S67 that either expression $\{4\}$ or expression $\{5\}$ is outstanding, the shape/movement determination unit 33 activates the movement calculation unit 34 in step S69, thereby invoking respective processes of the movement calculation unit 34 and the shape calculation unit 35, in accordance with lemma 3 and theorem 6.

FIG. 41 is a flowchart of the movement calculation unit 34 pursuant to the third form of this invention.

On start of its process, the movement calculation unit 34 calculates an integer n for determining the value range for $\alpha$ by using FIG. 29 in step S70, and an integer m for determining the value range for $\beta$ by using FIG. 30 in step S71. Then, the movement calculation unit 34 executes a process for determining the sign of $\sin\theta$ in step S102 or S105 shown in FIG. 42 before step S76.

Figure 42:
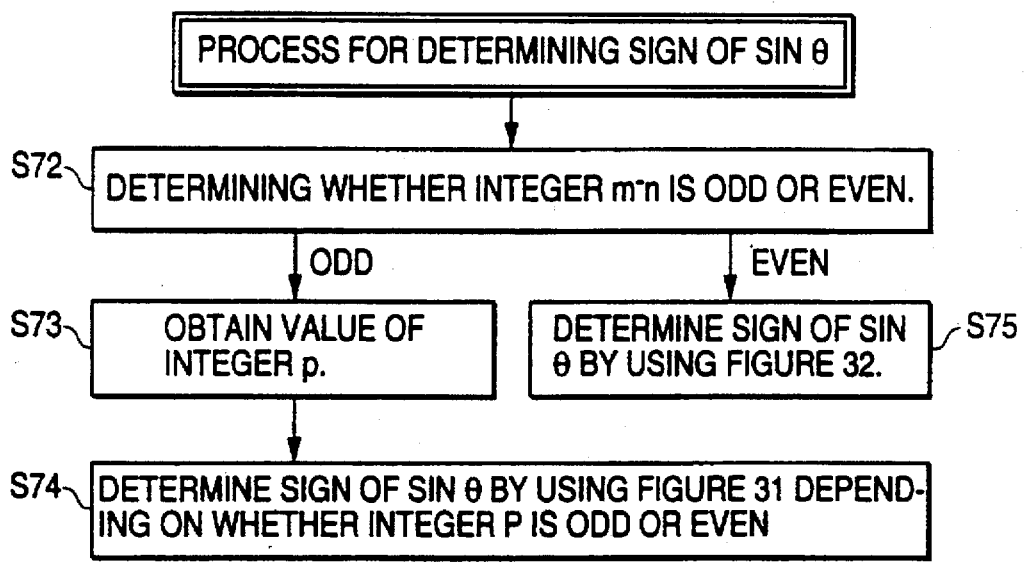
FIG. 42 is a flowchart of an embodiment of determining the sign of sinθ.

FIG. 42 is a flowchart of an embodiment of determining the sign of $\sin\theta$.

After completing step S71 shown in FIG. 41, the movement calculation unit 34 determines in step S72 whether an integer m−n is odd or even. When the movement calculation unit 34 determines in step S72 that integer m−n is odd, the movement calculation unit 34 obtains the value of an integer p in step S73, and determines in step S74 the sign of sinθ by using FIG. 40 depending on whether integer p is odd or even. When the movement calculation unit 34 determines in step S72 that integer m−n is even, the movement calculation unit 34 determines in step S75 the sign of sinθ by using FIG. 32.

Returning to FIG. 41, the movement calculation unit 34 obtains all elements of rotation matrix R in step S76, and determines in step S77 whether or not rotation matrix R or its inverse rotation matrix $R^{-1}$ satisfies the known data of an object inputted to the known data input unit 31. When the movement calculation unit 34 determines negatively (NO) in step S77, recognition disablement process (1) shown in FIG. 40 is invoked. When the movement calculation unit 34 determines affirmatively (YES) in step S77, the movement calculation unit 34 sends data on angle α and rotation matrix R to the shape calculation unit 35 and the feature point position reconstruction unit 36 in step S78.

As with the second form of this invention, the selection of either one of two sets of solutions, e.g. a selection between a rotation matrix R and its inverse rotation matrix $R^{-1}$ in the second form of this invention, is pari passu the description of FIG. 19 pursuant to the first form of this invention.

Figure 43:
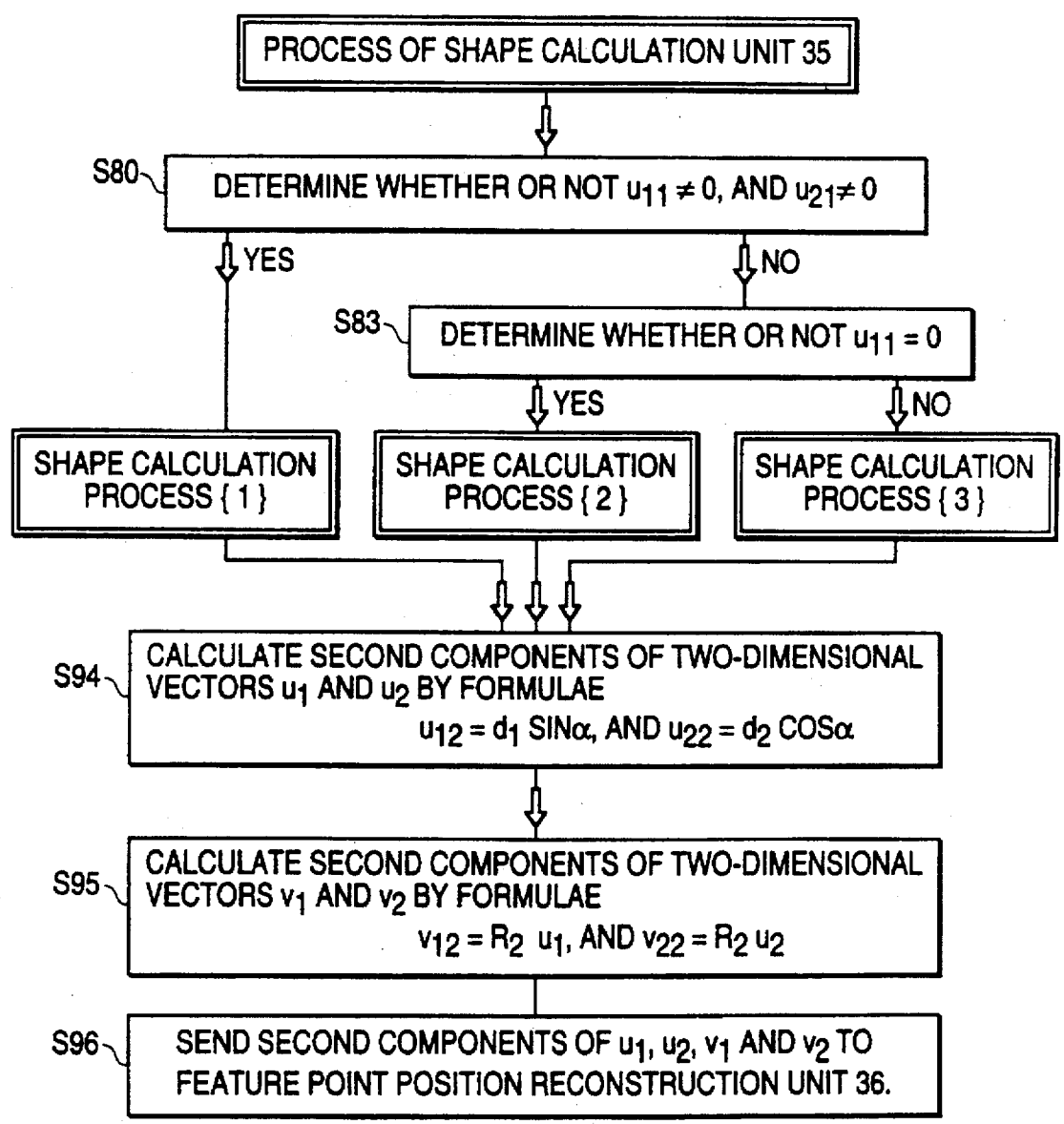
FIG. 43 is a flowchart of the shape calculation unit 35 pursuant to the second form of this invention.

FIG. 43 is a flowchart of the shape calculation unit 35 pursuant to the second form of this invention.

On start of its process, the shape calculation unit 35 determines in step S80 whether or not both $u_{11}$ and $u_{21}$ have non-zero values. If the shape calculation unit 35 determines affirmatively (YES) in step S80, the shape calculation unit 35 invokes shape calculation process {1} shown in FIG. 44 before continuing on to step S94.

Figure 44:
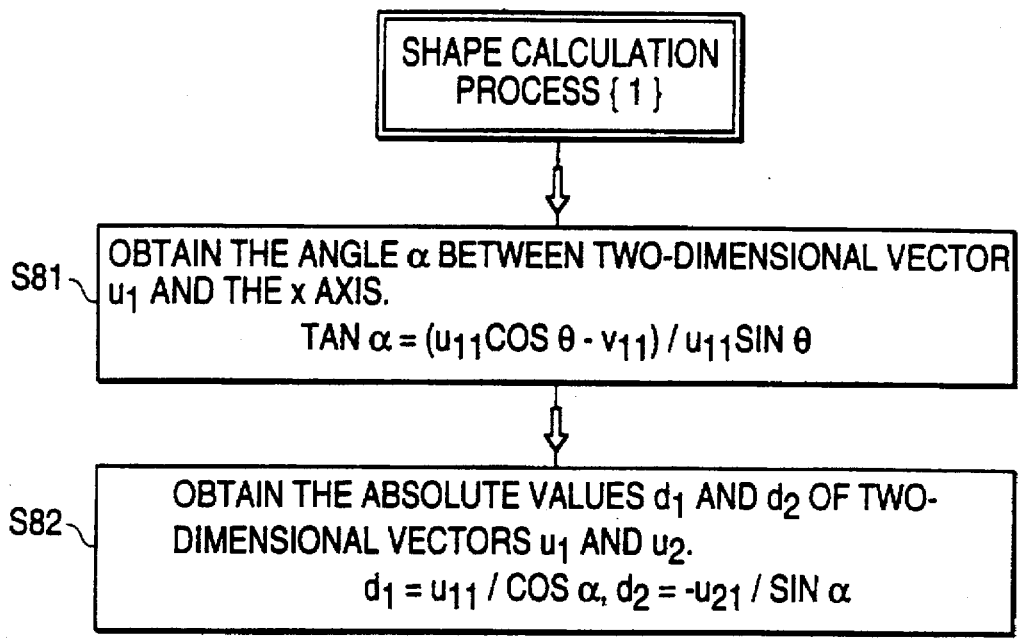
FIG. 44 is a flowchart of an embodiment of shape calculation process {1}.

FIG. 44 is a flowchart of an embodiment of shape calculation process {1}.

The shape calculation unit 35 obtains the angle between two-dimensional vector $u_1$ and the X axis, in step S81, and then the absolute values $d_1$ and $d_2$ of two-dimensional vectors $u_1$ and $u_2$, in step S82.

Returning to FIG. 43, if the shape calculation unit 35 determines negatively (NO) in step S80, the shape calculation unit 35 determines in step S83 whether or not $u_{11}$=0. If the shape calculation unit 35 determines affirmatively (YES) in step S83, the shape calculation unit 35 invokes shape calculation process {2} shown in FIG. 54 before continuing on to step S94.

Figure 45:
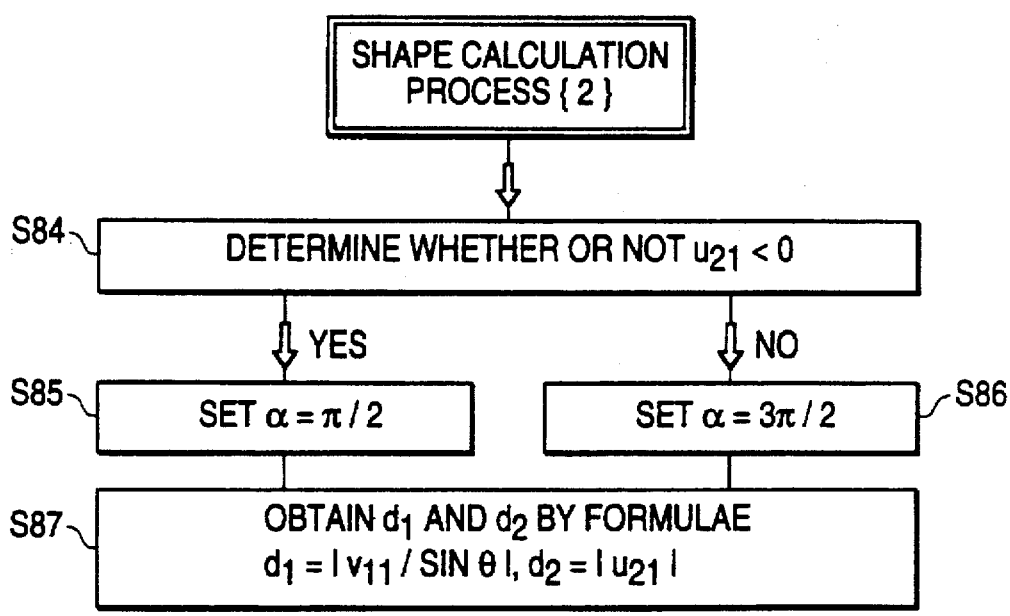
FIG. 45 is a flowchart of an embodiment of shape calculation process {2}.

FIG. 45 is a flowchart of an embodiment of shape calculation process {2}.

The shape calculation unit 35 determines in step S84 whether or not $u_{21}$ is smaller than zero. If it determines affirmatively (YES) in step S114, the shape calculation unit 35 sets the value of angle α equal to π/2 in step S85. If it determines negatively (NO) in step S84, the shape calculation unit 35 sets the value of angle α equal to 3 π/2 in step S86. On completing either step S85 or step S86, the shape calculation unit 35 obtains the absolute values $d_1$ and $d_2$ in step S87.

Figure 46:
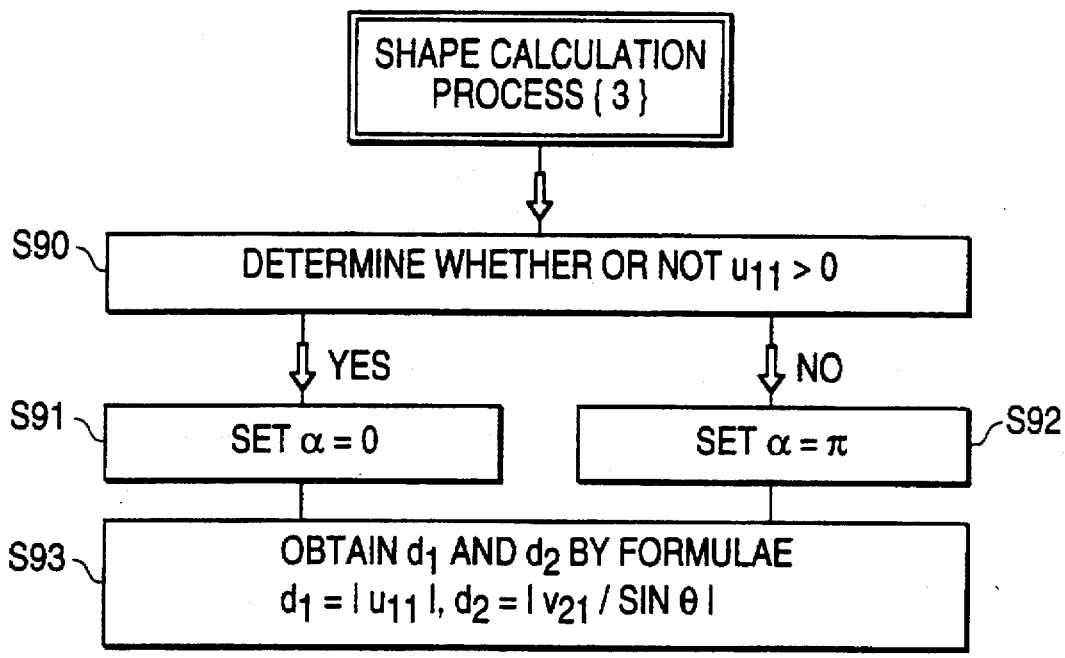
FIG. 46 is a flowchart of an embodiment of shape calculation process {3}.

Returning to FIG. 43, if the shape calculation unit 35 determines negatively (NO) in step S83, the shape calculation unit 35 invokes shape calculation process {3} shown in FIG. 46 before continuing on to step S94.

FIG. 46 is a flowchart of an embodiment of shape calculation process {3}.

The shape calculation unit 35 determines in step S90 whether or not $u_{11}$ is smaller than zero. If it determines affirmatively (YES) in step S90, the shape calculation unit 35 sets the value of angle α equal to zero in step S91. If it determines negatively (NO) in step S90, the shape calculation unit 35 sets the value of angle α equal to π in step S92. On completing either step S91 or step S92, the shape calculation unit 35 obtains the absolute values $d_1$ and $d_2$ in step S123.

Returning to FIG. 43, after completing shape calculation process {1}, {2} or {3}, the shape calculation unit 35 calculates the second components $u_{11}$ and $u_{21}$ of two-dimensional vectors $u_1$ and $u_2$ in step S94 and the second components $v_{11}$ and $v_{21}$ of two-dimensional vectors $v_1$ and $v_2$ in step S95. Then, the shape calculation unit 35 sends those second components to the feature point position reconstruction unit 36 in step S96.

Returning to FIG. 38, when the shape/movement recognition unit 27 completes the process of the shape calculation unit 35, the shape/movement recognition unit 47 continues on to step S97 shown in FIG. 39.

The feature point position reconstruction unit 36 identifies the transferred set of recognition solutions as a set of recognition solutions <1> in step S97, obtains a set of recognition solutions <2> in step S98, and determines in step S99 whether or not either one of the sets of recognition solutions <1> and <2> satisfies the known data stored in the known data input unit 31. The feature point position reconstruction unit 36 selects either recognition solution <1> or recognition solution <2> by concave/convex data of an object.

Figure 47:
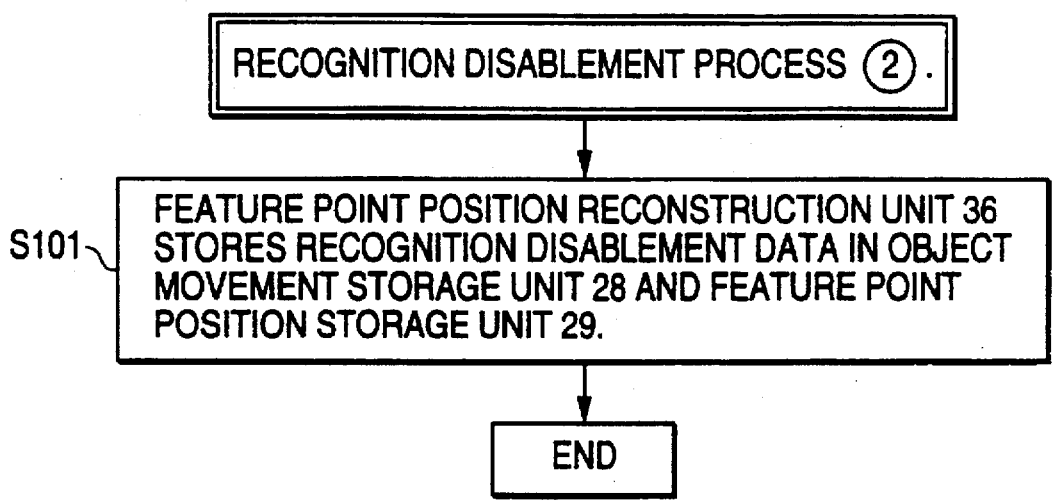
FIG. 47 is a flowchart of an embodiment of recognition disablement process {2} pursuant to the second form of this invention.

If the feature point position reconstruction unit 36 determines in step S99 that neither set of recognition solutions <1> and <2> satisfies the known data stored in the known data input unit 31, the shape calculation unit 35 invokes recognition disablement process {2} shown in FIG. 47, which is essentially the same as those pursuant to the first and second forms of this invention shown in FIGS. 22 and 33.

FIG. 47 is a flowchart of an embodiment of recognition disablement process {2} pursuant to the second form of this invention.

In step S101, the feature point position reconstruction unit 36 stores the recognition disablement data in the object movement storage unit 28 and the feature point position storage unit 29, thereby ending the process.

Returning to FIG. 39, if the feature point position reconstruction unit 36 determines in step S99 that either of the sets of recognition solutions <1> and <2> satisfies the known data stored in the known data input unit 31, the feature point position reconstruction unit 36 identifies it as a selected set of recognition solutions. Then, in step S102, the feature point position reconstruction unit 36 stores in the object movement storage unit 28 rotation matrix R in the selected set of recognition solutions together with the in-image coordinate values of feature point 0 stored in the feature point position normalization unit 32. Thereafter, in step S103, the feature point position reconstruction unit 36 stores in the feature point position storage unit 29 the second components of the two-dimensional vectors in the selected set of recognition solutions together with the in-image coordinate values of feature points 0, 1 and 2 stored in the feature point position normalization unit 32, thereby completing its process.

Thus, the shape/movement recognition unit 27 ends its process.

Although set of recognition solutions <1> is obtained first in the above embodiment, it goes without saying that there is another embodiment in which set of recognition solutions <2> is obtained first, which requires only the X axis to have the opposite direction.

As described above, the second form of this invention allows the movement of an object moving on a single plane coupled with a rotation to be recognized from the positions of three feature points forming a right angle each in images captured at two instants in time for observation.

Also, as explained in the description of FIG. 31, the shape/movement determination unit 33 can immediately determine the recognition enablement or recognition disablement of the moving body from the in-image positions of feature points.

The Third Form

FIG. 23 shows a universal relation between an object and its observation plane in an image input unit pursuant to the third form of this invention.

FIG. 24 shows a relation between an object and its observation plane pursuant to the third form of this invention, in which one of feature points of the object is fixed at the origin of a three-dimensional coordinate system.

Embodiments of the third form of this invention are explained below. As described earlier, the third form of this invention is different from the first form of this invention, in that the actual position and movement of feature points in an object are obtained from the known position data of three feature points of an object at any three instants in time for observation, because the rotating speed of an object does not have to be constant and because the three feature points do not form a right angle. The movement and the rotation of an object and the relation between the direction of observing an object and the coordinate axes are the same as those in the first and second forms of this invention.

The relations between an object and its observation plane pursuant to the third form of this invention are the same as those shown in FIGS. 23 and 24 pursuant to the first and second forms of this invention, except that the three feature points do not form a right angle.

The assumption that images are obtained as orthogonally projected images observed from the direction of the Y axis is the same as that for the first form of this invention. Therefore, the displacement in the direction of the X axis is the same as that observed on the image plane. Therefore, as explained in the description of FIG. 24, after one of the three feature points, e.g. feature point 0, moves to the origin, the Y coordinate values of other two feature points, e.g. feature points 1 and 2, the angle of rotation around the origin of the object from a first instant in time for observation to a third instant in time for observation and the angle of rotation around the origin of the object from the first instant in time for observation to a third instant in time for observation are calculated.

Described below in detail is the new theory used in the third form of this invention. It is necessary first to analyze the number of feature points and the number of images that must exist to establish correspondences. A theorem 7 gives the answer to the analysis.

Theorem 7

To be able to have a definite solution, it is necessary to establish correspondences of three [3] feature points each in three images.

A system 7.1 clarifies the meaning of theorem 7.

System 7.1

A theorem 7 satisfies following propositions (1) and (2).

Proposition (1) Two images produce no set of definite solutions, no matter how many feature points there are.

Proposition (2) Two feature points produce no set of definite solutions, no matter how many images there are.

Proof of theorem 7

Assuming that m feature points each in n images have correspondences, the number of equations need to be greater than the number of unknowns. The following illustrates why conditions of m and n are $m \geq 3$ and $n \geq 3$.

As described later, assume that a feature point 0 moves to the origin.

Codes are defined as follows.

$v_{kj}$ represents a vector from the origin to a j-th feature point in a k-th image, where k=1, ..., n and j=1, ..., m−1.

Rotation matrix $R_i$ represents a rotation of an object from a first image to an i-th image, where i=2, ..., n.

That is, a relation such as

| A first instant in time for observation | $R_i$ | An i-th instant in time for observation |
|---|---|---|
| $v_{1j}$ | $\rightarrow$ | $v_{ij}$ |

(where i=2, ..., n and j=1, ..., m−1) can be expressed as $v_{ij} = R_i \, v_{1j}$ (where k=1, ..., n and j=1, ..., m−1)  (1)

Since unknowns are $\theta_i$, which is an angle of rotation represented by rotation matrix $R_i$, (where i=2, ..., n,) and third components (i.e. Y components) of vectors $v_{kj}$, (where k=1, ..., n and j=1, ..., m−1,) the number of unknowns is (n−1)+n(m−1)=mn−1

Because two linear equations are obtained from each combination of i and j in expression (1), the number of equations is 2(m−1)(n−1). The number of equations must not be less than the number of unknowns to have a set of definite solutions.

That is, the difference obtained by subtracting the number of unknowns from the number of equations must not be negative. Therefore, (the number of equations)−(the number of unknowns)=2(m−1)(n−1)−(mn−1)=(m−2)(n−2)−1 $\geq$ 0

This is transformed into (m−2)(n−2) $\geq$ 1

Since both m and n are positive integers, m−2 $\geq$ 1 and n−2 $\geq$ 1. Hence, m $\geq$ 3 and n $\geq$ 3.

End of Proof

Although system 7.1 is a direct result of theorem 7, it can be directly proved. The direct proof is explained below.

Proof of System 7.1

(1) A proof that two observations of n points produce no definite solution.

The relations between two-dimensional vectors for n−1 points other than the origin on a rigid body and a rotation represented by rotation matrix R are expressed as follows:

Expression 14

| A first instant in time for observation | | A third instant in time for observation |
|---|---|---|

$$\begin{bmatrix} x_i \\ y_i \end{bmatrix} \xrightarrow{R} \begin{bmatrix} x_i' \\ y_i' \end{bmatrix} (i=1,\ldots,n-1), R = \begin{bmatrix} \cos\theta & -\sin\theta \\ \sin\theta & \cos\theta \end{bmatrix}$$

Conditional equations are transformed into $$\begin{bmatrix} x_i' \\ y_i' \end{bmatrix} = R \begin{bmatrix} x_i \\ y_i \end{bmatrix} \quad (i=1,\ldots,n-1)$$

That is, $$\begin{bmatrix} x_i' \\ y_i' \end{bmatrix} = \begin{bmatrix} \cos\theta, & -\sin\theta \\ \sin\theta, & \cos\theta \end{bmatrix} \begin{bmatrix} x_i \\ y_i \end{bmatrix} \quad (i=1,\ldots,n-1)$$

The unknowns are $\theta$, $y_i$ and $y_i'$, where $i=1,\ldots$ and $n-1$.

Since the number of conditional equations is $2n-2$ whereas the number of unknowns is $2n-1$, there is no set of definite solutions.

(2) It is shown that n observations at two points produce no set of definite solutions.

The relation between two-dimensional vectors of a single point other than the origin on a rigid body and a rotation are expressed as
Expression 15

| A first instant in time for observation | | A third instant in time for observation |
|---|---|---|

$$\begin{bmatrix} x_i \\ y_i \end{bmatrix} \xrightarrow{Rj} \begin{bmatrix} x_j \\ y_j \end{bmatrix} \quad (j=2,\ldots,n), \; Rj = \begin{bmatrix} \cos\theta_j, & -\sin\theta_j \\ \sin\theta_j, & \cos\theta_j \end{bmatrix}$$

Conditional equations are $$\begin{bmatrix} x_j \\ y_j \end{bmatrix} = R_j \begin{bmatrix} x_1 \\ y_1 \end{bmatrix} \quad (j=2,\ldots,n)$$

That is, $$\begin{bmatrix} x_j \\ y_j \end{bmatrix} = \begin{bmatrix} \cos\theta_j, -\sin\theta_j \\ \sin\theta_j, \cos\theta_j \end{bmatrix} \begin{bmatrix} x_1 \\ y_1 \end{bmatrix} \quad (j=2\ldots,n)$$

The unknowns are $\theta_j$, $y_1$ and $y_j$, where $j=2,\ldots$ n.

Since the number of equations is $2n-2$ whereas the number of unknown variables is $2n-1$, there is no set of definite solutions.
End of Proof FIG. 48 illustrates the orthogonal projections of feature points 0, 1 and 2 shown in FIG. 24 on the XY plane at three instants in time for observation pursuant to the third form of this invention.

To calculate the data on the shape and movement of an object, it is sufficient to calculate the displacement of feature point 0 to the origin and the angle of rotation around the origin. Since the displacement of feature point 0 can be easily obtained as described earlier, the angle of rotation around feature point 0 need only be calculated.

A moving body recognition apparatus pursuant to the third form of this invention calculates and outputs an angle of rotation of an object around the origin and a Y coordinate value of a feature point when feature point 0 moves to the origin, in addition to the X and Z coordinate values of feature points in the input images.

Figure 48:
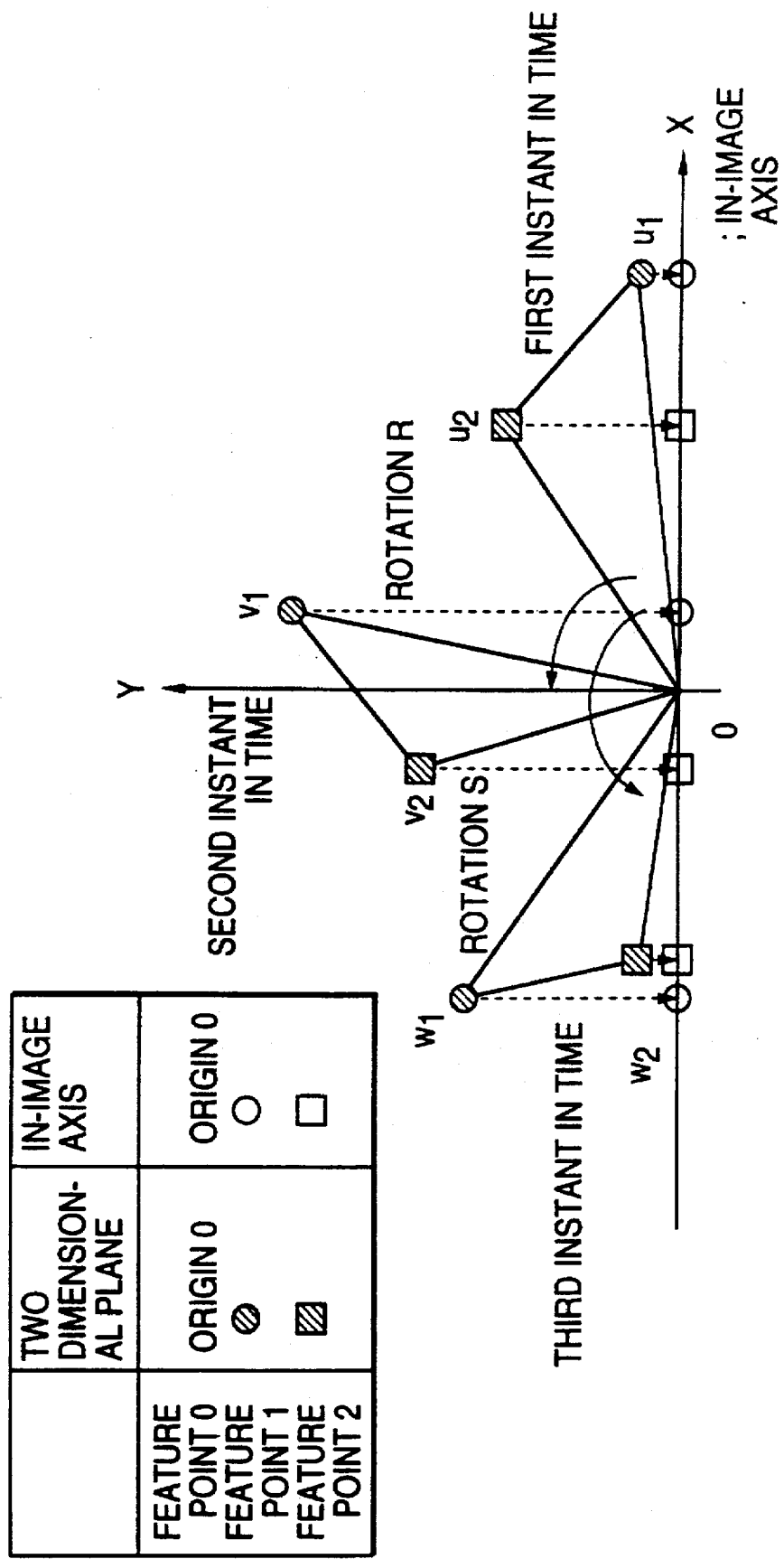
FIG. 48 illustrates the orthogonal projections of feature point 0, 1 and 2 shown in FIG. 24 on the XY plane at three instants in time for observation pursuant to the third form of this invention.

The following is a description of the codes shown in FIG. 48.

Feature point 0 is a feature point of an object moved to origin 0.

Feature points 1 and 2 are feature points on the object other than feature point 0.

$u_1$ and $u_2$ are two-dimensional vectors respectively representing feature points 1 and 2 at a first instant in time for observation.

$v_1$ and $v_2$ are two-dimensional vectors respectively representing feature points 1 and 2 at a third instant in time for observation.

$w_1$ and $w_2$ are two-dimensional vectors respectively representing feature points 1 and 2 at a third instant in time for observation.

R is a rotation matrix representing a rotation of the object around the origin from the first instant in time for observation to the third instant in time for observation, which is expressed as:
Expression 16

$$R = \begin{bmatrix} R_1 \\ R_2 \end{bmatrix} = \begin{bmatrix} r_{11} & r_{12} \\ -r_{12} & r_{11} \end{bmatrix}$$

S is a rotation matrix representing a rotation of the object around the origin from the first instant in time for observation to the third instant in time for observation, which is expressed as:
Expression 17

$$S = \begin{bmatrix} S_1 \\ S_2 \end{bmatrix} = \begin{bmatrix} s_{11} & s_{12} \\ -s_{12} & s_{11} \end{bmatrix}$$

These are related by the following expressions: $v_i = R\, u_i$ and $w_i = S\, u_i$, where $i=1, 2$.

That is,

| A first instant in time for observation | R | A second instant in time for observation | A first instant in time for observation | S | A third instant in time for observation |
|---|---|---|---|---|---|
| $u_1$ | → | $v_1$ | $u_1$ | → | $w_1$ |
| $u_2$ | → | $v_2$ | $u_2$ | → | $w_2$ |

Therefore, the problem can be formulated as follows:

A Problem Of Recognizing A Moving Body On A Single Plane $u_i$, $v_i$ and $w_i$ are two-dimensional vectors whose first components are known, where $i=1, 2$.

R and S are two-dimensional rotation matrices.

$v_i = R\, u_i$ and $w_i = S\, u_i$, where $i=1, 2$.

Assuming the above, obtain third components of $u_i$, $v_i$ and $w_i$, where $i=1, 2$, and the rotation matrices R and S.

A next theorem 8 presents conditions for solving this problem.

Theorem 8

The conditions of determining a set of solutions for a problem of recognizing a moving body on a single plane are to let {9}, {10} and {11} be all satisfied.
Expression 18

$$\begin{bmatrix} u_{11} & u_{21} \\ v_{11} & v_{21} \end{bmatrix} \text{ is regular.} \quad \{9\}$$

$$\begin{bmatrix} v_{11} & v_{21} \\ w_{11} & w_{21} \end{bmatrix} \text{ is regular.} \quad \{10\}$$

-continued $$\begin{bmatrix} w_{11} & w_{21} \\ u_{11} & u_{21} \end{bmatrix} \text{ is regular.} \quad \{11\}$$

Here, that a square matrix is regular should be construed as follows:

a matrix being regular $\iff$ its inverse matrix existing = $\iff$ the value of its determinant not being equal to zero Therefore, when determinants of matrices {9}, {10} and {11} are not all zero, the shape and movement of an object can be determined.

The proofs of theorems 8, 9 and 10 will be shown later in a batch.

A lemma 4 for use in proving theorems 9 and 10 is shown below. Lemma 4 shows a relation between the two two-dimensional rotation matrices R and S.

Expression 19

$$R = \begin{bmatrix} R_1 \\ R_2 \end{bmatrix} \quad S = \begin{bmatrix} S_1 \\ S_2 \end{bmatrix}$$

$$\begin{bmatrix} R_1 \\ S_2 \end{bmatrix} \text{ is regular.} \iff R \neq \pm S$$

Here, a $\iff$ sign indicates a necessary and sufficient condition. A next theorem 6 defines the meanings of conditions {4}, {5} and {6}.

Theorem 9

Conditions {9}, {10} and {11} in theorem 8 are equivalent to next conditions {12} through {15}.

Expression 20

$$R \neq \pm I \quad \{12\}$$

$$S \neq \pm I \quad \{13\}$$

$$R \neq \pm S \quad \{14\}$$

[$u_1$, $u_2$] being regular $\iff$ [$v_1$, $v_2$] being regular $\iff$ [$w_1$, $w_2$] being regular $\quad \{15\}$ where $$I = \begin{bmatrix} 1 & 0 \\ 0 & 1 \end{bmatrix}$$

is an identity matrix.

Condition {12} means that the rotation of an object from a first instant in time for observation to a third instant in time for observation is neither zero degrees nor one hundred and eighty degrees.

Condition {13} means that the rotation of an object from a first instant in time for observation to a third instant in time for observation is neither zero degrees nor one hundred and eighty degrees.

Condition {14} means that the rotation of an object from a third instant in time for observation to a third instant in time for observation is neither zero degrees nor one hundred and eighty degrees. (This is because condition {14} is equivalent to $RS^{-1} \neq \pm I$, where $RS^{-1}$ represents a rotation of an object from the third instant in time for observation to the third instant in time for observation.)

Condition {15} means that the three feature points 0, 1 and 2 are not on a single straight line, i.e. that the three feature points 0, 1 and 2 form a triangle.

A next theorem 10 presents formulae for calculating a set of definite solutions.

Theorem 10

Conditions of theorem 8 produce the next set of definite solutions.

Expression 21

$$R = \begin{bmatrix} R_1 \\ R_2 \end{bmatrix} = \begin{bmatrix} r_{11} & r_{12} \\ -r_{12} & r_{11} \end{bmatrix}$$

and $$S = \begin{bmatrix} S_1 \\ S_2 \end{bmatrix} = \begin{bmatrix} s_{11} & s_{12} \\ -s_{12} & s_{11} \end{bmatrix}$$

can be calculated by the following expression.

Expression 22

Define first that:

$$\begin{bmatrix} a_1 \\ a_2 \end{bmatrix} = \begin{bmatrix} a_{11} & a_{12} \\ a_{21} & a_{22} \end{bmatrix} = \begin{bmatrix} R_1 \\ S_1 \end{bmatrix}^{-1}$$

Calculate $a_1$ according to:

$$a_1 = [a_{11} \ a_{21}] = [u_{11} \ u_{21}] \begin{bmatrix} v_{11} & v_{12} \\ w_{11} & w_{21} \end{bmatrix}^{-1}$$

$R_1$ and $S_1$ can be obtained from components $a_{11}$ and $a_{12}$ of vector $a_1$ and the next expressions.

$$R_1 = [(1 + a_{11}^2 - a_{12}^2)/(2a_{11}) \pm (1 - r_{11}^2)^{1/2}]$$

$$S_1 = [(1 - a_{11}r_{11})/a_{12} - a_{11}r_{12}/a_{12}]$$

Since the values of elements of a first row matrix $R_1$ have been calculated, the values of all elements of rotation matrix R are obtained.

The values of all elements of rotation matrix S are obtained similarly.

Second components $u_{i2}$, $v_{i2}$ and $w_{i2}$ of two-dimensional vectors $u_i$, $v_i$ and $w_i$, where i=1, 2 are calculated by the next expressions.

Expression 23

According to the already calculated values of $R_1$ and $S_1$, $a_2$ is calculated by the next expressions.

$a_2$ = the second row of $$\begin{bmatrix} R_1 \\ S_1 \end{bmatrix}^{-1}$$

The following expression allows the second component of $u_i$, where i=1, 2, to be calculated.

$$[u_{12} \ u_{22}] = a_2 \begin{bmatrix} v_{11} & v_{21} \\ w_{11} & w_{21} \end{bmatrix}$$

The next expressions allow the second components of $v_i$ and $w_i$, where i=1, 2, to be calculated.

$v_{i2} = R_2 \ u_i$ and $w_{i2} = S_2 \ u_i$ (i=1, 2)

Expression 24

Theorems 9 and 10 require the inverse rotation matrices of $$\begin{bmatrix} R_1 \\ S_1 \end{bmatrix} \text{ and } \begin{bmatrix} v_{11} & v_{21} \\ w_{11} & w_{21} \end{bmatrix}$$

exists.

This is sequentially guaranteed by lemma 4 and theorem 8.

A next system 10.1 defines the correspondences between two sets of solutions by theorem 10.

System 10.1

When one set of the solutions is R, S, $u_i$, $v_i$ and $w_i$, where i=1, 2, the other set of solutions is Expression 25

$$\begin{bmatrix} 1 & 0 \\ 0 & -1 \end{bmatrix} R \begin{bmatrix} 1 & 0 \\ 0 & -1 \end{bmatrix}$$

is inverse rotation matrix of R, $$\begin{bmatrix} 1 & 0 \\ 0 & -1 \end{bmatrix} S \begin{bmatrix} 1 & 0 \\ 0 & -1 \end{bmatrix}$$

is inverse rotation matrix of S, $$\begin{bmatrix} 1 & 0 \\ 0 & -1 \end{bmatrix} u_1$$

is a mirror image transformation of $u_1$ with respect to the X axis, $$\begin{bmatrix} 1 & 0 \\ 0 & -1 \end{bmatrix} v_1$$

is a mirror image transformation of $v_1$ with respect to the X axis, and $$\begin{bmatrix} 1 & 0 \\ 0 & -1 \end{bmatrix} w_1$$

is a mirror image transformation of $w_1$ with respect to the X axis.

System 10.1 corresponds to a case in which there are two sets of solutions for an earlier described problem of recognizing a moving body. This shows that there are two sets of solutions respectively corresponding to cases in which the Y coordinate values of other feature points are positive and negative as shown in FIG. 49 when feature point 0 in an orthogonally projected image moves to the origin. They also correspond to the surfaces of an object observed from a TV camera as an image input unit being a convex and a concave.

Figure 49A:
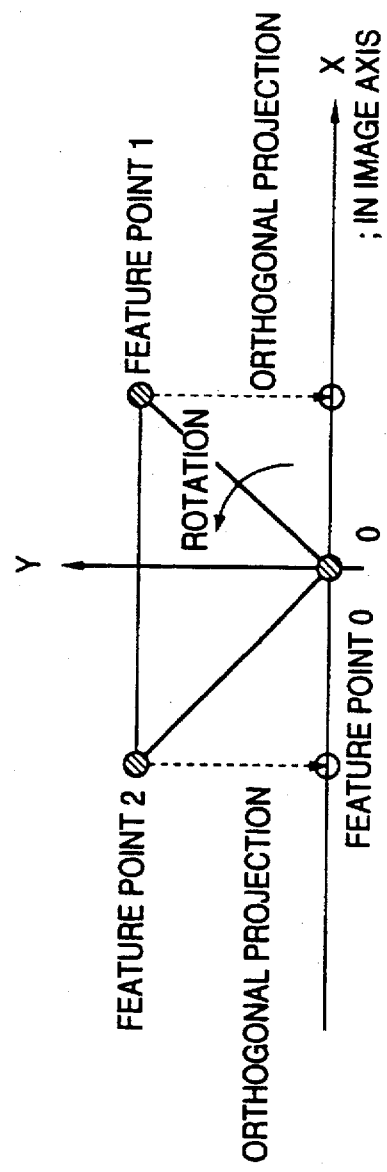
FIGS. 49A and 49B show two sets of solutions forming mirror image transformations of each other with respect to the X axis pursuant to the third from of this invention.
Figure 49B:
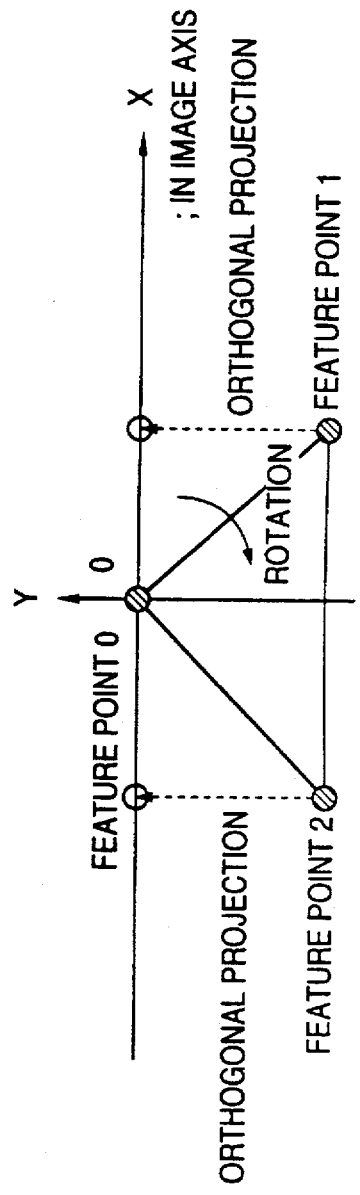

FIGS. 49A and 49B show two sets of solutions forming mirror image transformations of each other with respect to the X axis pursuant to the third form of this invention.

FIG. 49A shows that feature points shown in FIG. 47 are projected over to the XY plane as a set of solutions, in which the surface of an object forms a convex, whereas FIG. 49B shows the mirror image transformation of the set of solutions shown in FIG. 49A, in which the surface of an object forms a concave.

A next system 10.2 allows an easier calculation of $r_{11}$ by theorem 10.

System 10.2

When it can be assumed that the rotation of a rigid body is constant, i.e. when $S=R^2$, $r_{11}=a_{11}/2$.

The following are proofs of theorems 8, 9 and 10, in a sequence of proposition 3, lemma 4, theorem 9 and theorem 10.

Proposition 3

Expressions {12}, {13}, {14} and {15} in theorem 9 are conditions necessary for having a set of definite solutions.

Proof of Proposition 3

To reiterate the conditions, $v_i = R\ u_i$ and $w_i = S\ u_i$, where i=1, 2.

(1) Proof that condition {12} is necessary

By assuming that $R = \pm I$, it is shown that there is no set of definite solutions.

Condition $v_i = R\ u_i$ is transformed into $v_i = \pm u_i$.

Thus, the only remaining condition is $w_i = S\ u_i$. As already explained in the description of proposition (1) in theorem 7, there is no set of definite solutions.

(2) Proof that condition {13} is necessary

This is exactly the same as the proof for {1}.

(3) Proof that condition {14} is necessary

Assuming that $R = \pm S$, it is shown that there is no set of definite solutions.

$v_i = R\ u_i = \pm S\ u_i = \pm w_i$

Hence, condition $v_i = R\ u_i$ is reduced to $v_i = \pm w_i$. Thus, the only remaining condition is $w_i = S\ u_i$.

As illustrated in the description of (1) in system 7.1, there is no set of definite solutions.

(4) Proof that condition {15} is necessary

Assuming that $[u_1, u_2]$ is irregular, it is shown that there is no set of definite solutions.

Since $u_1$ and $u_2$ are linearly dependent on each other, $\alpha_1 u_1 + \alpha_2 u_2 = 0$, where $(\alpha_1, \alpha_2) \neq 0$.

Because $u_1 \neq 0$ and $u_2 \neq 0$, $\alpha_1 \neq 0$, and $\alpha_2 \neq 0$, it is described that $u_2 = \alpha u_1$.

Condition $v_2 = R\ u_2$ is reduced to $v_2 = \alpha v_1$.

Condition $w_2 = S\ u_1$ is reduced to $w_2 = \alpha w_1$.

Thus, all the conditions $v_i = R\ u_i$ and $w_i = S\ u_i$ where i=1, 2, are reduced to $v_1 = R\ u_1$ and $w_1 = S\ u_1$.

As already explained in the description of (2) in system 7.1, there is no set of definite solutions.

(5) Proof that condition {15} is necessary

From conditions,

Expression 26

$[v_1, v_2] = R[u_1, u_2]$ and $[w_1, w_2] = S[u_1, u_2]$

Since R and S are regular, $[u_1, u_2]$ being regular $\Longleftrightarrow$ $[v_1, v_2]$ being regular
$\Longleftrightarrow$ $[w_1, w_2]$ being regular End of Proof Proof 1 of lemma 4

Expression 27

$$R = \begin{bmatrix} R_1 \\ R_2 \end{bmatrix} = \begin{bmatrix} \cos\theta & -\sin\theta \\ \sin\theta & \cos\theta \end{bmatrix}$$

$$S = \begin{bmatrix} S_1 \\ S_2 \end{bmatrix} = \begin{bmatrix} \cos\phi & -\sin\phi \\ \sin\phi & \cos\phi \end{bmatrix}$$

By using the next relation, $$\begin{bmatrix} R_1 \\ S_1 \end{bmatrix} \text{ being regular} \iff \begin{vmatrix} R_1 \\ S_1 \end{vmatrix} \neq 0 \quad \begin{vmatrix} R_1 \\ S_1 \end{vmatrix}$$

is calculated first.

$$\begin{vmatrix} R_1 \\ S_1 \end{vmatrix} = \begin{vmatrix} \cos\theta & -\sin\theta \\ \cos\phi & -\sin\phi \end{vmatrix} = -\cos\theta\sin\phi + \sin\theta\cos\phi = \sin(\theta - \phi) \quad (1)$$

Also, $$RS^{-1} = \begin{bmatrix} \cos(\theta - \phi) & -\sin(\theta - \phi) \\ \sin(\theta - \phi) & \cos(\theta - \phi) \end{bmatrix} \quad (2)$$

$$\begin{vmatrix} R_1 \\ S_1 \end{vmatrix} = 0 \iff \sin(\theta - \phi) = 0 \text{ [from (1)]}$$

$$\iff (\theta - \phi) = n\pi \text{ (where } n \text{ is an integer)}$$

$$\iff RS^{-1} = \pm I$$

$$\iff R = \pm S$$

The contraproposition of the above proposition is:

$$\begin{bmatrix} R_1 \\ S_1 \end{bmatrix} \text{ being regular} \iff R \neq \pm S$$

End of Proof
Proof 2 of lemma 4
By proving the contraproposition, an original proposition is proved.
Expression 28

$$\begin{bmatrix} R_1 \\ S_1 \end{bmatrix}$$

being regular
$\iff$ vectors $R_1$ and $S_1$ being linearly dependent with each other
$\iff$ a certain number a satisfying $R_1 = a S_1$
$\iff R_1 = \pm S_1$,
(This is because the lengths of two-dimensional vectors $R_1$ and $S_1$ are both one, since R and S are both rotation matrices.)

$\iff R = \pm S$
  This is because $$R_1 = \pm S_1 \Rightarrow R_2 = \pm S_2 \Rightarrow R = \pm S,$$

which is due to the generic form of a two-dimensional rotation matrix, which is $$\begin{bmatrix} \cos\theta & -\sin\theta \\ \sin\theta & \cos\theta \end{bmatrix}.$$

End of Proof
Proof of Theorem 9
To reiterate the conditions, $$v_i = R\ u_i \text{ and } w_i = S\ u_i \text{ (where } i=1, 2) \quad (*)$$

From (*), $u_i = S^{-1} w_i$ and $v_i = R\ u_i = R\ S^{-1} w_i$.

Expression 29

$$\begin{bmatrix} u_{11} & u_{21} \\ v_{11} & v_{21} \end{bmatrix} = \begin{bmatrix} (S^{-1})_1 \\ (RS^{-1})_1 \end{bmatrix} [w_1\ w_2] \quad (1)$$

From (*), $$\begin{bmatrix} v_{11} & v_{21} \\ w_{11} & w_{21} \end{bmatrix} = \begin{bmatrix} R_1 \\ S_1 \end{bmatrix} [u_1\ u_2] \quad (2)$$

From (*), $w_i = SR^{-1} v_i$ and $u_i = R^{-1} v_i$ $$\begin{bmatrix} w_{11} & w_{21} \\ u_{11} & u_{21} \end{bmatrix} = \begin{bmatrix} (SR^{-1})_1 \\ (R^{-1})_1 \end{bmatrix} [v_1\ v_2] \quad (3)$$

From (1) through (3), {9} through {11} are equivalent to next (4) through (9).

$$\begin{bmatrix} (S^{-1})_1 \\ (RS^{-1})_1 \end{bmatrix} \text{ is regular.} \quad (4)$$

$[w_1\ w_2]$ is regular. (5)

$$\begin{bmatrix} R_1 \\ S_1 \end{bmatrix} \text{ is regular.} \quad (6)$$

$[u_1\ u_2]$ is regular. (7)

$$\begin{bmatrix} (SR^{-1})_1 \\ (R^{-1})_1 \end{bmatrix} \text{ is regular.} \quad (8)$$

$[v_1\ v_2]$ is regular. (9)

From Lemma 1, (4), (6) and (8) are equivalent respectively to {12}, {14} and {13}.

$$S^{-1} \neq \pm RS^{-1} \iff R \neq \pm I \quad \{12\}$$

$$R \neq \pm S \quad \{14\}$$

$$SR^{-1} \neq \pm R^{-1} \iff S \neq \pm I \quad \{13\}$$

(7) is equal to {15}, and is equivalent to (5) and (9) as illustrated in the proof of proposition 3. Therefore, (4) through (9) are equivalent to {12} through {15}.
Proof of theorem 10
Expression 30

$$v_i = R\ u_i \text{ and } w_i = S\ u_i \text{ (where } i=1, 2)$$

$$\begin{bmatrix} v_{11} & v_{21} \\ w_{11} & w_{21} \end{bmatrix} = \begin{bmatrix} R_1 \\ S_1 \end{bmatrix} [u_1\ u_2] \quad (1)$$

From conditions of theorem 9, which is $$R \neq \pm S \quad \{14\}$$

and lemma 4, $$\begin{bmatrix} R_1 \\ S_1 \end{bmatrix}$$

is regular.
By combining condition {10} in theorem 8 and condition {15} in theorem 9, all the matrices in expression (1) are regular.

$$\begin{bmatrix} R_1 \\ S_1 \end{bmatrix}^{-1} = \begin{bmatrix} a_1 \\ a_2 \end{bmatrix} \begin{bmatrix} a_{11} & a_{12} \\ a_{21} & a_{22} \end{bmatrix} \quad (2)$$

Because $$\begin{bmatrix} a_1 \\ a_2 \end{bmatrix} = [u_1 \, u_2] \begin{bmatrix} v_{11} & v_{21} \\ w_{11} & w_{22} \end{bmatrix}^{-1}$$

$$a_1 = [u_{11} \, u_{21}] \begin{bmatrix} v_{11} & v_{21} \\ w_{11} & w_{22} \end{bmatrix}^{-1}$$

Because parameters on the right side are known, $a_1$ can be calculated.

Expression 32

By definition, $$\begin{bmatrix} a_1 \\ a_1 \end{bmatrix} \begin{bmatrix} R_1 \\ S_1 \end{bmatrix} = I \quad (3)$$

$$a_1 \begin{bmatrix} r_{11}, & r_{12} \\ s_{11}, & s_{12} \end{bmatrix} = [1 \, 0]$$

By expanding, $$\begin{bmatrix} a_{11}r_{11} + a_{12}s_{11} = 1 \\ a_{11}r_{12} + a_{12}s_{12} = 0 \end{bmatrix} \quad (4), (5)$$

$$\leftrightarrow \begin{bmatrix} a_{12}s_{11} = 1 - a_{11}r_{11} \\ a_{12}s_{12} = -a_{11}r_{12} \end{bmatrix} \quad (6), (7)$$

by squaring both two expressions, $$a_{12}^2 = 1 + a_{11}^2 - 2a_{11}r_{11}$$

$$a_{11}r_{11} = (1 + a_{11}^2 - a_{12}^2)/2 \quad (8)$$

$$a_{11} \neq 0$$

Expression 33

This is because defining $a_{11}=0$ from (3), $$a_{12}[s_{11} \, s_{12}] = [1 \, 0]$$

$$a_{12} \neq 0$$

therefore, $$s_{12}=0$$

$$S=\pm I$$

This contradicts to the condition of theorem 9.
From (8), $$r_{11}=(1+a_{11}^2-a_{12}^2)/(2a_{11}) \quad (9)$$

$$r_{12}=\pm(1-r_{11}^2)^{1/2} \quad (10)$$

from (9) and (10), R1 can be calculated.

$$a_{12} \neq 0$$

Expression 34

This is because defining $a_{12}=0$ from (3), $$a_{11}[r_{11} \, r_{12}] = [1 \, 0]$$

$$a_{11} \neq 0$$

therefore, $$r_{12}=0$$

Hence, $$R=\pm I$$

This contradicts to condition of theorem 9.
From (6) and (7), $$s_{11}=(1-a_{11}r_{11})/a_{12} \quad (11)$$

$$s_{12}=-a_{11}r_{12}/a_{12} \quad (12)$$

From (11) and (12), S1 can be calculated.
Expression 35

A general expression of a two-dimensional matrix is, $$\begin{bmatrix} \cos\theta & -\sin\theta \\ \sin\theta & \cos\theta \end{bmatrix}$$

From R1, S1, the all elements of rotation matrises R and S can be calculated.
Expression 36

Also, $$\begin{bmatrix} a_1 \\ a_2 \end{bmatrix} = \begin{bmatrix} R_1 \\ S_1 \end{bmatrix}^{-1}$$

can be determined.
From (1), because $$[u_1, u_2] = \begin{bmatrix} R_1 \\ S_1 \end{bmatrix}^{-1} \begin{bmatrix} v_{11}, & v_{21} \\ w_{11}, & w_{21} \end{bmatrix} \quad (13)$$

therefore, $[u_{12}, u_{22}] = a_2 \begin{bmatrix} v_{11}, & v_{21} \\ w_{11}, & w_{21} \end{bmatrix}$ $$v_{i2}=R_2 \, u_i, \, W_{i2}=S_2 \, u_i \, (i=1, 2) \quad (14)$$

From (13), (14), second components of V Ui, Vi, Wi (i=1, 2) are finalized.
End of proof
Proof 1 of system 10.1

From conditions Vi=Rui, Wi=Sui (i=1, 2),
Expression 37

$$\begin{bmatrix} 1 & \\ & -1 \end{bmatrix} v_i = \left( \begin{bmatrix} 1 & \\ & -1 \end{bmatrix} R \begin{bmatrix} 1 & \\ & -1 \end{bmatrix} \right) \left( \begin{bmatrix} 1 & \\ & -1 \end{bmatrix} u_i \right) \quad (1)$$

$$\begin{bmatrix} 1 & \\ & -1 \end{bmatrix} w_i = \left( \begin{bmatrix} 1 & \\ & -1 \end{bmatrix} S \begin{bmatrix} 1 & \\ & -1 \end{bmatrix} \right) \left( \begin{bmatrix} 1 & \\ & -1 \end{bmatrix} u_i \right)$$

Since $$\begin{bmatrix} 1 & \\ & -1 \end{bmatrix} R \begin{bmatrix} 1 & \\ & -1 \end{bmatrix}, \begin{bmatrix} 1 & \\ & -1 \end{bmatrix} S \begin{bmatrix} 1 & \\ & -1 \end{bmatrix}$$

are rotation matrises, the first component of $$\begin{bmatrix} 1 & \\ & -1 \end{bmatrix} u_i, \begin{bmatrix} 1 & \\ & -1 \end{bmatrix} v_i, \begin{bmatrix} 1 & \\ & -1 \end{bmatrix} w_i$$

are equal to Ui, Vi and Wi, the terms expression (1) form another set of solutions.

End of proof
Proof 2 of system 10.1
A next direct proof can be set forth from theorem 10.
Expression 38
That the other set of solutions corresponding to rotation matrises can be understood $$\begin{bmatrix} 1 & \\ & -1 \end{bmatrix} R \begin{bmatrix} 1 & \\ & -1 \end{bmatrix}, \begin{bmatrix} 1 & \\ & -1 \end{bmatrix} S \begin{bmatrix} 1 & \\ & -1 \end{bmatrix}$$

from the general expression of a rotation matrix and an expression of theorem 10.
Matrix corresponding to $$\begin{bmatrix} a_1 \\ a_2 \end{bmatrix} \text{ is } \begin{bmatrix} a_1 \\ -a_2 \end{bmatrix}.$$

This is because $$\left( \begin{bmatrix} R_1 \\ S_1 \end{bmatrix} \begin{bmatrix} 1 & \\ & -1 \end{bmatrix}^{-1} \right) = \begin{bmatrix} 1 & \\ & -1 \end{bmatrix} \begin{bmatrix} R_1 \\ S_1 \end{bmatrix}^{-1} = \begin{bmatrix} a_1 \\ a_2 \end{bmatrix}$$

The other set of solution corresponding to $$u_i, v_i, w_i \ (i=1, 2)$$

is, $$\begin{bmatrix} 1 & \\ & -1 \end{bmatrix} u_i, \begin{bmatrix} 1 & \\ & -1 \end{bmatrix} v_i, \begin{bmatrix} 1 & \\ & -1 \end{bmatrix} w_i \ (i=1, 2)$$

Because, $$-[u_{12}\ u_{22}] = (-a_2) \begin{bmatrix} v_{11}, & v_{21} \\ w_{11}, & w_{21} \end{bmatrix}$$

$$\left( R_2 \begin{bmatrix} -1 & \\ & 1 \end{bmatrix} \right) \left( \begin{bmatrix} 1 & \\ & -1 \end{bmatrix} u_i \right) = -R_2 u_i = -v_{i2}$$

$$\left( S_2 \begin{bmatrix} -1 & \\ & 1 \end{bmatrix} \right) \left( \begin{bmatrix} 1 & \\ & -1 \end{bmatrix} u_i \right) = -S_2 u_i = -w_{i2}$$

End of proof
Supplement to the proof of system 10.1
Expression 39
For example, assuming $$R = \begin{bmatrix} \cos\theta, & -\sin\theta \\ \sin\theta, & \cos\theta \end{bmatrix},$$

$$\begin{bmatrix} 1 & \\ & -1 \end{bmatrix} R \begin{bmatrix} 1 & \\ & -1 \end{bmatrix} = \begin{bmatrix} \cos\theta, & \sin\theta \\ -\sin\theta, & \cos\theta \end{bmatrix} = \begin{bmatrix} \cos(-\theta) & -\sin(-\theta) \\ \sin(-\theta) & \cos(-\theta) \end{bmatrix}$$

is the inverse of rotation matrix R.
End of proof
Proof of System 10.2
Expression 40

$$\text{Defining } R = \begin{bmatrix} \cos\theta & -\sin\theta \\ \sin\theta & \cos\theta \end{bmatrix}, S = \begin{bmatrix} \cos 2\theta & -\sin 2\theta \\ \sin 2\theta & \cos 2\theta \end{bmatrix}.$$

$$\text{Because } \begin{bmatrix} a_{11}, & a_{12} \\ a_{21}, & a_{22} \end{bmatrix} = \begin{bmatrix} \cos\theta, & -\sin\theta \\ \cos 2\theta, & -\sin 2\theta \end{bmatrix}^{-1},$$

$$a_{11} = -\sin 2\theta / -\sin(2\theta - \theta) = 2 \cos \theta$$

$$\therefore r_{11} = a_{11}/2$$

End of proof
End of Proof

So far, the new theory for use in the third form of this invention has been described in detail. By applying this new theory to the shape/movement recognition unit 18 shown in FIG. 4 for its recognition of an object moving on a single plane coupled with a rotation, based on a result of extracting three feature points each in images captured at three instants in time for observation, the actual movements and positions of those feature points in a three-dimensional space are calculated, for enabling the movement of a moving body to be recognized.

The concept of a moving body recognition apparatus pursuant to the third form of this invention is similar to that pursuant to the first form of this invention. Also, an embodiment of the third form of this invention and the detailed configuration of the shape/movement recognition unit 27 are similar to those of the first form of this invention, which are shown in FIGS. 9 through 13. Accordingly, their descriptions are omitted.

Figure 50:
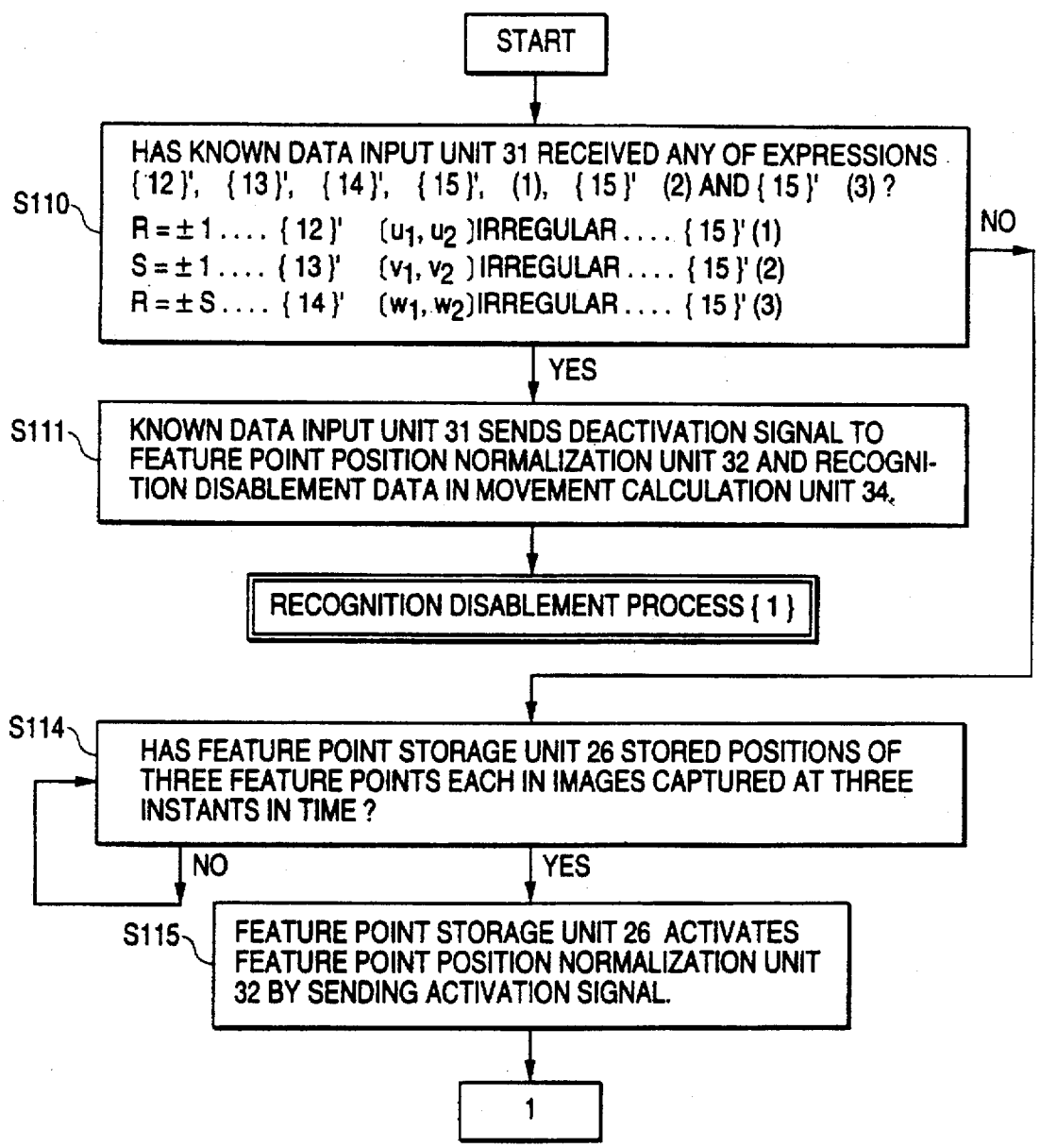
FIG. 50 is a first one of flowcharts showing in a three part series the whole processes of the shape/movement recognition unit 27 pursuant to the third form of this invention.
Figure 51:
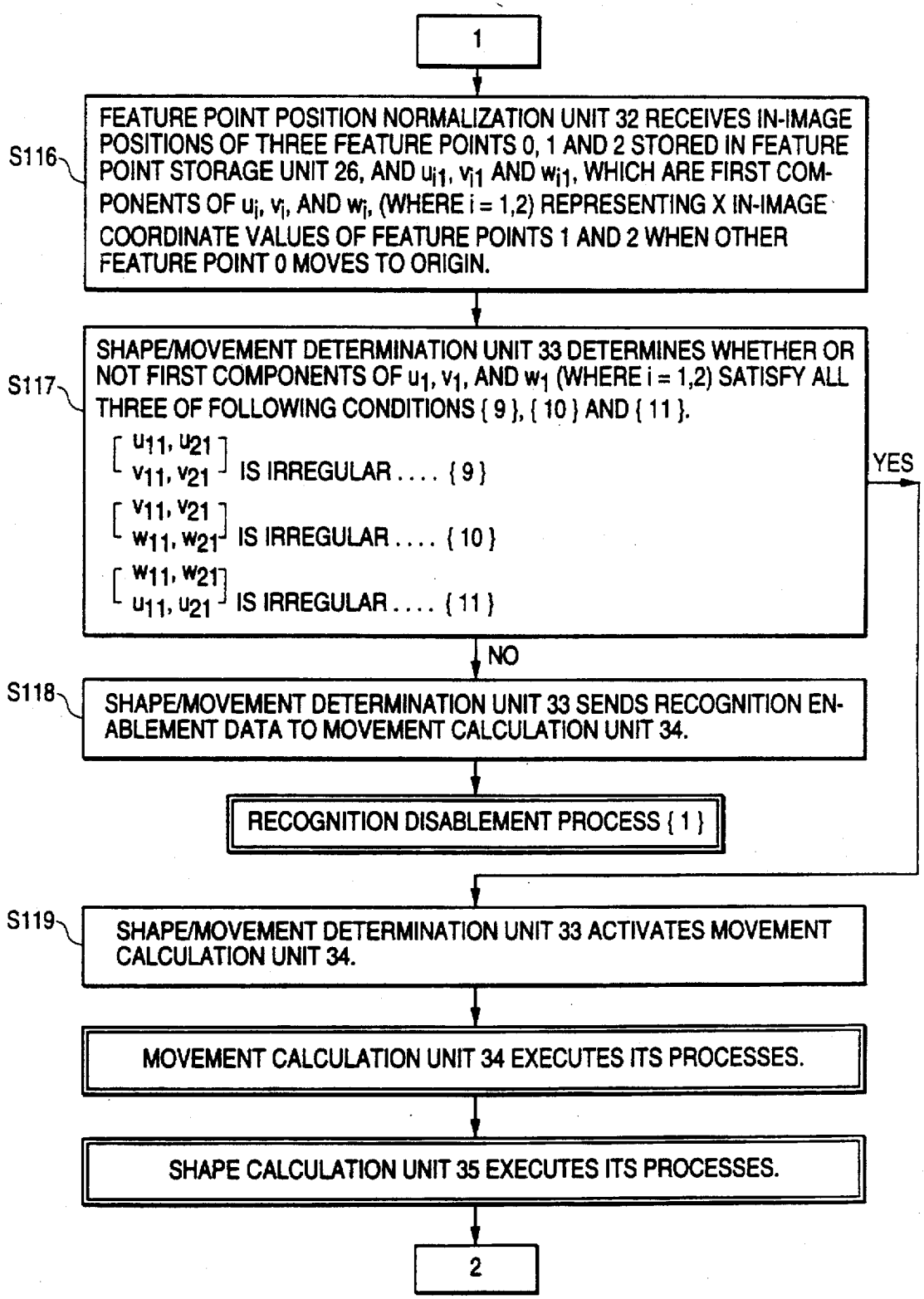
FIG. 51 is a second one of flowcharts showing in a three part series the whole processes of the shape/movement recognition unit 27 pursuant to the third form of this invention.
Figure 52:
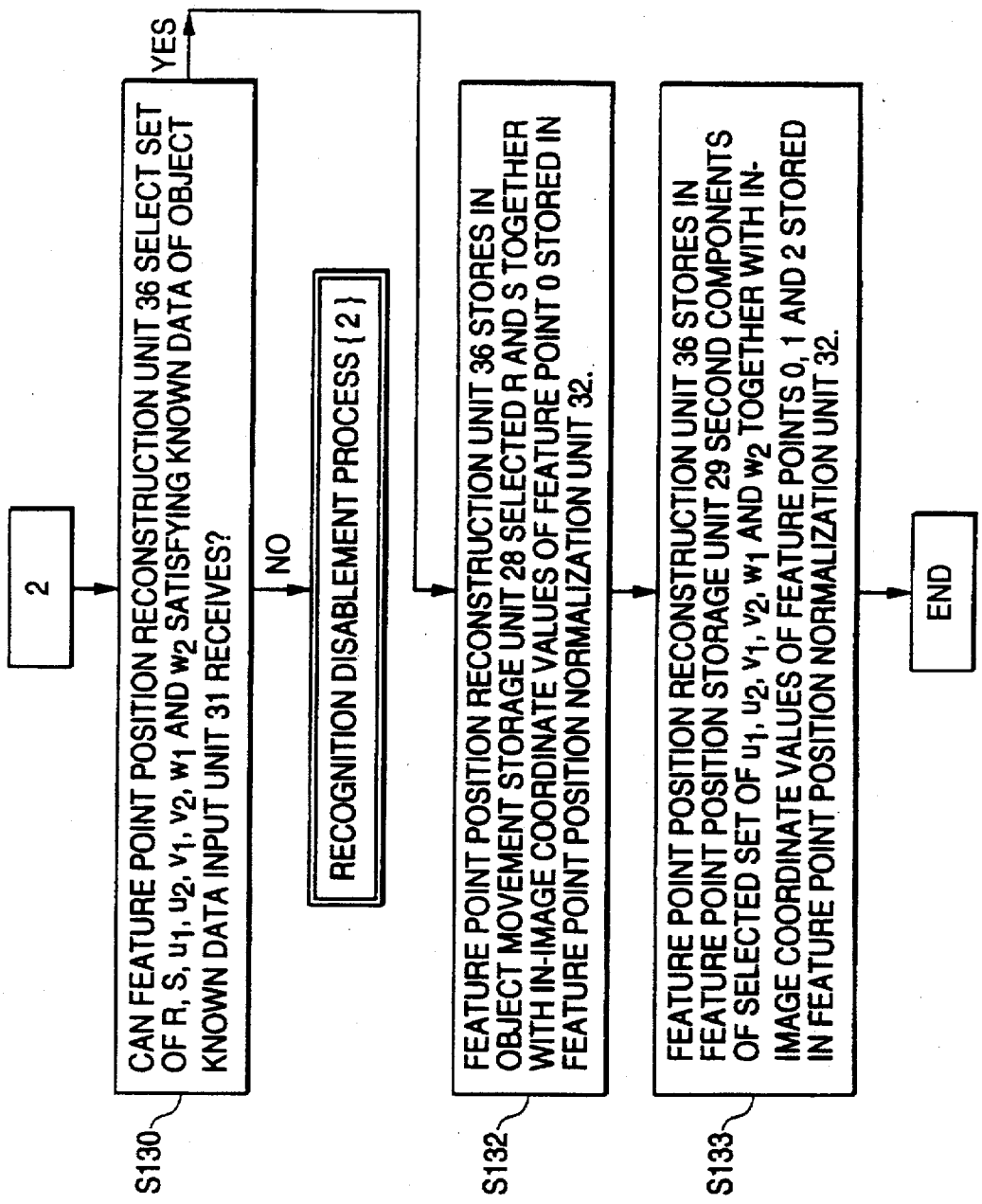
FIG. 52 is a third one of flowcharts showing in a three part series the whole processes of the shape/movement recognition unit 27 pursuant to the third form of this invention.

FIGS. 50, 51 and 52 are flowcharts showing in a three part series the whole processes of the shape movement recognition unit 27 pursuant to the third form of this invention.

In FIG. 27, when the processes start, the shape/movement recognition unit 27 determines in step S60 whether or not the known data input unit 31 shown in FIG. 12 has received at least one of the expressions {12}' through {15}', (1), (2) and (3). Here, generally, a satisfaction of expression {12}' is determined only after the calculation of rotation matrix R. However, the moving body recognition apparatus pursuant to the third form of this invention also has various sensors not explained in detail here, and determines whether the angle of rotation of the object from a first instant in time for observation to a second instant in time for observation is either zero degrees or one hundred and eighty degrees. Here, the prime signs in {12}', {13}' and {14}' represent equivalent transformations of {12}', {13} and {14} illustrated in the description of theorem 9.

Figure 53:
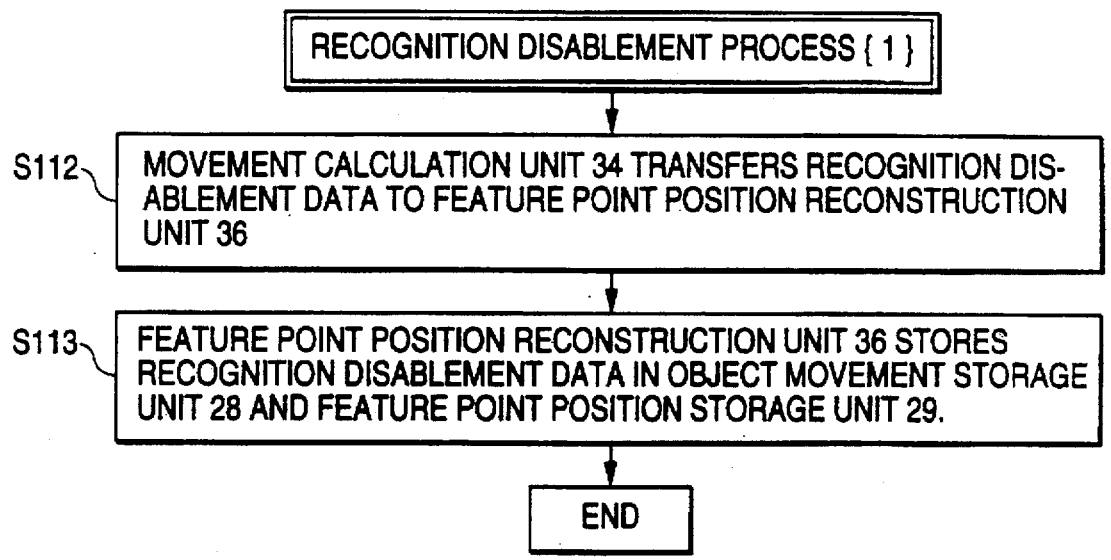
FIG. 53 is a flowchart of an embodiment of recognition disablement process {1} pursuant to the third form of this invention.

If the shape/movement recognition unit 27 determines in step S110 that the known data input unit 31 has received at least one of expressions {12}' through {15}', (1), (2) and (3), the known data input unit 31 outputs in step S111 a deactivation signal to the feature point position normalization unit 32, and stores recognition disablement data in the movement calculation unit 34, thereby invoking a recognition disablement process {1} shown in FIG. 53. The flow of recognition disablement process {1} for the third form of this invention is essentially the same as that shown in FIG. 17 for the first form of this invention.

FIG. 50 is a flowchart of an embodiment of recognition disablement process {1} pursuant to the third form of this invention.

On start of recognition disablement process {1}, the movement calculation unit 34 sends recognition disablement data to the feature point position reconstruction unit 36 in step S112. Then, the feature point position reconstruction unit 36 stores the recognition disablement data in the object movement storage unit 28 and the feature point storage unit 29 in step S63, thereby ending the process.

If the shape/movement recognition unit 27 determines in step S110 that the known data input unit 31 has received none of {12}' through {15}', (1), (2) and (3), the shape/movement recognition unit 27 the feature point position normalization unit 32, and stores recognition disablement data in the movement calculation unit 34, thereby invoking a recognition disablement process {1} shown in FIG. 53.

The flow of recognition disablement process {1} for the third form of this invention is essentially the same as that shown in FIG. 17 for the first form of this invention.

FIG. 50 is a flowchart of an embodiment of recognition disablement process {1} pursuant to the third form of this invention.

On start of recognition disablement process {1}, the movement calculation unit 34 sends recognition disablement data to the feature point position reconstruction unit 36 in step S112. Then, the feature point position reconstruction unit 36 stores the recognition disablement data in the object movement storage unit 28 and the feature point storage unit 29 in step S63, thereby ending the process.

If the shape/movement recognition unit 27 determines in step S110 that the known data input unit 31 has received none of {12}' through {15}', (1), (2) and (3), the shape/movement recognition unit 27 determines in step S114 whether or not the feature point storage unit 26 has stored all data on the positions of three feature points each in images captured at three instants in time for observation. The shape/movement recognition unit 27 repeats step S114 until it determines that the feature point storage unit 26 has stored the positions of three feature points each in images captured at three instants in time for observation. When the shape/movement recognition unit 27 determines positively (YES) that the feature point storage unit 26 has stored all data, the shape/movement recognition unit 27 sends an activation signal to the feature point position normalization unit 32, thereby activating the feature point position normalization unit 32.

In FIG. 51, the feature point position normalization unit 32 stores in step S116 data on the positions of the three feature points 0, 1 and 2, which the feature point position normalization unit 32 stores in the feature point storage unit 26, and obtains first components $u_{12}$, $v_{12}$ and $w_{12}$ of two-dimensional vectors $u_i$, $v_i$ and $w_i$ (where i=1, 2) as X coordinate values of feature points 1 and 2, which are instituted. Also, no further calculation is performed, when the shape/movement determination unit 33 determines in step S117 a recognition disablement by using only the in-image positions of feature points.

If the shape/movement determination unit 33 determines in step S117 that expressions {9}, {10} and {11} are all outstanding, the shape/movement determination unit 33 activates the movement calculation unit 34 in step S119, thereby invoking respective processes of the movement calculation unit 34 and the shape calculation unit 35, in accordance with theorem 10.

Figure 54:
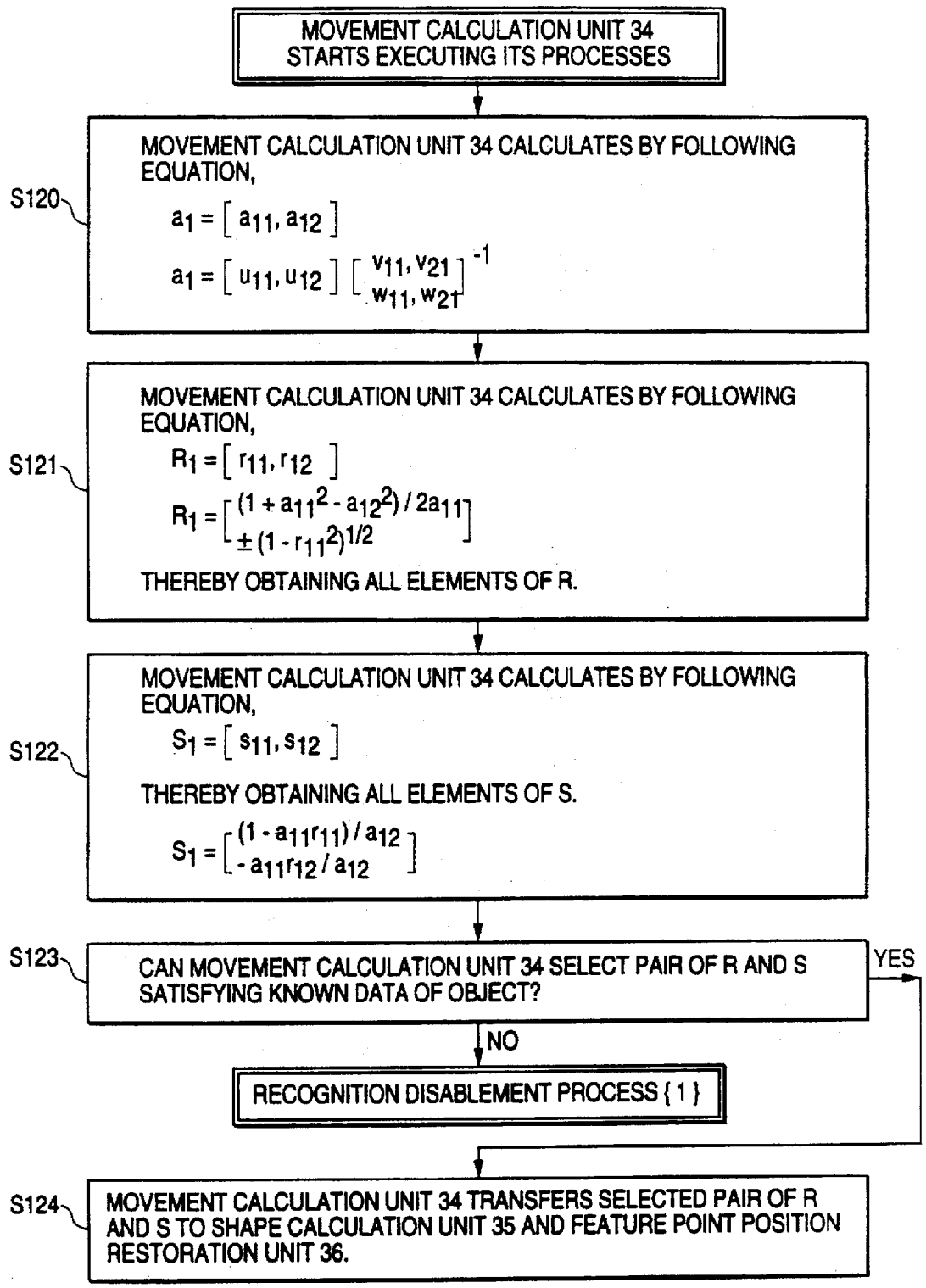
FIG. 54 is a flowchart of the movement calculation unit 34 pursuant to the third form of this invention.

FIG. 54 is a flowchart of the movement calculation unit 34 pursuant to the third form of this invention.

On start of its process, the movement calculation unit 34 calculates a first row vector $a_1$ in matrix a in step S120, rotation matrix R in step S121, and rotation matrix S in step S122. Then, the movement calculation unit 34 determines in step S123 whether or not at least one of calculation results of rotation matrices R and S satisfies the known data regarding the movement of an object inputted to the known data input unit 31. In this determination in step S123, the movement calculation unit 34 selects the appropriate one from the results of calculating rotation matrices R and S according to signals inputted from various sensors for detecting the movement of an object. If it determines in step S123 neither rotation matrix R nor rotation matrix S satisfies the known data, the movement calculation unit 34 invokes recognition disablement process {1} shown in FIG. 53.

The selection of either one of two sets of solutions, e.g. a rotation matrix R and its inverse rotation matrix $R^{-1}$, is pari passu the description of FIG. 19 pursuant to the first form of this invention.

If the movement calculation unit 34 determines in step S123 that there is a set of solutions that satisfies known data about the movement of an object, the movement calculation unit 34 sends the selected one of the results of calculating rotation matrices R and S to the shape calculation unit 35 and the feature point position reconstruction unit 36 in step S124.

Figure 55:
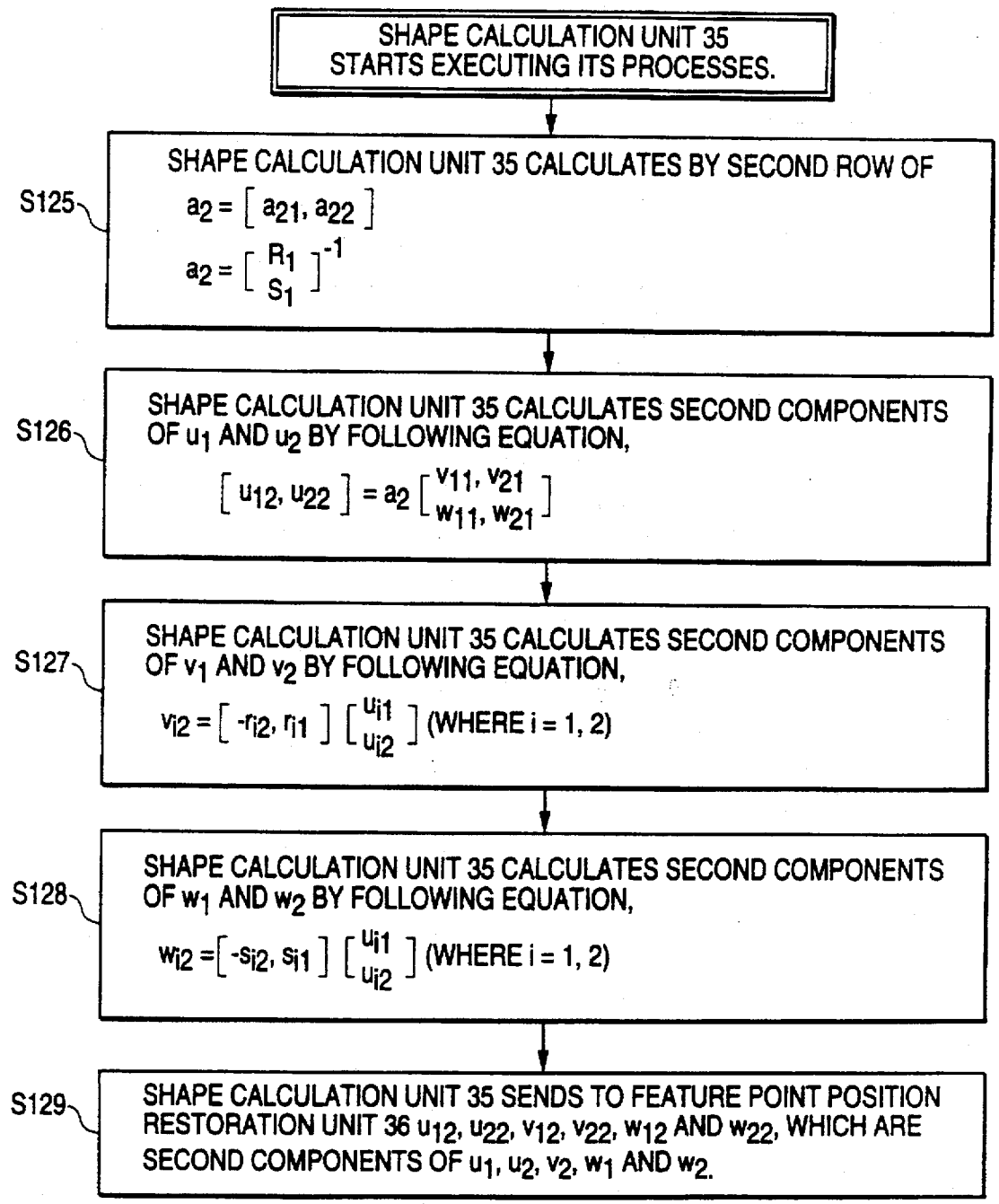
FIG. 55 is a flowchart of the shape calculation unit 35 pursuant to the third form of this invention.

FIG. 55 is a flowchart of the shape calculation unit 35 pursuant to the third form of this invention.

On start of its process, the shape calculation unit 35 obtains the second row of $a_2$ of matrix a in step S125. Based on the result obtained in step S125, the shape calculation unit 35 obtains $u_{12}$ and $u_{22}$ as the second components of two-dimensional vectors $u_1$ and $u_2$ in step S126, $v_{12}$ and $v_{22}$ as the second components of two-dimensional vectors $v_1$ and $v_2$ in step S127, $w_{12}$ and $w_{22}$ as the second components of two-dimensional vectors $w_1$ and $w_2$ in step S128. Then, in step S129 the shape calculation unit 35 sends to the feature point position reconstruction unit 36 the values of second components $u_{12}$, $u_{22}$, $v_{12}$, $v_{22}$, $w_{12}$ and $w_{22}$ of those two-dimensional vectors $u_1$, $u_2$, $v_1$, $v_2$, $w_1$ and $w_2$.

Returning to FIG. 52, the feature point position reconstruction unit 36 executes its processes from step S130, on completing the process of the shape calculation unit 35 shown in FIG. 51. In step S130, from the two-dimensional vectors $u_1$, $u_2$, $v_1$, $v_2$, $w_1$ and $w_2$, and rotation matrices R and S obtained as the result of calculating the shape and movement of an object, the feature point position reconstruction unit 36 selects the values matching the known data about the movement of the object inputted to the known data input unit 31. If it determines negatively (NO) in step S130 that such values exist, the feature point position reconstruction unit 36 invokes a recognition disablement process {2} shown in FIG. 56, which is essentially the same as that pursuant to the first form of this invention shown in FIG. 22.

Figure 56:
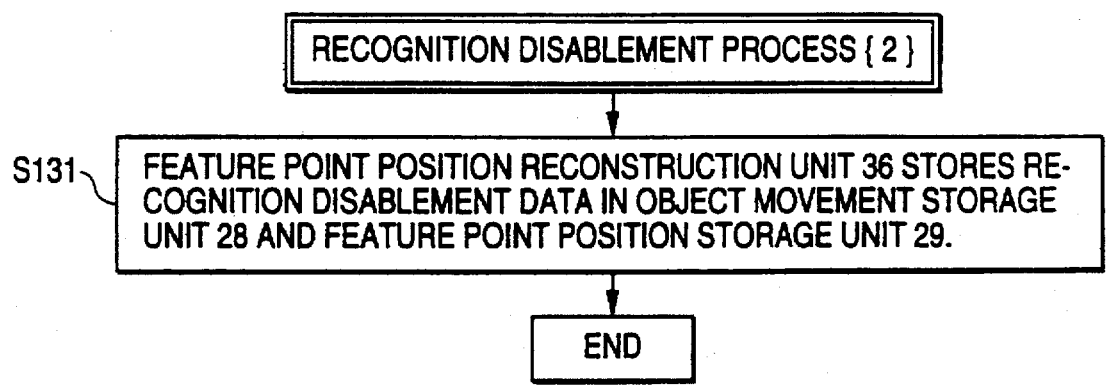
FIG. 56 is a flowchart of an embodiment of recognition disablement process {2} pursuant to the third form of this invention.

FIG. 56 is a flowchart of an embodiment of recognition disablement process {2} pursuant to the third form of this invention.

In step S131, the feature point position reconstruction unit 36 stores the recognition disablement data in the object movement storage unit 28 and the feature point position storage unit 29, thereby ending the process.

The shape calculation unit 35 selects either one from two sets of solutions, which are mirror image transformations of each other, based on the concave/convex data shown in FIG. 21.

Returning to FIG. 52, when the feature point position reconstruction unit 36 can select a calculation result satisfying the known data in step S130, the feature point position reconstruction unit 36 stores in the object movement storage unit 28 the values of elements of rotation matrices R and S in the selected set of solutions and the in-image coordinate values of feature point 0 in step S132, and in the feature point position storage unit 29 the values of the second components $u_{12}$, $u_{22}$, $v_{12}$, $v_{22}$, $w_{12}$ and $w_{22}$ of those two-dimensional vectors $u_1$, $u_2$, $v_1$, $v_2$, $w_1$ and $w_2$ in the selected set of solutions together with the coordinate values of the three feature points each in three images stored in the feature point position normalization unit 32 in step S133, thereby ending the process.

The above described embodiment assumes that a rotation around the origin of an object from a first instant in time for observation to a second instant in time for observation, which is represented by a rotation matrix R, is different from a rotation around the origin of an object from a first instant in time for observation to a third instant in time for observation, which is represented by a rotation matrix S.

However, these rotations can be equal, when an object maintains a steady rotating speed and equal time intervals spacing apart those instants in time for observation.

Under such a circumstance, when the known data input unit 31 receives data that the rotation of an object is constant, the movement calculation unit 34 may substitute the above calculation of rotation matrix R (in step S121 shown in FIG. 54) by Expression 41

$$R_1 = [r_{11} \ r_{12}] = [a_{11}/2 \pm (1-r_{11}^2)^{1/2}]$$

for reducing the processing load.

Further in this case, the calculation in step S120, which is Expression 42

$$a_1 = [a_{11}, a_{12}] = [u_{11}, u_{21}] \begin{bmatrix} v_{11} & v_{21} \\ w_{11} & w_{21} \end{bmatrix}^{-1}$$

is performed for obtaining only vector $a_1$ of a partial matrix, thereby calculating rotation matrix S by using an equation $S=R^2$ in lieu of going through step S122.

The above embodiment allows two sets of solutions to be calculated simultaneously when the movement calculation unit 34 calculates rotation matrix R in step S121. However, the above embodiment can be reconfigured, such that the movement calculation unit 34 obtains only one set of solutions in step S121.

In this alternative embodiment, the feature point position reconstruction unit 36 calculates a set of rotation matrices $R^{-1}$ and $S^{-1}$, which are the inverse to the set of rotation matrices R and S, according to the next expressions.

Expression 43

$$R^{-1} = \begin{bmatrix} r_{11} & -r_{12} \\ r_{12} & r_{11} \end{bmatrix} \ S^{-1} = \begin{bmatrix} s_{11} & -s_{12} \\ s_{12} & s_{11} \end{bmatrix}$$

Also, the other values of two-dimensional vectors $u_i'$, $v_i'$ and $w_i'$ (where i=1, 2), which are the mirror image transformations of $u_i$, $v_i$ and $w_i$ (where i=1, 2) with respect to the X axis are calculated by the next expressions.

Expression 44

$$u_i' = \begin{bmatrix} u_{i1} \\ -u_{i2} \end{bmatrix} \ v_i' = \begin{bmatrix} v_{i1} \\ -v_{i2} \end{bmatrix} \ w_i' = \begin{bmatrix} w_{i1} \\ -w_{i2} \end{bmatrix} \ (i=1,2)$$

This enables the feature point position reconstruction unit 36 to obtain two sets of solutions.

As described above, the third form of this invention allows the movement of an object from a positions of three feature points each in images of an object moving on a single plane coupled with a rotation captured at two instants in time for observation. As described in the description of FIG. 51, the shape/movement determination unit 33 can immediately determine whether or not a moving body can be recognized from the in-image positions of feature points.

The Fourth Form

Figure 57:
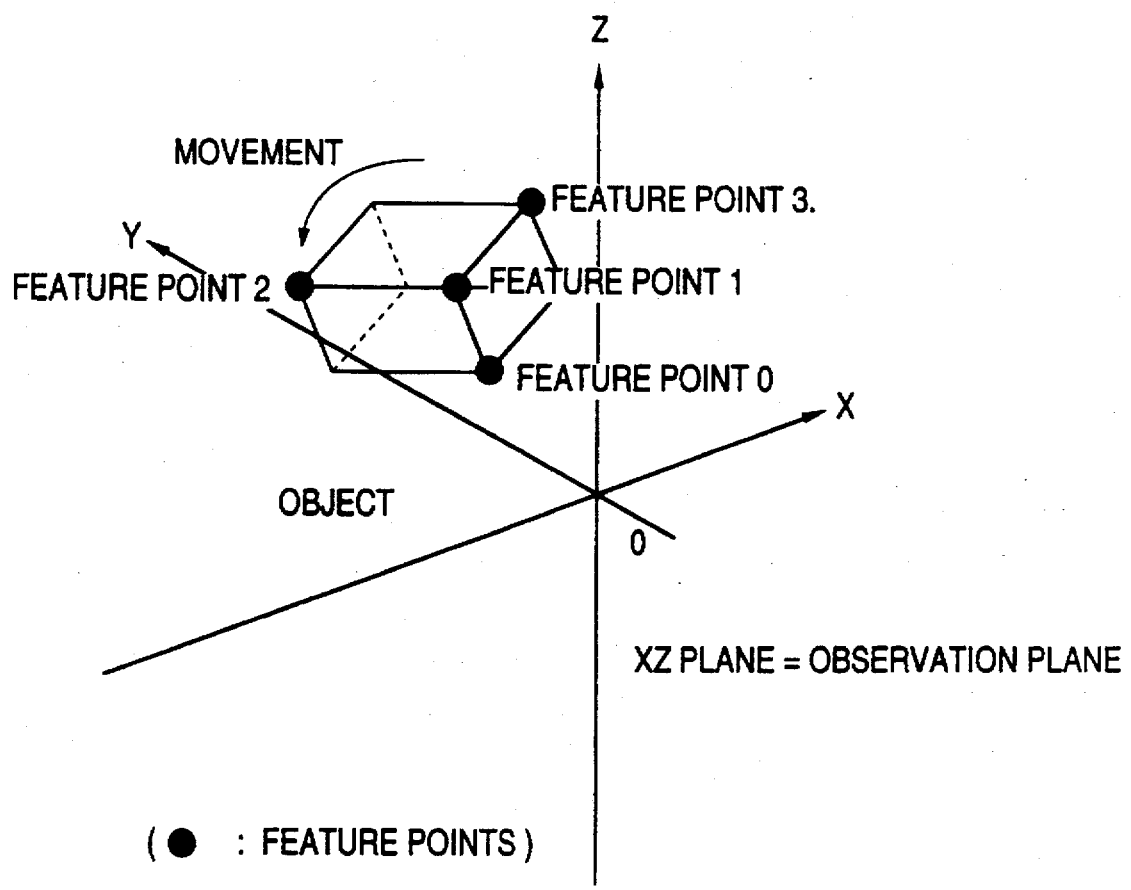
FIG. 57 shows a universal relation between an object and its observation plane in an image input unit pursuant to the fourth form of this invention.

FIG. 57 shows a universal relation between an object and its observation plane in an image input unit pursuant to the fourth form of this invention.

Embodiments of the fourth form of this invention are explained below. As described earlier, the fourth form of this invention is for recognizing a moving body in the most generic cases, in which the actual positions and movements of four feature points of an object are calculated by determining, from known position data on the four feature points each in orthogonally projected images captured at any three instants in time for observation, that the four feature points do not exist on the same plane, that the axis of rotation of an object is not parallel to the direction of the orthogonal projection between any two instants in time for observation of the three instants in time for observation, and that rotation of the object between any two instants in time for observation is not a rotation of one hundred and eighty degrees around the axis parallel to the plane on which the images are orthogonally projected.

As with the first, second and third forms of this invention, in the fourth form of this invention, an orthogonally projected image is used. Except the fact that the direction of observing an image is in the direction of the Y axis, the second form of this invention has no limitations on the rotation and movement of an object, unlike the first, second and third forms of this invention.

Figure 58:
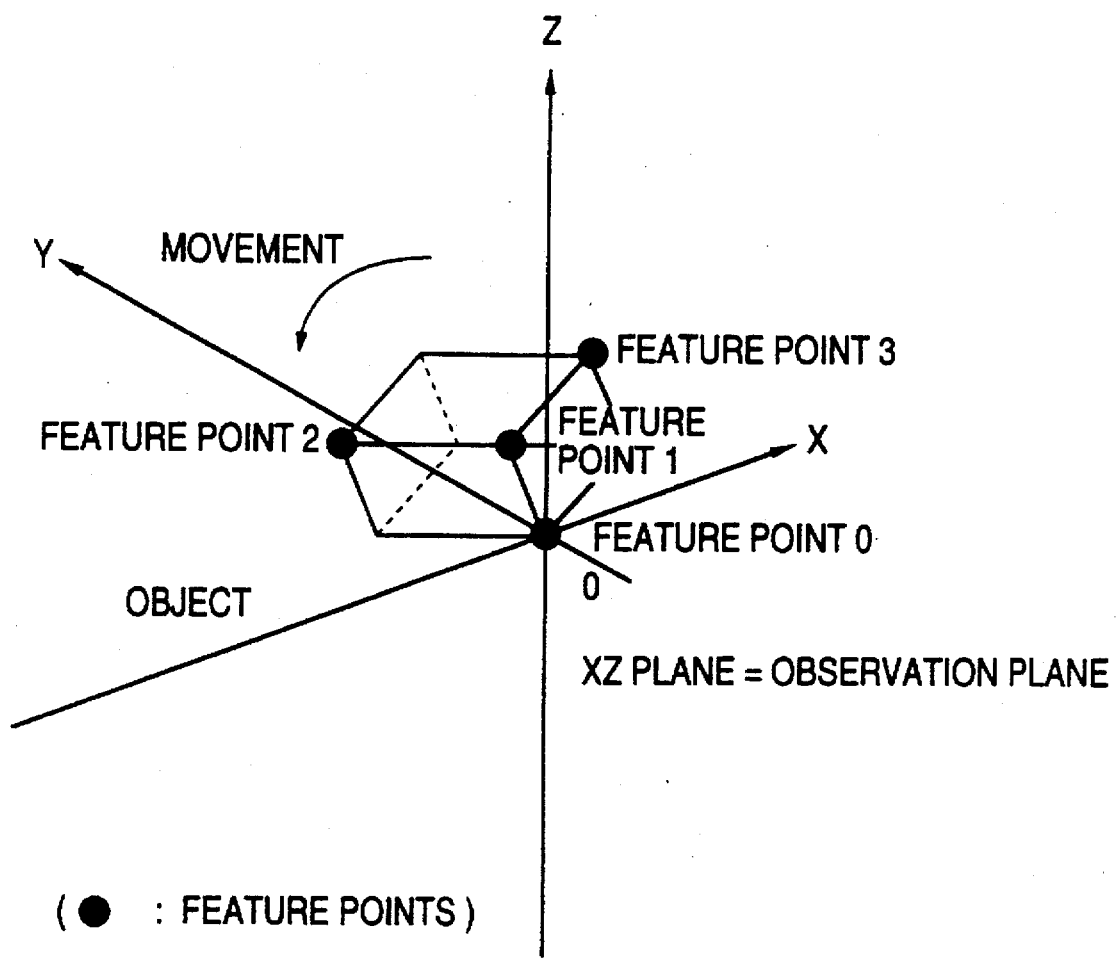
FIG. 58 shows a relation between an object and its observation plane pursuant to the fourth form of this invention, in which feature point 0 is fixed to the origin of a three-dimensional coordinate system.

FIG. 58 shows a relation between an observation plane and an object whose feature point 0 is fixed to the origin pursuant to the fourth form of this invention.

Figure 59:
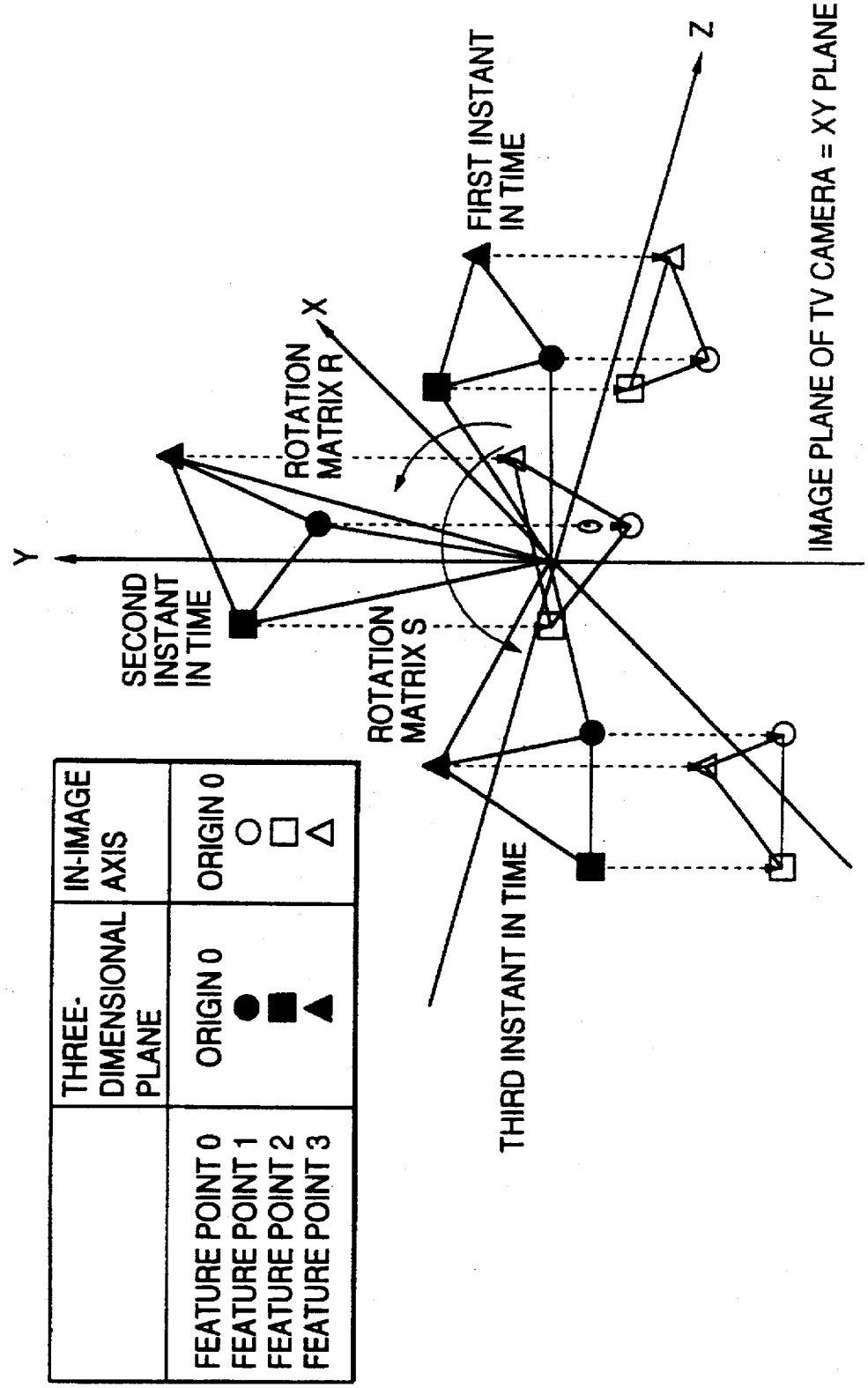
FIG. 59 shows orthogonal projections of feature points on the XZ plane pursuant to the fourth form of this invention.

FIG. 59 shows orthogonal projections of feature points on the XZ plane pursuant to the fourth form of this invention.

The displacements of an object in the directions of the X and Z axes are the same as those observed on an image plane. As shown in FIGS. 58 and 59, the angle of rotation of an object around the origin and the Y coordinate values of other three feature points (e.g. feature points 1, 2 and 3) when one feature point (e.g. feature point 0) moves to the origin are calculated by an expression A new theory for the fourth form of this invention is explained below. The theory discusses a problem of reconstructing the structure (positions of feature points) and movement of an object from observations of four feature points each in orthogonally projected images captured at three instants in time for observation. As described earlier, one feature point is fixed to the origin for a problem formulation.

FIG. 59 showing the relation between an object and the image axis illustrates a problem of obtaining the positions and rotations of three triangles in a three-dimensional space from three in-image triangles.

Codes are defined as follows.

Feature points 1, 2 and 3 are feature points other than feature point 0, which falls on the origin.

$u_1$, $u_2$ and $u_3$ represent three-dimensional vectors from the origin respectively to feature points 1, 2 and 3 at a first instant in time for observation.

$v_1$, $v_2$ and $v_3$ represent three-dimensional vectors from the origin respectively to feature points 1, 2 and 3 at a second instant in time for observation.

$w_1$, $w_2$ and $w_3$ represent three-dimensional vectors from the origin respectively to feature points 1, 2 and 3 at a third instant in time for observation.

Expression 10

The vector expressions are as follows.

$$u_i = \begin{bmatrix} u_{i1} \\ u_{i2} \\ u_{i3} \end{bmatrix} = \begin{bmatrix} u_i' \\ u_{i3} \end{bmatrix}, v_i = \begin{bmatrix} v_{i1} \\ v_{i2} \\ v_{i3} \end{bmatrix} = \begin{bmatrix} v_i' \\ v_{i2} \end{bmatrix}, w_i = \begin{bmatrix} w_{i1} \\ w_{i2} \\ w_{i3} \end{bmatrix} = \begin{bmatrix} w_i' \\ w_{i2} \end{bmatrix}$$

$(i = 1,2,3)$

It is assumed here that the first, second and third components respectively represent X, Z and Y coordinate values, instead of X, Y and Z coordinate values.

Rotation matrix R represents a three-dimensional rotation of an object around the origin from the first instant in time for observation to the second instant in time for observation.

Rotation matrix S represents a three-dimensional rotation of an object around the origin from the first instant in time for observation to the third instant in time for observation. Rotation matrices R and S are expressed as follows.

$$R = \begin{bmatrix} r_{11} & r_{12} & r_{13} \\ r_{21} & r_{22} & r_{23} \\ r_{31} & r_{32} & r_{33} \end{bmatrix} = \begin{bmatrix} r_1 \\ r_2 \\ r_3 \end{bmatrix} = \begin{bmatrix} R' \\ r_3 \end{bmatrix}$$

$$S = \begin{bmatrix} s_{11} & s_{12} & s_{13} \\ s_{21} & s_{22} & s_{23} \\ s_{31} & s_{32} & s_{33} \end{bmatrix} = \begin{bmatrix} s_1 \\ s_2 \\ s_3 \end{bmatrix} = \begin{bmatrix} S' \\ s_3 \end{bmatrix}$$

The reason why the Y coordinate values become third components of vectors here unlike a generic expression is because expansions of expressions are easier when the Y coordinate values become the third components of vectors, since it is the Y coordinate values that are unknown.

Accordingly, vector relations can be expressed as $v_i = R\, u_i$ and $w_i = S\, u_i$ (where i=1, 2, 3). That is,

| A first instant in time for observation | R | A second instant in time for observation | A first instant in time for observation | S | A third instant in time for observation |
|---|---|---|---|---|---|
| $u_1$ | → | $v_1$ | $u_1$ | → | $w_1$ |
| $u_2$ | → | $v_2$ | $u_2$ | → | $w_2$ |
| $u_3$ | → | $v_3$ | $u_3$ | → | $w_3$ |

Codes of rotation matrices R and S are defined as follows.

O(n) represents the entire class of orthogonal matrices.

SO(n) represents the entire class of n-dimensional rotation matrices.

A' is a matrix with the last row of A shed when A is a matrix having plural rows and plural columns, and a matrix with the last column (row) shed when A is a matrix having only one row (column).

$R_{ij}$ is an n−1-dimensional matrix obtained by shedding the i-th row and j-th column when R is an n-dimensional matrix.

Thus, the problem can be formulated as follows.

A Movement/Shape Recognition Problem

Assuming that $u_i$, $v_i$ and $w_i$ are three-dimensional vectors whose first and second components are known, where i=1, 2, 3, R and S are three-dimensional rotation matrices, such that $v_i = R\, u_i$, and $w_i = S\, u_i$, where i=1, 2, 3, obtain the third components of $u_i$, $v_i$ and $w_i$, where i=1, 2, 3 and rotation matrices R and S.

Expression 12

$$v_I = R u_I,\ w_i = S u_i\ (i = 1,2,3) \tag{1}$$

$$\begin{bmatrix} v_i' \\ w_i' \end{bmatrix} = \begin{bmatrix} R' \\ S' \end{bmatrix} u_1$$

$$\begin{bmatrix} v_1' & v_2' & v_3' \\ w_1' & w_2' & w_3' \end{bmatrix} = \begin{bmatrix} R' \\ S' \end{bmatrix} \begin{bmatrix} u_1' & u_2' & u_3' \\ u_{13} & u_{23} & u_{22} \end{bmatrix}$$

A next theorem 11 gives conditions for solving the problem.

Theorem 11

Next conditions {16}, {17} and {18} are necessary to prevent the above movement/shape recognition problem from degenerating in a sense of four points and three observations.

Expression 13

$$\operatorname{rank} \begin{bmatrix} u_1' & u_2' & u_3' \\ v_1' & v_2' & v_3' \end{bmatrix} = 3 \tag{16}$$

$$\operatorname{rank} \begin{bmatrix} v_1' & v_2' & v_3' \\ w_1' & w_2' & w_3' \end{bmatrix} = 3 \tag{17}$$

$$\operatorname{rank} \begin{bmatrix} w_1' & w_2' & w_3' \\ u_1' & u_2' & u_3' \end{bmatrix} = 3 \tag{18}$$

A next theorem 12 presents reasons of the conditions.

Theorem 12

{16}, {17} and {18} in theorem 11 are equivalent to {19} through {22}.

Expression 14

$$R \neq \begin{bmatrix} U & \\ \hline & \det U \end{bmatrix} \tag{19}$$

(where U is a two-dimensional orthogonal matrix.)

$$S \neq \begin{bmatrix} U & \\ \hline & \det U \end{bmatrix} \tag{20}$$

(where U is a two-dimensional orthogonal matrix.)

$$S \neq \begin{bmatrix} U & \\ \hline & \det U \end{bmatrix} R \tag{21}$$

(where U is a two-dimensional orthogonal matrix.)

{22}

$u_1$, $u_2$ and $u_3$ are linearly independent;

$v_1$, $v_2$ and $v_3$ are linearly independent; and $w_1$, $w_2$ and $w_3$ are linearly independent.

The meaning of {19} is as follows. "Rotation matrix R does not represent a rotation around the Y axis, which is the third axis, or a rotation whose angle around the axis of rotation on the XZ plane is one hundred and eighty degrees."

The meaning of {20} is as follows. "Rotation matrix S does not represent a rotation around the Y axis, which is the third axis, or a rotation whose angle around an axis of rotation on the XZ plane is one hundred and eighty degrees."

The meaning of {21} is as follows. "There is neither any rotation around the Y axis, which is the third axis from the second instant in time for observation to the third instant in time for observation, nor any rotation whose angle around the axis of rotation on the XZ plane is one hundred and eighty degrees."

The meaning of {22} is as follows. "The object has a three-dimensional shape."

The meanings of {19}, {20} and {21} will be described later in proofs of proposition 5 and lemma 8.

A next theorem 13 describes the equations for calculating the solution.

Theorem 13

Under conditions of theorems 11 and 12, a set of solutions is finalized according to next steps.

Expression 15

A first step is to calculate $$\begin{bmatrix} a_1 \\ a_2 \end{bmatrix}$$

When $$\begin{bmatrix} v_1' & v_2' & v_3' \\ w_{1p} & w_{2p} & w_{3p} \end{bmatrix}$$

is regular and $$[u_1\, u_2\, u_3,] \begin{bmatrix} v_1' & v_2' & v_3' \\ w_{1p} & w_{2p} & w_{3p} \end{bmatrix}^{-1} = \begin{bmatrix} a_{11} & a_{12} & a_{12} \\ a_{21} & a_{22} & a_{22} \\ a_{31} & a_{32} & a_{33} \end{bmatrix}$$

Select a single value for p ($1 \leq p \leq 2$), such that $$\begin{bmatrix} a_{11} & a_{12} \\ a_{21} & a_{22} \end{bmatrix}$$

becomes regular. When a selection of p fails, an attempt is made to select p by rotating the XY coordinate system by other than integer times of ninety degrees.
Expression 16

A second step is to calculate $$\begin{bmatrix} R \\ S_p \end{bmatrix}$$

There is an h ($1 \leq h \leq 2$), such that $a_{h3} \neq 0$.

The values of $\alpha_i$ ($1 \leq i \leq 2$), $\beta$ and $\Gamma$ are determined by next expressions.

$$\alpha_i = \left(1 + \sum_{k=1}^{2} a_{ik}^2 - a_{i3}^2\right)/2 \ (1 \leq i \leq 2)$$

$$\beta = (\beta_1\beta_2) = (a_{11}a_{23} - a_{21}a_{13},\ a_{12}a_{22} - a_{22}a_{12})$$

$$\Gamma = (\gamma_1\gamma_2\gamma_3) = (a_{23},\ -a_{13},\ 0)$$

{1} in second step is to calculate $$\begin{bmatrix} r_{11} & r_{12} \\ r_{21} & r_{22} \end{bmatrix}$$

When $a_{13} \neq 0$ and $a_{23} \neq 0$, $$\begin{bmatrix} r_{1i} \\ r_{2i} \end{bmatrix} = \begin{bmatrix} \beta \\ a_i' \end{bmatrix}^{-1} \begin{bmatrix} \gamma_1 \\ \alpha_1 \end{bmatrix} (1 \leq i \leq 2)$$

When $a_{13}=0$ and $a_{23}=0$, $$\begin{bmatrix} r_{11} \\ r_{21} \end{bmatrix} = \begin{bmatrix} \beta_1/a_{23} \\ \beta_2/a_{23} \end{bmatrix} \begin{bmatrix} r_{12} \\ r_{22} \end{bmatrix} = \begin{bmatrix} \beta \\ a_2' \end{bmatrix}^{-1} \begin{bmatrix} \gamma_2 \\ \alpha_2 \end{bmatrix}$$

When $a_{13} \neq 0$ and $a_{23}=0$, $$\begin{bmatrix} r_{11} \\ r_{21} \end{bmatrix} = \begin{bmatrix} \beta \\ a_1' \end{bmatrix}^{-1} \begin{bmatrix} \gamma_1 \\ \alpha_1 \end{bmatrix} \begin{bmatrix} r_{12} \\ r_{22} \end{bmatrix} = \begin{bmatrix} -\beta_1/a_{13} \\ -\beta_2/a_{13} \end{bmatrix}$$

Expression 17
{2} in second step is to calculate $$\begin{bmatrix} r_{13} \\ r_{23} \end{bmatrix}$$

$r_{13} = \pm(1 - r_{11}^2 - r_{12}^2)^{1/2}$ $r_{23} = $
 when $\Gamma_{13} \neq 0$; $-\beta_1\, r_{13}/\beta_2$
 when $\Gamma_{13} = 0$; $\pm(1 - r_{21}^2 - r_{22}^2)^{1/2}$ $$s_{pj} = \left(\delta_{hj} - \sum_{k=1}^{2} a_{hk} r_{kj}\right)/a_{h3} (1 \leq j \leq 3)$$

A third step is to calculate the third component of $u_1$, which is the third row of $$a_3 = \begin{bmatrix} R' \\ S_p \end{bmatrix}^{-1}$$

$$[u_{13}\, u_{23}\, u_{33}] = a_3 \begin{bmatrix} v_1' & v_2' & v_3' \\ w_{1p} & w_{2p} & w_{3p} \end{bmatrix}$$

A fourth step is to calculate S' ($1 \leq q \leq 2$, $q \neq p$)

$$s_p = [w_{1q}\, w_{2q}\, w_{3q}] = a_3 \begin{bmatrix} u_1' & u_2' & u_3' \\ u_{12} & u_{23} & u_{33} \end{bmatrix}^{-1}$$

A fifth step is to calculate R and S by next formulae.

$r_{3j} = (-1)^{3+j} \det R_{3j},\ s_{3j} = (-1)^{3+j} \det S_{3j}$

A sixth step is to calculate the third components of $v_i$ and $w_i$ by next formulae.

$v_{13} = r_3 \cdot u_1,\ w_{13} = s_3 \cdot u_1$

A next system 13.1 defines the relation between two sets of solutions.
System 13.1
When one of the two sets of solutions in theorem 13 is
Expression 18
R, S, $[u_{13}\, u_{23}\, u_{33}],\ [v_{13}\, v_{23}\, v_{33}],\ [w_{13}\, w_{23}\, w_{33}]$ Then, the other set of solutions is $$\begin{bmatrix} I_2 & \\ & -1 \end{bmatrix} R \begin{bmatrix} I_2 & \\ & -1 \end{bmatrix},\ \begin{bmatrix} I_2 & \\ & -1 \end{bmatrix} S \begin{bmatrix} I_2 & \\ & -1 \end{bmatrix} -$$

$[u_{13}\, u_{23}\, u_{33}] - [v_{13}\, v_{23}\, v_{33}] - [w_{13}\, w_{23}\, w_{33}]$ where $I_2$ is a two-dimensional identity matrix.

Figure 60A:
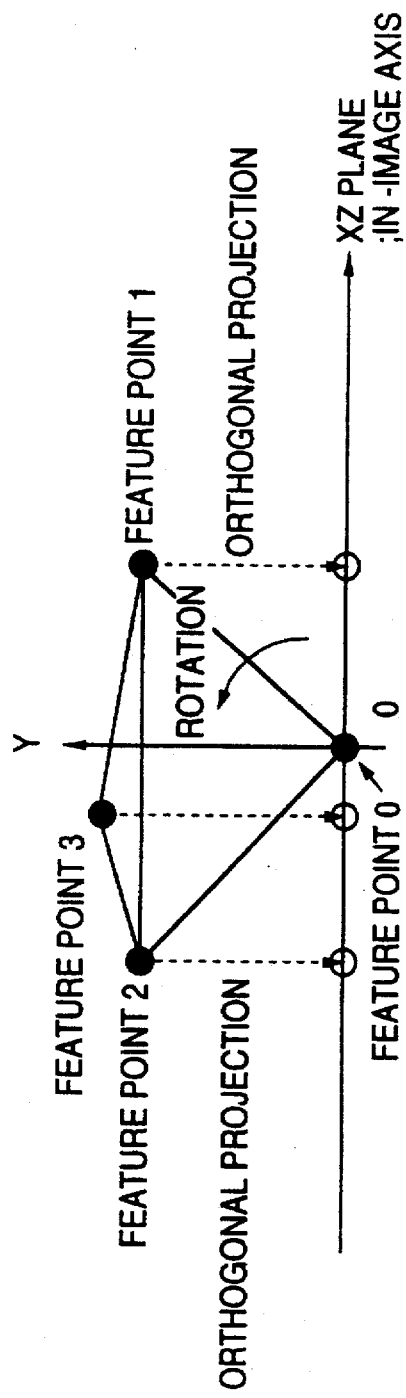
FIGS. 60A and 60B show two sets of solutions forming mirror image transformations of each other with respect to the XZ plane on which an image is projected pursuant to the fourth form of this invention.
Figure 60B:
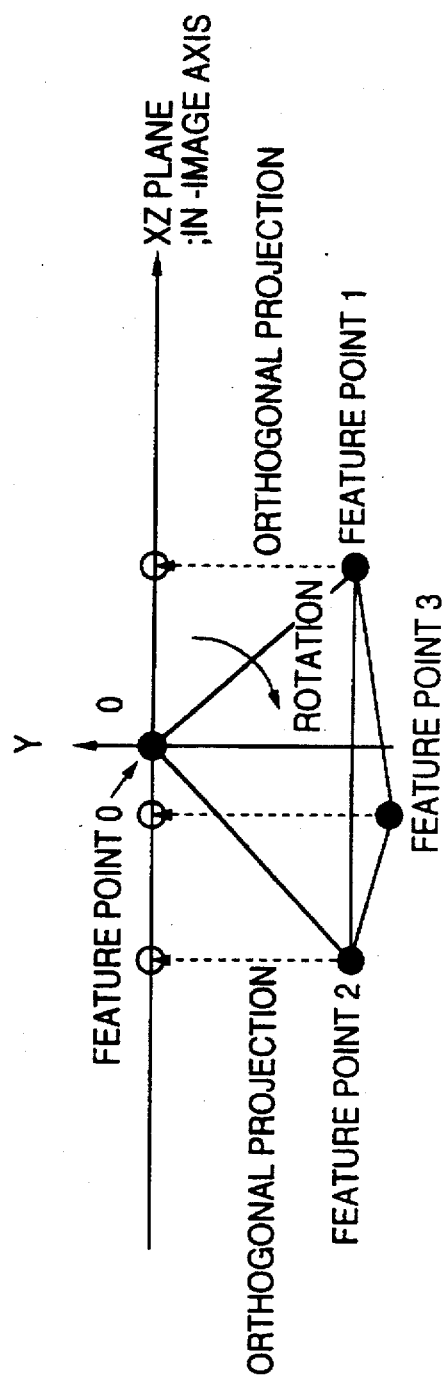

FIGS. 60A and 60B show two sets of solutions forming mirror image transformations of each other with respect to the XZ plane on which an image is projected pursuant to the fourth form of this invention.

The proofs of the above theorems are presented the sequence of proposition 4, theorem 12, theorem 13 and system 13.1.
Proposition 4
{19} through {22} in theorem 12 are necessary to prevent the above movement/shape recognition problem from degenerating in a sense of four points and three observations.

Proof of Proposition 4

It is shown that the movement/shape recognition problem degenerates into a problem in which the number of instants in time for observation is less than three or the number of observations is less than four, when conditions are not satisfied.

Expression 19

$$R \neq \begin{bmatrix} U \\ \hline \det U \end{bmatrix} \qquad \{19\}$$

$$v_i = Ru_1$$

(where U is a two-dimensional orthogonal matrix.)

$$\Longleftrightarrow \begin{bmatrix} v_1' \\ v_{13} \end{bmatrix} = \begin{bmatrix} U \\ \hline \det U \end{bmatrix} \begin{bmatrix} u_1' \\ u_{12} \end{bmatrix}$$

$$\Longleftrightarrow \begin{bmatrix} v_1' = U \cdot u_1' \\ v_{13} = \det U \cdot u_{13} \end{bmatrix} \quad (\det U = \pm 1)$$

Since $v_{i3}$ is unknown, there are no data for $u_{i3}$. Therefore, this degenerates into a shape/movement recognition problem comprising only $w_i = S u_i$.

Expression 20

$$S = \begin{bmatrix} U \\ \hline \det U \end{bmatrix} \qquad \{20\}$$

(where U is a two-dimensional orthogonal matrix.)

As with the case of {19}, this degenerates into a shape/movement recognition problem comprising only $v_i = R u_i$.

$$S = \begin{bmatrix} U \\ \hline \det U \end{bmatrix} R \qquad \{21\}$$

$$w_i = S u_1$$

(where U is a two-dimensional orthogonal matrix.)

$$\Longleftrightarrow \begin{bmatrix} w_1' \\ w_{13} \end{bmatrix} = \begin{bmatrix} U \\ \hline \det U \end{bmatrix} R u_1 \Longleftrightarrow \begin{bmatrix} w_1' \\ w_{13} \end{bmatrix} =$$

$$\begin{bmatrix} U \\ \hline \det U \end{bmatrix} v_1 \Longleftrightarrow \begin{bmatrix} w_1' = U \cdot v_1 \\ w_{12} = \det U \cdot v_{13} \end{bmatrix} \quad (\det U = \pm 1)$$

Since $w_{i3}$ and $v_{i3}$ are unknown, there are no data for $u_{i3}$. Therefore, this degenerates into a shape/movement recognition problem comprising only $v_i = R u_i$.

Expression 21

{22} When $u_1$, $u_2$ and $u_3$ are not linearly independent, the shape/movement recognition problem degenerates into:

$u_i$ is a linear combination of $u_1, \ldots, u_{i-1}, u_{i+1}, \ldots u_3$, for an existing i (where $1 \leq i \leq 3$), and $v_i = R u_i$ and $w_i = S u_i$ (i=1, 2, 3) $\Leftrightarrow v_i = R u_i$ and $w_i = S u_i$ (i=1, $\ldots$, i-1, i+1, $\ldots$, 3)

End of Proof

Proof of Theorem 12

Expression 22

$$\begin{bmatrix} v_1' & v_2' & v_3' \\ w_1' & w_2' & w_3' \end{bmatrix} = \begin{bmatrix} R \\ S \end{bmatrix} [u_1 \, u_2 \, u_3] \qquad (1)$$

From $w_i = S u_i = S R^{-1} v_i$ and $u_i = R^{-1} v_i$, $$\begin{bmatrix} w_1' & w_2' & w_3' \\ u_1' & u_2' & u_3' \end{bmatrix} = \begin{bmatrix} (SR^{-1})' \\ R^{-1'} \end{bmatrix} [v_1 \, v_2 \, v_3] \qquad (1)'$$

From $u_i = S^{-1} w_i$ and $v_i = R u_i = R S^{-1} w_i$, $$u_i = S^{-1} w_i, \, v_i = R u_i = R S^{-1} w_i$$

$$\begin{bmatrix} u_1' & u_2' & u_3' \\ v_1' & v_2' & v_3' \end{bmatrix} = \begin{bmatrix} S^{-1'} \\ (RS^{-1})' \end{bmatrix} [w_1 \, w_2 \, w_3] \qquad (1)''$$

Therefore, {16}, {17} and {18} are equivalent to <1> through <6>. (This is because for a matrix product AB, rank $AB \leq$ rank A, rank B.)

$$\text{rank} \begin{bmatrix} R' \\ S' \end{bmatrix} = 3 \qquad <1>$$

$u_1$, $u_2$ and $u_3$ are linearly independent. <2>

$$\text{rank} \begin{bmatrix} (SR^{-1})' \\ R^{-1'} \end{bmatrix} = 3 \qquad <3>$$

$v_1$, $v_2$ and $v_3$ are linearly independent. <4>

$$\text{rank} \begin{bmatrix} S^{-1'} \\ (RS_{-1})' \end{bmatrix} = 3 \qquad <5>$$

$w_1$, $w_2$ and $w_3$ are linearly independent. <6>

$$[v_1 \, v_2 \, v_3] = R[u_1 \, u_2 \, u_3]$$
$$[w_1 \, w_2 \, w_3] = S[u_1 \, u_2 \, u_3]$$

Therefore, <2>, <4> and <6> are equivalent to each other. {22}

From lemma 6, <1>, <3> and <5> are equivalent to {21}, {20} and {19}.

$$S \neq \begin{bmatrix} U \\ \hline \det U \end{bmatrix} R \qquad (21)$$

$$R^{-1} \neq \begin{bmatrix} U \\ \hline \det U \end{bmatrix} SR^{-1} \Leftrightarrow S \neq \begin{bmatrix} U \\ \hline \det U \end{bmatrix} \qquad (20)$$

$$RS^{-1} \neq \begin{bmatrix} U \\ \hline \det U \end{bmatrix} S^{-1} \Leftrightarrow R \neq \begin{bmatrix} U \\ \hline \det U \end{bmatrix} \qquad (19)$$

End of Proof

Expression 24

When $$\begin{bmatrix} v_1' & v_2' & v_3' \\ w_{1p} & w_{2p} & w_{3p} \end{bmatrix}$$

is regular, and $$[u_1 \, u_2 \, u_3] \begin{bmatrix} v_1' & v_2' & v_3' \\ w_{1p} & w_{2p} & w_{3p} \end{bmatrix}^{-1} = \begin{bmatrix} a_{11} & a_{12} & a_{13} \\ a_{21} & a_{22} & a_{23} \\ a_{31} & a_{32} & a_{33} \end{bmatrix}$$

select one value of p ($1 \leq p \leq 2$), such that $$\begin{bmatrix} a_{11} & a_{12} \\ a_{21} & a_{22} \end{bmatrix}$$

is regular.

When it cannot select one, select a value of p by rotating the XY coordinate system by other than integer times of ninety degrees. Lemma 7 shows a value of p can be thus selected.

$$\begin{bmatrix} v_1' & v_2' & v_3' \\ w_{1p} & w_{2p} & w_{3p} \end{bmatrix} = \begin{bmatrix} R' \\ S_p \end{bmatrix} [u_1 \, u_2 \, u_3] \quad (2)$$

$$\begin{bmatrix} R \\ S_p \end{bmatrix}^{-1} = [u_1 \, u_2 \, u_3] \begin{bmatrix} v_1' & v_2' & v_3' \\ w_{1p} & w_{2p} & w_{3p} \end{bmatrix}^{-1}$$

By expressing $$\begin{bmatrix} R \\ S_p \end{bmatrix}^{-1} = \begin{bmatrix} a_1 \\ a_2 \\ a_3 \end{bmatrix} = \begin{bmatrix} a_{11} & a_{12} & a_{13} \\ a_{21} & a_{22} & a_{23} \\ a_{31} & a_{32} & a_{33} \end{bmatrix}$$

$$\begin{vmatrix} a_{11} & a_{12} \\ a_{21} & a_{22} \end{vmatrix} \neq 0$$

$$\begin{bmatrix} a_1 \\ a_2 \end{bmatrix} = [u_1' \, u_2' \, u_3'] \begin{bmatrix} v_1' & v_2' & v_3' \\ w_{1p} & w_{2p} & w_{3p} \end{bmatrix}^{-1}$$

The formulae for calculating $$\begin{bmatrix} R \\ S_p \end{bmatrix}$$

can be deducted from this. However, since the deductive process is long, it is shown at the end of the proof. (Refer to steps 1 through 6.)

Therefore, $a_3$ can be calculated.
Expression 25

From (2), $$\begin{bmatrix} R \\ S_p \end{bmatrix}^{-1} \begin{bmatrix} v_1' & v_2' & v_3' \\ w_{1p} & w_{2p} & w_{3p} \end{bmatrix} = \begin{bmatrix} u_1' & u_2' & u_3' \\ u_{12} & u_{22} & u_{32} \end{bmatrix}$$

Therefore, $$[u_{13} \, u_{23} \, u_{33}] = a_3 \begin{bmatrix} v_1' & v_2' & v_3' \\ w_{1p} & w_{2p} & w_{3p} \end{bmatrix}$$

$$\begin{bmatrix} v_1' & v_2' & v_3' \\ w_1' & w_2' & w_3' \end{bmatrix} = \begin{bmatrix} R' \\ S' \end{bmatrix} \begin{bmatrix} u_1' & u_2' & u_3' \\ u_{12} & u_{22} & u_{32} \end{bmatrix}$$

From (1)

$$\begin{bmatrix} R \\ S' \end{bmatrix} = \begin{bmatrix} v_1' & v_2' & v_3' \\ w_1' & w_2' & w_3' \end{bmatrix} \begin{bmatrix} u_1' & u_2' & u_3' \\ u_{12} & u_{22} & u_{32} \end{bmatrix}^{-1}$$

Therefore, $s_q$, such that $1 \leq q \leq 2$ and $q \neq p$, is obtained from $$s_q = [w_{1q} \, w_{2q} \, w_{3q}] \begin{bmatrix} u_1' & u_2' & u_3' \\ u_{12} & u_{22} & u_{32} \end{bmatrix}^{-1}$$

Since R' and S' are obtained, R and S are obtained from lemma 5.

From conditional expressions, $$v_{13} = r_3 \cdot u_1, \quad w_{13} = s_3 \cdot u_1$$

Therefore, $[v_{13} \, v_{23} \, v_{33}]$, $[w_{13} \, w_{23} \, w_{33}]$ is also obtained.

Steps 1 through 6 below describe the procedure for deducting the remaining formulae for calculating $$\begin{bmatrix} R \\ S_p \end{bmatrix}.$$

First, $r_i$ is determined by deducting simultaneous linear equations only of $r_i$, whose result is used for obtaining $s_p$.
Expression 26
By definition, $$\begin{bmatrix} a_1 \\ a_2 \end{bmatrix} \begin{bmatrix} r_1 \\ r_2 \\ s_p \end{bmatrix} = \begin{bmatrix} 1 & 0 & 0 \\ 0 & 1 & 0 \end{bmatrix}$$

The ij component is $$\sum_{k=1}^{2} a_{ik} r_{kj} + a_{i3} s_{pj} = \delta_{ij} (1 \leq i \leq 2, 1 \leq j \leq 3) \quad (3)$$

Here, when $i=j$, $\delta_{ij}=1$, and when $i \neq j$, $\delta_{ij}=0$
By transforming (3), $$a_{i3} s_{pj} = \delta_{ij} - \sum_{k=1}^{2} a_{ik} r_{kj} (1 \leq i \leq 2, 1 \leq j \leq 3) \quad (3)'$$

Expression 27

Step 1

$$a_i' \begin{bmatrix} r_{1i} \\ r_{2i} \end{bmatrix} = \alpha_i (1 \leq i \leq 2)$$

where $$\alpha_i = \left( 1 + \sum_{k=1}^{2} a_{ik}^2 - a_{i3}^2 \right) / 2$$

By squaring both sides of (3)', $$(a_{i3} s_{pj})^2 = \left( \delta_{ij} - \sum_{k=1}^{2} a_{ik} r_{kj} \right)^2$$

When an addition is performed with respect to j,

The left side $= \sum_{j=1}^{3} (a_{i3} s_{pj})^2 = \sum_{j=1}^{3} \left( \delta_{ij} - \sum_{k=1}^{2} a_{ik} r_{kj} \right)^2$ The right side $= a_{i3}^2 (s_p, s_p) = a_{i3}^2$ $$\sum_{j=1}^{3} \left( \delta_{ij}^2 + \sum_{k=1}^{2} a_{ik}^2 r_{kj}^2 - 2 \delta_{ij} \sum_{k=1}^{2} a_{ik} r_{kj} + 2 a_{i1} a_{i2} r_{1j} r_{2j} \right) =$$

$$\sum_{j=1}^{2} \delta_{ij}^2 + \sum_{k=1}^{2} a_{ik}^2 \sum_{j=1}^{3} r_{kj}^2 - 2\sum_{j=1}^{3} \delta_{ij} \sum_{k=1}^{2} a_{ik}r_{kj} + 2a_{11}a_{12}\sum_{j=1}^{2} r_{1j}r_{2j} =$$

$$1 + \sum_{k=1}^{2} a_{ik}^2 - 2\sum_{k=1}^{2} a_{ik}r_{ki}$$

That is, $$a_{i3}^2 = 1 + \sum_{k=1}^{2} a_{ik}^2 - 2\sum_{k=1}^{2} a_{ik}r_{ki}$$

$$\sum_{k=1}^{2} a_{ik}r_{ki} = \left(1 + \sum_{k=1}^{2} a_{ik}^2 - a_{i3}^2\right)/2$$

$$(a_{i1}, a_{i2})\begin{bmatrix} r_{11} \\ r_{21} \end{bmatrix} = \alpha_i, \, a_i' \begin{bmatrix} r_{11} \\ r_{21} \end{bmatrix} = \alpha_i$$

$(1 \leq i \leq 2)$

Expression 29

Step 2

$$\beta \begin{bmatrix} r_1 \\ r_2 \end{bmatrix} = \gamma \quad (5)$$

$$\beta_k = \begin{vmatrix} a_{1k} & a_{12} \\ a_{2k} & a_{22} \end{vmatrix} = a_{1k}a_{23} - a_{2k}a_{12}$$

$\beta = (\beta_1, \beta_2) = (a_{11}a_{22} - a_{21}a_{12}, a_{12}a_{k2} - a_{22}a_{12})$
$\gamma = (\gamma_1, \gamma_2, \gamma_3) = (a_{23}, -a_{12}, 0)$ By replacing i with 1 and 2 in (3), for j, which is $1 \leq j \leq 3$,
Expression 30

$$\begin{bmatrix} \sum_{k=1}^{2} a_{1k}r_{kj} + a_{13}s_{pj} = \delta_{1j} \\ \sum_{k=1}^{2} a_{2k}r_{kj} + a_{23}s_{pj} = \delta_{2j} \end{bmatrix}$$

$s_{pj}$ is eliminated by (the upper equation)$\times a_{23}$ − (the lower equation)$\times a_{13}$, $$\sum_{k=1}^{2} \begin{vmatrix} a_{1k} & a_{13} \\ a_{2k} & a_{23} \end{vmatrix} r_{kj} = \begin{vmatrix} \delta_{1j} & a_{13} \\ \delta_{2j} & a_{23} \end{vmatrix},$$

$$\sum_{k=1}^{2} \beta_k r_{kj} = \gamma_j, (\beta_1, \beta_2) \begin{bmatrix} r_1 \\ r_2 \end{bmatrix} = (\gamma_1, \gamma_2, \gamma_3)$$

Expression 31

Step 3

$$\sum_{k=1}^{2} \gamma_k r_{ik} = \beta_i \quad (6)$$

$(1 \leq i \leq 2)$

Assuming $1 \leq i$, $h \leq 2$, $i \neq h$ and $1 \leq j \leq 3$, From (5)

$\beta_i r_{ij} + \beta_h r_{hj} = \gamma_j$ $\beta_h r_{hj} = \gamma_j - \beta_i r_{ij}$ Expression 32

Substituting into $\sum_{j=1}^{3} r_{ij}r_{hj} = 0$,

Since $\sum_{j=1}^{3} r_{ij}(\gamma_j - \beta_i r_{ij}) = 0 \sum_{j=1}^{3} \gamma_j r_{ij} = \beta_i$ Because $\gamma_3 = 0$, $\sum_{k=1}^{2} \gamma_k r_{ik} = \beta_i$ by further replacing j with k,
Expression 33
Step 4

$a_{13} \neq 0$ or $a_{23} \neq 0$

If $a_{i3} = 0$, (where $1 \leq i \leq 2$)
Expression 34
The third column of $$\begin{bmatrix} r_1 \\ r_2 \\ S_p \end{bmatrix} \begin{bmatrix} a_1 \\ a_2 \\ a_3 \end{bmatrix} = \begin{bmatrix} 1 & 0 & 0 \\ 0 & 1 & 0 \\ 0 & 0 & 1 \end{bmatrix} \text{ is } \begin{bmatrix} r_{13} \\ r_{23} \\ S_{p3} \end{bmatrix} a_{33} = \begin{bmatrix} 0 \\ 0 \\ 1 \end{bmatrix}$$

Because $s_{p3}a_{33}=1$, $a_{33} \neq 0$ Therefore, $$\begin{bmatrix} r_{13} \\ r_{23} \end{bmatrix} = \begin{bmatrix} \sigma \\ 0 \end{bmatrix} R = \begin{bmatrix} U \\ \hline del\, U \end{bmatrix}$$

This contradicts with the assumption.
Expression 35

Step 5

$$\begin{bmatrix} r_{11} & r_{12} \\ r_{21} & r_{22} \end{bmatrix};$$

When $a_{13} \neq 0$ and $a_{23} \neq 0$, $$\begin{bmatrix} r_{11} \\ r_{12} \end{bmatrix} = \begin{bmatrix} \beta \\ a_i' \end{bmatrix}^{-1} \begin{bmatrix} \gamma_i \\ \alpha_i \end{bmatrix}$$

$(1 \leq i \leq 2)$

When $a_{13} = 0$ and $a_{23} \neq 0$ $$\begin{bmatrix} r_{11} \\ r_{21} \end{bmatrix} = \begin{bmatrix} \beta_1/a_{23} \\ \beta_2/a_{23} \end{bmatrix} \quad \begin{bmatrix} r_{12} \\ r_{22} \end{bmatrix} = \begin{bmatrix} \beta \\ a_2' \end{bmatrix}^{-1} \begin{bmatrix} \gamma_2 \\ \alpha_2 \end{bmatrix}$$

When $a_{13} \neq 0$ and $a_{23} = 0$ $$\begin{bmatrix} r_{11} \\ r_{21} \end{bmatrix} = \begin{bmatrix} \beta_2 \\ a_i' \end{bmatrix}^{-1} \begin{bmatrix} \gamma_1 \\ \alpha_i \end{bmatrix} \quad \begin{bmatrix} r_{12} \\ r_{22} \end{bmatrix} = \begin{bmatrix} -\beta_1/a_{13} \\ -\beta_2/a_{13} \end{bmatrix}$$

$r_{13} = \pm(1 - r_{11}^2 - r_{12}^2)^{1/2}$ $$\begin{bmatrix} r_{13} \\ r_{23} \end{bmatrix}; r_{23} = \begin{bmatrix} \text{When } r_{13} \neq 0; -\beta_i r_{13}/\beta_2 \\ \text{When } r_{13} = 0; \pm(1 - r_{21}^2 - r_{22}^2)^{1/2} \end{bmatrix}$$

When one set of the solutions is expressed as $$\begin{bmatrix} r_{13} \\ r_{23} \end{bmatrix}$$

Then the other set of solutions is expressed as $$\begin{bmatrix} r_{13} \\ r_{33} \end{bmatrix}$$

To reiterate (4), (5) and (6),
Expression 36

$$a_i, \begin{bmatrix} r_{11} \\ r_{21} \end{bmatrix} = \alpha_i \ (1 \leq i \leq 2) \quad (4)$$

$$\beta \begin{bmatrix} r_1 \\ r_1 \end{bmatrix} = \tau \quad (5)$$

$$(\gamma, r_i') = \beta_i \ (1 \leq i \leq 2) \quad (6)$$

Because $$\begin{bmatrix} a_{23}r_{11} - a_{12}r_{12} = \beta_1 \\ a_{23}r_{21} - a_{12}r_{22} = \beta_2 \end{bmatrix},$$

From columns 1 and 2 of (4) and (5),
Expression 37

$$\begin{bmatrix} \beta \\ a_i' \end{bmatrix} \begin{bmatrix} r_{11} \\ r_{21} \end{bmatrix} = \begin{bmatrix} \tau_i \\ \alpha_i \end{bmatrix} (1 \leq i \leq 2)$$

When $$\left| \begin{matrix} \beta \\ a_i' \end{matrix} \right| \neq 0 \begin{bmatrix} r_{11} \\ r_{21} \end{bmatrix}$$

can be calculated uniquely.

$$\left| \begin{matrix} \beta \\ a_i' \end{matrix} \right| = \left| \begin{matrix} \beta_1 & \beta_2 \\ a_{11} & a_{12} \end{matrix} \right| = \beta_1 a_{12} - \beta_2 a_{11} = \left| \begin{matrix} a_{12} & a_{13} \\ a_{21} & a_{22} \end{matrix} \right| a_{12} - \left| \begin{matrix} a_{13} & a_{13} \\ a_{22} & a_{22} \end{matrix} \right| a_{13} = \left| \begin{bmatrix} a_{11} \\ a_{21} \end{bmatrix} a_{13} - \begin{bmatrix} a_{12} \\ a_{22} \end{bmatrix} a_{11} \right| a_{13}$$

When $i = 1$ $a_{13} \left| \begin{matrix} a_{11} & a_{12} \\ a_{12} & a_{22} \end{matrix} \right| = \left| \begin{matrix} a_{11} & a_{12} \\ a_{11} & a_{12} \end{matrix} \right| a_{12}$ When $i = 2$ $a_{23} \left| \begin{matrix} a_{11} & a_{12} \\ a_{21} & a_{22} \end{matrix} \right| = \left| \begin{matrix} a_{21} & a_{23} \\ a_{11} & a_{13} \end{matrix} \right| a_{23}$ Expression 38
When $a_{13} \neq 0$ and $a_{23} \neq 0$,
From (7), $$\begin{bmatrix} r_{11} & r_{12} \\ r_{21} & r_{22} \end{bmatrix}$$

is obtained uniquely.
When $a_{13}=0$ and $a_{23} \neq 0$,
From (6)'

$$\begin{bmatrix} r_{11} \\ r_{21} \end{bmatrix}, = \begin{bmatrix} \beta_1/a_{23} \\ \beta_2/a_{23} \end{bmatrix}$$

From $i=2$ in (7), $$\begin{bmatrix} r_{12} \\ r_{22} \end{bmatrix}$$

is determined.
When $a_{13} \neq 0$ and $a_{23}=0$,

From $i=1$ in (7), $$\begin{bmatrix} r_{11} \\ r_{21} \end{bmatrix}$$

is determined.
From (6)'

$$\begin{bmatrix} r_{12} \\ r_{22} \end{bmatrix} = \begin{bmatrix} -\beta_1/a_{13} \\ -\beta_2/a_{13} \end{bmatrix}$$

(any combinations)

$$\begin{bmatrix} r_{13} \\ r_{23} \end{bmatrix}; \begin{matrix} r_{13} = \pm (1 - r_{11}^2 - r_{12}^2)^{1/2} \\ r_{23} = \pm (1 - r_{21}^2 - r_{22}^2)^{1/2} \end{matrix}$$

From column 3 in (5), $$\beta_1 r_{13} + \beta_2 r_{23} = 0 \ (\because \gamma_3 = 0)$$

Because $$\beta_2 = \left| \begin{matrix} a_{12} & a_{13} \\ a_{22} & a_{23} \end{matrix} \right|$$

From the relation of an inverse matrix,
$\beta_2 = 0 \Longleftrightarrow r_{13} = 0$
When $r_{13} \neq 0$, $\beta_2 \neq 0$,
From $r_{23} = -\beta_1 r_{13}/\beta_2$ The sign of $r_{23}$ is determined. Therefore, when one set of solutions for $r_{13}$ and $r_{23}$ is expressed as $(r_{13}, r_{23})$, every set of solutions can be expressed as $(\pm r_{13}, \pm r_{23})$.
Expression 39

Step 6

For an i ($1 \leq i \leq 2$) such that $a_{i3} \neq 0$, because $$s_{pj} = \left( \delta_{ij} - \sum_{k=1}^{2} a_{ik} r_{kj} \right) / a_{i3} (1 \leq j \leq 3)$$

$s_p$ is obtained from $r_1$ and $r_2$.
When $$\begin{bmatrix} r_1 \\ r_2 \end{bmatrix} \begin{bmatrix} r_{11} & r_{12} \pm r_{13} \\ r_{21} & r_{22} \pm r_{23} \end{bmatrix} S_p = [S_{p1} \ S_{p2} \pm S_{p3}]$$

The first half is obtained from (3)', while $s_{pj}$ is obtained from $r_{kj}$ ($k=1, 2$) in the same row.

Expression 40
Especially when j=3, $$S_{p3} = -\sum_{k=1}^{2} a_{jk}(\pm r_{k3})/a_{i3}$$

Therefore, $$s_p = [s_{p1}\ s_{p2}\ \pm s_{p3}]$$

End of Proof of Theorem 13
A Proof of System 13.1
Expression 41
From step 6, $$\begin{bmatrix} r_1 \\ r_2 \\ S_p \end{bmatrix} = \begin{bmatrix} r_{11} & r_{12} \pm r_{13} \\ r_{21} & r_{22} \pm r_{23} \\ S_{p1} & S_{p2} \pm S_{p3} \end{bmatrix}$$

A set of solutions corresponding to the positive signs are expressed as $$R,\ S,\ [u_{13}\ u_{23}\ u_{33}],\ [v_{13}\ v_{23}\ v_{22}],\ [w_{13}\ w_{22}\ w_{33}]$$

Then, R corresponding to the negative signs is $$\begin{bmatrix} I_2 \\ & -1 \end{bmatrix} R \begin{bmatrix} I_2 \\ & -1 \end{bmatrix}$$

(from lemma 5)
Because by definition, $$\begin{bmatrix} R \\ s_p \end{bmatrix}^{-1} = \begin{bmatrix} a_1 \\ a_2 \\ a_3 \end{bmatrix}$$

From the relation of an inverse matrix, $$\begin{bmatrix} a_1 \\ a_2 \\ a_3 \end{bmatrix}$$

in case of the negative signs $$\begin{bmatrix} a_1 \\ a_2 \\ -a_2 \end{bmatrix}$$

From a proof of theorem 13,
Expression 42

$$[u_{13}\ u_{23}\ u_{32}] = a_3 \begin{bmatrix} v_1' & v_2' & v_3' \\ w_{1p} & w_{2p} & w_{3p} \end{bmatrix} [u_{13}\ u_{23}\ u_{33}]$$

in case of the negative signs is $$[u_{13}\ u_{23}\ u_{33}]$$

Also, from the proof of theorem 13,
Expression 43

Since $$S' = [w_1'\ w_2'\ w_3'] \begin{bmatrix} u_1' & u_2' & u_3' \\ u_{13} & u_{23} & u_{22} \end{bmatrix}^{-1}$$

In case of the negative signs, $$\begin{bmatrix} u_1' & u_2' & u_3' \\ u_{13} & u_{23} & u_{33} \end{bmatrix}^{-1}$$

has the signs in its n-th column inverted, S' has the signs in its third column inverted. As with the case of R,
Rotation matrix S corresponding to the negative signs is $$\begin{bmatrix} I_2 \\ & -1 \end{bmatrix} S \begin{bmatrix} I_2 \\ & -1 \end{bmatrix}$$

(from lemma 1)
Expression 44

$$\begin{bmatrix} v_i' \\ v_{12} \end{bmatrix} = \begin{bmatrix} R \\ r_3 \end{bmatrix} \begin{bmatrix} u_i' \\ u_{12} \end{bmatrix},\ \begin{bmatrix} w_i' \\ w_{12} \end{bmatrix} = \begin{bmatrix} S \\ s_2 \end{bmatrix} \begin{bmatrix} u_i' \\ u_{12} \end{bmatrix}\ (1=1,2,3)$$

In case of the negative signs, the first expression is $$\begin{bmatrix} I_2 \\ & -1 \end{bmatrix} R \begin{bmatrix} I_2 \\ & -1 \end{bmatrix} \begin{bmatrix} u_1' \\ -u_{13} \end{bmatrix} = \begin{bmatrix} I_2 \\ & -1 \end{bmatrix} R \begin{bmatrix} u_1' \\ u_{13} \end{bmatrix} = \begin{bmatrix} v_1' \\ -v_{13} \end{bmatrix}$$

Similarly, the second expression is $$\begin{bmatrix} I_2 \\ & -1 \end{bmatrix} S \begin{bmatrix} I_2 \\ & -1 \end{bmatrix} \begin{bmatrix} u_1' \\ -u_{13} \end{bmatrix} = \begin{bmatrix} I_2' \\ & -1 \end{bmatrix} S \begin{bmatrix} u_1' \\ u_{12} \end{bmatrix} = \begin{bmatrix} w_1' \\ -w_{13} \end{bmatrix}$$

Therefore, in case of the negative signs, $$[v_{13}\ v_{23}\ v_{33}],\ [w_{13}\ w_{23}\ w_{33}]$$

become $$-[v_{13}\ v_{23}\ v_{33}],\ -[w_{13}\ w_{23}\ w_{33}]$$

End of Proof
The lemma used in the proof of the above theorem is proved below.
Lemma 5
When $n \geq 2$,
Expression 45
In an n-dimensional rotation matrix (1)R, $$R = \begin{bmatrix} r_{11} & \vdots & r_{1n} \\ \cdots & r_{ij} & \cdots \\ r_{n1} & \vdots & r_{nn} \end{bmatrix}$$

When (n−1)-dimensional matrix obtained by eliminating the i-th row and j-th column is expressed as $R_{ij}$, $$r_{ij} = (-1)^{i+j}\ det\ R_{ij}$$

Proof
For a regular matrix A, generally, $$(A^{-1})_{ji} = (det A)^{-1}(-1)^{i+j}\ det A_{ij}$$

Substituting R into A, since $R^{-1} = R^t$ $r_{ij}=(-1)^{i+j} det R_{ij}$

End of Proof
Proof 2
A direct proof is presented.
After the case in which i, j=n is proved, the satisfaction of other cases are illustrated. (When i, j=n)

By applying the components of the k-th column to the n-th row of R, and by applying two-dimensional rotation to the components of n-th column, in sequence, the components of k-th column can be made to have values zero. That is, by expressing the (n−2)-dimensional identity matrix as $I_{n-2}$,
Expression 46

$$R \cdot \begin{bmatrix} I_{n-2} & 0 \\ \hline 0 & \begin{matrix} \cos\theta_{n-1} & \sin\theta_{n-1} \\ -\sin\theta_{n-1} & \cos\theta_{n-1} \end{matrix} \end{bmatrix} \cdots \begin{bmatrix} \cos\theta_1 & 0 & \sin\theta_1 \\ \hline 0 & I_{n-2} & 0 \\ \hline -\sin\theta_1 & 0 & \cos\theta_1 \end{bmatrix} = \begin{bmatrix} * & * \\ \hline 0 & * \end{bmatrix}$$

By expressing (n−1)-dimensional matrix obtained by eliminating the n-th row and n-th column as $R_{n-1}$,
Expression 47

$$= \begin{bmatrix} R_{n-1} & 0 \\ \hline 0 & det R_{n-1} \end{bmatrix}$$

That is, $$R = \begin{bmatrix} R_{n-1} & 0 \\ \hline 0 & det R_{n-1} \end{bmatrix} \times$$

$$\begin{bmatrix} \cos\theta_1 & 0 & -\sin\theta_1 \\ \hline 0 & I_{n-2} & 0 \\ \hline \sin\theta_1 & 0 & \cos\theta_1 \end{bmatrix} \cdots \begin{bmatrix} I_{n-2} & 0 \\ \hline 0 & \begin{matrix} \cos\theta_{n-1} & \sin\theta_{n-1} \\ -\sin\theta_{n-1} & \cos\theta_{n-1} \end{matrix} \end{bmatrix} =$$

$$\begin{bmatrix} R_{n-1} & 0 \\ \hline 0 & det R_{n-1} \end{bmatrix} \begin{bmatrix} \cos\theta_1 & & & * \\ & \cos\theta_2 & & * \\ & & \ddots & \\ 0 & & & \cos\theta_{n-1} \\ \hline & * & & \cos\theta_1 \ldots \cos\theta_{n-1} \end{bmatrix}$$

$$R_{nn} = R_{n-1} \begin{bmatrix} \cos\theta_1 & & & * \\ & \cos\theta_2 & & * \\ & & \ddots & \\ 0 & & & \cos\theta_{n-1} \end{bmatrix}$$

$det R_{nn} = (det R_{n-1}) \cos\theta_1 \ldots \cos\theta_{n-1} = r_{nn}$ $\therefore r_{nn} = (-1)^{n+n} det R_{nn}$ (When i≠n and j≠n)
The matrix obtained by swapping the i-th row with the n-th row and the j-th column with the n-th column in rotation matrix R is
Expression 48

$$i\text{-th row} \begin{bmatrix} r_{11} & r_{1n} & & r_{1j} \\ r_{n1} & r_{nn} & & r_{nj} \\ & & I_{n-1,n-1} & \\ r_{11} & r_{1n} & & r_{ij} \end{bmatrix} \begin{matrix} \\ \\ \\ \end{matrix}$$
$\quad\quad\quad\quad j\text{-th column}$ Because this is a rotation matrix, $$j\text{-th column } r_{1j} = det \begin{bmatrix} r_{1i} & r_{1n} & & \\ r_{n1} & r_{nn} & \cdots & \\ & & & r_{n-1,n-1} \end{bmatrix} i\text{-th row}$$

Because columns needs to be swapped n−1−j times or rows need to be swapped n−1−i times to transform the matrix in the matrix determinant on the right side into $R_{ij}$,
(When i=n and j≠n)
A matrix obtained by swapping the j-th column and n-th column by changing the sings in the n-th column is
Expression 49

$$j\text{-th column} \begin{bmatrix} r_{1i} & -r_{1n} & & r_{1j} \\ & & & \\ & & r_{n-1,n-1} & \\ r_{n1} & -r_{nn} & & r_{nj} \end{bmatrix}$$

Because this is a rotation matrix, $$j\text{-th column } r_{nj} = det \begin{bmatrix} r_{11} & -r_{1n} & \\ & & r_{n-1,n-1} \end{bmatrix}$$

To transform the matrix in the determinant on the right side into $R_{nj}$, the columns need to be swapped n−i−j times after converting the signs of j-th column.

$\therefore r_{nj}=(-1)^{1+n+j} det R_{nj}=(-1)^{n+j} det R_{nj}$ (When i≠n and j=n)
This is proved as in the case (when i=n and j≠n)
End of Proof
Lemma 6
R and S are n-dimensional rotation matrices where n≧2,
Expression 50
By expressing $$R = \begin{bmatrix} r_1 \\ \vdots \\ r_n \end{bmatrix} = \begin{bmatrix} R' \\ r_n \end{bmatrix}, S = \begin{bmatrix} s_1 \\ \vdots \\ s_n \end{bmatrix} = \begin{bmatrix} S' \\ s_n \end{bmatrix}$$

The necessary and sufficient condition for $$rank \begin{bmatrix} R' \\ S' \end{bmatrix} < n$$

is that (n−1)-dimensional orthogonal matrix U exists, which is expressed as $$S = \begin{bmatrix} U & \\ \hline & det U \end{bmatrix} R_1$$

Proof
(Necessity)
Because rank R'=n−1, S'=U R', where U is an (n−1)-dimensional square matrix. By expressing the i-th column of U as $u_i$,
because $(s_i, s_i)=1$ and $(u_i, u_i)=1$
When i≠j,
because $(s_i, s_j)=0$ and $(u_i, u_j)=0$
Therefore, U is an (n−1)-dimensional orthogonal matrix.
From lemma 5, Expression 51

$$s_{n1} = (-1)^{r+1} \det S_{n1}$$
$$= (-1)^{r+1} \det(UR_{n1})$$
$$= \det(U) \cdot (-1)^{r+1} \det R_{n1}$$
$$= \det(U) r_{n1}$$

Therefore, $$s_n = \det(U) r_n$$

(Sufficiency) $S = \begin{bmatrix} S' \\ s_n \end{bmatrix} = \begin{bmatrix} UR' \\ \det(U) r_n \end{bmatrix} = \begin{bmatrix} U & \\ \hline & \det U \end{bmatrix} R$ This is self-evident from $S' = U R'$.
End of Proof
Lemma 7

Premised on conditions {16}, {17} and {18} in theorem 11, next propositions (1) and (2) are outstanding.
Proposition (1)
{23} and {24} are equivalent for p (=1 or 2).
Expression 52
{23} When $$\begin{bmatrix} v_1' & v_2' & v_3' \\ w_{1p} & w_{2p} & w_{3p} \end{bmatrix}$$

is regular, and $$[u_1 \, u_2 \, u_3] \begin{bmatrix} v_1' & v_2' & v_3' \\ w_{1p} & w_{2p} & w_{3p} \end{bmatrix}^{-1} = \begin{bmatrix} a_{11} & a_{12} & a_{13} \\ a_{21} & a_{22} & a_{23} \\ a_{31} & a_{32} & a_{33} \end{bmatrix} \begin{bmatrix} a_{11} & a_{12} \\ a_{21} & a_{22} \end{bmatrix}$$

is regular.
{24} $S_{p3} \neq 0$, and $$\begin{bmatrix} R \\ s_p \end{bmatrix}$$

is regular.
Proposition (2)

If the XY coordinate system is rotated by other than integer times of ninety degrees [90°], a value of p (=1 or 2) satisfying {19} can be selected.
Proof
Expression 53

$$\begin{bmatrix} v_1' & v_2' & v_3' \\ w_{1p} & w_{2p} & w_{3p} \end{bmatrix} = \begin{bmatrix} R \\ s_p \end{bmatrix} [u_1 \, u_2 \, u_3]$$

Because $[u_1, u_2, u_3]$ is regular, $$\begin{bmatrix} v_1' & v_2' & v_3' \\ w_{1p} & w_{2p} & w_{3p} \end{bmatrix}$$

is regular $$\leftrightarrow \begin{bmatrix} R \\ s_p \end{bmatrix}$$

is regular.

At this time, $$\begin{bmatrix} R \\ s_p \end{bmatrix}^{-1} = [u_1 \, u_2 \, u_3] \begin{bmatrix} v_1' & v_2' & v_3' \\ w_{1p} & w_{2p} & w_{3p} \end{bmatrix}$$

By defining this matrix as $$A = \begin{bmatrix} a_{11} & a_{12} & a_{13} \\ a_{21} & a_{22} & a_{23} \\ a_{31} & a_{32} & a_{33} \end{bmatrix}$$

From a general formula for obtaining an inverse matrix,
Expression 54
Because $$s_{p2} = \frac{1}{|A|} \begin{vmatrix} a_{11} & a_{12} \\ a_{21} & a_{22} \end{vmatrix}, s_{p3} \neq 0 \leftrightarrow \begin{vmatrix} a_{11} & a_{12} \\ a_{21} & a_{22} \end{vmatrix} \neq 0$$

Therefore, {23} and {24} are equivalent. (2) It need only be shown that p (=1 or 2) satisfying {24} can be selected from (1).

As described in theorem 12, note that {16}, {17} and {18} are equivalent to {19} through {22}. What should be illustrated is that a value of p (=1, 2) can be selected, if the XY coordinate system is rotated other than by integer times of ninety degrees, when p (=1 or 2) satisfying {24} cannot be selected. The negation of {24} is a next external 1.
External 1
{25}
Expression 55
{25} For p such that $1 \leq p \leq 2$, $s_{p3} = 0$ or $$\begin{bmatrix} R \\ s_p \end{bmatrix}$$

is not regular.
{25} can be classified into next cases (10.1), (10.2) and (10.3).
(10.1) $s_{13} = s_{23} = 0$,
(10.2)

$$\begin{bmatrix} R \\ s_1 \end{bmatrix} \cdot \begin{bmatrix} R \\ s_2 \end{bmatrix}$$

are not regular.
(10.3) $s_{13} = 0$ and $$\begin{bmatrix} R \\ s_2 \end{bmatrix}$$

is not regular.
Alternatively,
$s_{23} = 0$ and $$\begin{bmatrix} R \\ s_1 \end{bmatrix}$$

is not regular
However, cases (10.1) and (10.2) contradict conditions {19} and {21}.

In case (10.1), because $$s = \left[\begin{array}{c|c} \cdot\frac{U}{\cdot\cdot} & \overline{detU} \end{array}\right],$$

this contradicts condition {19}.

In case (10.2), because $s_p$ ($1 \leq p \leq 2$) is a linear combination of $r_1$ and $r_2$, it intersects orthogonally with $r_3$. That is, $(s_p, r_3)=0$ ($1 \leq p \leq 2$)

Since $SR^{-1}=SR^t$, the p3 element of $SR^{-1}$ is obtained as $(s_p, r_3)$, which is zero [0].

Expression 56

Because this is, $$SR^{-1} = \left[\begin{array}{c|c} \cdot\frac{U}{\cdot\cdot} & \overline{detU} \end{array}\right]$$

it contradicts condition {21}.

Therefore, only case (10.3) remains.

Especially, when $s_{13}=0$ and $s_{23}=0$. Because this is not case (10.1), both of them cannot be zero [0].

It is shown that $s_{13} \neq 0$ and $s_{23} \neq 0$ can be achieved, if the XY coordinate system is rotated other than by integer times of ninety degrees [90°].

Expression 57

Expressing $w^*=S^* u^*$ when a coordinate system in which $w=S u$ is rotated around the Z axis by $-\theta$, since an object rotates around the Z axis by $\theta$ in a relative sense, $$u^* = \left[\begin{array}{cc} r(\theta) & \\ & 1 \end{array}\right] u, \quad w^* = \left[\begin{array}{cc} r(\theta) & \\ & 1 \end{array}\right] w$$

Therefore, $s^* = \left[\begin{array}{cc} r(\theta) & \\ & 1 \end{array}\right] s \left[\begin{array}{cc} r(-\theta) & \\ & 1 \end{array}\right]$ $$= \left[\begin{array}{cc} r(\theta) \left[\begin{array}{cc} s_{11} & s_{12} \\ s_{21} & s_{22} \end{array}\right] r(-\theta) & r(\theta)\left[\begin{array}{c} s_{13} \\ s_{23} \end{array}\right] \\ \left[\begin{array}{cc} s_{31} & s_{32} \end{array}\right] r(-\theta) & s_{33} \end{array}\right]$$

Especially, $\left[\begin{array}{c} s^*_{13} \\ s^*_{23} \end{array}\right] = r(\theta) \left[\begin{array}{c} s_{13} \\ s_{23} \end{array}\right]$ When only one of $s_{13}$ and $s_{23}$ is zero [0], by selecting $\theta$ other than integer times of ninety degrees, $s_{13} \neq 0$ and $s_{23} \neq 0$ can be achieved. Conditions {19} through {22} are outstanding even if an XY coordinate system is rotated.

Therefore, when p (=1 or 2) satisfying {24} cannot be selected, a rotation of an XY coordinate system by other than integer times of ninety degrees enables p satisfying {24} to be selected.

End of Proof

Expression 58

A next [NOTE] allows $$\left[\begin{array}{c} R \\ s_p \end{array}\right]$$

is regular." in lemma 7 to be replaced by $(s_p, r_3) \neq 0$, which is an easier expression.

NOTE

Expression 59

$$\left[\begin{array}{c} R \\ s_p \end{array}\right]$$

is regular." in condition {24} is equivalent to $(s_p, r_3) \neq 0$.

Expression 60

As a proof of lemma 7, its contraproposition is proved, which is $$\left[\begin{array}{c} R \\ s_p \end{array}\right]$$

is not regular. $\iff$ $(s_p, r_3) \neq 0$.

($\Rightarrow$) Since $s_p$ is a linear combination of $r_1$ and $r_2$, it intersects orthogonally with $r_3$.

($\Leftarrow$) If an expression $s_p = \Sigma b_i r_i$ (where $b_i$ is a constant) is substituted into $(s_p, r_3)=0$, $b_3=0$. Since $s_p$ is a linear combination of $r_1$ and $r_2$, $$\left[\begin{array}{c} R \\ s_p \end{array}\right]$$

is not regular.

End of Proof

Explained below is a proof of the representations in {19}, {20} and {21} by proving proposition 5 and lemma 8.

Proposition 5

Expression 61

Three-dimensional rotation $$\left[\begin{array}{c|c} \cdot\frac{U}{\cdot\cdot} & \overline{detU} \end{array}\right],$$

(where U is a two-dimensional orthogonal matrix.) ... (*) represents a rotation either (1) or (2).

(1) a rotation around a third axis (2) a rotation around an axis on the plane formed by first and second axes, whose angle is one hundred and eighty degrees.

Conversely, rotations (1) and (2) can be expressed by a rotation matrix (*).

Proof

Because det $U=\pm 1$, rotation matrix (*) can be classified into (1) and (2).

Expression 62

$$\left[\begin{array}{c|c} \cdot\frac{U}{\cdot\cdot} & \overline{1\cdot\cdot} \end{array}\right] \quad (1)$$

(where U is a two-dimensional rotation matrix.)

This represents a rotation around the third axis.

$$\left[\begin{array}{c|c} \cdot\frac{U}{\cdot\cdot} & \overline{1\cdot\cdot} \end{array}\right] \quad (2)$$

(where U represents a two-dimensional orthogonal matrix, and det $U=-1$.)

It is shown below that this represents a rotation around an axis on the plane formed by first and second axes, whose angle is one hundred and eighty degrees. To obtain the axis of rotation of the matrix in question, an equation (a)

$$\left[\begin{array}{c|c} U & \\ \hline & -1 \end{array}\right]\left[\begin{array}{c} x \\ y \\ z \end{array}\right]=\left[\begin{array}{c} x \\ y \\ z \end{array}\right] \quad \text{(a)}$$

is solved. Equation (a) is equivalent to an equation (b)

$$U\left[\begin{array}{c} x \\ y \end{array}\right]=\left[\begin{array}{c} x \\ y \end{array}\right] \text{ and } Z=0.$$

Expression 64
From lemma 8, $$U\left[\begin{array}{cc} \cos\theta & \sin\theta \\ \sin\theta & -\cos\theta \end{array}\right] \quad (0 \leq \theta < 2\pi)$$

Since a set of solutions of (b) is $$\left[\begin{array}{c} x \\ y \end{array}\right]=a\left[\begin{array}{c} \cos(\theta/2) \\ \sin(\theta/2) \end{array}\right]$$

(where a is any real number.)
Since a set of solutions of (a) is $$\left[\begin{array}{c} x \\ y \\ z \end{array}\right]=\left[\begin{array}{c} a\left[\begin{array}{c} \cos(\theta/2) \\ \sin(\theta/2) \end{array}\right] \\ 0 \end{array}\right]$$

(where a is any real number.)
Expression 65
Therefore, $$\left[\begin{array}{c|c} U & \\ \hline & -1 \end{array}\right]$$

represents a rotation around an axis expressed by a vector $$\left[\begin{array}{c} \cos(\theta/2) \\ \sin(\theta/2) \\ 0 \end{array}\right]$$

on the plane formed by first and second axes.
Because $$\left[\begin{array}{c|c} U & \\ \hline & -1 \end{array}\right]$$

transfers a point $$\left[\begin{array}{c} 0 \\ 0 \\ z \end{array}\right]$$

on the Z axis to a symmetrical point $$\left[\begin{array}{c} 0 \\ 0 \\ z \end{array}\right],$$

the angle of rotation is one hundred and eighty degrees [180°].

As described above, rotation matrix (*) represents both rotations (1) and (2). Hence, conversely, rotations (1) and (2) are expressed as rotation matrix (*).
End of Proof Lemma 8
When two-dimensional orthogonal matrix U is not a rotation matrix,
Expression 66

$$U=\left[\begin{array}{cc} \cos\theta & \sin\theta \\ \sin\theta & -\cos\theta \end{array}\right] \quad (0 \leq \theta < 2\pi)$$

The set of solution for a vector equation $$U\left[\begin{array}{c} x \\ y \end{array}\right]=\left[\begin{array}{c} x \\ y \end{array}\right] \text{ is } \left[\begin{array}{c} x \\ y \end{array}\right]=a\left[\begin{array}{c} \cos(\theta/2) \\ \sin(\theta/2) \end{array}\right]$$

where a is any real number.)
That is, U is a mirror image transformation with respect to an axis expressed by a vector $$\left[\begin{array}{c} \cos(\theta/2) \\ \sin(\theta/2) \end{array}\right]$$

Proof
Expression 67
Because $$\left[\begin{array}{cc} 1 & \\ & -1 \end{array}\right]$$

(direct sum of sets), $$U=S\left[\begin{array}{cc} 1 & \\ & -1 \end{array}\right]$$

(where S is a two-dimensional rotation matrix.)
Because rotation matrices S and R can be expressed as $$S=\left[\begin{array}{cc} \cos\theta & -\sin\theta \\ \sin\theta & \cos\theta \end{array}\right] \quad (0 \leq \theta < 2\pi)$$

$$U=\left[\begin{array}{cc} \cos\theta & \sin\theta \\ \sin\theta & -\cos\theta \end{array}\right] \quad (0 \leq \theta < 2\pi)$$

By transforming the expression in question,
Expression 68

$$\left[\begin{array}{ccc} \cos\theta-1 & \sin\theta \\ \sin\theta & -\cos\theta-1 \end{array}\right]\left[\begin{array}{c} x \\ y \end{array}\right]=\left[\begin{array}{c} 0 \\ 0 \end{array}\right] \quad \text{(c)}$$

By applying the formula of a double angle, $$\left[\begin{array}{cc} 2\sin^2(\theta/2), & 2\sin(\theta/2)\cos(\theta/2) \\ 2\sin(\theta/2)\cos(\theta/2), & -2\cos^2(\theta/2) \end{array}\right]\left[\begin{array}{c} x \\ y \end{array}\right]=\left[\begin{array}{c} 0 \\ 0 \end{array}\right]$$

$$\left[\begin{array}{c} \sin(\theta/2) \\ \cos(\theta/2) \end{array}\right]\times\left[\begin{array}{cc} -\sin(\theta/2) & \cos(\theta/2) \\ \sin(\theta/2) & -\cos(\theta/2) \end{array}\right]\left[\begin{array}{c} x \\ y \end{array}\right]=\left[\begin{array}{c} 0 \\ 0 \end{array}\right] \quad \text{(d)}$$

$$\left[\begin{array}{c} x \\ y \end{array}\right]=a\left[\begin{array}{c} \cos(\theta/2) \\ \sin(\theta/2) \end{array}\right] \quad \text{(e)}$$

(where a is any real number.) satisfies (d) i.e. (c). Conversely, it is shown that (e) represents every solution of (c).

I. When $\theta \neq 0$ or $\pi$,
since $\sin\theta \neq 0$, $\sin\theta = 2\sin(\theta/2)\cos(\theta/2)$, $\sin(\theta/2) \neq 0$ and $\cos(\theta/2) \neq 0$.

Hence, (d) is reduced into
Expression 69

$$\begin{bmatrix} -\sin(\theta/2) & \cos(\theta/2) \\ \sin(\theta/2) & -\cos(\theta/2) \end{bmatrix} \begin{bmatrix} x \\ y \end{bmatrix} = \begin{bmatrix} 0 \\ 0 \end{bmatrix}$$

Accordingly, represents every solution of (c).
II. When $\theta=0$,
Expression 70

$$\begin{bmatrix} 0 & 0 \\ 0 & -2 \end{bmatrix} \begin{bmatrix} x \\ y \end{bmatrix} = \begin{bmatrix} 0 \\ 0 \end{bmatrix}$$

$$\begin{bmatrix} x \\ y \end{bmatrix} = a \begin{bmatrix} 1 \\ 0 \end{bmatrix}$$

is a solution of (c), which matches (e).
III. When $\theta=\pi$, $$\begin{bmatrix} 2 & 0 \\ 0 & 0 \end{bmatrix} \begin{bmatrix} x \\ y \end{bmatrix} = \begin{bmatrix} 0 \\ 0 \end{bmatrix}$$

Expression 71

$$\begin{bmatrix} -2 & 0 \\ 0 & 0 \end{bmatrix} \begin{bmatrix} x \\ y \end{bmatrix} = \begin{bmatrix} 0 \\ 0 \end{bmatrix}$$

$$\begin{bmatrix} x \\ y \end{bmatrix} = a \begin{bmatrix} 0 \\ 1 \end{bmatrix}$$

is a solution of (c), which matches (e).
Expression 72
Since (e) is a solution of (c), the axis of U is a vector $$\begin{bmatrix} \cos(\theta/2) \\ \sin(\theta/2) \end{bmatrix}$$

Since U represents an orthogonal transformation, the length and angle remain unchanged.
Expression 73
Therefore, U represents a mirror image transformation with respect to axis expressed by a vector $$\begin{bmatrix} \cos(\theta/2) \\ \sin(\theta/2) \end{bmatrix}$$

The final result can also be directly proved by showing U=(a two-dimensional rotation of angle $\theta/2$) (a mirror image transformation with respect to the first axis) (a two-dimensional rotation of [the angle of rotation$-\theta/2$])
That is,
Expression 74

$$U = \begin{bmatrix} \cos(\theta/2), & -\sin(\theta/2) \\ \sin(\theta/2), & \cos(\theta/2) \end{bmatrix} \begin{bmatrix} 1 \\ & -1 \end{bmatrix} \begin{bmatrix} \cos(-\theta/2), & -\sin(-\theta/2) \\ \sin(-\theta/2), & \cos(-\theta/2) \end{bmatrix}$$

needs to be shown.

The right side =

$$\begin{bmatrix} \cos^2(\theta/2) & -\sin^2(\theta/2), & 2\sin(\theta/2) & \cos(\theta/2) \\ 2\sin(\theta/2) & \cos(\theta/2), & -\cos^2(\theta/2) & +\sin^2(\theta/2) \end{bmatrix} =$$

-continued $$\begin{bmatrix} \cos\theta & \sin\theta \\ \sin\theta & -\cos\theta \end{bmatrix} = \text{The left side}$$

End of Proof

So far, the new theory for use in the fourth form of this invention has been discussed in detail. By having the shape/movement recognition unit 18 shown in FIG. 4 apply this new theory to an object moving with a rotation, based on the result of extracting four feature points each in images captured at three instants in time for observation, the actual positions and movements of those feature points in a three-dimensional space are calculated, thereby enabling the movement of a moving body to be recognized.

Figure 61:
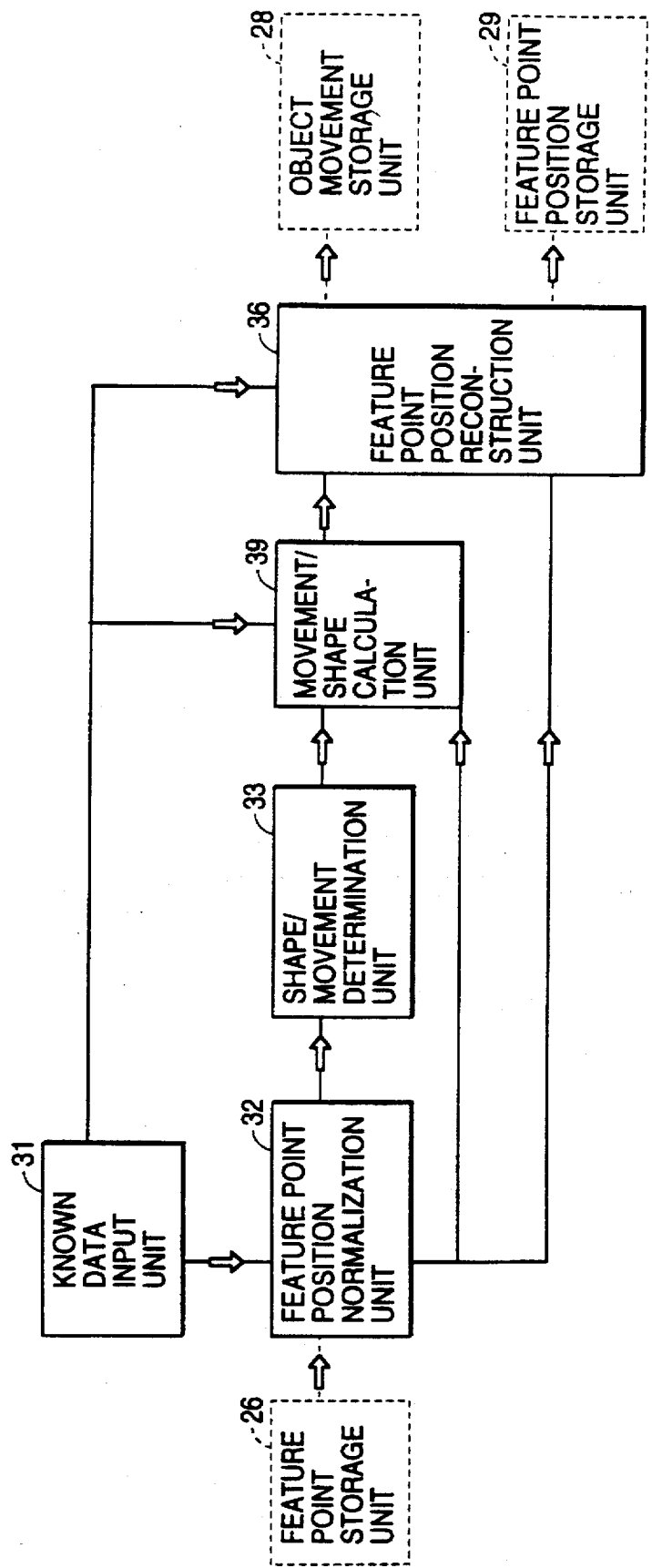
FIG. 61 is a block diagram of a shape/movement recognition unit 27 pursuant to the fourth form of this invention.

FIG. 61 is a block diagram of a shape/movement recognition unit 27 pursuant to the fourth form of this invention.

The concept of a moving body recognition apparatus in the fourth form of this invention is similar to that in the first form of this invention. Also, an embodiment of the fourth form of this invention and the detailed configuration of the shape/movement recognition unit 27 are similar to those of the first form of this invention, which are shown in FIGS. 9 through 13. Accordingly, their descriptions are omitted. The only difference is that the movement calculation unit 34 and the shape calculation unit 35 (illustrated in FIG. 12, which is a block diagram of the shape/recognition unit 27 shown in FIG. 11) are consolidated into a movement/shape calculation unit 39 shown in FIG. 61.

Figure 62:
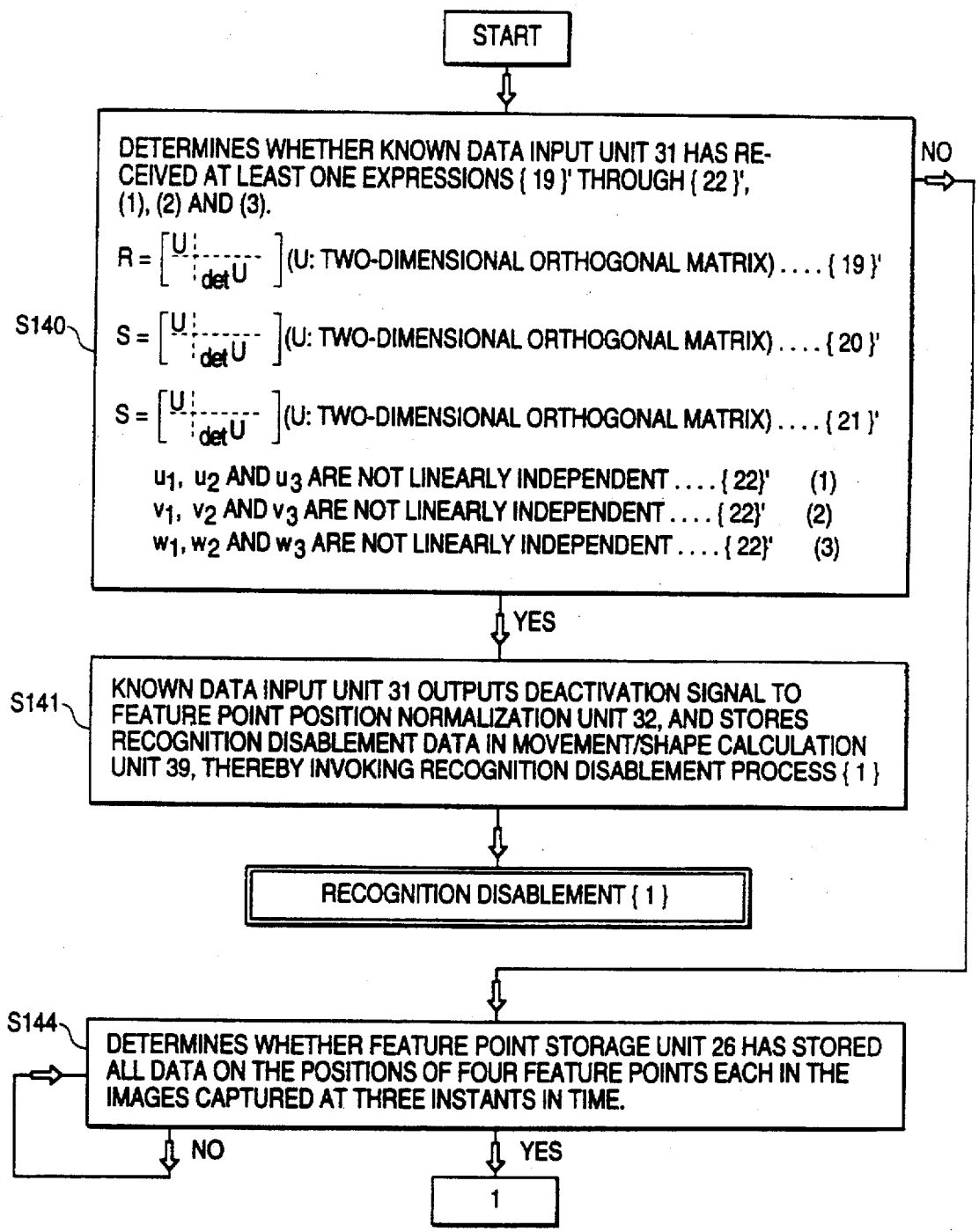
FIG. 62 is a first one of flowcharts showing in a three part series the whole processes of the shape/movement recognition unit 27 pursuant to the fourth form of this invention.
Figure 63:
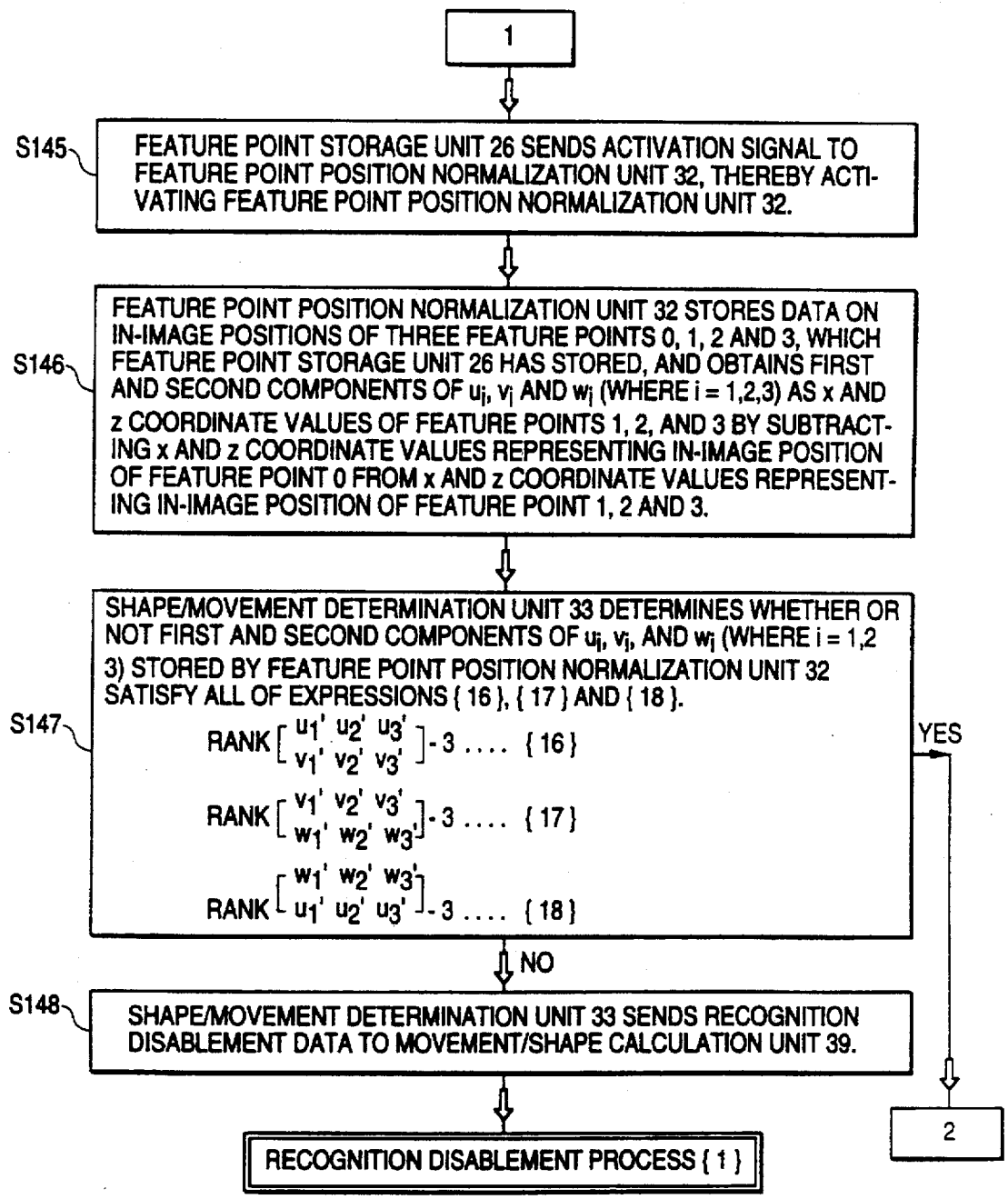
FIG. 63 is a second one of flowcharts showing in a three part series the whole processes of the shape/movement recognition unit 27 pursuant to the fourth form of this invention.
Figure 64:
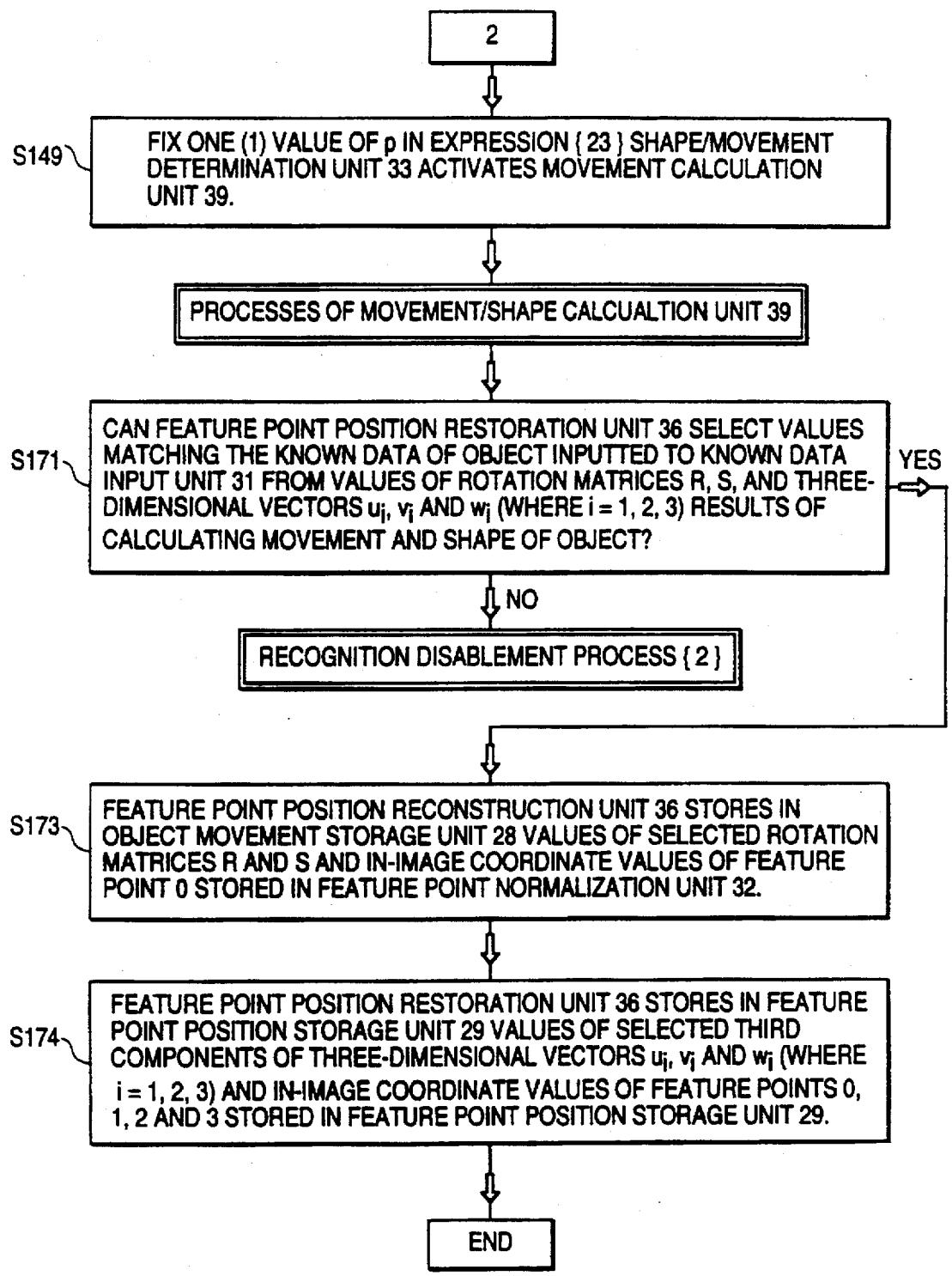
FIG. 64 is a third one of flowcharts showing in a three part series the whole processes of the shape/movement recognition unit 27 pursuant to the fourth form of this invention.

FIGS. 62, 63 and 64 are flowcharts showing in a three part series the whole processes of the shape/movement recognition unit 27 pursuant to the fourth form of this invention.

In FIG. 62, when the processes start, the shape/movement recognition unit 27 determines in step S140 whether or not the known data input unit 31 shown in FIG. 12 has received at least one of the expressions {19}' through {22}', (1), (2) and (3). As with the first, second and third forms of this invention, a signal from a sensor allows the determination to be made. The relation between expressions {19}' through {21}' and {19} through {21} are the same as those described earlier.

If the shape/movement recognition unit 27 determines in step S140 that the known data input unit 31 has received at least one of expressions {19}' through {22}', (1), (2) and (3), the known data input unit 31 outputs in step S141 a deactivation signal to the feature point position normalization unit 32, and stores recognition disablement data in the movement calculation unit 34, thereby invoking a recognition disablement process {1} shown in FIG. 64. As with the flow of recognition disablement process {1} for the second and third forms of this invention, the flow of recognition disablement process {1} for the fourth form of this invention is essentially the same as that shown in FIG. 17 for the first form of this invention.

If the shape/movement recognition unit 27 determines in step S140 that the known data input unit 31 has received none of {19}' through {22}', (1), (2) and (3), the shape/movement recognition unit 27 does not determine (NO) in step S144 that feature point storage unit 26 has stored all data on the positions of four feature points each in images captured at three instants in time for observation. The shape/movement recognition unit 27 repeats step S144 until it determines that the feature point storage unit 26 has stored the positions of four feature points each in images captured at three instants in time for observation. When the shape/movement recognition unit 27 determines (YES) in step S144 that the feature point storage unit 26 has stored all data, the shape/movement recognition unit 27 has the feature point storage unit 26 send an activation signal to the feature point position normalization unit 32 in step S145 (shown in FIG. 63), thereby activating the feature point position normalization unit 32.

Continuing on to FIG. 63, the feature point position normalization unit 32 stores in step S146 data on the in-image positions of four feature points 0, 1, 2 and 3, which the feature point storage unit 26 has stored, and obtains first and second components of $u_i$, $v_i$ and $w_i$ (where i=1, 2, 3) as X and Z coordinate values of feature points 1, 2 and 3, which are different from feature point 0, after feature point 0 moves to the origin and the other feature points 1, 2 and 3 are parallelly displaced. Therefore, the feature point position normalization unit 32 obtains the X and Z coordinate values of feature points 1, 2 and 3 after a parallel displacement by subtracting the X and Z coordinate values of feature point 0 before the parallel displacement from the X and Z coordinate values of feature points 1, 2 and 3 before the parallel displacement.

Then, the shape/movement recognition unit 27 has the shape/movement determination unit 33 determine in step S147 whether or not these first and second components stored by the feature point position normalization unit 32 satisfy all of expressions {16}, {17} and {18}. If the shape/movement determination unit 33 determines negatively (NO) in step S147, i.e. that they don't satisfy at least one of expressions {16}, {17} and {18}, the shape/movement determination unit 33 sends recognition disablement data to the movement/shape calculation unit 39 in step S148, thereby invoking recognition disablement process {1} shown in FIG. 65. The flow of recognition disablement process {1} pursuant to the fourth form of this invention shown in FIG. 65 is essentially the same as that shown in FIGS. 17, 30 and 49 pursuant to the first, second and third forms of this invention, except that the movement/shape calculation unit 39, instead of the movement calculation unit 34 sends recognition disablement data to the feature point position reconstruction unit 36.

Figure 65:
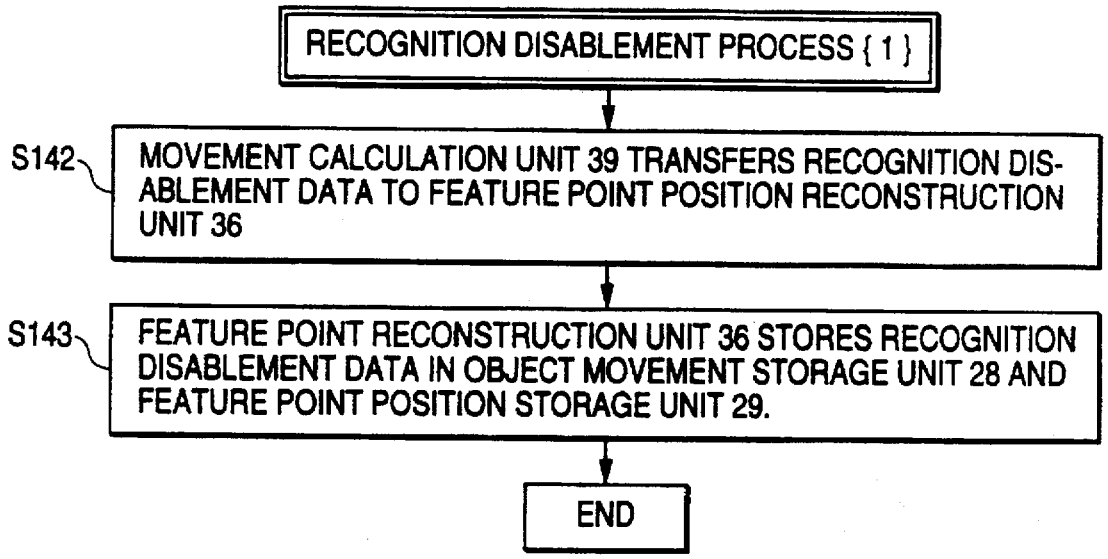
FIG. 65 is a flowchart of an embodiment of recognition disablement process {1} pursuant to the fourth form of this invention.

FIG. 65 is a flowchart of an embodiment of recognition disablement process {1} pursuant to the fourth form of this invention.

On start of recognition disablement process {1}, the movement/shape calculation unit 39 sends recognition disablement data to the feature point position reconstruction unit 36 in step S142. Then, the feature point position reconstruction unit 36 stores the recognition disablement data in the object movement storage unit 28 and the feature point storage unit 29 in step S143, thereby ending the process.

As explained in the description of theorem 12, expressions {16}, {17} and {18} are equivalent to expressions {19} through {22}. Therefore, it can be said that the check in step S147 and the check in step S140 form a duplication. However, since a sensor can perform the check in step S140, such a duplication is instituted. Also, no further calculation is performed, when the shape/movement determination unit 33 determines in step S147 a recognition disablement by using only the positions of feature points in an image.

If the shape/movement determination unit 33 determines positively (YES) in step S147 that expressions {16}, {17} and {18} are all outstanding, the shape/movement determination unit 33 activates the movement calculation unit 34 in step S149, thereby invoking respective processes of the movement calculation unit 34 and the shape calculation unit 35, in accordance with theorem 13.

As described earlier, a sensor performs a check in step S140, aside from a process of a moving body recognition apparatus pursuant to the fourth form of this invention. If the elements of R and S are known, the shape/movement recognition unit 27 can determine the receipt of expressions {19}', {20}' and {21}' and calculate two-dimensional orthogonal matrix U.

As for expression {19}',

Expression 75

$$R = \begin{bmatrix} r_{11} & r_{12} & 0 \\ r_{21} & r_{22} & 0 \\ 0 & 0 & r_{33} \end{bmatrix}$$

That is, $r_{13}=r_{23}=r_{31}=r_{32}=0$ is a necessary and sufficient condition for $$R = \left[ \begin{array}{c|c} U & \\ \hline & \det U \end{array} \right]$$

(where U is a two-dimensional orthogonal matrix.)

At this time $$U = \begin{bmatrix} r_{11} & r_{12} \\ r_{21} & r_{22} \end{bmatrix}$$

Next, as for expression {20}', $$S = \begin{bmatrix} s_{11} & s_{12} & 0 \\ s_{21} & s_{22} & 0 \\ 0 & 0 & s_{33} \end{bmatrix}$$

Expression 76

That is, $r_{13}=r_{23}=r_{31}=r_{32}=0$ is a necessary and sufficient condition for $$S = \left[ \begin{array}{c|c} U & \\ \hline & \det U \end{array} \right]$$

(where U is a two-dimensional orthogonal matrix.)

At this time, $$U = \begin{bmatrix} s_{11} & s_{12} \\ s_{21} & s_{22} \end{bmatrix}$$

Next, as for expression {21}',

Expression 77

$$S = \left[ \begin{array}{c|c} U & \\ \hline & \det U \end{array} \right] R$$

(where U is a two-dimensional orthogonal matrix.) is equivalent to $$\left[ SR^{-1} = \left[ \begin{array}{c|c} U & \\ \hline & \det U \end{array} \right] \right]$$

(where U is a two-dimensional orthogonal matrix.)

By defining $SR^{-1}=P$

Expression 78

$$P = \begin{bmatrix} p_{11} & p_{12} & 0 \\ p_{21} & p_{22} & 0 \\ 0 & 0 & p_{33} \end{bmatrix}$$

That is, $p_{13}=p_{23}=p_{31}=p_{32}=0$ is a necessary and sufficient condition for $$SR^{-1} = \left[ \begin{array}{c|c} U & \\ \hline & \det U \end{array} \right]$$

(where U is a two-dimensional orthogonal matrix.)
At this time, $$U = \begin{bmatrix} s_{11} & s_{12} \\ s_{21} & s_{22} \end{bmatrix}$$

Figure 66:
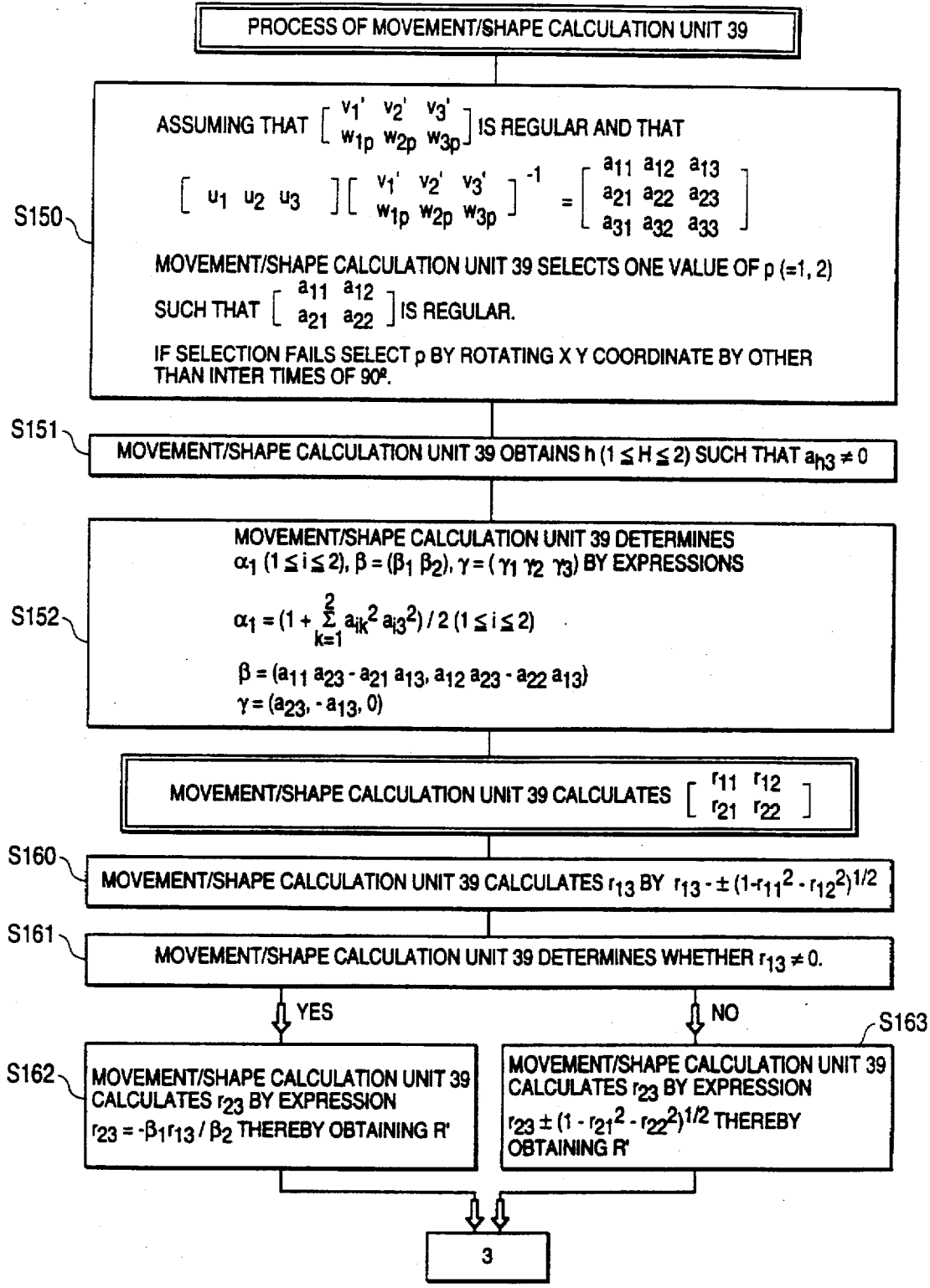
FIG. 66 is a first one of flowcharts showing in a two part series the whole processes of the movement/shape calculation unit 39 pursuant to the fourth form of this invention.
Figure 67:
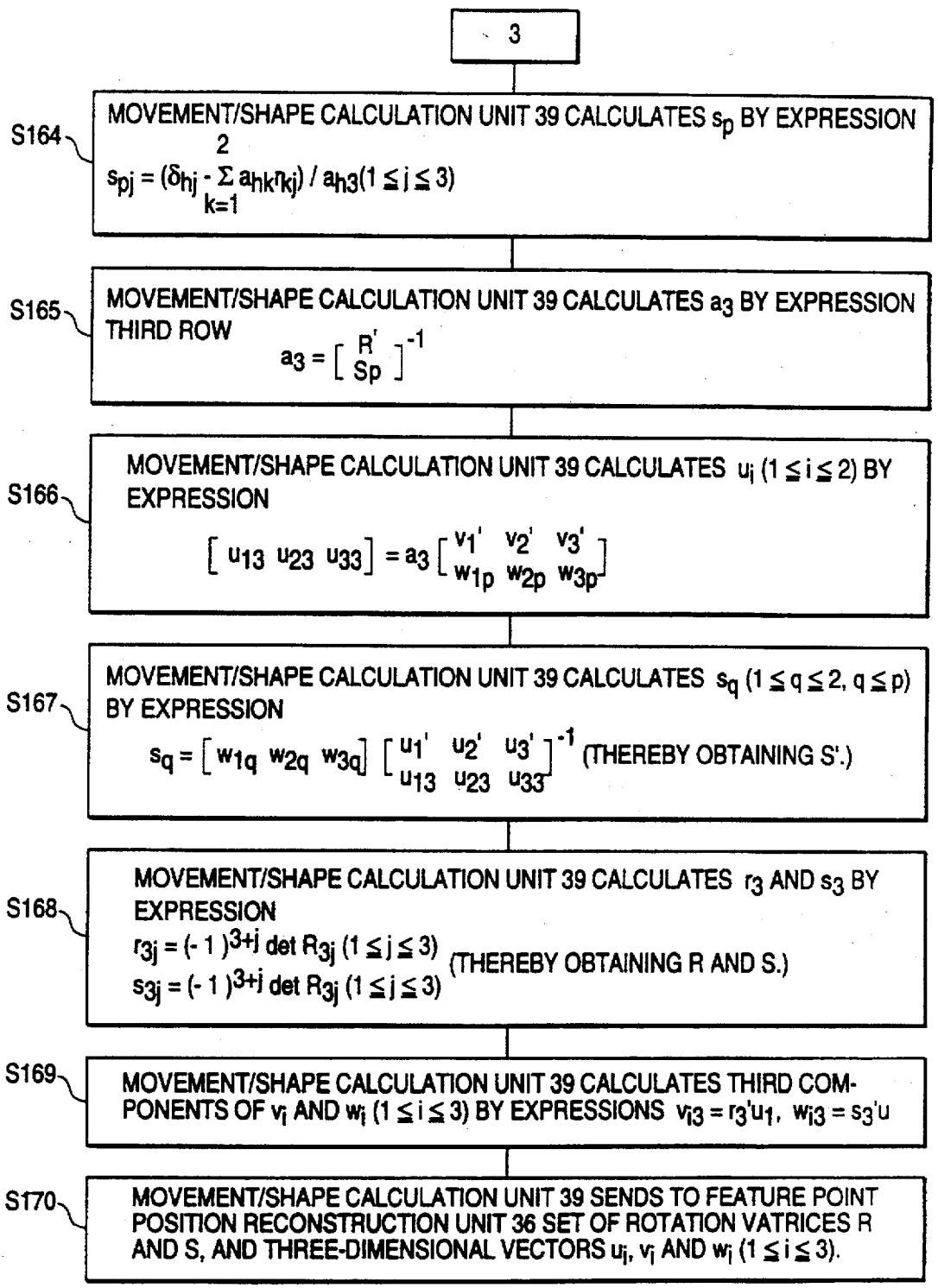
FIG. 67 is a second one of flowcharts showing in a two part series the whole processes of the movement/shape calculation unit 39 pursuant to the fourth form of this invention.

FIGS. 66 and 67 are flowcharts showing in a two part series the whole processes of the movement/shape calculation unit 39 pursuant to the fourth form of this invention.

On start of its process, the movement/shape calculation unit 39 selects in step S150 a value of p defined in expression {23}, as a first procedure. Then, as a second procedure, the movement/shape calculation unit 39 obtains in step S151 a value of h such that $a_{h3}$ is not zero, and determines in step S152 values of α, β and Γ, for calculating the values of $r_{11}$, $r_{12}$, $r_{21}$ and $r_{22}$ among elements of rotation matrix R.

Figure 68:
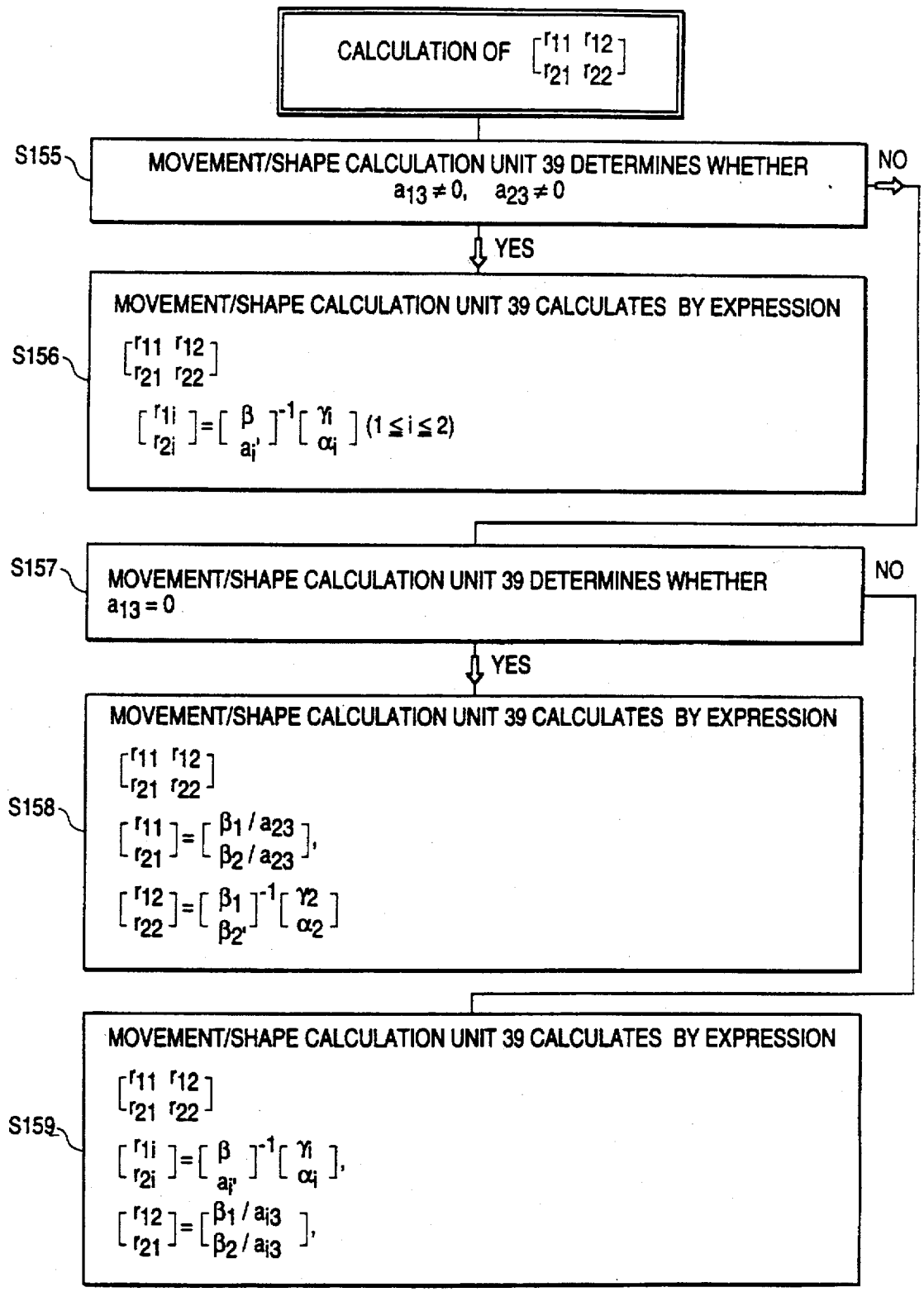
FIG. 68 is a flowchart showing processes for calculating elements at intersections between the first and second rows and the first and second columns of a rotation matrix R comprising three rows and three columns.

FIG. 68 is a flowchart showing processes for calculating elements at intersections between the first and second rows and the first and second columns of a rotation matrix R comprising three rows and three columns.

In step S158, the movement/shape calculation unit 39 determines in step S155 whether or not both $a_{13}$ and $a_{23}$ are zero. If it determines in step S155 that both of them are not zero, the movement/shape calculation unit 39 calculates $r_{11}$, $r_{12}$, $r_{21}$ and $r_{22}$ in step S156. If it determines in step S155 that either $a_{13}$ or $a_{23}$ is zero, the movement/shape calculation unit 39 determines in step S157 whether or not $a_{13}$ is zero. If it determines $a_{13}=0$ in step S157, the movement/shape calculation unit 39 calculates $r_{11}$, $r_{12}$, $r_{21}$ and $r_{22}$ in step S158. If it determines $a_{13}\neq 0$ in step S157, the movement/shape calculation unit 39 calculates $r_{11}$, $r_{12}$, $r_{21}$ and $r_{22}$ in step S159.

Returning to FIG. 66, the movement/shape calculation unit 39 calculates $r_{13}$ in step S160, on completing the calculation of $r_{11}$, $r_{12}$, $r_{21}$ and $r_{22}$ in step S156, S158 or S159 shown in FIG. 68. Then, the movement/shape calculation unit 39 determines in step S161 whether or not $r_{13}=0$. If it determines $r_{13}\neq 0$ in step S161, the movement/shape calculation unit 39 calculates $r_{23}$ in step S162. If it determines $r_{13}=0$ in step S161, the movement/shape calculation unit 39 calculates $r_{23}$ in step S163. Thus, the movement/shape calculation unit 39 has completed calculating the values of the elements in the first and second rows in rotation matrix R.

Continuing on to FIG. 67, as the final process of the second procedure, the movement/shape calculation unit 39 calculates $s_{pj}$. Then, as a third procedure, the movement/shape calculation unit 39 calculates $a_3$, which is a third row of matrix a in step S165, and the third component of a three-dimensional vector $u_1$ in step S166.

As a fourth procedure, the movement/shape calculation unit 39 calculates $s_q$ in step S167, thereby completing the calculation of the first and second rows of rotation matrix S.

As a fifth procedure, the movement/shape calculation unit 39 calculates in step S168 the third row $r_3$ of rotation matrix R and the third row $s_3$ of rotation matrix S.

As a sixth procedure, the movement/shape calculation unit 39 calculates in step S169 third components of three-dimensional vectors $v_i$ and $w_i$, and sends to the feature point position reconstruction unit 36 those calculation results, i.e. the values of rotation matrices R, S, and three-dimensional vectors $u_i$, $v_i$ and $w_i$ (where i=1, 2, 3) representing three feature points at three instants in time for observation.

Returning to FIG. 64, the feature point position reconstruction unit 36 begins its processes from step S171, when the movement/shape calculation unit 39 completes its processes in step S170 shown in FIG. 67. In step S171, the feature point position reconstruction unit 36 selects the values matching the known data of an object inputted to the known data input unit 31 from the results of calculating the movement and shape of an object, i.e. from the values of rotation matrices R, S, and three-dimensional vectors $u_i$, $v_i$ and $w_i$ (where i=1, 2, 3).

Also, the feature point position reconstruction unit 36 selects either rotation matrices R and S or their inverse rotation matrices, as well as either one of two sets of solutions, which are mirror image transformations of each other with respect to an observation plane, as with the first, second and third forms of this invention.

Figure 69:
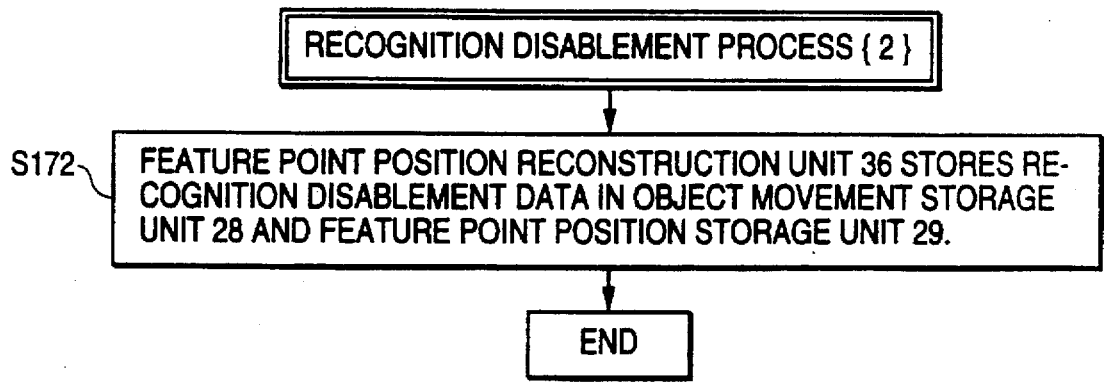
FIG. 69 is a flowchart of an embodiment of recognition disablement process {2} pursuant to the fourth form of this invention.

When it fails in selecting such values in step S171 due to their non-existences, the feature point position reconstruction unit 36 invokes a recognition disablement process {2} shown in FIG. 69, which is essentially the same as those pursuant to the first, second and third forms of this invention shown in FIGS. 22, 33 and 56.

FIG. 69 is a flowchart of an embodiment of recognition disablement process {2} pursuant to the fourth form of this invention.

In step S172, the feature point position reconstruction unit 36 stores the recognition disablement data in the object movement storage unit 28 and the feature point position storage unit 29, thereby ending the process.

Returning to FIG. 64, when it succeeds in selecting such values in step S171, the feature point position reconstruction unit 36 stores in the object movement storage unit 28 the values of selected rotation matrices R and S together with the in-image coordinate values of feature point 0 stored in feature point normalization unit 32 in step S173, and in the feature point position storage unit 29 the values of third components of the selected three-dimensional vectors $u_i$, $v_i$ and $w_i$ (where i=1, 2, 3) and the in-image coordinate values of four feature points stored in the feature point position storage unit 29 in step S174, thereby ending its processes.

Thus, the shape/movement recognition unit 27 completes its whole processes.

In the above embodiment, the movement/shape calculation unit 39 simultaneously calculates two sets of solutions in obtaining inverse rotation matrix $R^{-1}$, as shown in FIG. 65. However, it is also possible to structure another embodiment in which the movement/shape calculation unit 39 calculates only one set of solutions according to the steps shown in FIG. 66.

The other embodiment is such that the feature point position reconstruction unit 36 calculates, as the other values of rotation matrices R and S, $R^{-1}$ and $S^{-1}$, which are inverse matrices of R and S, according to next formulae.

Expression 79

$$R' = \begin{bmatrix} r_{11} & r_{12} & -r_{13} \\ r_{21} & r_{22} & -r_{23} \\ -r_{31} & -r_{32} & r_{33} \end{bmatrix}, S = \begin{bmatrix} s_{11} & s_{12} & -s_{13} \\ s_{21} & s_{22} & -s_{23} \\ -s_{31} & -s_{32} & s_{32} \end{bmatrix}$$

The feature point position reconstruction unit 36 calculates by next formulae the other set of three-dimensional vectors $u_i'$, $v_i'$ and $v_i'$ (where i=1, 2, 3), as the mirror image transformations of the set of three-dimensional vectors $u_i$, $v_i$ and $v_i$ (where i=1, 2, 3) with respect to the XZ plane on which feature points are orthogonally projected.

Expression 80

$$u_i' = \begin{bmatrix} u_{i1} \\ u_{i2} \\ -u_{i3} \end{bmatrix}, v_i' = \begin{bmatrix} v_{i1} \\ v_{i2} \\ -v_{i3} \end{bmatrix}, w_i' = \begin{bmatrix} w_{i1} \\ w_{i2} \\ -w_{i3} \end{bmatrix}$$

(where i=1, 2, 3)

Accordingly, the feature point position reconstruction unit 36 can obtain two sets of solutions.

As described above, the fourth form of this invention allows the moving body recognition apparatus to recognize the movement of an object moving with a rotation from four feature points each in images captured at three instants in time for observation. Also, as explained in the description of FIG. 63, the shape/movement determination unit 33 can immediately determine the enablement or disablement of recognizing a movement from the in-image positions of feature points.

FIG. 70 is a block diagram of a computer system embodying a moving body recognition apparatus of this invention.

As has already been described in the descriptions of FIGS. 9 through 13, a TV camera 180, image processing hardware including a space filter 181, a first memory 182 and a CPU 183 correspond respectively to the image input unit 24, the feature point extraction unit 25, the feature point storage unit 26 and the shape/movement recognition unit 27 shown in FIG. 10. The CPU 183 connects with a sensor 184 and the first memory 182. The sensor 184 comprises e.g. a keyboard for supplying known data to the known data input unit 31. The CPU 183 outputs a result of recognizing a moving body to a second memory 185 corresponding to the object movement storage unit 28 and the feature point position storage unit 29.

A moving body recognition apparatus having such a system configuration can have the TV camera 180 capture images of an object and the second memory 185 store the result of recognizing the movement of an object. The moving body recognition apparatus can be an automatic monitoring device, an visual sensing device for an automatically running vehicle, or an FA inspection device.

FIG. 71 shows an environment for an experimental program verification.

An experiment is performed to verify a program for processes of a moving body recognition apparatus of this invention by using as an input feature point correspondence data created internally in a computer. The program comprises two hundred and eighty steps, and the average duration of execution is four point six milliseconds. This attests that the moving body recognition apparatus of this invention, even if it is a system based on a personal computer, can recognize a moving body at a rate faster than a video speed.

As described in detail above, this invention allows the shape and movement of an object to be recognized based on the feature points extracted from images of an object captured by a single image input unit. As such, compared with a prior art in which two image input units are used, this invention enables the numbers of image input units and feature point extraction units to be slashed by half, thereby miniaturizing a moving body recognition apparatus. Also, because feature points of an object need not have correspondences, unlike the prior art of using two image input units, this invention sheds the time required for establishing the correspondences, thereby having an advantage of reduced processing time.

This invention enables a single TV camera to recognize a moving body. A moving body recognition apparatus can be applied for use in various industries requiring a recognition of a moving body by an image processing, such as factory automations and various monitoring devices.

In addition, this invention is applicable not only to a visual recognition of an object but also to an acoustic recognition of an object, in which case a moving body recognition apparatus is configured mutatis mutandis e.g. by using an ultrasonic sensor as a sound input unit in lieu of a TV camera as an image input unit.

What is claimed is:

1. A moving body recognition apparatus for recognizing a movement of a moving object by positions of feature points in an image corresponding to said moving object, comprising:

image input means for capturing images of said moving object;

feature point extraction means for extracting feature points in said images captured by said image input means;

feature point position storage means for storing known position data corresponding to said extracted feature points; and shape/movement recognition means for calculating actual positions of said extracted feature points and a movement of said object from said known position data of three of said extracted feature points of said object each in said images captured at any three instances in time from a direction perpendicular to an axis of rotation of said object moving on a single plane and said object having a rotation, three positions at said three instances of any one of said three feature points being on a plane parallel to said direction perpendicular to said axis of rotation.

2. The moving body recognition apparatus according to claim 1, wherein:

said shape/movement recognition means processes said images of said object captured from said direction perpendicular to said axis of rotation as orthogonally projected images of said object.

3. The moving body recognition apparatus according to claim 2, wherein said feature point extraction means comprises:

a space filter means for extracting an outline image from said images captured by said image input means; and an edge point extraction means for extracting an edge point from said outline image and for storing it as feature point data in said feature point position storage means.

4. The moving body recognition apparatus according to claim 2, further comprising:

a feature point position storage means for storing the actual positions of feature points outputted from said shape/movement recognition means; and an object movement storage means for storing the angle of rotation of an object outputted from said shape/movement recognition means.

5. The moving body recognition apparatus according to claim 4, configured as a computer system comprising:

a television camera in correspondence with said image input means;

image processing hardware including a space filter in correspondence with a feature point extraction means;

a first memory in correspondence with said feature point position storage means;

a central processing unit (CPU) in correspondence with said shape/movement recognition means;

a second memory in correspondence with said feature point position storage means and said object movement storage means; and a sensor for outputting to said CPU known position data regarding the shape and movement of said object.

6. The moving body recognition apparatus according to claim 4, wherein:

said image input means captures images of said object monitored by a visual device of an automatically running vehicle or an image of said object inspected in an inspection of factory automation (FA); and said feature point position storage means and said object movement storage means store the results of recognizing the movements of said object being monitored or inspected.

7. The moving body recognition apparatus according to claim 4, wherein said shape/movement recognition means comprises:

a known data input means for receiving from an external sensor known-data regarding movements and positions of said feature points of said object;

a feature point position normalization means for obtaining as normalized known position data the relative positions of the other two [2] feature point when one [1] of said three [3] feature points of said object each in said images captured at any three [3] instants in time for observation falls on the origin of a three-dimensional coordinate space;

a shape/movement determination means for determining an enablement or a disablement of recognizing said movements and positions of feature points of said object by using an output from said feature point position normalization means;

a movement calculation means, activated by a determination by said shape/movement determination means of an enablement of recognizing said movements and positions of said feature points of said object, for calculating an angle of rotation of said object around said origin by using an output from said feature point position normalization means;

a shape calculation means for obtaining unknown position data other than said known position data of said three [3] feature points of said object by using outputs from said movement calculation means and said feature point position normalization means; and a feature point position reconstruction means for outputting a movement of said object by combining an angle of rotation around said origin outputted from said movement calculation means with position data of said feature point falling on said origin in said images outputted from said feature point position normalization means, and for outputting positions of feature points by combining said unknown position data outputted from said shape calculation means with said position data of three [3] feature points in said images outputted from said feature point position normalization means.

8. The moving body recognition apparatus according to claim 7, wherein an external memory means for temporarily storing known data outputted from said external sensor on an offline basis is provided before an input to said known data input means.

9. The moving body recognition apparatus according to claim 7, wherein the whole processes of said shape/movement recognition means comprise:

a first step of determining whether or not said known data input means has received at least one [1] of six [6] expressions, $R = \pm I$, $S = \pm I$, $R = \pm S$, (where I is an identity matrix)

$u_{11}u_{22} - u_{21}u_{12} = 0$, $v_{11}v_{22} - v_{21}v_{12} = 0$ and $w_{11}w_{22} - w_{21}w_{12} = 0$, when the relations between two-dimensional vectors $u_i$, $v_i$ and $w_i$ (i=1, 2), are expressed as:

$v_i = R u_i$ and $w_i = S u_i$, (i=1, 2) where the X axis is the direction of a parallel displacement of said three [3] feature points 0, 1 and 2, the Z axis is the direction parallel to the axis of rotation of said object and, the Y axis is a direction perpendicular to an image plane, which is the XZ plane, $u_i = [u_{i1}, u_{i2}]^t$, $v_i = [v_{i1}, v_{i2}]^t$ and $w_i = [w_{i1}, w_{i2}]^t$ on the XY plane representing relative positions of feature points 1 and 2 (two [2] not falling on the origin of said three [3] feature points 0, 1 and 2) from the origin on which feature point 0 falls respectively at said first, second and third instants in time for observation, and a pair of rotation matrices R and S $$R = \begin{bmatrix} r_{11} & r_{12} \\ -r_{12} & r_{11} \end{bmatrix} S = \begin{bmatrix} s_{11} & s_{12} \\ -s_{12} & s_{11} \end{bmatrix}$$

represent two-dimensional rotations on the XY plane around the origin of an object from said first instant in time for observation respectively to said second and third instants in time for observation;

a second step, invoked when said shape/movement recognition means determines positively in said first step, of executing recognition disablement process {1} after said known data input means outputs a deactivation signal to said feature point position normalization means and recognition disablement data to said movement calculation means;

a third step, invoked when said shape/movement recognition means determines negatively in said first step, of determining whether said feature point position storage means has stored positions of said three [3] feature points 0, 1 and 2 in said images at three [3] instants in time for observation, which is repeated until a positive determination is obtained;

a fourth step, invoked when said shape/movement recognition means determines positively in said third step, of having said feature point position storage means send an activation signal to said feature point position normalization means, thereby activating said feature point position normalization means;

a fifth step of having feature point position normalization means store positions of said three [3] feature points 0, 1 and 2 each in said images stored in said feature point position storage means and obtain first components of vectors $u_i$, $v_i$ and $w_i$ (where i=1, 2) as the X coordinate values by subtracting from the x coordinate values of feature points 1 and 2 in said images the X coordinate values of feature point 0 in said images, which falls on the origin of said XZ plane;

a sixth step of having said shape/movement determination means determine whether said first components of vectors $u_i,v_i$ and $w_i$ (where i=1, 2) obtained by said feature point position normalization means satisfy all of next three [3] conditions $$\begin{bmatrix} u_{11} & u_{21} \\ v_{11} & v_{21} \end{bmatrix}$$

is regular, $$\begin{bmatrix} v_{11} & v_{21} \\ w_{11} & w_{21} \end{bmatrix}$$

is regular, $$\begin{bmatrix} w_{11} & w_{21} \\ u_{11} & u_{21} \end{bmatrix}$$

is regular, a seventh step, invoked when said shape/movement determination means determines negatively in said sixth step, of having said shape/movement determination means output recognition disablement data to said movement calculation means, thereby executing a recognition disablement process {1};

an eighth step, invoked when said shape/movement determination means determines positively in said sixth step, of having said shape/movement determination means activate said movement calculation means for executing a process of said movement calculation means;

a ninth step of having shape calculation means execute its process;

a tenth step of having said feature point position reconstruction means determine whether or not there is a set of R, S, $u_1$, $v_1$, $w_1$, $u_2$, $v_2$ and $w_2$ satisfying said known data regarding said movement and said shape of said object received by said known data input means;

an eleventh step, invoked when said feature point position reconstruction means determines negatively in said tenth step, of having said feature point position reconstruction means execute a recognition disablement process {2};

a twelfth step, invoked when said feature point position reconstruction means determines positively in said tenth step, of having said feature point position reconstruction means store in said object movement storage means a pair of rotation matrices R and S satisfying said known data and the coordinate values of feature point 0 in said images outputted from said feature point position normalization means; and a thirteenth step of having said feature point position reconstruction means store in said feature point position storage means second components of $u_1$, $v_1$, $w_1$, $u_2$, $v_2$ and $w_2$ satisfying said known data and coordinate values of feature points 0, 1 and 2 in said images outputted from said feature point position normalization means, thereby ending the whole processes.

10. The moving body recognition apparatus according to claim 9, wherein said movement calculation means:

calculates $$a_1 = [a_{11}\ a_{12}] = [u_{11}\ u_{12}]\begin{bmatrix} v_{11} & v_{21} \\ w_{11} & w_{21} \end{bmatrix}^{-1}$$

rotation matrix R by the result of calculating $a_1$ by using an expression $$R_1 = [r_{11}\ r_{12}] = [(1+a_{11}^2-a_{12}^2)/2a_{11} \pm (1-r_{11}^2)^{1/2}]$$

rotation matrix S by using an expression $$S_1 = [s_{11}\ s_{12}] = [(1-a_{11}r_{11})/a_{12} - a_{11}r_{12}/a_{12}]$$

determines whether or not a calculated pair of rotation matrices R and S satisfies said known data of said object received by said known data input means;

invokes said recognition disablement process {1} when no pair of rotation matrices R and S satisfies said known data; and sends said pair of rotation matrices R and S satisfying said known data to said shape calculation means and said feature point position reconstruction means.

11. The moving body recognition apparatus according to claim 10, wherein said recognition disablement process {1} comprises:

a step of having said movement calculation means send to said feature point position reconstruction means recognition disablement data; and a step of having said feature point position reconstruction means store said recognition disablement data in said object movement storage means and said feature point position storage means, for a process completion.

12. The moving body recognition apparatus according to claim 9, wherein said shape calculation means:

calculates $a_2$ by using an output from said movement calculation means and by using an expression $$a_2 = [a_{21}\ a_{22}] = \text{second row of}\begin{bmatrix} R_1 \\ S_1 \end{bmatrix}^{-1};$$

calculates second components of said two-dimensional vectors $u_1$ and $u_2$ by using an expression $$[u_{12}\ u_{22}] = a_2 \begin{bmatrix} v_{11} & v_{21} \\ w_{11} & w_{21} \end{bmatrix};$$

calculates second components of said two-dimensional vectors $v_1$ and $v_2$ by using an expression $$v_{i2} = R_2\ u_i = [-r_{12}\ r_{11}]\begin{bmatrix} u_{i1} \\ u_{i2} \end{bmatrix}\ (\text{where } i = 1,2);$$

calculates second components of said two-dimensional and vectors $w_1$ and $w_2$ by using an expression $$w_{i2} = S_2\ u_i = [-s_{12}\ s_{11}]\begin{bmatrix} u_{i1} \\ u_{i2} \end{bmatrix}$$

(where i=1, 2); and sends to feature point position reconstruction means the calculated values of second components $u_{22}$, $v_{12}$, $v_{22}$, $w_{12}$ and $w_{22}$ of said two-dimensional vectors $u_1$, $u_2$, $v_1$, $v_2$, $w_1$ and $w_2$.

13. The moving body recognition apparatus according to claim 9, wherein said recognition disablement process {2} comprises:

a step of having said feature point position reconstruction means store recognition disablement data in said object movement storage means and said feature point position storage means, for a process completion.

14. The moving body recognition apparatus according to claim 9, wherein said movement calculation means:

calculates only $a_1$ by using an output from said feature point position normalization means and an expression $$a_1 = [a_{11}\ a_{12}] = [u_{11}\ u_{12}] \begin{bmatrix} v_{11} & v_{21} \\ w_{11} & w_{21} \end{bmatrix}^{-1};$$

calculates rotation matrix R by the result of calculating $a_1$ by using an expression $$R_1 = [r_{11}\ r_{12}] = [a_{11}/2 \pm (1-r_{11}^2)^{1/2}]$$

rotation matrix S by using an expression $S_1$=first row of rotation matrix $R^2$;

and sends said calculated pair rotation matrices R and S to said shape calculation means and feature point position reconstruction means.

15. The moving body recognition apparatus according to claim 9, wherein:

said movement calculation means calculates $a_1$ by using an output from said feature point position normalization means and an expression $$a_1 = [a_{11}\ a_{12}] = [u_{11}\ u_{12}] \begin{bmatrix} v_{11} & v_{21} \\ w_{11} & w_{21} \end{bmatrix}^{-1}$$

calculates rotation matrix R by using only one [1] of positive and negative values of $r_{12}$ $$R_1 = [r_{11}\ r_{12}] = [(1+a_{11}^2-a_{12}^2)/2a_{11} \pm (1-r_{11}^2)^{1/2}]$$

calculates rotation matrix S by using an expression $$S_1 = [s_{11}\ s_{12}] = [(1-a_{11}r_{11})/a_{12} - a_{11}r_{12}/a_{12}],$$

and sends said pair of rotation matrices R and S to said shape calculation means and said feature point position reconstruction means;

said shape calculation means calculates $a_2$ by using an output from said movement calculation means and an expression $$a_2 = [a_{21}\ a_{22}] = \text{second row of} \begin{bmatrix} R_1 \\ S_1 \end{bmatrix}^{-1}$$

calculates second components of two [2] of said two-dimensional vectors $u_1$ and $u_2$ by using an expression $$[u_{12}\ u_{22}] = a_2 \begin{bmatrix} v_{11} & v_{21} \\ w_{11} & w_{21} \end{bmatrix}$$

calculates second components of two [2] of said two-dimensional vectors $v_1$ and $v_2$ by using an expression $$v_{i2} = R_2\ u_i = [-r_{12}\ r_{11}] \begin{bmatrix} u_{i1} \\ u_{i2} \end{bmatrix} \text{ (where } i=1,2)$$

calculates second components of two [2] of said two-dimensional and vectors $w_1$ and $w_2$ by using an expression $$w_{i2} = S_2\ u_i = [-s_{12}\ s_{11}] \begin{bmatrix} u_{i1} \\ u_{i2} \end{bmatrix} \text{ (where } i=1,2), \text{ and}$$

sends to feature point position reconstruction means the calculated values of second components $u_{12}$, $u_{22}$, $v_{12}$, $v_{22}$, $w_{12}$ and $w_{22}$ of said two-dimensional vectors $u_1$, $u_2$, $v_1$, $v_2$, $w_1$ and $w_2$;

said feature point position reconstruction means calculates a pair of rotation matrices R' and S' inverse to said pair of rotation matrices R and S by using expressions $$R' = \begin{bmatrix} r_{11} & -r_{12} \\ r_{12} & r_{11} \end{bmatrix}\ S' = \begin{bmatrix} s_{11} & -s_{12} \\ s_{12} & s_{11} \end{bmatrix}$$

calculates the mirror image transformations $u_i'$, $v_i'$ and $w_i'$ of (i=1, 2) said two-dimensional vectors $u_i$, $v_i$ and $w_i$ (i=1, 2) by using expressions $$u_i' = \begin{bmatrix} u_{i1} \\ u_{i2} \end{bmatrix}\ v_i' = \begin{bmatrix} v_{i1} \\ v_{i2} \end{bmatrix}\ w_i' = \begin{bmatrix} w_{i1} \\ w_{i2} \end{bmatrix} (i=1,2).$$

16. A moving body recognition apparatus for recognizing a movement of a moving object by positions of feature points in images corresponding to said moving object, comprising:

image input means for capturing images of said moving object from a direction perpendicular to an axis of rotation of said object moving on a single plane and said object having a rotation;

feature point extraction means for extracting three feature points in said images captured at any three instances in time by said image input means, three positions at said three instances of any one of said three feature points being on a plane parallel to said direction perpendicular to said axis of rotation;

feature point position storage means for storing known position data of said extracted three feature points; and movement recognition means for calculating a movement of said object from said known position data of said extracted three feature points of said object each in said images captured at any three instances in time by said image input means.

* * * * *